US012518876B2

(12) United States Patent
Fossat et al.

(10) Patent No.: US 12,518,876 B2
(45) Date of Patent: Jan. 6, 2026

(54) SYSTEMS AND METHODS FOR GENERATING MODELS FOR DETERMINING BLOOD GLUCOSE LEVELS USING VOICE

(71) Applicant: KVI Brave Fund I Inc., Toronto (CA)

(72) Inventors: Yan Fossat, Toronto (CA); Jouhyun Jeon, Toronto (CA)

(73) Assignee: KVI BRAVE FUND I INC., Toronto (CA)

(*) Notice: Subject to any disclaimer, the term of this patent is extended or adjusted under 35 U.S.C. 154(b) by 266 days.

(21) Appl. No.: 18/039,262

(22) PCT Filed: Sep. 27, 2021

(86) PCT No.: PCT/CA2021/051341
§ 371 (c)(1),
(2) Date: May 29, 2023

(87) PCT Pub. No.: WO2022/109714
PCT Pub. Date: Jun. 2, 2022

(65) Prior Publication Data
US 2024/0013915 A1 Jan. 11, 2024

Related U.S. Application Data

(60) Provisional application No. 63/119,109, filed on Nov. 30, 2020.

(51) Int. Cl.
*G16H 50/20* (2018.01)
*A61B 5/00* (2006.01)
(Continued)

(52) U.S. Cl.
CPC ......... *G16H 50/20* (2018.01); *A61B 5/14532* (2013.01); *A61B 5/4803* (2013.01);
(Continued)

(58) Field of Classification Search
CPC .... G16H 50/20; G16H 40/67; A61B 5/14532; A61B 5/4803; G10L 25/03; G10L 25/66
See application file for complete search history.

(56) References Cited

U.S. PATENT DOCUMENTS 6,151,571 A * 11/2000 Pertrushin ............... G10L 17/26
704/207
7,398,213 B1 7/2008 Levanon et al.
(Continued)

FOREIGN PATENT DOCUMENTS

DE 102015218948 A1 9/2015
EP 3937170 A1 1/2022
(Continued)

OTHER PUBLICATIONS

Zhang, Larry, et al. "DigiVoice: Voice biomarker featurization and analysis pipeline." arXiv preprint arXiv:1906.07222 (2019). (Year: 2019).*

(Continued)

*Primary Examiner* — Brian L Albertalli
(74) *Attorney, Agent, or Firm* — FASKEN MARTINEAU DuMOULIN LLP; Paul Blizzard

(57) ABSTRACT

Provided are methods and systems for generating a model for determining blood glucose levels using voice samples and associated embodiments. Different criteria for selecting voice features as biomarkers for determining blood glucose levels were investigated. Models generated using voice features selected using multiple criteria including a univariate measure, a measure of intra-stability of the voice feature and a measure of the decision-making ability of the voice feature were found to discriminate between subjects with different blood glucose levels and perform better than models generated using fewer criteria. The described embodiments can be used to generate models useful for integration (Continued)

into various applications for predicting blood glucose levels using voice.

22 Claims, 30 Drawing Sheets

(51) Int. Cl.
  *A61B 5/145* (2006.01)
  *G10L 25/03* (2013.01)
  *G10L 25/66* (2013.01)
  *G16H 40/67* (2018.01)
(52) U.S. Cl.
  CPC .............. *G10L 25/03* (2013.01); *G10L 25/66* (2013.01); *G16H 40/67* (2018.01)

(56) References Cited

U.S. PATENT DOCUMENTS

| | | | |
|---|---|---|---|
| 7,925,508 | B1 | 4/2011 | Michaelis |
| 10,475,530 | B2 | 11/2019 | Harper |
| 10,515,629 | B2 | 12/2019 | Harper |
| 10,950,226 | B2 | 3/2021 | Harper |
| 10,978,181 | B2 | 4/2021 | Harper |
| 11,011,188 | B2 | 5/2021 | Shallom |
| 12,039,425 | B1 * | 7/2024 | Nudd ................... G16H 50/70 |
| 2015/0318002 | A1 * | 11/2015 | Karam ................ A61B 5/4803 704/231 |
| 2018/0277146 | A1 * | 9/2018 | Chen ................... G16H 50/30 |
| 2019/0189148 | A1 | 6/2019 | Levanon |
| 2019/0365301 | A1 | 12/2019 | Rasmusson et al. |
| 2020/0077940 | A1 | 3/2020 | Srivastava et al. |
| 2020/0098384 | A1 * | 3/2020 | Nematihosseinabadi .................... G10L 15/22 |
| 2020/0388287 | A1 * | 12/2020 | Anushiravani ........ G16H 20/10 |
| 2021/0201900 | A1 | 7/2021 | Harper |
| 2021/0233623 | A1 | 7/2021 | Harper |
| 2021/0361227 | A1 | 11/2021 | Chou et al. |
| 2022/0037022 | A1 * | 2/2022 | Khanzada ............... G06N 20/20 |

FOREIGN PATENT DOCUMENTS

| | | | | |
|---|---|---|---|---|
| GB | 2605929 | A * | 10/2022 | ........... A61B 5/0004 |
| RU | 2506893 | C1 * | 2/2014 | ......... A61B 5/14532 |
| RU | 2510023 | C1 * | 3/2014 | ......... A61B 5/14532 |
| WO | 2014049438 | A2 | 4/2014 | |
| WO | 2014072823 | A2 | 5/2014 | |

OTHER PUBLICATIONS

Jeon et al., "Biomarker potential of real-world voice signals to predict abnormal blood glucose levels", bioRxiv, Sep. 28, 2020 (Sep. 28, 2020), pp. 1-26.
Sidorova et al., "Blood Glucose Estimation from Voice: First Review of Successes and Challenges", Journal of Voice, Oct. 9, 2020 (Sep. 10, 2020), pp. 1-11.
C. Tschope et al., "Estimating Blood Sugar from Voice Samples: A Preliminary Study", 2015 International Conference on Computational Science and Computational Intelligence (CSCI), 2015, pp. 804-805.
Sidorova et al. "Voice Changes in Diabetes Mellitus: a Methodological Commentary", The Journal of Voice, Jul. 29, 2020 (Jul. 29, 2020), pp. 1-12.

* cited by examiner

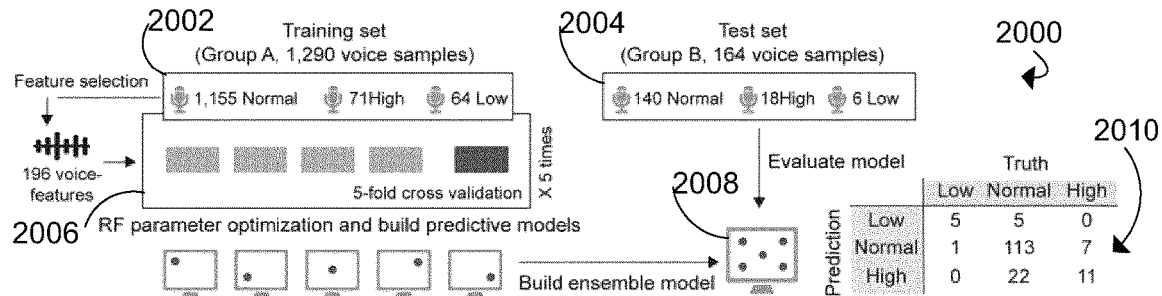
FIG. 20
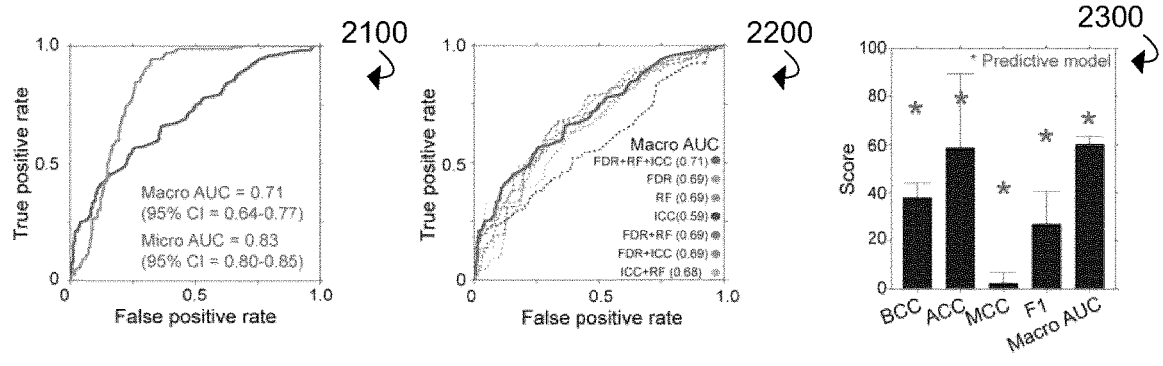
FIG. 21  FIG. 22  FIG. 23
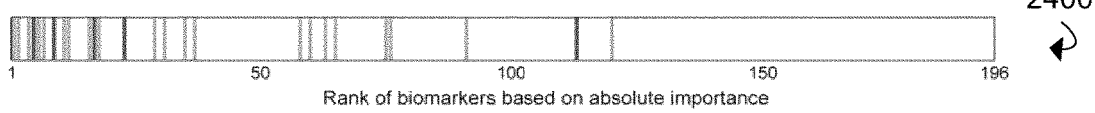
FIG. 24
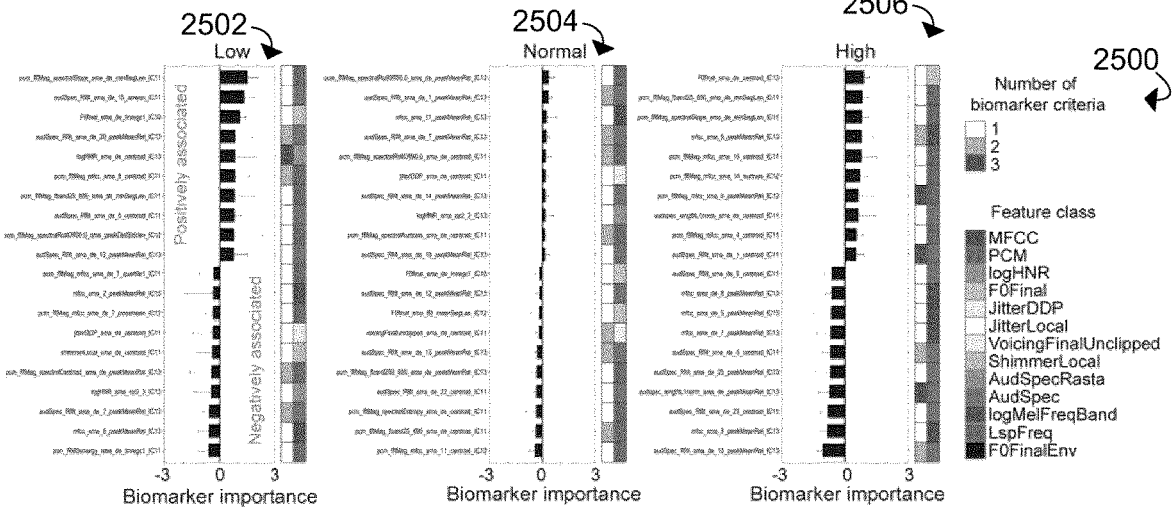
FIG. 25

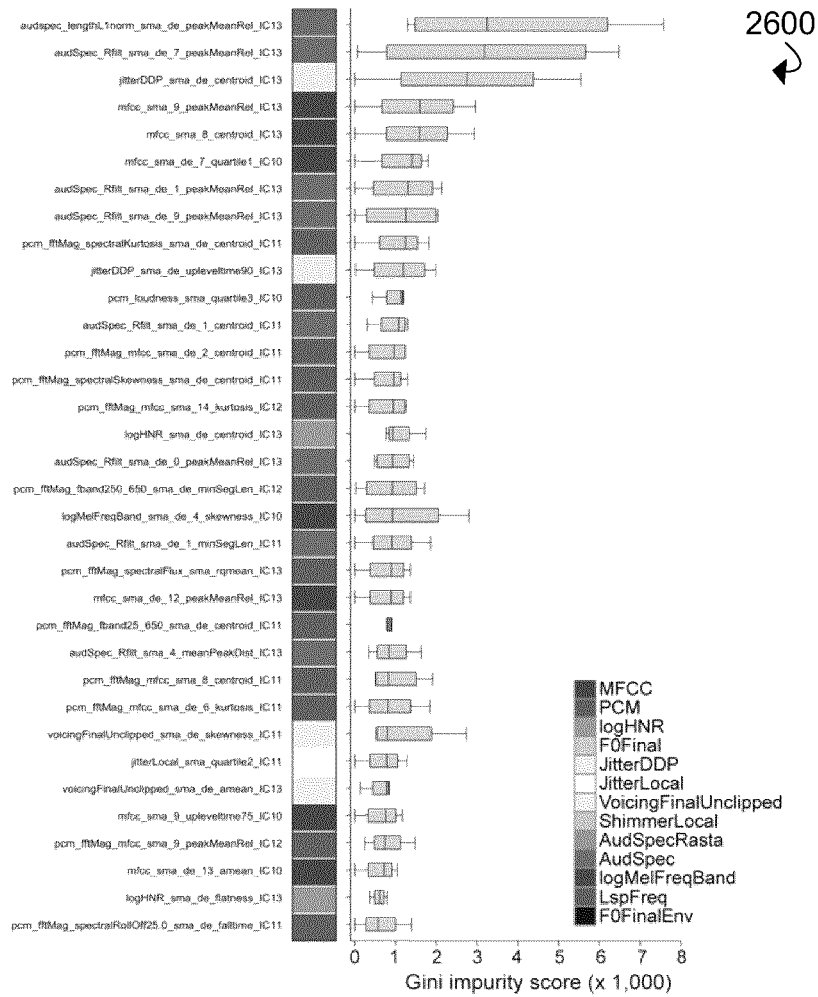
FIG. 26
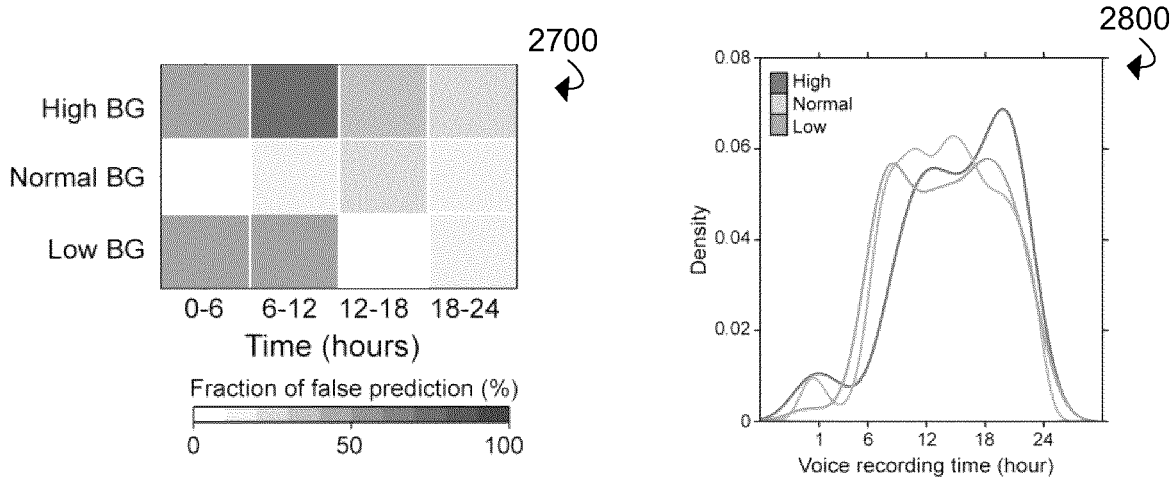
FIG. 27
FIG. 28

SYSTEMS AND METHODS FOR GENERATING MODELS FOR DETERMINING BLOOD GLUCOSE LEVELS USING VOICE

RELATED APPLICATIONS

This application is a 35 USC § 371 national stage entry of International Patent Application No. PCT/CA2021/051341 filed Sep. 27, 2021, which claims priority to U.S. provisional patent application No. 63/119,109 filed Nov. 30, 2020, the entire contents of each of which are hereby incorporated by reference.

FIELD

The described embodiments relate to determining blood glucose levels using voice and more specifically to systems and methods for generating models for determining blood glucose levels using voice samples.

BACKGROUND

Human voice is composed of complex signals that are tightly associated with physiological changes in body systems. Due to the depth of signals that can be analyzed, as well as the wide range of potential physiological dysfunction that manifest in voice signals, voice has quickly gained traction in healthcare and medical research. For example, it has been shown that thyroid hormone imbalance caused the hoarseness of voice, and affected larynx development (Hari Kumar et al., 2016). Unstable pitch and loudness were observed in patients with multiple sclerosis (Noffs et al., 2018). Other recent studies also demonstrated distinct voice characteristics that were associated with various pathological, neurological, and psychiatric disorders, such as congestive heart failure (Maor et al., 2020), Parkinson's disease (Vaicuknyas et al., 2017), Alzheimer's disease (Fraser et al., 2015), post-traumatic stress disorder (Marmar et al., 2019), and autism spectrum disorder (Bonneh et al., 2011). The human voice is now considered as an emerging biomarker, which is inherently non-invasive, low-cost, accessible, and easy monitor for health conditions in various real-life settings.

Glucose is an essential component of cellular metabolism, and its concentration in blood is regulated and maintained in a controlled, physiological range as a part of metabolic homeostasis (Veen et al., 2020). Long-lasting disturbances in blood glucose concentrations can cause diabetes and diabetes-related complications. Diabetes has a high incidence (10.5% of population in 2018) and is one of the main causes of death in the United States (7th leading cause). In spite of such risks, screening undiagnosed patients is not conducted routinely, and thus about 50% of adult diabetes cases are estimated to be undiagnosed, globally (Beagley et al., 2014).

Recent studies have investigated whether Type 2 Diabetes patients have different voice characteristics compared to healthy controls (Hamdan et al., 2012; Pinyopodjanard et al. 2019) and a higher vocal pitch has been observed as a potential clinical symptom of hypoglycemia in Type 1 Diabetes patients (Czupryniak et al., 2019). However, voice characteristics associated with abnormal blood glucose levels (e.g., elevated blood glucose not considered clinically hyperglycemic) in healthy or potentially prediabetic individuals remains unknown despite their considerable potential for clinical diagnostic utility.

Voice signal analysis is an emerging non-invasive technique to examine health conditions. The analysis of human voice data (including voice signal analysis) presents a technical computer-based problem which involves digital signal processing of the voice data. Analysis, including the use of predictive models, requires significant processing capabilities in order to determine biomarker signals and extract relevant information. The sheer number of available biomarker signals poses a challenge since the biomarkers must be efficiently selected in order to reduce processing overhead. Another challenge for voice signal analysis systems performing prediction is that they preferably function in real-time with the voice data collection and on a variety of different processing platforms, and operate efficiently to deliver predictions and results to a user in a timely fashion.

There is a need for more advanced systems and methods for determining the association of voice signals with blood glucose levels in healthy individuals and as a potential biomarker for disease.

SUMMARY

Provided are systems and methods for generating models for determining blood glucose levels using voice and associated embodiments.

As set out in the Example 1, voice profiles comprising voice features were generated based on 17,552,688 voice signals from 44 participants undergoing continuous blood glucose monitoring and their 1,454 voice recordings. From each voice recording or sample, 12,072 voice-features were extracted. Notably, a number of selection criteria including the longitudinal stability of various voice features were investigated and used to select voice biomarkers features for determining blood glucose levels. The longitudinal stability of voice-features were quantified using linear mixed-effect modelling. Voice-features that showed significant differences between different blood glucose levels, strong intra-stability and the ability to make distinct choice in decision trees were selected as voice biomarkers.

The 196 voice biomarkers listed in Table 3 were selected using these three criteria and used to generate a predictive model using a multi-class random forest classifier. The selected biomarkers were demonstrated to be particularly useful for determining glucose levels in healthy individuals. Results showed a predictive model with an overall accuracy of 78.66%, overall AUC of 0.83 (95% confidence interval is 0.80-0.85), and 0.41 of Matthews Correlation Coefficient (MCC) to discriminate three different blood glucose levels in an independent test set. Significantly, the use of the three different selection criteria for selecting voice features as biomarkers to generate a predictive model was demonstrated to outperform models generated by selecting voice biomarkers based on a single criteria or two criteria.

A second cohort of subjects that included healthy subjects and subjects with glycemic dysfunction were then recruited into the study for continuous blood glucose monitoring and voice profiling. As set out in Example 2, voice profiles comprising voice features were generated based on 103,408, 752 voice signals from 154 participants undergoing continuous blood glucose monitoring and their 8,566 voice recordings. From each voice recording or sample, 12,072 voice-features were extracted. Voice-features were then identified as voice biomarkers using the selection criteria identified in Example 1, namely that features showed significant differences between different blood glucose levels, strong intra-stability or the ability to make distinct choice in decision trees.

32 of the voice biomarkers identified in the second cohort overlapped with the 196 voice biomarkers listed in Table 3—that were identified in Example 1—and are referred to herein as "Tier 1" biomarkers. 242 voice biomarkers identified in the second cohort were identified using at least two of the three selection approaches—referred to herein as "Tier 2" biomarkers. The combination of the Tier 1 and Tier 2 represented 274 voice features—referred to herein as "Tier 3" biomarkers. The Tier 1, Tier 2, and Tier 3 voice biomarkers were used to generate three predictive models using a multi-class random forest classifier. A fourth tier, Tier 4, was generated based on all 7,066 identified biomarkers in Example 2. Predictive models generated using the selected voice features were able to readily discriminate between subjects with low, medium and high blood glucose levels. An improvement in computational efficiency may be described in terms of the model generation time, as demonstrated in Table 10.

Accordingly, there is provided in one aspect a computer-implemented method for generating a blood glucose level prediction model. In one embodiment, the method comprises: providing, at a memory: a plurality of voice samples from at least one subject at a plurality of time points; and a plurality of blood glucose levels, wherein each blood glucose level in the plurality of blood glucose levels is temporally associated with a voice sample in the plurality of voice samples; sorting, at a processor in communication with the memory, the plurality of voice samples into two or more blood glucose level categories based on the blood glucose levels; extracting, at the processor, voice feature values for a set of voice features from each of the plurality of voice samples; determining, at the processor, for each voice feature in the set of voice features: a univariate measure of whether the voice feature distinguishes between the two or more blood glucose level categories; a measure of the intra-stability of the voice feature within each of the two or more blood glucose level categories; and a measure of the decision-making ability of the voice feature; selecting, at the processor, a subset of voice features from the set of voice features based on the univariate measure, the measure of intra-stability and the measure of the decision-making ability; and generating at the processor, the blood glucose level prediction model based on the subset of voice features. The voice biomarkers, associated systems and methods also advantageously provide a computationally efficient manner for performing digital signal analysis and model generation based on voice data by limiting the amount of processing to a subset of the total biomarkers available.

In one or more embodiments, generating the blood glucose level prediction model based on the subset of voice features comprises the use of a statistical classifier and/or statistical regression. In one or more embodiments, generating the blood glucose level prediction model based on the subset of voice features comprises determining a weight for each voice feature in the subset of voice features.

In one or more embodiments, the method may comprise at least one selected from the group of: determining the univariate measure by calculating a False Discovery Rate (FDR), determining the measure of intra-stability by calculating an intraclass correlation coefficient (ICC); and determining the measure of the decision-making ability comprises calculating a Gini impurity score, optionally a Gini impurity score corrected for multiple comparisons ($Gini_c$).

In one or more embodiments, the False Discovery Rate (FDR) may be determined using ANOVA corrected for multiple comparisons optionally Benjamini-Hockberg adjusted p-value(s).

In one or more embodiments, the measure of intra-stability may be determined by calculating a coefficient of variation.

In one or more embodiments, the measure of the decision-making ability comprises a calculated mean decrease in accuracy.

In one or more embodiments, the method may further comprise: selecting, at the processor, a subset of voice features from the set of voice features based on at least one selected from the group of a FDR with a p-value less than an ICC greater than 0.5 or greater than 0.75; and a $Gini_c$ greater than 0.5.

In one or more embodiments, the voice features may be selected from the group of a Mel-Frequency Cepstral Coefficient (MFCC) feature, a logarithmic harmonic-to-noise ratio (logHNR) feature, a smoothed fundamental frequency contour (F0Final) feature, an envelope of smoothed F0Final (F0FinalEnv) feature, a difference of period lengths (JitterLocal) feature, a difference of JitterLocal (JitterDDP) feature, a voicing probability of the final fundamental frequency candidate with unclipped voicing threshold (VoicingFinalUnclipped) feature, an amplitude variations (ShimmerLocal) feature, an auditory spectrum coefficient (AudSpec) feature, a relative spectral transform of AudSpec (AudSpecRasta) feature, a logarithmic power of Mel-frequency bands (logMelFreqBand) feature, a line spectral pair frequency (LspFreq) value, and a Pulse-Code Modulation (PCM) feature.

In one or more embodiments, the voice features may comprise at least one selected from the group of a (MFCC) feature, a PCM feature and an AudSpec feature.

In one or more embodiments, the voice features may comprise at least one voice feature described or listed in Table 3, Table 4, Table 6, Table 7, Table 8, or Table 9, FIG. 32, FIG. 33, FIG. 34, or FIG. 35.

In one embodiment, the voice features comprise or consist or Tier 1 voice features. In one embodiment, the voice features comprise or consist of Tier 2 voice features. In one embodiment, the voice features comprise or consist of Tier 3 voice features.

In one or more embodiments, the method may further comprise preprocessing, at the processor, the voice samples by at least one selected from the group of: performing a normalization of the voice samples; performing dynamic compression of the voice samples; and performing voice activity detection (VAD) of the voice samples.

In one or more embodiments, the method may further comprise: generating, at the processor, the blood glucose level prediction model based on the voice feature values for the subset of voice features, wherein each voice feature value is associated with a blood glucose level or category, and optionally at least one clinicopathological value for the at least one subject.

In one embodiment, the categories are representative of a plurality of levels or defined ranges of blood glucose levels, for example a level or range of glucose levels in mg/dL or mmol/L. In one embodiment, methods, systems and devices described herein involve the use of 3, 4, 5, 6, 7, 8, 9, or 10 or more categories.

In one or more embodiments, the voice sample may comprise a predetermined phrase vocalized by the at least one subject, optionally wherein the predetermined phrase comprises the date or time.

In one or more embodiments, the blood glucose level prediction model may be a statistical classifier and/or a statistical regressor.

In a further aspect, voice biomarkers and embodiments described herein may be used to predict the level of blood glucose in a subject, optionally healthy subjects or in subjects with glycemic dysfunction such as diabetes or prediabetes.

The methods, systems and devices described herein present a number of advantages. For example, the use of voice biomarkers is non-invasive, cost-effective, accessible anytime without the need for specialized equipment, and free from any risk of complications or infections. The voice biomarkers, associated systems and methods described herein may also serve as a conventional surrogate of blood glucose monitoring in daily life. The embodiments described herein may also be used as a screening tool to identify individuals with prediabetes or those at risk of developing diabetes in the future, or to monitor subjects at risk of glycemic dysfunction.

The voice biomarkers, systems and methods described herein also advantageously provide a computationally efficient manner for performing digital signal analysis on voice in order to perform these predictions by limiting the amount of processing to a subset of the total biomarkers available.

In one aspect, there is also provided a system for generating a blood glucose level prediction model. In one embodiment, the system comprises: a memory, the memory comprising: a plurality of voice samples from at least one subject at a plurality of time points; and a plurality of blood glucose levels, wherein each blood glucose level in the plurality of blood glucose levels is temporally associated with a voice sample in the plurality of voice samples; a processor in communication with the memory, the processor configured to: sort the plurality of voice samples into two or more blood glucose level categories based on the blood glucose levels; extract voice feature values for a set of voice features from each of the voice samples; determine for each voice feature in the set of voice features: a univariate measure of whether the voice feature distinguishes between the two or more blood glucose level categories; a measure of the intra-stability of the voice feature within each of the two or more blood glucose level groups; a measure of the decision-making ability of the voice feature; select a subset of voice features from the set of voice features based on the univariate measure, the measure of intra-stability and the measure of the decision-making ability; and generate the blood glucose level prediction model based on the subset of voice features.

In one or more embodiments, the processor may be further configured to generate the blood glucose level prediction model based on the subset of voice features by determining a weight for each voice feature in the subset of voice features.

In one or more embodiments, the processor may be further configured to: determine the univariate measure by calculating a False Discovery Rate (FDR); determine the measure of intra-stability by calculating an intraclass correlation coefficient (ICC); and/or determine the measure of the decision-making ability comprises calculating a Gini impurity score, optionally a Gini impurity score corrected for multiple comparisons ($Gini_c$).

In one or more embodiments, the processor may be further configured to select the subset of voice features from the set of voice features based on at least one selected from the group of a FDR with a p-value less than 0.01; an ICC greater than 0.5 or greater than 0.75; and a $Gini_c$ greater than 0.5.

In one or more embodiments, the voice features may be selected from the group of a Mel-Frequency Cepstral Coefficient (MFCC) feature, a logarithmic harmonic-to-noise ratio (logHNR) feature, a smoothed fundamental frequency contour (F0Final) feature, an envelope of smoothed F0Final (F0FinalEnv) feature, a difference of period lengths (JitterLocal) feature, a difference of JitterLocal (JitterDDP) feature, a voicing probability of the final fundamental frequency candidate with unclipped voicing threshold (VoicingFinalUnclipped) feature, an amplitude variations (ShimmerLocal) feature, an auditory spectrum coefficient (AudSpec) feature, a relative spectral transform of AudSpec (AudSpecRasta) feature, a logarithmic power of Mel-frequency bands (logMelFreqBand) feature, a line spectral pair frequency (LspFreq) value, and a Pulse-Code Modulation (PCM) feature.

In one or more embodiments, the voice features may comprise at least one selected from the group of a (MFCC) feature, a PCM feature and an AudSpec feature.

In one or more embodiments, the voice features may comprise at least one voice feature described or listed in Table 3, Table 4, Table 6, Table 7, Table 8, or Table 9, FIG. 32, FIG. 33, FIG. 34, or FIG. 35.

In one or more embodiments, the processor may be further configured to preprocess the voice samples by performing at least one selected from the group of: performing a normalization of the voice samples; performing dynamic compression of the voice samples; and performing voice activity detection (VAD) of the voice samples.

In one or more embodiments, the processor may be further configured to: generate the blood glucose level prediction model based on the voice feature values for the subset of voice features, wherein each voice feature value is associated with a blood glucose level or category, and optionally at least one clinicopathological value for the at least one subject.

In one or more embodiments, the voice sample may comprise a predetermined phrase vocalized by the subjects, optionally wherein the predetermined phrase comprises the date or time.

In one or more embodiments, the blood glucose level prediction model may comprise a statistical classifier and/or statistical regressor.

In a further aspect, the voice biomarkers and embodiments described herein may be used to predict the level of blood glucose in a subject, optionally healthy subjects or in subjects with glycemic dysfunction such as diabetes or prediabetes. The methods, systems and devices described herein present a number of advantages. For example, the use of voice biomarkers is non-invasive, cost-effective, accessible anytime without the need for specialized equipment, and free from any risk of complications or infections. The voice biomarkers, associated systems and methods described herein may also serve as a conventional surrogate of blood glucose monitoring in daily life. The embodiments described herein may also be used as a screening tool to identify individuals with prediabetes or those at risk of developing diabetes in the future, or to monitor subjects at risk of glycemic dysfunction.

Accordingly, there is provided in one aspect a computer-implemented method for determining a blood glucose level for a subject. In one embodiment, the method comprises: providing, at a memory, a blood glucose level prediction model; receiving, at a processor in communication with the memory, a voice sample from the subject; extracting, at the processor, at least one voice biomarker feature value from the voice sample for at least one predetermined voice biomarker feature; determining, at the processor, the blood glucose level for the subject based on the at least one voice biomarker feature value and the blood glucose level prediction model; and outputting, at an output device, the blood glucose level for the subject.

In one or more embodiments, the blood glucose level for the subject may be a quantitative level, optionally wherein the quantitative level is expressed as mg/dL or mmol/L.

In one or more embodiments, the blood glucose level for the subject may be a category, optionally hypoglycemic, normal or hyperglycemic.

In one or more embodiments, the predetermined voice biomarker feature may be described or listed in Table 3, Table 4, Table 6, Table 7, Table 8, or Table 9, FIG. 32, FIG. 33, FIG. 34, or FIG. 35.

In one or more embodiments, the method may comprise: extracting, at the processor, at least 5, 10, 25, 50, 75 or 100 voice biomarker feature values from the voice sample for at least 5, 10, 25, 50, 75 or 100 predetermined voice biomarker features described or listed in Table 3 or Table 6; and determining, at the processor, the blood glucose level for the subject based on the at least 5, 10, 25, 50, 75 or 100 voice biomarker feature values and the blood glucose level prediction model.

In one or more embodiments, the method may comprise: extracting, at the processor, voice biomarker feature values from 5, 6, 7, 8, 9, 10, more than 10, or all of the voice sample for the predetermined voice biomarker features described or listed in Table 4, Table 7, Table 8, or Table 9, FIG. 32, FIG. 33, FIG. 34, or FIG. 35 and determining, at the processor, the blood glucose level for the subject based on the 5, 6, 7, 8, 9, 10, more than 10, or all of the voice biomarker feature values and the blood glucose level prediction model.

In one or more embodiments, the blood glucose level prediction model may comprise a statistical classifier and/or a statistical regressor.

In one or more embodiments, the statistical classifier may comprise at least one selected from the group of a perceptron, a naive Bayes classifier, a decision tree, logistic regression, K-Nearest Neighbor, an artificial neural network, machine learning, deep learning and support vector machine.

In one or more embodiments, the blood glucose level prediction model may be a random forest classifier.

In one or more embodiments, the blood glucose level prediction model may be an ensemble model. For example, in one embodiment the ensemble model comprises n random forest classifiers; and wherein the determining, at the processor, the blood glucose level may comprise: determining a prediction from each of the n random forest classifiers in the ensemble model; and determining the blood glucose level based on an election of the predictions from the n random forest classifiers in the ensemble model.

In one or more embodiments, the method may further comprise preprocessing, at the processor, the voice sample by at least one selected from the group of: performing a normalization of the voice sample; performing dynamic compression of the voice sample; and performing voice activity detection (VAD) of the voice sample.

In one or more embodiments, the method may further comprise: transmitting, to a user device in network communication with the processor, the blood glucose level for the subject, wherein the outputting of the blood glucose level for the subject occurs at the user device.

In one or more embodiments, the method may further comprise determining the blood glucose level for the subject based on at least one clinicopathological value for the subject, optionally at least one of height, weight, BMI, disease comorbidity e.g. diabetes status, and blood pressure.

In one or more embodiments, the voice sample may comprise a predetermined phrase vocalized by the subject, optionally wherein the predetermined phrase comprises the date or time.

In one or more embodiments, the predetermined phrase may be displayed to the subject on a user device.

In one or more embodiments, the voice sample may be obtained from the subject in the afternoon.

In one or more embodiments, the method may be for monitoring blood glucose levels in a healthy subject or in a subject with glycemic dysfunction, optionally prediabetes or diabetes.

In one or more embodiments, the subject may have prediabetes or diabetes, optionally Type I or Type II diabetes.

In one or more embodiments, the subject may not have Type I or Type II diabetes or wherein the subject may not have been diagnosed with Type I or Type II diabetes.

In one aspect, there is provided a system for determining a blood glucose level for a subject. In one embodiment, the system comprises: a memory, the memory comprising: a blood glucose level prediction model; a processor in communication with the memory, the processor configured to: receive a voice sample from the subject; extract at least one voice biomarker feature value from the voice sample for at least one predetermined voice biomarker feature; determine the blood glucose level for the subject based on the at least one voice biomarker feature values and the blood glucose level prediction model; and outputting, at an output device, the blood glucose level for the subject.

In one or more embodiments, the blood glucose level for the subject may be a quantitative level, optionally wherein the quantitative level is expressed as mg/dL or mmol/L.

In one or more embodiments, the blood glucose level for the subject may be a category, optionally hypoglycemic, normal or hyperglycemic.

In one or more embodiments, the at least one predetermined voice biomarker feature may be described or listed in Table 3, Table 4, Table 6, Table 7, Table 8, or Table 9, FIG. 32, FIG. 33, FIG. 34, or FIG. 35.

In one or more embodiments, the processor may be further configured to: extract at least 5, 10, 25, 50, 75 or 100 voice biomarker feature values from the voice sample for at least 5, 10, 25, 50, 75 or 100 of the predetermined voice biomarker features described or listed in Table 3 or Table 6; and determine the blood glucose level for the subject based on the at least 5, 10, 25, 50, 75 or 100 voice biomarker feature values and the blood glucose level prediction model.

In one or more embodiments, the processor may be further configured to: extract voice biomarker feature values from the voice sample for 5, 6, 7, 8, 9, 10, more than 10, or all of the predetermined voice biomarker features described or listed in Table 4, Table 7, Table 8, or Table 9, FIG. 32, FIG. 33, FIG. 34, or FIG. 35 and determine the blood glucose level for the subject based on 5, 6, 7, 8, 9, 10, more than 10 or all of the voice biomarker feature values described or listed in Table 4, Table 7, Table 8, or Table 9, FIG. 32, FIG. 33, FIG. 34, or FIG. 35 and the blood glucose level prediction model.

In one or more embodiments, the blood glucose level prediction model may comprise a statistical classifier and/or statistical regressor.

In one or more embodiments, the statistical classifier may comprise at least one selected from the group of a perceptron, a naive Bayes classifier, a decision tree, logistic regression, K-Nearest Neighbor, an artificial neural network, machine learning, deep learning and support vector machine.

In one or more embodiments, the blood glucose level prediction model may be a random forest classifier.

In one or more embodiments, the blood glucose level prediction model may be an ensemble model. In one embodiment the ensemble model comprises n random forest classifiers; and wherein the processor may be configured to determine the blood glucose level by: determining a prediction from each of the n random forest classifiers in the ensemble model; and determining the blood glucose level based on an election of the predictions from the n random forest classifiers in the ensemble model.

In one or more embodiments, the processor may be further configured to preprocess the voice sample by at least one selected from the group of: performing a normalization of the voice sample; performing dynamic compression of the voice sample; and performing voice activity detection (VAD) of the voice sample.

In one or more embodiments, the processor may be further configured to: receive from a user device, optionally a mobile device, in network communication with the processor the voice sample; and/or transmit to a user device, optionally a mobile device, in network communication with the processor the predicted blood glucose category, wherein the outputting of the blood glucose level for the subject occurs at the user device.

In one or more embodiments, the processor may be further configured to determine the blood glucose level for the subject based on at least one clinicopathological value of the subject, optionally at least one of height, weight, BMI, disease comorbidity e.g. diabetes status and blood pressure.

In one or more embodiments, the voice sample may comprise a predetermined phrase vocalized by the subject, optionally wherein the predetermined phrase comprises the date or time.

In one or more embodiments, the predetermined phrase may be displayed to the subject on a user device, optionally a mobile device.

In one or more embodiments, the voice sample may be obtained from the subject in the afternoon.

In one or more embodiments, the system may be for monitoring blood glucose levels in a healthy subject. In one embodiment, the system may be for monitoring blood glucose levels is a subject with diabetes or prediabetes.

In one or more embodiments, the subject may not have Type I or Type II diabetes or the subject may not been diagnosed with Type I or Type II diabetes.

In one aspect, there is provided a device for determining a blood glucose level for a subject. In one embodiment, the device comprises: a receiving unit for obtaining a voice sample from the subject; an extraction unit for extracting at least one voice biomarker feature value from the voice sample for at least one predetermined voice biomarker feature; a determining unit for determining the blood glucose level for the subject based on the at least one voice biomarker feature value and a blood glucose level prediction model; and an output unit for outputting the blood glucose level for the subject.

In one or more embodiments, the device may further comprise a storage unit for providing the blood glucose level prediction model.

In one or more embodiments, the at least one predetermined voice biomarker feature may be described or listed in Table 3 or Table 6. In one embodiment, the predetermined voice biomarker features may comprise one or more voice biomarker features described or listed in Table 4, Table 7, Table 8, or Table 9, FIG. 32, FIG. 33, FIG. 34, or FIG. 35.

In one or more embodiments, the device may be a mobile device such as a smart phone, watch or tablet.

In one or more embodiments, a user of the device may download a software application comprising the receiving unit, extraction unit, determining unit, and output unit from an application store.

In one or more embodiments, the device may comprise: a conferencing unit providing a conferencing software application, the conferencing unit in network communication with the receiving unit, wherein the voice sample is provided to the receiving unit from the conferencing unit, optionally wherein the conferencing unit is for teleconferencing or videoconferencing between the subject and a health professional.

In one aspect, there is also provided a computer-implemented method, the method comprising: receiving, at an audio input device of a user device, a voice sample; determining a blood glucose level based on the voice sample; and outputting, at the output device of the user device, the blood glucose level or an output based on the blood glucose level. In one embodiment, the blood glucose level is determined using a method as described herein.

In one embodiment, the method further comprises: receiving, at a user input device of the user device, a user input indicating a user request for a blood glucose level; responsive to the user input, outputting, at an output device of the user device, a user prompt to the user to provide a voice sample; responsive to the user prompt, receiving, at an audio input device of the user device, the voice sample.

In one or more embodiments, the user device may be a smart speaker; the user input may be a voice query for the blood glucose level; the user prompt may be a voice prompt output; and the output device may be a speaker device.

In one or more embodiments, the user device may be a smart watch; the user input may be a voice query for the blood glucose level; the user prompt may be a voice prompt output; and the output device may be a speaker device or a display device.

In one or more embodiments, the output based on the blood glucose level comprises a nutritional recommendation. In one or more embodiments, the blood glucose prediction request may further comprise a nutritional recommendation request; the blood glucose prediction response may further comprise a nutritional recommendation, the nutritional recommendation comprising a recommended food for the user; and the outputting, at the output device of the user device, may further comprise outputting the nutritional recommendation.

In one or more embodiments, the method further comprises receiving, at the user device a food check request and the output based on the blood glucose level comprises a food check response. In one or more embodiments, the blood glucose prediction request may further comprise a food check request, the food check request comprising a food identifier; the blood glucose prediction response may further comprise a food check response, the food check response indicating whether the user is permitted to eat the food type; and the outputting, at the output device of the user device, may further comprise outputting the food check response.

In one or more embodiments, the method may further comprise: if the food check response permits the user to eat the food type, transmitting, from a wireless device of the user device to a storage container, an unlock command.

In one aspect, there is provided a device, comprising: a memory comprising: a user input device; a network device;

an audio input device; an output device; a processor in communication with the memory, the user input device, the network device, the audio input device, and the display device.

In one embodiment, the processor is configured to: receive, at the audio input device, the voice sample; determine a blood glucose level based on the voice sample; and output, at the output device, the blood glucose level or an output based on the blood glucose level. In one or more embodiments, the processor is configured to determine the blood glucose level according to a method described herein.

In one embodiment, the processor is configured to determine the blood glucose level by: transmitting, from the network device to a server in network communication with the user device, a blood glucose prediction request comprising the voice sample; and receiving, at the network device from the server in response to the blood glucose prediction request, a blood glucose prediction response, the blood glucose prediction response comprising the blood glucose level.

In one or more embodiments, the processor is configured to output, at the output device of the user device, a user prompt to the user to provide the voice sample and receive, at the audio input device of the user device, the voice sample.

In one or more embodiments, the user input comprises a voice query for the blood glucose level; the user prompt comprises a voice prompt output; and the output device comprises a speaker device or a display device, optionally a watch display device.

In one or more embodiments, the output based on the blood glucose level comprises a nutritional recommendation. For example, the blood glucose prediction request may further comprise a nutritional recommendation request; the blood glucose prediction response further may comprise a nutritional recommendation, the nutritional recommendation comprising a recommended food for the user; and the output, at the output device, may further comprise outputting the nutritional recommendation.

In one or more embodiments, the processor is configured to receive at the user device a food check request and the output based on the blood glucose level comprises a food check response. For example, in one or more embodiments, the blood glucose prediction request further comprises a food check request, the food check request comprising a food type; the blood glucose prediction response may further comprise a food check response, the food check response indicating whether the user is permitted to eat the food type; and the outputting, at the output device of the user device, may further comprise outputting the food check response.

In one or more embodiments if the food check response permits the user to eat the food type, transmitting, from a wireless device of the user device to a storage container, an unlock command.

In one aspect, there is provided a computer-implemented method, comprising: receiving, at a user input device of a user device, a user input indicating a user lifestyle criteria and optionally a user lifestyle value; receiving, at an audio input device of the user device, a first voice sample; storing, a first lifestyle journaling request comprising the user lifestyle criteria, the user lifestyle value, and the first voice sample or data based on the first voice sample; receiving, at the audio input device of the user device, a second voice sample; storing, a second lifestyle journaling request comprising the user lifestyle criteria, the user lifestyle value, and the second voice sample or data based on the second voice sample; determining a lifestyle response based on the first lifestyle request and the second lifestyle request, the lifestyle response comprising at least one selected from the group of a glucose trend indication and a disease progression score; and outputting, at the output device of the user device, at least one selected from the group of the glucose trend indication and the disease progression score. In one embodiment, the lifestyle response is based on two or more blood glucose levels determined according to a method described herein.

In one or more embodiments, the method further comprises outputting, at an output device of the user device, a first user prompt to the user to provide a first voice sample; responsive to the first user prompt, receiving, at an audio input device of the user device, the first voice sample. Alternatively or in addition the method may comprise outputting, at the output device of the user device, a second user prompt to the user to provide the second voice sample and responsive to the second user prompt, receiving, at the audio input device of the user device, the second voice sample.

In one or more embodiments storing the first lifestyle journaling request may comprise transmitting, from a network device of the user device to a server in network communication with the user device, the first lifestyle journaling request; storing the second lifestyle journaling request may comprise transmitting, from the network device of the user device to the server in network communication with the user device, the second lifestyle journaling request; determining the lifestyle response comprises receiving, at the network device from the server in response to the second lifestyle journaling request, the lifestyle response. In one embodiment, the lifestyle response comprises at least one selected from the group of a glucose trend indication and a disease progression score.

In one or more embodiments, the outputting at the display device, may comprise outputting a notification.

In one or more embodiments, the notification may be a medication change notification or a lifestyle change notification.

For example, in one or more embodiments the user lifestyle criteria may comprise alcohol consumption or physical activity. In one or more embodiments, the user lifestyle value comprises units of alcohol or minutes of physical activity.

In one aspect, there is provided a device, comprising: a memory comprising: a user input device; a network device; an audio input device; an output device; a processor in communication with the memory, the user input device, the network device, the audio input device, and the display device. In one embodiment, the processor is configured to: receive at the user input device, a user input indicating a user lifestyle criteria and a user lifestyle value; receive, from the audio input device, a first voice sample; store a first lifestyle journaling request comprising the user lifestyle criteria, the user lifestyle value, and the first voice sample or data based on the first voice sample; receive, at the audio input device, a second voice sample; store a second lifestyle journaling request comprising the user lifestyle criteria, the user lifestyle value, and the second voice sample or data based on the first voice sample; determine a lifestyle response based on the first lifestyle request and the second lifestyle request. In one embodiment, the lifestyle response comprises at least one selected from the group of a glucose trend indication and a disease progression score. In one embodiment, the processor is configured to output, at the output device, at least one selected from the group of the glucose trend indication and the disease progression score. In one embodiment, determining the lifestyle response is based on two or more blood glucose levels determined according to a method described herein.

In one embodiment, the processor is further configured to: responsive to the user input, output at the output device, a first user prompt to the user to provide the first voice sample; and responsive to the first user prompt, receive, from the audio input device, the first voice sample. Alternatively or in addition, the processor may be configured to: output, at the output device, a second user prompt to the user to provide the second voice sample and responsive to the second user prompt, receive, at the audio input device, the second voice sample.

In one or more embodiments, storing the first lifestyle request may comprise transmitting, from a network device to a server, the first lifestyle journaling request; storing the second lifestyle request may comprise transmitting, from the network device to the server, the second lifestyle journaling request; determining the lifestyle response comprises receiving, at the network device from the server in response to the second lifestyle journaling request, a lifestyle response. In one embodiment, the lifestyle response comprises at least one selected from the group of a glucose trend indication and a disease progression score.

In one or more embodiments, the outputting at the display device, may comprise outputting a notification.

In one or more embodiments, the notification may be a medication change recommendation or a lifestyle change recommendation.

In one aspect, there is provided a computer-implemented method, comprising: providing a software application; receiving automatically, at an audio input device of the user device, a voice sample of a user using the software application; determining a blood glucose level based on the voice sample; and outputting, at the output device of the user device, the blood glucose level or an output based on the blood glucose level. In one embodiment, the blood glucose level is determined according to a method described herein.

In one or more embodiments, determining the blood glucose level comprises: transmitting, from a network device of the user device to a server in network communication with the user device, a blood glucose prediction request comprising the voice sample; receiving, at the network device from the server in response to the blood glucose prediction request, a blood glucose prediction response, the blood glucose prediction response comprising a blood glucose level.

In one or more embodiments the software application may be a teleconference software application.

In one or more embodiments, the teleconference software application may be one selected from the group of Cisco® Webex, Zoom, Google® Meet, Facebook Messenger, and Whatsapp®.

In one or more embodiments, the software application may be an automated telephone system. In one or more embodiments, the automated telephone system is a PBX system.

In one aspect, there is provided a device, comprising: a memory, the memory comprising a software application; a user input device; a network device; an audio input device; an output device; a processor in communication with the memory, the user input device, the network device, the audio input device, and the display device, the processor configured to: execute the software application; receive automatically, at the audio input device, a voice sample of a user using the software application; determine a blood glucose level based on the voice sample; and output, at the output device of the user device, the blood glucose level or an output based on the blood glucose level. In one embodiment, the blood glucose level is determined according to a method described herein.

In one or more embodiments, the processor may be further configured to determine the blood glucose level by: transmitting, from the network device to a server, a blood glucose prediction request comprising the voice sample; receiving, at the network device from the server in response to the blood glucose prediction request, a blood glucose prediction response, the blood glucose prediction response comprising the blood glucose level.

In one or more embodiments, the software application may be a teleconference software application.

In one or more embodiments, the teleconference software application may be one selected from the group of Cisco® Webex, Zoom, Google® Meet, Facebook Messenger, and Whatsapp®.

In one or more embodiments, the software application may be an automated telephone system.

In one or more embodiments, the automated telephone system may be a PBX system.

In one aspect, there is provided a computer-implemented method, comprising: outputting, at an output device of a user device, at least one screening question; receiving, at a user input device of the user device, at least one screening answer corresponding to the at least one screening question; receiving, at an audio input device of the user device, a voice sample; determining a pre-diabetic screening response based on the at least one screening answer and a blood glucose level determined based on the voice sample; and outputting, at the output device of the user device, the pre-diabetic screening response. In one embodiment, the blood glucose level is determined based on a method as described herein.

In one embodiment, the pre-diabetic screening response comprises a pre-diabetic risk profile.

In one embodiment, the method further comprises outputting, at the output device of the user device, a user prompt to the user to provide the voice sample and responsive to the user prompt, receiving, at the audio input device of the user device, the voice sample.

In one or more embodiments, determining the pre-diabetic screening response may further comprise: transmitting, from a network device of the user device to a server in network communication with the user device, a pre-diabetic screening request comprising the at least one screening answer and the voice sample; receiving, at the network device from the server in response to the pre-diabetic screening request, a pre-diabetic screening response.

In one embodiment, the at least one screening answer comprise clinicopathological information for the subject, optionally one or more of height, weight, BMI, disease comorbidity e.g. diabetes status, blood pressure, family history, age, race or ethnicity and physical activity.

In one aspect, there is provided a device, comprising: a memory comprising: a user input device; a network device; an audio input device; an output device; a processor in communication with the memory, the user input device, the network device, the audio input device, and the display device, the processor configured to: output, at the output device, at least one screening questions; receive, at a user input device, at least one screening answer corresponding to the at least one screening questions; receive, at an audio input device, a voice sample; determine a pre-diabetic screening response; and output, at the output device, the pre-diabetic screening response. In one embodiment, the processor is configured to determine the pre-diabetic screening response based on a blood level determined according to a method described herein.

In one embodiment, the pre-diabetic screening response comprises a pre-diabetic risk profile.

In one embodiment, the processor is configured to: output, at the output device, a user prompt to the user to provide the voice sample; and responsive to the user prompt, receive, at an audio input device, the voice sample.

In one or more embodiments, the processor may be further configured to determine the pre-diabetic screening response by: transmitting, from a network device to a server, a pre-diabetic screening request comprising the at least one screening answer and the voice sample; receiving, at the network device from the server in response to the pre-diabetic screening request, the pre-diabetic screening response.

In one aspect, there is provided a computer-implemented method, comprising: receiving a voice sample of a subject; determining a blood glucose level based on the voice sample; and outputting the blood glucose level or an output based on the blood glucose level. In one embodiment, the blood glucose level is determined based on a method described herein.

In one or more embodiments, the determining the blood glucose level may further comprise: transmitting from the network device of the user device to a server in network communication with the user device, a blood glucose prediction request comprising the voice sample; receiving at the network device from the server in response to the blood glucose prediction request, a blood glucose prediction response, the blood glucose prediction response comprising a blood glucose level.

In one or more embodiments, the voice sample may be received from at least one sensor device proximate to the user in network communication with the user device.

In one or more embodiments, the outputting the blood glucose level may comprise outputting a blood glucose level notification based on the blood glucose level at an output device of the user device.

In one or more embodiments, the method may further comprise: receiving, at the network device of the user device from a network device of a companion device, a pairing request comprising a pairing identifier; and responsive to the pairing request, transmitting, from the network device of the user device to the network device of the companion device, a pairing response based on the pairing request; and receiving, at the network device of the companion device, the blood glucose level; and outputting, at an output device of the companion device, a blood glucose level notification based on the blood glucose level.

In one or more embodiments, the method may further comprise: transmitting, from the sensor device in wireless communication with the network device of the user device, a blood glucose level notification based on the blood glucose level; wherein the outputting the blood glucose level comprises outputting a blood glucose level notification at an output device of the sensor device in wireless communication.

In one or more embodiments, the blood glucose level notification may further comprise a medication reminder notification.

In one or more embodiments, the blood glucose level notification may further comprise a safety alarm.

In one aspect, there is provided a device, comprising: a memory comprising: a user input device; a network device; an audio input device; an output device; a processor in communication with the memory, the user input device, the network device, the audio input device, and the display device, the processor configured to: receive a voice sample of a user proximate to the sensor device; determine a blood glucose prediction response comprising a blood glucose level; and output the blood glucose level or an output based on the blood glucose level.

In one or more embodiments, the processor may be further configured to determine the blood glucose level by: transmitting, from the network device to a server, a blood glucose prediction request comprising the voice sample; receiving, at the network device from the server in response to the blood glucose prediction request, a blood glucose prediction response, the blood glucose prediction response comprising a blood glucose level.

In one or more embodiments, the voice sample may be received from at least one sensor device proximate to the user in network communication with the user device.

In one or more embodiments, the outputting the blood glucose level may comprise outputting a blood glucose level notification based on the blood glucose level at the output device of the user device.

In one or more embodiments, the device may further comprise a processor further configured to: receive, at the network device from a network device of a companion device, a pairing request comprising a pairing identifier; and responsive to the pairing request, transmit, from the network device to the network device of the companion device, a pairing response based on the pairing request; the companion device comprising: a companion processor configured to: receive, at the network device of the companion device, the blood glucose level; and output, at an output device of the companion device, a blood glucose level notification.

In one or more embodiments, the device may further comprise transmitting, to the sensor device in wireless communication with the network device, a blood glucose level notification based on the blood glucose level; wherein the outputting the blood glucose level comprises outputting a blood glucose level notification at an output device of the sensor device in wireless communication.

In one or more embodiments, the blood glucose level notification may further comprise a medication reminder notification.

In one or more embodiments, the blood glucose level notification may further comprises a safety alarm.

In one aspect, there is provided a computer-implemented method, comprising: providing, at a user device, an educational application; outputting, at an output device of the user device, a user prompt to the user to provide a voice sample; responsive to the user prompt, receiving, at an audio input device of the user device, the voice sample; determining an educational lesson response based on the voice sample, the educational lesson plan comprising at least one educational lesson of the educational application; and outputting, at the output device of the user device, the at least one educational lesson of the educational application.

In one or more embodiments, the determining an educational lesson response may further comprises: transmitting, from a network device of the user device to a server in network communication with the user device, a first educational lesson request comprising the voice sample; receiving, at the network device from the server in response to the educational lesson request, the educational lesson response, the educational response comprising at least one educational lesson of the educational application.

In one aspect there is provided a computer-implemented method, the method comprising: providing, at a user device, an educational application; receiving, at an audio input device of the user device, the voice sample; determining an educational lesson response based on the voice sample, the educational lesson plan comprising at least one educational lesson of the educational application; and outputting, at the output device of the user device, the at least one educational lesson of the educational application.

In one or more aspects, systems may be provided to operate any of the methods described herein.

Also provided is a device, comprising: a memory comprising: an educational application; a user input device; a network device; an audio input device; an output device; and a processor in communication with the memory, the user input device, the network device, the audio input device, and the display device. In one embodiment, the processor is configured to: receive, at the audio input device, the voice sample; determine an educational lesson response based on the voice sample, the educational lesson response comprising at least one educational lesson of the educational application; and output, at the output device, the at least one educational lesson of the educational application.

BRIEF DESCRIPTION OF THE DIAGRAMS

A preferred embodiment of the present invention will now be described in detail with reference to the diagrams, in which:

In FIG. 12, values of 176 voice-features, which showed FDR<0.05 and absolute dropout score>0.05, are presented in Example 1.

FIG. 20 shows the evaluation of the predictive model in Example 1, and specifically the overall predictive model design in accordance with one or more embodiments.

FIG. 21 shows the evaluation of the predictive model in Example 1, and specifically the performance of the predictive model in the test set. Receiver operating characteristic (ROC) curves of micro average and macro average are shown.

FIG. 22 shows the evaluation of the predictive model in Example 1, and specifically the performance of characterized voice biomarkers. A macro AUC of 196 biomarker-based predictive models (FDR+RF+ICC) is compared with those of models generated by individual biomarkers that were selected by only FDR, only RF, only ICC, FDR+RF, FDR+ICC, and ICC+RF.

FIG. 23 shows the evaluation of the predictive model in Example 1, and specifically the performance comparison between the predictive model and random models. Asterisk indicated BCC, ACC, MCC, F1, and macro AUC of the predictive model. Error bars indicated standard deviation of performance matrix in 1,000 random models.

FIG. 24 shows the evaluation of the predictive model in Example 1, and specifically the importance of voice biomarkers to predict BG groups in the test set.

FIG. 25 shows the evaluation of the predictive model in Example 1, and specifically using relevant voice biomarkers to predict different categories of BG groups. Experimentally, the top 10 voice biomarkers that were positively and negatively associated with BG groups were compared. Last four characters of voice-features (IC10, IC11, IC12, and IC13) indicated the origin of a pre-defined feature set which OpenSmile provided.

FIG. 26 shows voice-features selected by $Gini_c$ in Example 1. Voice-features with high $Gini_c$ ($Gini_c$>0.5) were selected as voice biomarkers. Gini impurity scores were measured from 1,000 repeated random stratified subsampling, score distributions were shown. Last four characters of voice-features (IC10, IC11, IC12, and IC13) indicated the origin of a pre-defined feature set.

FIG. 27 shows the performance of blood glucose level prediction depending on time in Example 1.

FIG. 28 shows the distributions of voice recording times for experimental data separately for high, normal, and low blood glucose levels, respectively.

Figure 29:
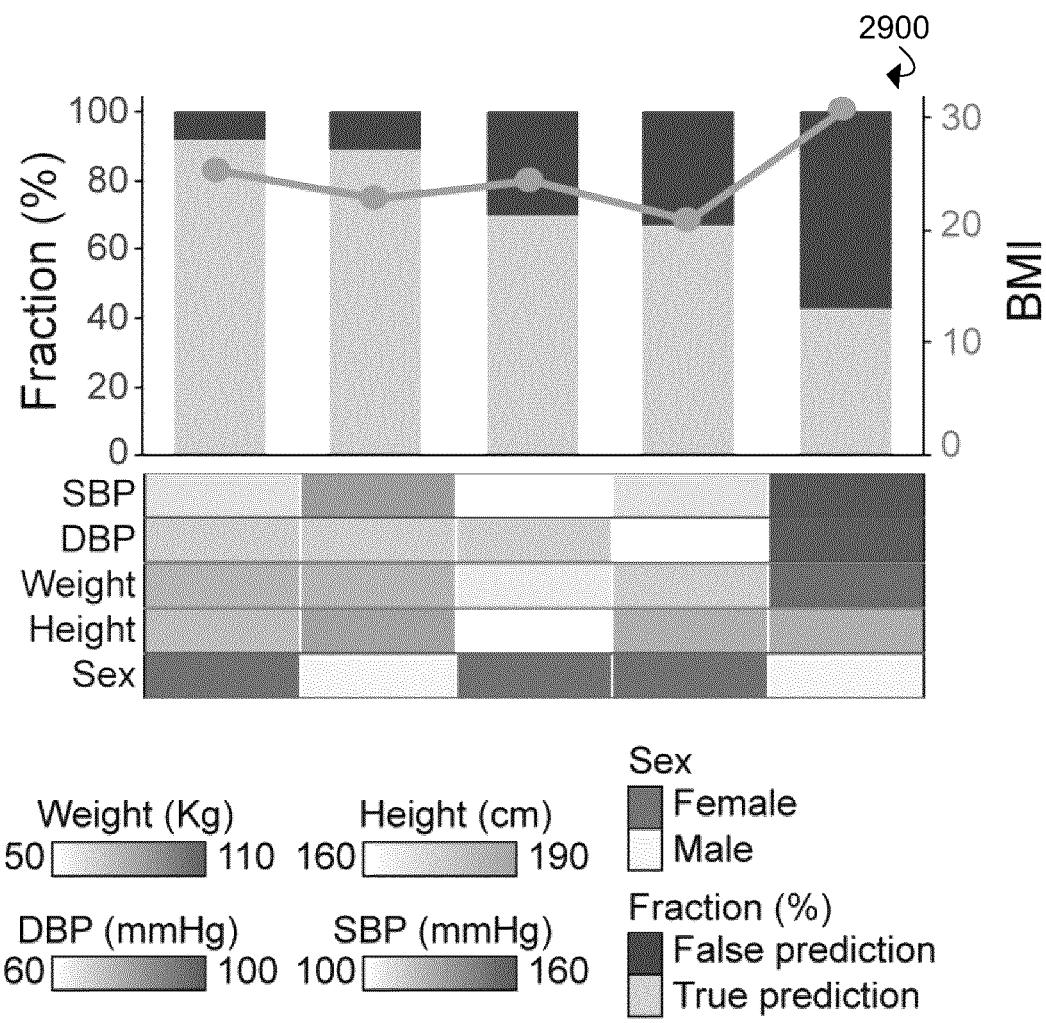

FIG. 29 shows the performance of blood glucose level prediction in the test set in Example 1. Fractions of true (light grey) and false (dark grey) prediction depending on each individual were shown. SBP and DBP indicated systolic blood pressure and diastolic blood pressure, respectively.

Figure 30:
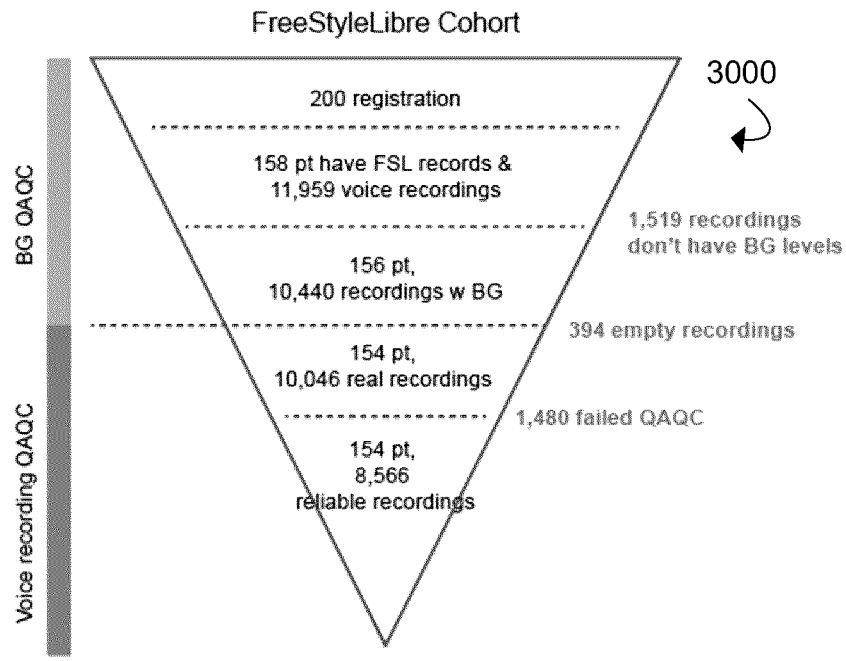

FIG. 30 shows the generation of the subject data set from Example 2, which was separated into a training set and a test set.

Figure 17:
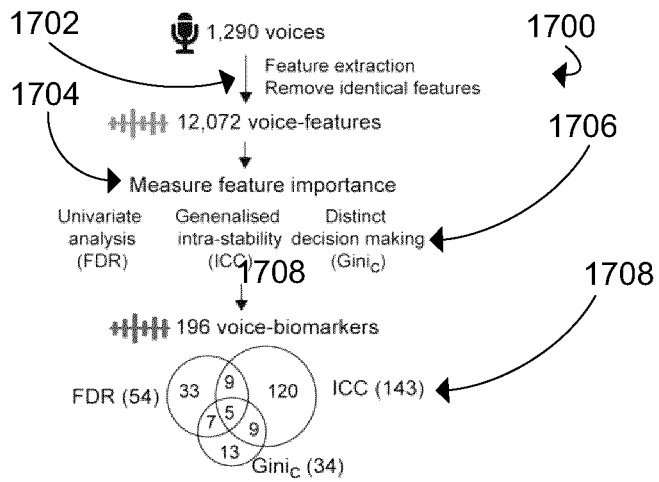
FIG. 17 shows the identification of voice biomarkers as set out in Example 1, including a method for defining voice biomarkers. In total, 196 voice-biomarkers were selected from three criteria (FDR, ICC, and $Gini_c$).
Figure 31:
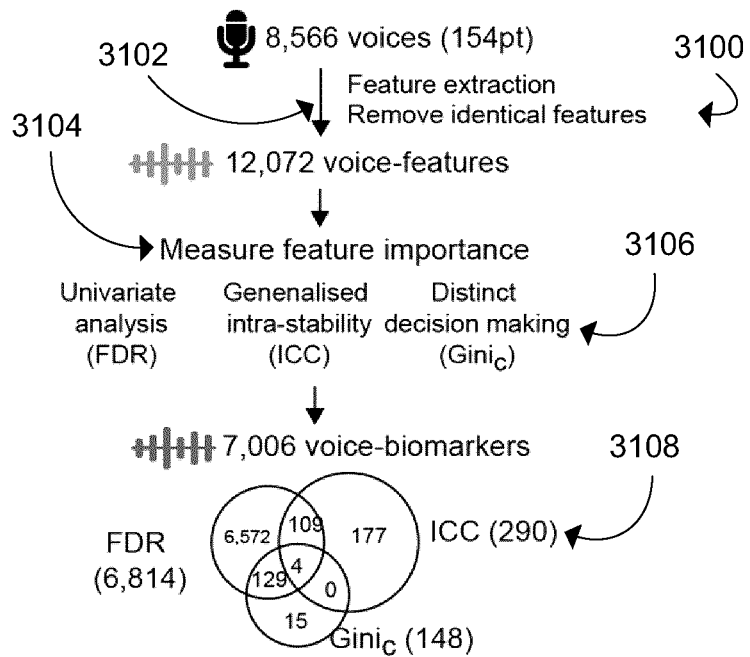

FIG. 31 shows the identification of voice biomarkers as set out in Example 2, including a method for defining voice biomarkers. In total, 7,896 voice-biomarkers were selected from three criteria (FDR, ICC, and $Gini_c$) including 77 overlapping voice biomarkers identified in Example 1 as shown in FIG. 17.

Figure 32:
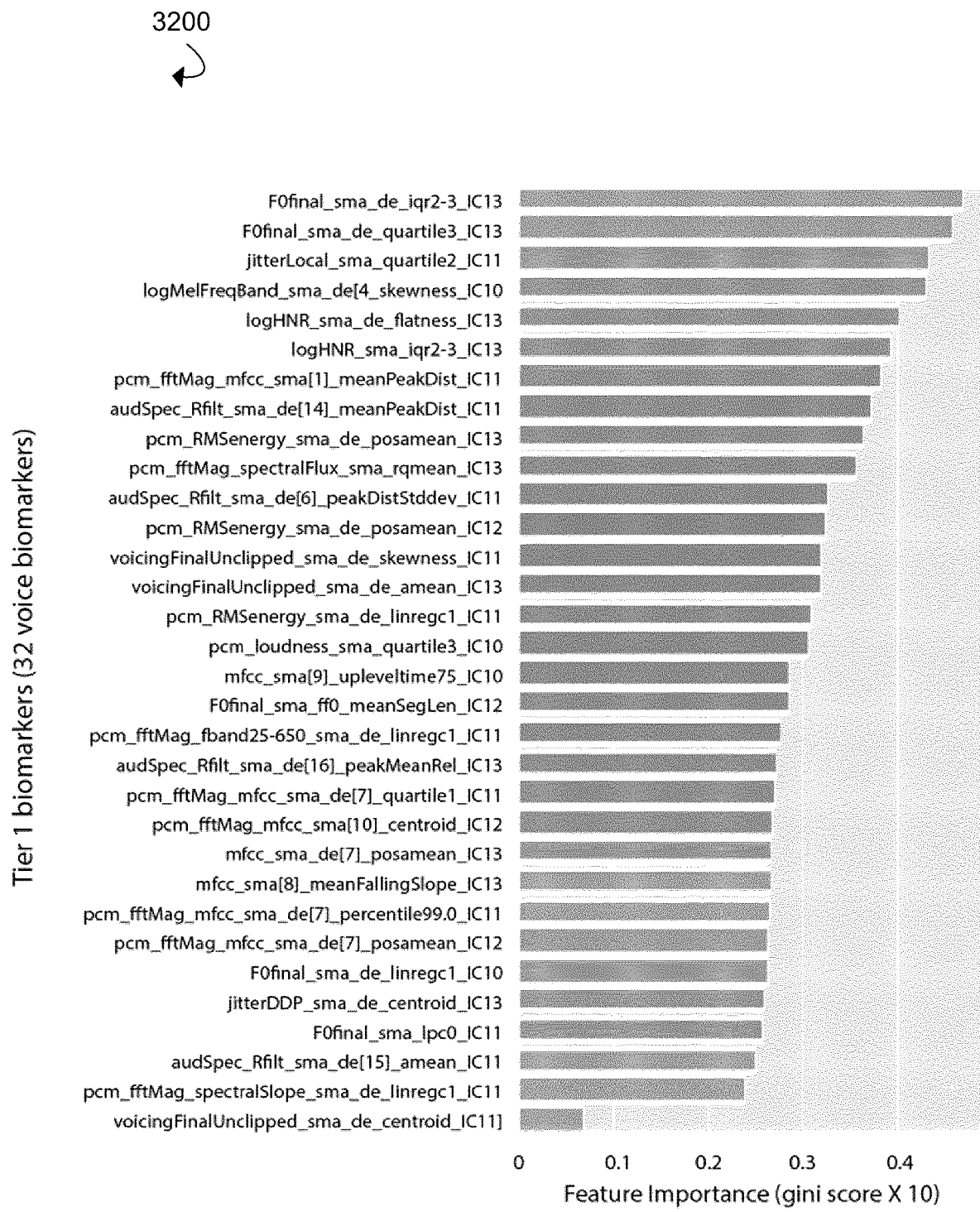

FIG. 32 shows the Tier 1 biomarkers identified in Example 2, sorted by Gini score×10.

Figure 33:
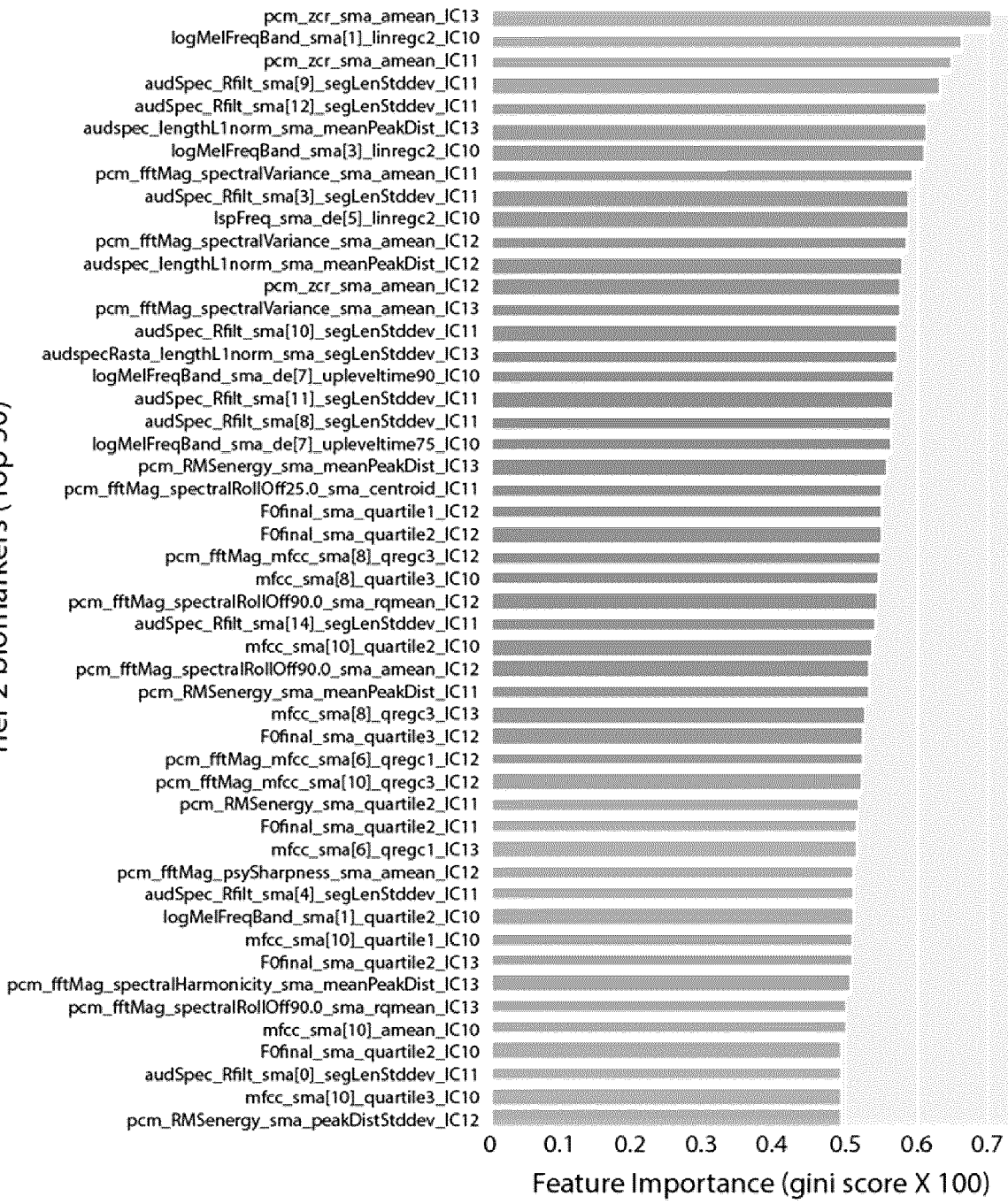

FIG. 33 shows the top 50 biomarkers in Tier 2 identified in Example 2, sorted by Gini score×100.

Figure 34:
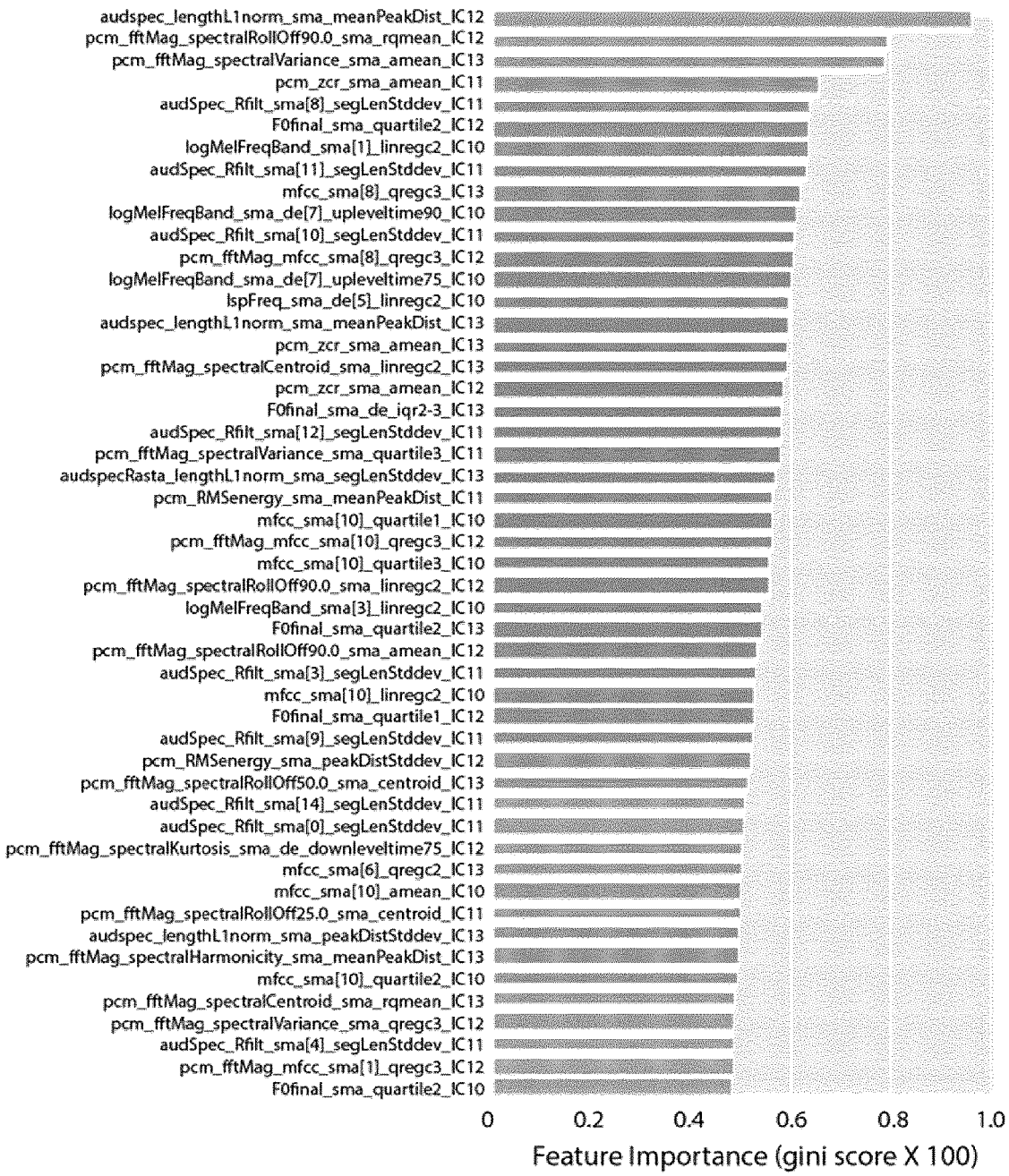

FIG. 34 shows the top 50 biomarkers in Tier 3 identified in Example 2, sorted by Gini score×100.

Figure 35:
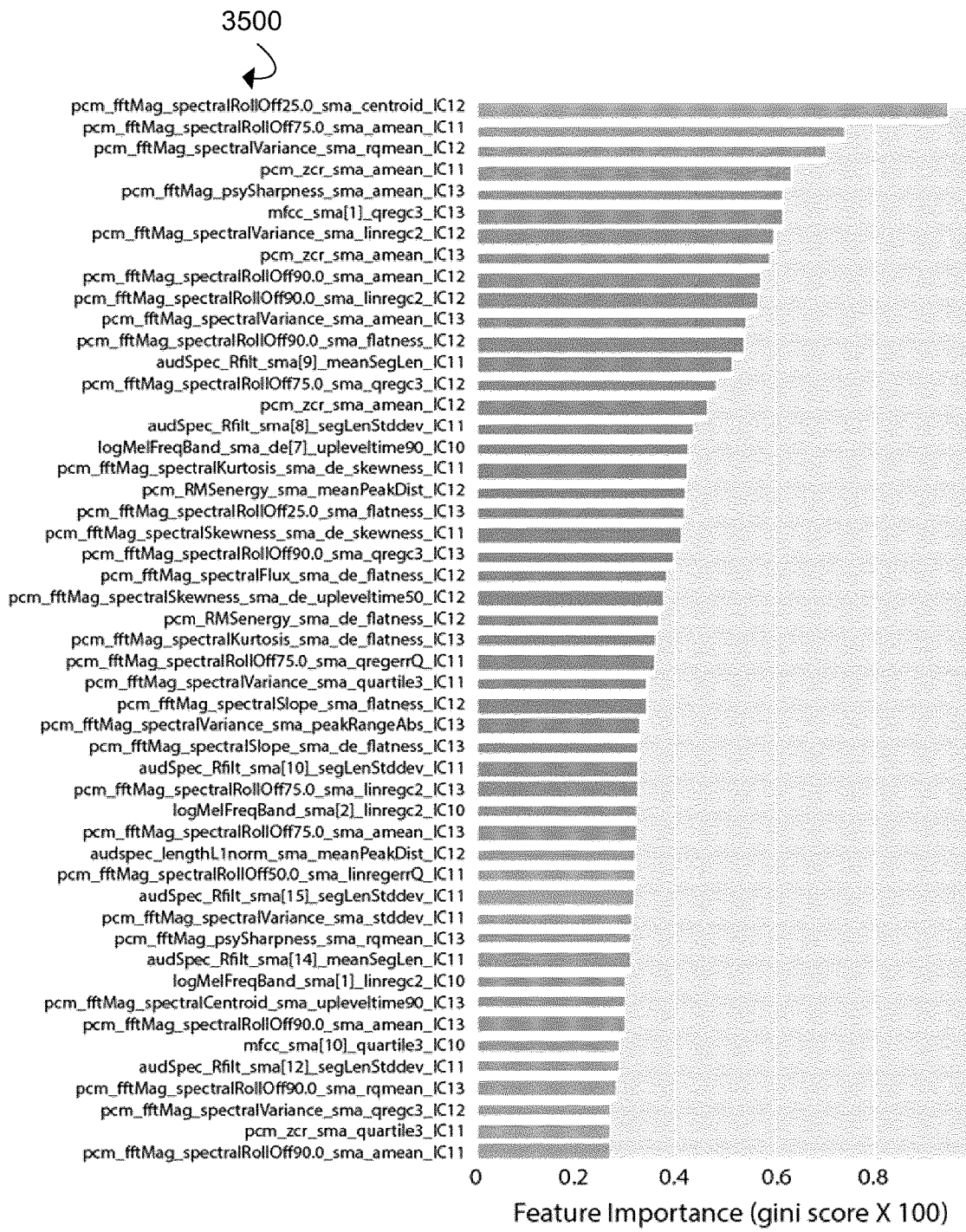

FIG. 35 shows the top 50 biomarkers in Tier 4 identified in Example 2, sorted by Gini score×100.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the diagrams are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and a combination thereof.

Program code may be applied to input data to perform the functions described herein and to generate output information. The output information is applied to at least one output device, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modifications and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

As used herein, the term "user" refers to a user of a user device, and the term "subject" refers to a subject whose measurements are being collected. The user and the subject may be the same person, or they may be different persons in the case where one individual operates the user device and another individual is the subject. For example, in one embodiment the user may be a health care professional such as a nurse, doctor or dietitian and the subject is a human patient.

As used herein, the term "categorical prediction" may be used to describe a limited, fixed number of possible values. As an example, the blood glucose categorical prediction may have three possible categorical values including "low", "medium", and "high". As another example, the blood glucose categorical prediction may include many categorical values including "1.0 mmol/L", "1.5 mmol/L", "2.0 mmol/L", "2.5 mmol/L", "3.0 mmol/L", "3.5 mmol/L", "4.0 mmol/L", "4.5 mmol/L", "5.0 mmol/L", "5.5 mmol/L", "6.0 mmol/L", "6.5 mmol/L", "7.0 mmol/L", "7.5 mmol/L", "8.0 mmol/L", "8.5 mmol/L", "9.0 mmol/L", "9.5 mmol/L", "10.0 mmol/L", "10.5 mmol/L", "11.0 mmol/L", "11.5 mmol/L", "12.0 mmol/L", "12.5 mmol/L", "13.0 mmol/L", "13.5 mmol/L", "14.0 mmol/L", "14.5 mmol/L", "15.0 mmol/L", and "15.5 mmol/L". As shown in Example 1 and Example 2, the embodiments described herein were demonstrated to categorically predict blood glucose levels using voice for three categories "Low", "Medium", and "High". The embodiments described herein may also be used to for categorical prediction using a larger number of categorical values, such as but not limited to the numerical categorical values set out above, in order to identify a discrete, numerical output that may appear to a user to be a continuous BG prediction.

Figure 1:
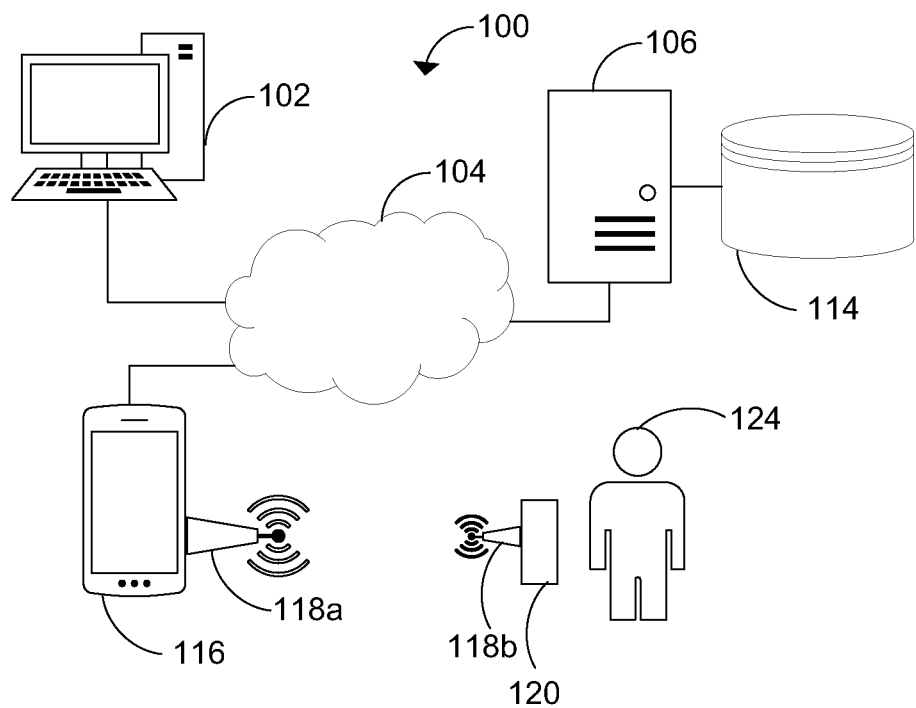
FIG. 1 shows a system diagram in accordance with one or more embodiments.

Reference is first made to FIG. 1, which shows a system diagram 100 of a blood glucose (BG) prediction system for determining a blood glucose level for a subject. The BG prediction system includes one or more computer devices 102, a network 104, one or more servers 106, one or more data stores 114, and one or more user devices 116.

The one or more computer devices 102 may be used by a user such as a subject, an administrator, clinician, or other medical professional to access a software application (not shown) running on server 106 at remote service 112 over network 104. In one embodiment, the one or more computer devices 102 may access a web application hosted at server 106 using a browser for reviewing BG predictions given to the users 124 using user devices 116. In an alternate embodiment, the one or more user devices 116 may download an application (including downloading from an App Store such as the Apple® App Store or the Google® Play Store) for reviewing BG predictions given to the users 124 using user devices 116.

The one or more user devices 116 may be any two-way communication device with capabilities to communicate with other devices. A user device 116 may be a mobile device such as mobile devices running the Google® Android® operating system or Apple® iOS® operating system. A user device 116 may be a smart speaker, such as an Amazon® Alexa® device, or a Google® Home® device. A user device 116 may be a smart watch such as the Apple® Watch, Samsung® Galaxy® watch, a Fitbit® device, or others as known. A user device 116 may be a passive sensor system attached to the body of, or on the clothing of, a user.

A user device 116 may be the personal device of a user, or may be a device provided by an employer. The one or more user devices 116 may be used by an end user 124 to access the software application (not shown) running on server 106 over network 104. In one embodiment, the one or more user devices 116 may access a web application hosted at server 106 using a browser for determining BG predictions. In an alternate embodiment, the one or more user devices 116 may download an application (including downloading from an App Store such as the Apple® App Store or the Google® Play Store) for determining BG predictions. The user device 116 may be a desktop computer, mobile device, or laptop computer. The user device 116 may be in communication with server 106, and may allow a user 124 to review a user profile stored in a database at data store 114, including historical BG predictions. The users 124 using user devices 116 may provide one or more voice samples using a software application, and may receive a BG prediction based on the one or more voice samples as described herein.

The one or more user devices 116 may each have one or more audio sensors. The one or more audio sensors may be in an array. The audio sensors may be used by a user 124 of the software application to record a voice sample into the memory of the user device 116. The one or more audio sensors may be an electret microphone onboard the user device, MEMS microphone onboard the user device, a Bluetooth enabled connection to a wireless microphone, a line in, etc.

The one or more user devices 116 may also include an additional caregiver device (not shown) or additional companion device (not shown). As described herein, caregiver and companion may be used interchangeably, and may refer to another individual separate from the subject/user 124 of user device 116 who may be a friend, family member, caregiver, companion, or related individual to the subject/user 124. The caregiver may use the caregiver device (not shown) in order to monitor or be apprised of the alerts, notifications, and BG levels of the user 124. The caregiver device (not shown) may have a caregiver software application that may send a pairing request to the user device 116. The user 124 may approve the pairing request, causing a pairing confirmation to be sent to the caregiver device. The pairing of the user device 116 and the caregiver device (not shown) may allow for alerts, notifications, and BG levels for the subject/user 124 to be shared with a caregiver so that they may be informed of adverse situations.

The software application running on the one or more user devices 116 may communicate with server 106 using an Application Programming Interface (API) endpoint, and may send and receive voice sample data, user data, mobile device data, and mobile device metadata.

The software application running on the one or more user devices 116 may display one or more user interfaces on a display device of the user device, including, but not limited to, the user interfaces shown in FIGS. 6A, 6B, 6C, 6D and 6I.

Local wireless device 118a of the one or more user devices 116 may allow for communication with a local wireless device 118b of one or more sensor devices 120. There may be one or more sensor devices 120.

The sensor device 120 may be a wireless audio input device, such as a wireless microphone. The sensor device 120 may transmit voice samples recorded proximate to the user 124 to the user device 116, and may receive alarms or notifications from the user device 116 for presentation to the user 124. The sensor device 120 may be worn on the body of user 124, on their clothing, or may be disposed proximate to the user 124.

Network 104 may be any network or network components capable of carrying data including the Internet, Ethernet, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.) and others, including any combination of these.

The server 106 is in network communication with the one or more user devices 116 and the one or more computer devices 102. The server 106 may further be in communication with a database at data store 114. The database at data store 114 and the server 106 may be provided on the same server device, may be configured as virtual machines, or may be configured as containers. The server 106 and a database at data store 114 may run on a cloud provider such as Amazon® Web Services (AWS®).

The server 106 may host a web application or an Application Programming Interface (API) endpoint that the one or more user devices 116 may interact with via network 104. The server 106 may make calls to the mobile device 110 to poll for voice sample data. Further, the server 106 may make calls to the database at data store 114 to query subject data, voice sample data, voice glucose model data, or other data received from the users 124 of the one or more user devices 116. The requests made to the API endpoint of server 106 may be made in a variety of different formats, such as JavaScript Object Notation (JSON) or eXtensible Markup Language (XML). The voice sample data may be transmitted between the server 106 and the user device 116 in a variety of different formats, including MP3, MP4, AAC, WAV, Ogg Vorbis, FLAC, or other audio data formats as known. The voice sample data may be stored as Pulse-Code Modulation (PCM) data. The voice sample data may be recorded at 22,050 Hz or 44,100 Hz. The voice sample date may be collected as a mono signal, or a stereo signal. The voice sample data received by the data store 114 from the one or more user devices 116 may be stored in the database at data store 114, or may be stored in a file system at data store 114. The file system may be a redundant storage device at the data store 114, or may be another service such as Amazon® S3, or Dropbox.

The database of data store 114 may store subject information including glucose measurement data, subject and/or user information including subject and/or user profile information, and configuration information. The database of data store 114 may be a Structured Query Language (SQL) such as PostgreSQL or MySQL or a not only SQL (NoSQL) database such as MongoDB.

Figure 2:
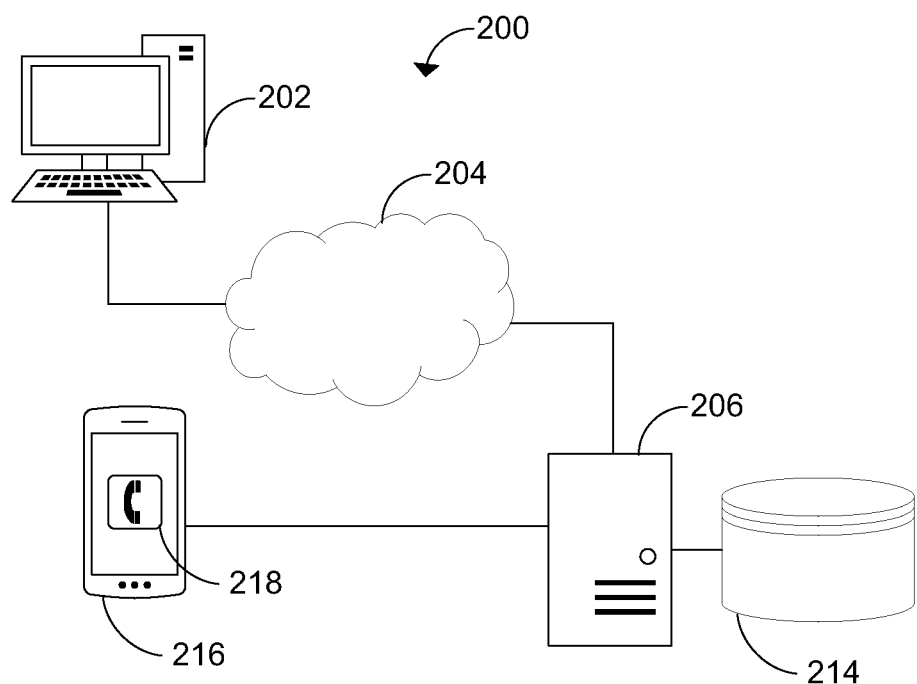
FIG. 2 shows another system diagram in accordance with one or more embodiments.

Referring next to FIG. 2, there is shown another system diagram 200 of an alternate embodiment of a blood glucose prediction system. The one or more computer devices 202, the network 204, the one or more user devices 216, the server 206, and the data store 214 generally correspond to the one or more computer devices 102, the network 104, the one or more user devices 116, the server 106, and the data store 114 respectively of FIG. 1.

The one or more user devices 216 may further include a calling application 218 that may connect to a server 206 using a telephone network such as a cellular telephone system, a Voice over Internet Protocol (VoIP) system, and other manners of communicating with a public switched telephone network (PSTN).

In this embodiment, audio samples are communicated to the server 206 via the public switched telephone network.

In this embodiment, the server 206 may be a private branch exchange (PBX) system, such as a VoIP PBX. The server 206 may be a PBX system as a corporate organization, a governmental organization, a health organization, or any other organization typically operating a PBX system. The PBX system may be for an organization providing telemedicine services.

The server 206 may provide the BG level to the user at user device 216 using an audio prompt, or may notify another user such as a clinician at computer device 202. The BG level may produce an alert or an alarm to a user (including a clinician) at computer device 202. The alert/alarm may separately be communicated via SMS, Email, or an in-application notification.

Figure 3:
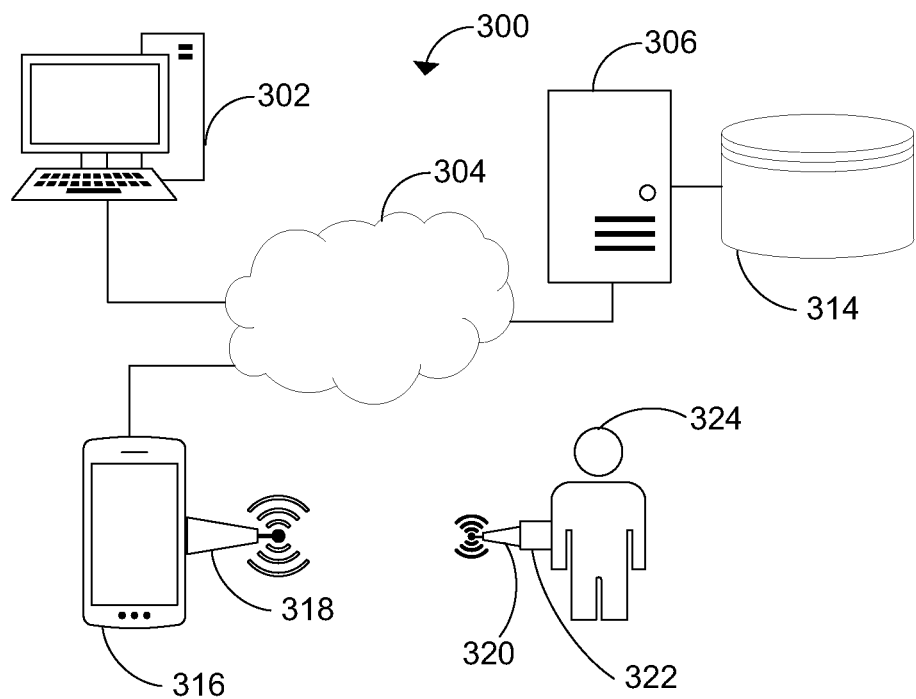
FIG. 3 shows another system diagram in accordance with one or more embodiments.

Referring next to FIG. 3 there is shown another system diagram 300 of an alternate embodiment of the blood glucose prediction system. The one or more computer devices 302, the network 304, the one or more user devices 316, the server 306, and the data store 314 generally correspond to the one or more computer devices 102, the network 104, the one or more user devices 116, the server 106, and the data store 114 respectively of FIG. 1.

The system diagram 300 shows a data collection and model training embodiment, whereby the one or more user devices 316 each have a wireless transceiver 318. The system 300 further includes a glucose monitoring device 322 attached to the skin of a subject 324. The glucose monitoring device 322 may have a wireless transceiver 320 that corresponds to the wireless transceiver 318 of the user device 316. The user device 316 and the glucose monitoring device 322 may be in wireless communication with one another using a short-range wireless protocol such as 802.11x or Bluetooth®.

In one embodiment, the glucose measurement device 322 is a continuous glucose monitor (CGM) device that directly or indirectly provides a measure of glucose concentration. Various CGM devices known in the art are suitable for use with the systems and methods described herein. In one embodiment, the glucose measurement device 322 may be the FreeStyle Libre™ glucose monitoring system available from Abbott® Diabetes Care. In another embodiment, the glucose measurement device 322 may be a CGM device from Dexcom (San Diego, California) such as the G6™, or a CGM device from Medtronic (Fridley, Minnesota) such as the Guardian™ Connect.

The software application on the mobile device 316 may communicate with the glucose sensor 322 and may download the glucose measurement data, or alternatively the glucose sensor 322 may push the glucose data to the user device 316. The sensor of the glucose monitoring device may communicate with the user device 316 and the glucose measurement device 322 using a local wireless connection such as the one provided via wireless transceiver 320, such as 802.11x, Bluetooth, Near-Field Communications (NFC), or Radio-Frequency IDentification (RFID).

The glucose measurement data collected by the glucose monitoring device 322 may include a glucose level such as a concentration, a time reference, glucose monitoring device information corresponding to the glucose monitoring device, and glucose measurement metadata.

The glucose monitoring device may record a single glucose measurement, or may alternatively measure a time series of glucose measurements. The time series of glucose measurements may be recorded from the beginning to the end of the voice sample.

Various devices known in the art can be used to produce time-series glucose data. For example, glucose levels can be gathered with off-the-shelf glucose monitoring devices such as continuous glucose monitoring (CGM) technology, which provides a convenient and cost-effective way to accurately measure continuous glycemia and provide glucose data corresponding to the speech or utterances of the subject.

The user device 316 may run a software application configured to record a voice sample of the user 324 speaking while receiving glucose measurements from the glucose monitoring device 322. The glucose measurements recorded generally contemporaneously with the utterance or voicing of a sample phrase by the user 324.

The software application running on the one or more user devices 316 may communicate with server 306 using an Application Programming Interface (API) endpoint, and may send and receive voice sample data, user data, mobile device data, and mobile device metadata.

The software application running on the one or more user devices 316 may display one or more user interfaces to the user 324 who may be using user device 316, including those shown in FIGS. 6E, 6F, 6G, 6H. The software application running on the one or more user devices 316 may prompt the user to speak a particular prompt, and record a voice sample. The prompt may be a fixed sentence or utterance, or it may be a varied sentence or utterance. The software application may prompt the user 324 to provide a voice sample at particular times of day. For example, the software application may prompt user 324 to provide one or more voice samples in the afternoon.

The software application running on the one or more user devices 316 may communicate with server 306 by using requests made to the API endpoint of server 306 made in a variety of different formats, such as JavaScript Object Notation (JSON) or eXtensible Markup Language (XML). The voice sample data may be transmitted between the server 306 and the user device 316 in a variety of different formats, including MP3, MP4, AAC, WAV, Ogg Vorbis, FLAC, or other audio data formats as known. The voice sample data may be stored as Pulse-Code Modulation (PCM) data. The voice sample data may be recorded at 22,050 Hz or 44,100 Hz. The voice sample date may be collected as a mono signal, or a stereo signal. The voice sample data received by the data store 314 from the one or more user devices 316 may be stored in the database at data store 314, or may be stored in a file system at data store 314. The file system may be a redundant storage device at the data store 314, or may be another service such as Amazon® S3, or Dropbox.

The server 306, in addition to the data store 314 may further provide methods and functionality as described herein for generating a voice glucose prediction model.

Figure 4:
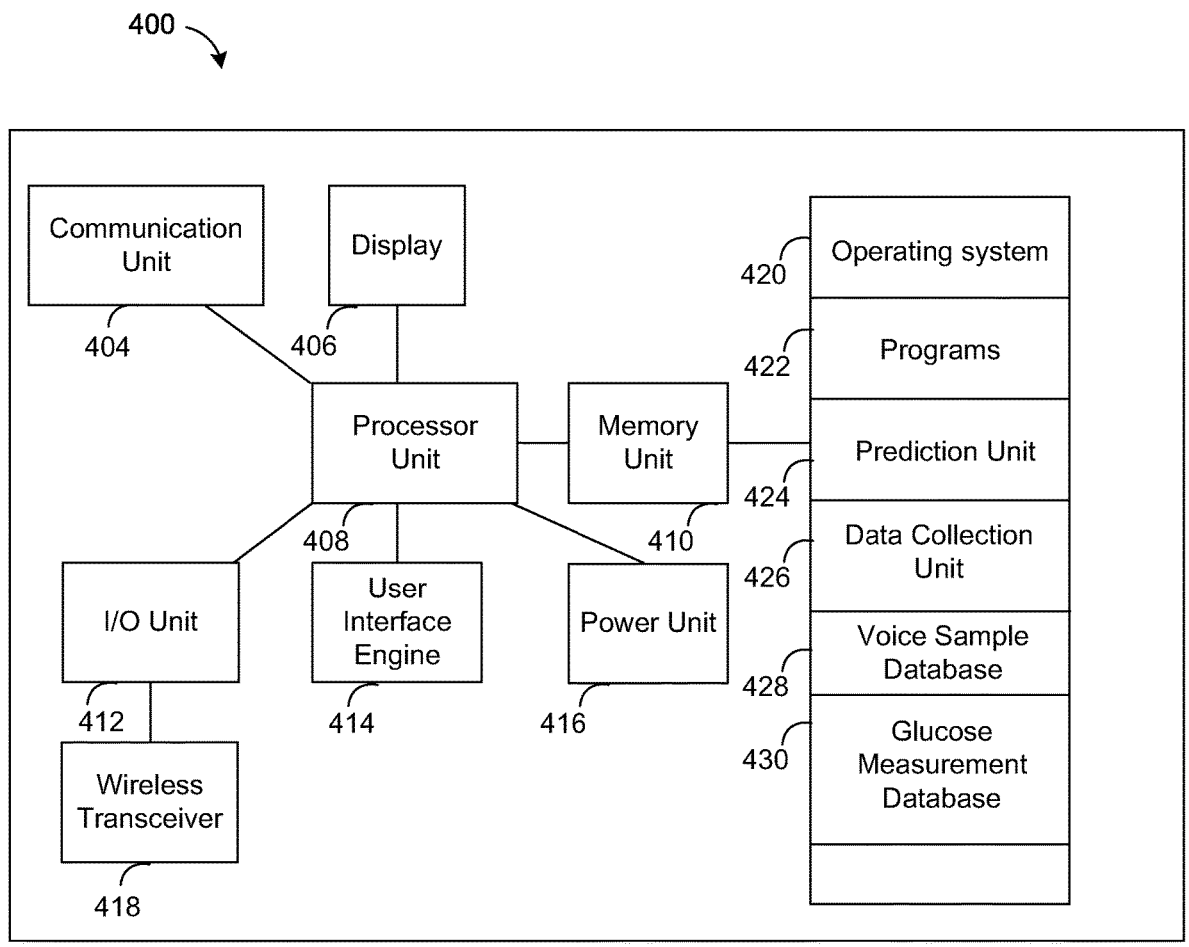
FIG. 4 shows a device diagram in accordance with one or more embodiments.

FIG. 4 shows a user device diagram 400 showing detail of the one or more user devices 116 in FIG. 1, 216 in FIG. 2, and 316 in FIG. 3.

The user device 400 includes one or more of a communication unit 404, a display 406, a processor unit 408, a memory unit 410, I/O unit 412, a user interface engine 414, a power unit 416, and a wireless transceiver 418. The user device 400 may be a laptop, gaming system, smart speaker device, mobile phone device, smart watch or others as are known. The user device 400 may be a passive sensor system proximate to the user, for example, a device worn on user, or on the clothing of the user.

The communication unit 404 can include wired or wireless connection capabilities. The communication unit 404 can include a radio that communicates utilizing CDMA, GSM, GPRS or Bluetooth protocol according to standards such as IEEE 802.11a, 802.11b, 802.11g, or 802.11n. The communication unit 404 can be used by the mobile device 400 to communicate with other devices or computers.

Communication unit 404 may communicate with the wireless transceiver 418 to transmit and receive information via local wireless network with the glucose monitoring device. In an alternate embodiment, the communication unit 404 may communicate with the wireless transceiver 418 to transmit and receive information via local wireless network with an optional handheld device associated with the glucose monitoring device. The communication unit 404 may provide communications over the local wireless network using a protocol such as Bluetooth (BT) or Bluetooth Low Energy (BLE).

The display 406 may be an LED or LCD based display, and may be a touch sensitive user input device that supports gestures.

The processor unit 408 controls the operation of the mobile device 400. The processor unit 408 can be any suitable processor, controller or digital signal processor that can provide sufficient processing power depending on the configuration, purposes and requirements of the user device 400 as is known by those skilled in the art. For example, the processor unit 408 may be a high performance general processor. In alternative embodiments, the processor unit 408 can include more than one processor with each processor being configured to perform different dedicated tasks. In alternative embodiments, it may be possible to use specialized hardware to provide some of the functions provided by the processor unit 408. For example, the processor unit 408 may include a standard processor, such as an Intel® processor, an ARM® processor or a microcontroller.

The processor unit 408 can also execute a user interface (UI) engine 414 that is used to generate various UIs, some examples of which are shown and described herein, such as interfaces shown in FIGS. 6A-6H.

The present systems, devices and methods may provide an improvement in the operation of the processor unit 408 by ensuring the analysis of voice data is performed using relevant biomarkers. The reduced processing required for the relevant biomarkers in the analysis (as compared with processing the superset of all biomarkers) reduces the processing burden required to make BG predictions based on voice data.

The memory unit 410 comprises software code for implementing an operating system 420, programs 422, prediction unit 424, data collection unit 426, voice sample database 428, and glucose measurement database 430.

The present systems and methods may provide an improvement in the operation of the memory unit 410 by ensuring the analysis of voice data is performed using relevant biomarkers and thus only relevant biomarker data is stored. The reduced storage required for the relevant biomarkers in the analysis (as compared with processing the superset of all biomarkers) reduces the memory overhead required to make BG predictions based on voice data.

The memory unit 410 can include RAM, ROM, one or more hard drives, one or more flash drives or some other suitable data storage elements such as disk drives, etc. The memory unit 410 is used to store an operating system 420 and programs 422 as is commonly known by those skilled in the art.

The I/O unit 412 can include at least one of a mouse, a keyboard, a touch screen, a thumbwheel, a track-pad, a track-ball, a card-reader, an audio source, a microphone, voice recognition software and the like again depending on the particular implementation of the user device 400. In some cases, some of these components can be integrated with one another.

The user interface engine 414 is configured to generate interfaces for users to configure glucose and voice measurement, connect to the glucose measurement device, record training voice and glucose data, view glucose measurement data, view voice sample data, view glucose predictions, etc. The various interfaces generated by the user interface engine 414 are displayed to the user on display 406.

The power unit 416 can be any suitable power source that provides power to the user device 400 such as a power adaptor or a rechargeable battery pack depending on the implementation of the user device 400 as is known by those skilled in the art.

The operating system 420 may provide various basic operational processes for the user device 400. For example, the operating system 420 may be a mobile operating system such as Google® Android® operating system, or Apple® iOS® operating system, or another operating system.

The programs 422 include various user programs so that a user can interact with the user device 400 to perform various functions such as, but not limited to, viewing glucose data, voice data, recording voice samples, receiving and viewing glucose measurement data from a glucose measurement device, receiving any other data related to glucose predictions, as well as receiving messages, notifications and alarms as the case may be. The programs 422 may include a telephone calling application, a voice conferencing application, social media applications, and other applications as known. The programs 422 may make calls, requests, or queries to the prediction unit 424, the data collection unit 426, the voice sample database 428, and the glucose measurement database 430. The programs 422 may be downloaded from an application store ("app store") such as the Apple® App Store® or the Google® Play Store®.

In one or more embodiments, the programs 422 may include a glucose fitness application. The glucose fitness application may record voice samples from the user and report the user's BG category/level. Such a fitness application may integrate with a health tracker of the individual such as a Fitbit®, or Apple® Watch such that additional exercise, or measurement data may be collected. The glucose fitness application may record historical BG predictions in order to determine changes in the user's BG levels. The embodiments described herein may allow for a diabetic user to check glucose levels using voice samples, and may allow a diabetic user to replace portions of their finger stick testing by providing voice samples. The glucose fitness application may use the BG level to generate a notification to a user. The notification may include a mobile notification such as an app notification, a text notification, an email notification, or another notification that is known. The glucose fitness application may operate using the method of FIG. 7A, 7E or FIG. 8.

In one or more embodiments, the programs 422 may include a smart speaker application, operable to interact with a user using voice prompts, and receptive of voice commands. In such an embodiment, the voice commands the user provides as input may be used as voice sample data as described herein. In this case, a user may request their BG prediction by prompting the smart speaker "Alexa, how is my blood glucose level doing right now?" or similar. The smart speaker application may passively monitor the user's BG levels by way of the voice command voice samples, and may alert the user when it drops. The smart speaker application may follow the method of FIG. 7A, FIG. 7C, FIG. 7E or FIG. 8.

In one or more embodiments, the programs 422 may include a smart watch application for outputting information including a BG level or category on a watch face. The smart watch application may enable a user to provide voice prompts using an input device of the watch and check blood glucose predictions on an output device of the watch. The smart watch application may follow the method of FIG. 7A, FIG. 7C, FIG. 7E or FIG. 8.

In one or more embodiments, the programs 422 may include a nutrition application which may determine a diet recommendation for a user based on their blood glucose level or category. The nutrition application may also recommend food intake or diet changes to the user. The nutrition application may follow the method of FIG. 7A, FIG. 7C, FIG. 7E or FIG. 8.

In one or more embodiments, the programs 422 may include a food check application which may act to provide a glucose food test, or check, for the user. As used herein the term "food" includes liquid compositions such as beverages. This test or check may include taking a voice sample and a proposed food the user wants to eat and then providing the user an indication that it is acceptable or unacceptable to eat the food based on the subject's blood glucose level and information about the food such as identity, sugar content, nutritional information and serving size. The diet application may connect to a locked food container, and may unlock the food container based on the user's BG level or category. The food check application may follow the method of FIG. 7A, FIG. 7C, FIG. 7E or FIG. 8.

In one or more embodiments, the programs 422 may include a pre-diabetic lifestyle application that may track the user's BG level history, and may output predictions of disease susceptibility. The glucose fitness application may provide lifestyle change recommendations to a pre-diabetic user. For example, a non-diabetic individual may be at risk of developing type-II diabetes. The pre-diabetic lifestyle application may follow the method of FIG. 7B.

The lifestyle application may allow for the user to select lifestyle criteria and lifestyle values. The lifestyle criteria may correspond to items such as "tobacco usage", "alcohol intake", "exercise level" or other such behavior and lifestyle descriptors that may be associated with an increased risk of type-II diabetes. Each lifestyle criteria may correspond to a lifestyle value. For example, a "tobacco intake" may select 5 cigarettes per day as it's corresponding lifestyle value. The lifestyle values may similarly correlate to number of units of alcohol per day, number of minutes of exercise per day, number of steps per day, volume of water consumer per day, etc.

The lifestyle criteria may be diarized in a lifestyle request. The lifestyle request may allow a user to document at different times, lifestyle changes which may have an impact upon their type-II diabetes risk.

Based on the BG level, and the user's diarized lifestyle requests, the lifestyle application may determine (or may request from a server) a lifestyle change recommendation.

In one or more embodiments, the programs 422 may include a video conferencing application. The video conferencing application may follow the method of FIG. 7C or FIG. 8.

In one or more embodiments, the programs 422 may include a pre-diabetic screening application. The pre-diabetic screening application may assist a medical professional or another user to provide pre-diabetic screening to determine a diabetic risk profile based on a blood glucose level. The pre-diabetic screening application may be combined and integrated with a validated prediabetes screener (e.g. CANRISK), and may include a questionnaire in addition to a voice sample analysis. For example, the pre-diabetic screening application may incorporate at least one screening question that provide information related to risk factors for pre-diabetes or diabetes such as body mass index (BMI), weight, blood pressure, disease comorbidity, family history, age, race or ethnicity and physical activity. The at least one screening question may be used as feature inputs and combined with the voice features in the predictive model. The pre-diabetic screening application may be used by a medical professional or may be provided directly to a user. The pre-diabetic screening application may follow the method of FIG. 7D or FIG. 8.

In one or more embodiments, the programs 422 may include a passive glucose application that may receive audio inputs, transmit voice samples to a server, optionally receive BG predictions, and optionally provide alerts to the user's device to the user automatically and without user prompting. In one or more embodiments, the passive sensor application may be connected wirelessly to a user device such as a mobile phone, and may cause an email, text message, or application notification to be displayed to a user on the user device. The passive sensor application may follow the method of FIG. 7E or FIG. 8.

In one or more embodiments, the passive sensor application may provide a notification to the user such as to take medication (e.g. insulin), consume or avoid certain foods or otherwise follow a therapeutic plan. The passive sensor application may follow the method of FIG. 7E or FIG. 8.

In one or more embodiments, the programs 422 may include an educational application. For example, in one embodiment programs 422 include an educational application for helping subjects manage their blood glucose levels, optionally for recently diagnosed type-II diabetic users. The educational program may communicate recommended diet and behavioral changes to the user, and may use the user's voice samples to tailor educational content presented to them on the user device. The educational application may follow the method of FIG. 7F or FIG. 8.

In one or more embodiments, the programs 422 may include a subject tracker for a plurality of subjects. The subject tracker may provide a user interface providing information and glucose predictions collected periodically from the subjects. The glucose predictions may be provided to the medical professional in order to e.g. collect clinical trial data or adjust a treatment plan for a subject in the plurality of subjects. The user interface may include a reporting interface for the plurality of subjects, or alternatively may provide email, text message, or application notifications to the medical professional about one or more subjects based on subject BG predictions, disease susceptibility, or other predicted subject data. The subject tracker may follow the method of FIG. 7B, FIG. 7E or FIG. 8.

In one or more embodiments, the programs 422 may include a caregiver application for friends and family members of type-II diabetic subjects. The user of the caregiver application may receive BG predictions for another subject. The caregiver application may be paired with a user profile of a user of one of the blood glucose programs described herein. The pairing may provide a caregiver of a subject with type-II diabetes alerts or notifications based on voice samples of the subject so that they are aware of adverse BG situations and allow them to intervene to correct them if required. The subject paired with the caregiver may record their voice samples using a passive sensor device attached to their body, and/or clothing. The caregiver application may follow the method of FIG. 7E or FIG. 8.

In one or more embodiments, the programs 422 may include an employer provided safety application. This may include the passive sensor application as described herein, and may be incorporated on an employer provided user device. For example, in positions where public safety is at stake and/or the prevention of workplace injuries is a high priority and in situations where alertness is a requirement, including commercial airline pilots, bus drivers, truck drivers, military personnel, surgeons, and the like. The passive sensor may generate alertness warnings to the employee to warn them of a high-risk situation. The safety application may follow the method of FIG. 7E or FIG. 8.

The prediction unit 424 receives voice data from the audio source connected to I/O unit 412 via the data collection unit 426, and may transmit the voice data to the server (see e.g. 106 and 206 in FIGS. 1 and 2 respectively). In response, the server may operate the method as described in FIG. 8 to generate a blood glucose prediction for the subject, and may respond with the blood glucose prediction to the user device. The voice sample data may be stored in the voice sample database 428 along with the prediction data. Prediction unit 424 may determine predictive messages based on the voice model and the voice sample data. The predictive messages may be displayed to a user of the mobile device 400 using display 406. The predictive messages may include a BG category.

Figure 8:
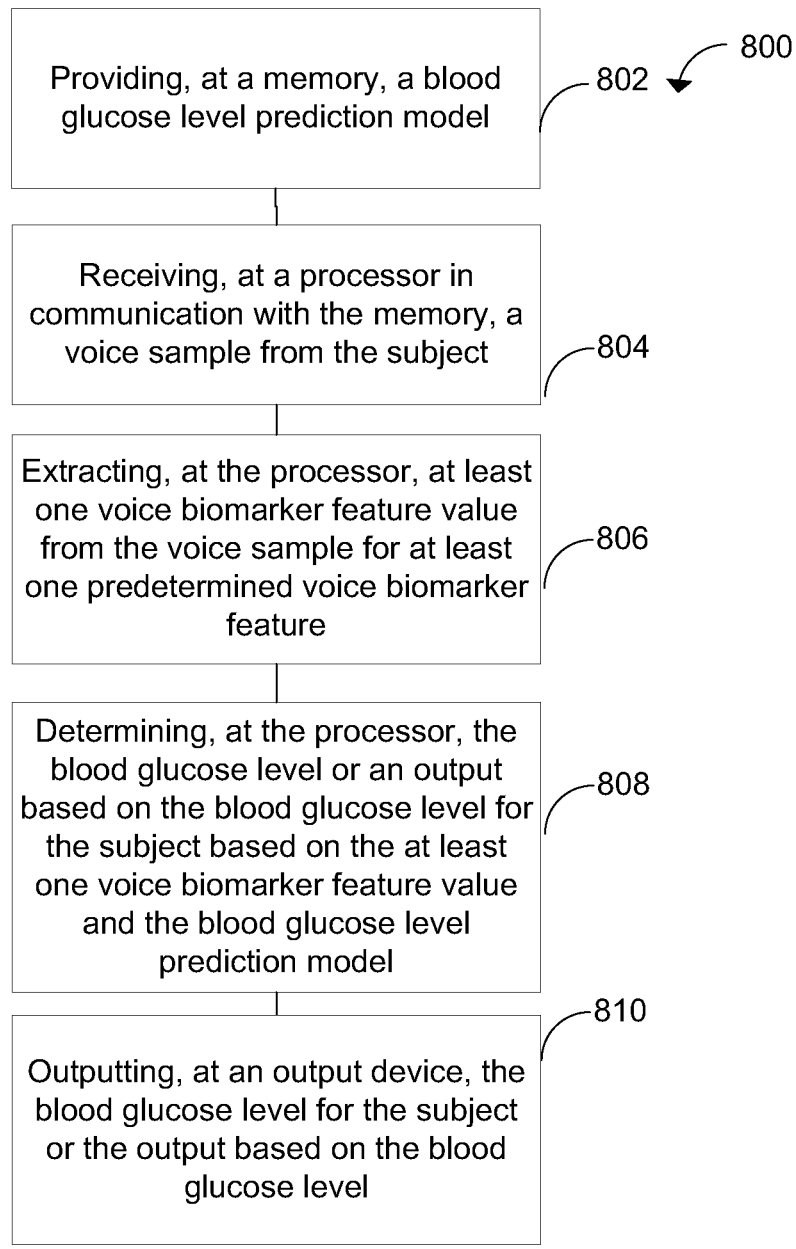
FIG. 8 shows a method diagram in accordance with one or more embodiments.

In an alternate embodiment, the prediction unit 424 of the mobile device 400 may include a voice glucose prediction model, and may operate the method as described in FIG. 8 to generate a blood glucose prediction for the subject on the mobile device itself. In this alternate unit, the voice sample data may be stored in the voice sample database 428 along with the prediction data.

The data collection unit 426 receives voice sample data from an audio source connected to the I/O unit 412.

In one or more embodiments, the data collection unit 426 receives glucose measurement data from the glucose measurement device via the wireless transceiver 418. The data collection unit 426 may receive the glucose measurement data and may store it in the glucose measurement database 430. The data collection unit 426 may receive the glucose measurement data and may transmit it to a server. The data collection unit 426 may supplement the glucose measurement data that is received from the glucose measurement device with mobile device data and mobile device metadata. The data collection unit 426 may further send glucose measurement data to the server. The data collection engine 426 may communicate with the glucose measurement device wirelessly, using a wired connection, or using a computer readable media such as a flash drive or removable storage device.

The voice sample database 428 may be a database for storing voice samples received by the user device 400. The voice sample database 430 may receive the data from the data collection unit 426.

The glucose measurement database 430 may be a database for storing glucose measurement data from the glucose measurement device. The measurement database 430 may receive the data from the data collection unit 426.

Figure 5:
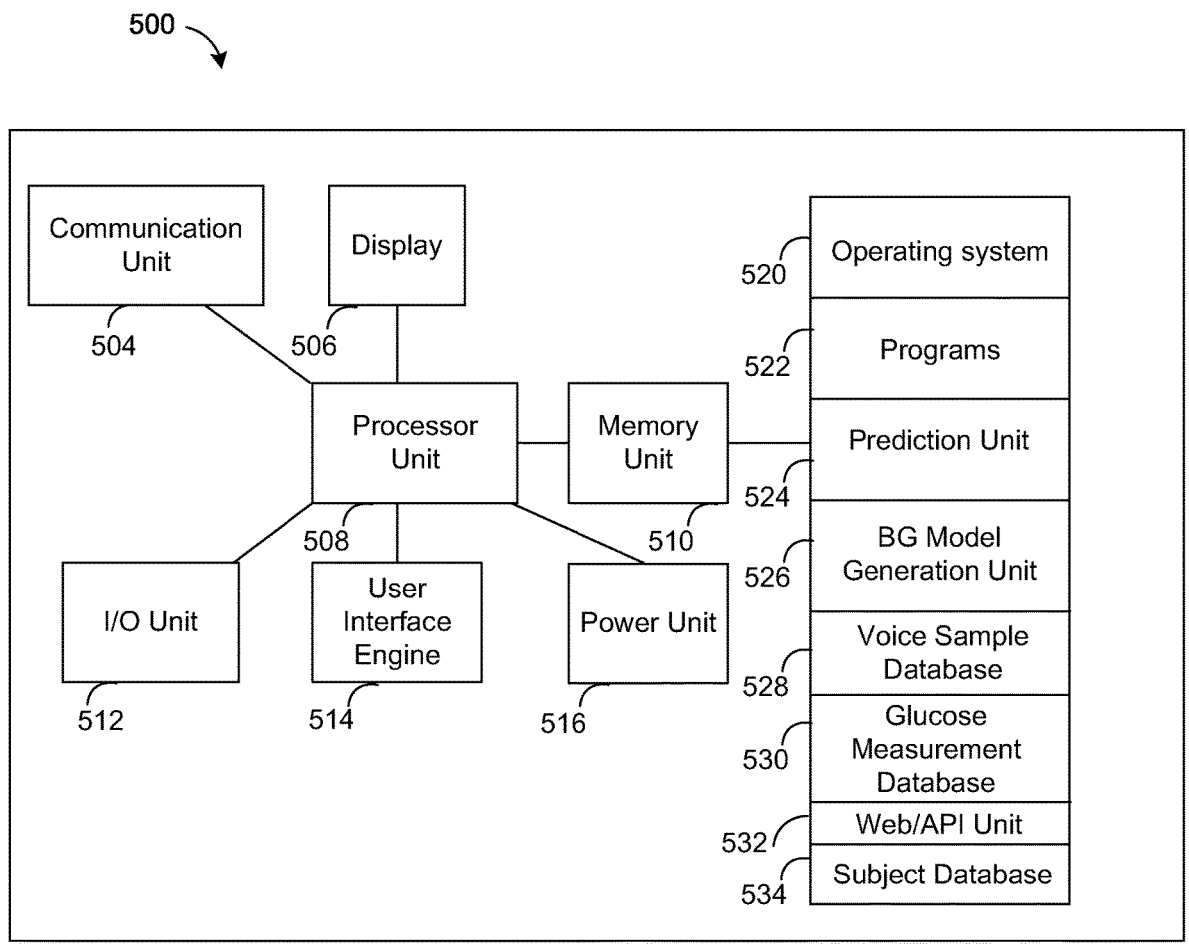
FIG. 5 shows another device diagram in accordance with one or more embodiments.

FIG. 5 shows a server diagram showing detail of the server 106 in FIG. 1, 206 in FIG. 2, and 306 in FIG. 3. The server 500 includes one or more of a communication unit 504, a display 506, a processor unit 508, a memory unit 510, I/O unit 512, a user interface engine 514, and a power unit 516.

The communication unit 504 can include wired or wireless connection capabilities. The communication unit 504 can include a radio that communicates using standards such as IEEE 802.11a, 802.11b, 802.11g, or 802.11n. The communication unit 504 can be used by the server 500 to communicate with other devices or computers.

Communication unit 504 may communicate with a network, such as networks 104, 204, and 304 (see FIGS. 1, 2 and 3 respectively).

The display 506 may be an LED or LCD based display, and may be a touch sensitive user input device that supports gestures.

The processor unit 508 controls the operation of the server 500. The processor unit 508 can be any suitable processor, controller or digital signal processor that can provide sufficient processing power depending on the configuration, purposes and requirements of the server 500 as is known by those skilled in the art. For example, the processor unit 508 may be a high performance general processor. In alternative embodiments, the processor unit 508 can include more than one processor with each processor being configured to perform different dedicated tasks. The processor unit 508 may include a standard processor, such as an Intel® processor or an AMD® processor.

The processor unit 508 can also execute a user interface (UI) engine 514 that is used to generate various UIs for delivery via a web application provided by the Web/API Unit 530, some examples of which are shown and described herein, such as interfaces shown in FIG. 6A-I.

The memory unit 510 comprises software code for implementing an operating system 520, programs 522, prediction unit 524, BG model generation unit 526, voice sample database 528, glucose measurement database 530, Web/API Unit 532, and subject database 534.

The memory unit 510 can include RAM, ROM, one or more hard drives, one or more flash drives or some other suitable data storage elements such as disk drives, etc. The memory unit 510 is used to store an operating system 520 and programs 522 as is commonly known by those skilled in the art.

The I/O unit 512 can include at least one of a mouse, a keyboard, a touch screen, a thumbwheel, a track-pad, a track-ball, a card-reader, an audio source, a microphone, voice recognition software and the like again depending on the particular implementation of the server 500. In some cases, some of these components can be integrated with one another.

The user interface engine 514 is configured to generate interfaces for users to configure glucose and voice measurement, record training voice and glucose data, view glucose measurement data, view voice sample data, view glucose predictions, etc. The various interfaces generated by the user interface engine 514 may be transmitted to a user device by virtue of the Web/API Unit 532 and the communication unit 504.

The power unit 516 can be any suitable power source that provides power to the server 500 such as a power adaptor or a rechargeable battery pack depending on the implementation of the server 500 as is known by those skilled in the art.

The operating system 520 may provide various basic operational processes for the server 500. For example, the operating system 520 may be a server operating system such as Ubuntu® Linux, Microsoft® Windows Server® operating system, or another operating system.

The programs 522 include various user programs. They may include several hosted applications delivering services to users over the network, for example, a voice conferencing server application, a social media application, and other applications as known.

In one or more embodiments, the programs 522 may provide a public health platform that is web-based, or client-server based application via Web/API Unit 532 that provides for health research on a large population of subjects. The health platform may provide population health researchers the ability to conduct large N surveillance studies to map the incidence and prevalence of diabetes and prediabetes. The public health platform may provide access for queries and data analysis of the voice sample database 528, the glucose measurement database 530, and the subject database 534. The health platform may allow for population health research on different groups, including based on demographic information, the subject's diabetic or pre-diabetic status.

In one or more embodiments, the programs 522 may provide a public health platform that is web-based, or client server based via a Web/API Unit 532 that provides type-II diabetic risk stratification for a population of subjects. This may include a patient population of a medical professional who is a user of the public health platform. For example, the medical professional may be able to receive a 24 h view into BG levels for their patients to further identify the subject's risk levels.

In one or more embodiments, the programs 522 may provide a telephone automation system, including via a PBX system. The telephone automation system may include an answering machine, an automated telephone voice prompt system, a telemedicine system, and other telephone based answering and reception systems.

The prediction unit 524 receives voice data from a user device over a network at Web/API Unit 532, and may operate the method as described in FIG. 8 to generate a blood glucose prediction for the subject. The server may respond with the blood glucose prediction to the user device via a message from the Web/API Unit 532. The voice sample data may be stored in the voice sample database 528 along with the prediction data. Prediction unit 524 may determine predictive messages based on the BG voice model and the voice sample data.

The BG model generation unit 526 receives voice data from voice sample database 528, glucose data from glucose measurement database 530, and subject information from subject database 534. The BG model generation unit 526 may generate a BG prediction model based on the method of FIG. 9.

The voice sample database 528 may be a database for storing voice samples received from the one or more user devices via Web/API Unit 532. The voice sample database 528 may include voice samples from a broad population of subjects interacting with user devices. The voice samples in voice sample database 528 may be referenced by a subject identifier that corresponds to an entry in the subject database 534. The voice sample database 528 may include voice samples for a population of subjects, including more than 10,000, more than 100,000 or more than a million subjects. The voice sample database 528 may include voice samples from many different audio sources, including passive sensor devices, user devices, PBX devices, smart speakers, smart watches, game systems, voice conferencing applications, etc.

The glucose measurement database 530 may be a database for storing glucose measurement data received from the one or more user devices via Web/API Unit 532. The measurement database 530 may include blood glucose measurements from a broad training population of subjects who have performed the training actions using the one or more user devices. The blood glucose measurements in glucose measurement database 530 may be referenced by a subject identifier that corresponds to an entry in the subject database 534. The glucose measurement database 530 may include glucose measurements corresponding to voice samples for a population of subjects, including more than 1,000, more than 10,000 or more than 100,000 subjects.

The Web/API Unit 532 may be a web based application or Application Programming Interface (API) such as a REST (REpresentational State Transfer) API. The API may communicate in a format such as XML, JSON, or other interchange format.

The Web/API Unit 532 may receive a blood glucose prediction request including a voice sample, may apply methods herein to determine a blood glucose prediction, and then may provide the prediction in a blood glucose prediction response. The voice sample, values determined from the voice sample, and other metadata about the voice sample may be stored after receipt of a blood glucose prediction request in voice sample database 528. The predicted BG level may be associated with the voice sample database entry, and stored in the subject database 534.

The Web/API Unit 532 may receive a training request, including blood glucose measurements and a voice sample. The voice sample, values determined from the voice sample, and other metadata about the voice sample may be stored after receipt of a blood glucose prediction request in voice sample database 528. The corresponding glucose measurements may be associated with the voice sample entry in the voice sample database 528 and stored in the glucose measurement database 530.

The Web/API Unit 532 may receive a nutritional recommendation request including a voice sample, may apply methods herein to determine a blood glucose prediction and a nutritional recommendation, and then may provide the blood glucose prediction and the nutritional recommendation in a response. The nutrition recommendation may use coarse BG predictions to recommend nutrients to the user so that the user can adjust their diet. The voice sample of the nutritional recommendation request may be stored in voice sample database 528. The nutritional recommendation provided in response may be associated with the voice sample entry in voice sample database 528 and stored in the subject database 534.

The Web/API Unit 532 may receive a food check request including a food identifier and a voice sample. The Web/API Unit 532 may determine whether it's acceptable for the user to consume the food identified by the food identifier based on their current BG level as predicted based on the voice sample. The Web/API Unit 532 may make a call to a third party database, such as a food or nutrition database, in order to determine nutritional values of the food identified by the food identifier. In response to the food check request, the Web/API Unit 532 may reply with a food check response including an indication of whether it is acceptable for the user/subject to consume the food. The food check response may include an unlock command which may be used by the user device to unlock a corresponding food container. The voice sample of the food check may be stored in voice sample database 528. The food identifier may be associated with the voice sample entry in voice sample database 528 and stored in subject database 534. The food check response, including whether the subject is permitted to consume the food, may be associated with the food identifier, the voice sample entry in the voice sample database 528, and stored in subject database 534.

The Web/API Unit 532 may receive a lifestyle journaling request including one or more lifestyle criteria and a corresponding one or more lifestyle values. The lifestyle criteria may include a criteria of the user, such as weight, blood pressure, caloric intake, tobacco smoking intake, alcohol intake, illicit substance intake, pharmaceutical intake, or other criteria as are known. Optionally, each lifestyle criteria may be provided with a lifestyle value. For example, for "alcohol intake", a user may indicate "3 drinks per week". The lifestyle journaling request may be made by a user device and may include a voice sample or other data based on the sample such as a blood glucose level. The voice sample may be stored in voice sample database 528. The one or more lifestyle criteria and the corresponding one or more lifestyle values may be associated with the voice sample or other data and may be stored in subject database 534. In response to the lifestyle journaling request, a lifestyle response may be transmitted to the user device. The response may include a glucose trend indication, a disease progression score, or a relative value. The trend or progression scores may be determined based upon the user/subject's historical lifestyle criteria/values. For example, if a user decreases their alcohol intake from "5 drinks per week" to "3 drinks per week", the lifestyle response may include a trend or indication of the user's decreased susceptibility to type-II diabetes. Optionally, the lifestyle response may include an indicator or flag that the user's medication or therapeutic plan should be reviewed or changed with a health professional.

The Web/API Unit 532 may receive a screening question request from a user device. In response, the Web/API Unit 532 may send at least one pre-diabetic screening questions to the user device.

The Web/API Unit 532 may receive a screening answer request, including a voice sample and at least one answer to a corresponding at least one pre-diabetic screening questions. The Web/API Unit 532 may determine a pre-diabetic risk profile based on the voice sample and the one or more answers, and may transmit it in response to the user device in a pre-diabetic screening response including the risk profile. In one embodiment, the at least one screening answer comprise clinicopathological information such as, but not limited to, information on one or more of height, weight, BMI, disease comorbidity e.g. diabetes status, blood pressure, disease comorbidity, family history, age, race or ethnicity and physical activity.

The subject database 534 may be a database for storing subject information, including one or more clinicopathological values about each subject. Further, the subject database 534 may include the subject's food checks, references to the subject's voice sample entries in the voice sample database 528, food identifiers used in food check requests, nutritional recommendation requests, nutritional recommendation responses, and entries in the subject's glucose measurement entries in glucose measurement database 530. Each subject may have a unique identifier, and the unique identifier may reference voice samples in the voice sample database 528 and glucose measurements in the glucose measurement database 530. The subject database 534 may include subject information for a population of subjects, including more than 10,000, more than 100,000 or more than a million subjects. The subject database may have anonymized subject data, such that it does not personally identify the subjects themselves.

Referring next to FIGS. 6A, 6B, 6C, and 6D together, there are example user interfaces 600, 610, 620 and 630 respectively showing a subject collecting a voice sample and receiving a blood glucose prediction.

At interface 600, there is a user interface shown to a user at a user device 602 who desires to receive a BG prediction. To initiate the prediction, the user is prompted to begin the blood glucose check by selecting a start button 606. Once start is selected, the audio input of the user device begins recording the voice sample into memory of the user device 602.

In an alternate embodiment, the user may receive a notification on the user device 602 to initiate the voice sampling, and by selecting the notification may be presented with interface 600 to initiate the collection. The notification to the user to initiate the voice sampling may be determined based on the time of day.

In response to the user selecting the start button, a variable prompt interface 610 is shown, prompting the user to read the prompt 614. The prompt may be a variable prompt 614 as shown, and may change subject to subject, or for each voice sample that is recorded. During the voice sample collection, the user interface 610 may show a voice sample waveform 616 on the display.

Alternatively, a static prompt to user interface 620 may instead be shown to a subject and the prompt 624 may be static. Each subject may speak the same prompt out loud for every voice sample. During the voice sample collection, the user interface 620 may show a voice sample waveform 626 on the display.

In response to completing the voice prompt (either static or variable), a BG prediction 634 may be made in a BG prediction interface 630. The BG prediction 634 may be a categorical prediction, i.e. 'Low', 'Medium', and 'High' or 'hypoglycemic', 'normal' and 'hyperglycemic' or a quantitative level i.e. mg/dL or mmol/L. As described herein, the BG prediction 634 may be for a plurality of categorical predictions, optionally categorical predictions that may appear continuous such as numerical values. The prediction may be generated by a server, or may be generated by the user device itself.

Referring next to 6E, 6F, 6G, and 6H together, there are example interfaces 640, 650, 660, and 670 respectively showing a subject performing training actions on a user device 642.

At interface 640, there is a user interface shown to a user at a user device 642 who desires to perform a training action. The interface 640 may provide a glucose monitoring connection indicator 648 that may indicate whether the blood glucose monitoring device is operational and in communication with the user device 642. The subject may initiate the training action by selecting the start button 646.

In an alternate embodiment, the user may receive a notification on the user device 642 to initiate the training action, and by selecting the notification may be presented with interface 640 to initiate the training action. The notification to the user to perform the training action may be determined based on the time of day.

In response to the user selecting the start button 646, a variable training interface 650 may be displayed on the user device 642 providing a variable prompt 654 for the subject to read. A voice waveform indication 656 may be displayed to the user.

Alternatively, in response to the user selecting the start button 646, a static training interface 660 may be displayed to the user selecting the start button 646, providing a static prompt 664 for the subject to read. A voice waveform indication 666 may be displayed to the user.

In response to the user selecting the start button 646, a subject glucose recording may begin and blood glucose data may be sent to the user device 642. Similarly, responsive to the user selecting the start button 646, subject voice sample data may be recorded from an audio input of the user device 642 into memory.

In response to the user completing the voice sample data and blood glucose measurement collection, a completion interface 670 may be displayed indicating that the data is being uploaded to a server.

Figure 6A:
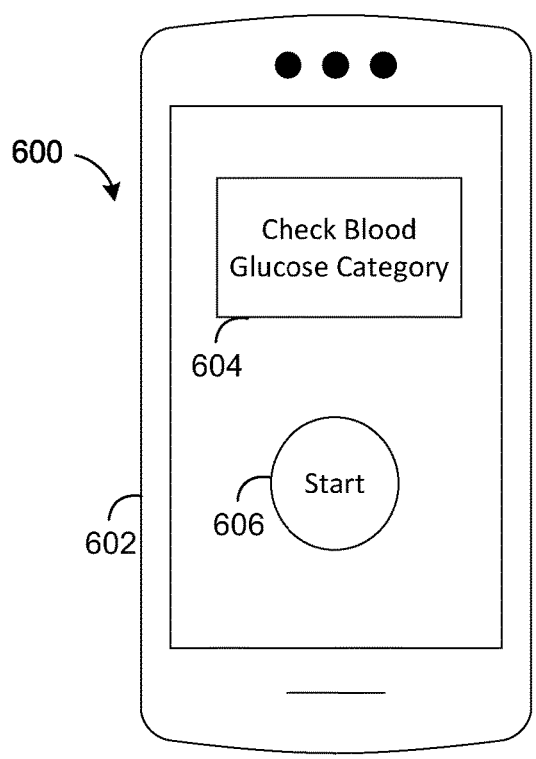
FIGS. 6A, 6B, 6C, 6D, 6E, 6F, 6G, 6H and 6I show user interface diagrams in accordance with one or more embodiments.
Figure 6B:
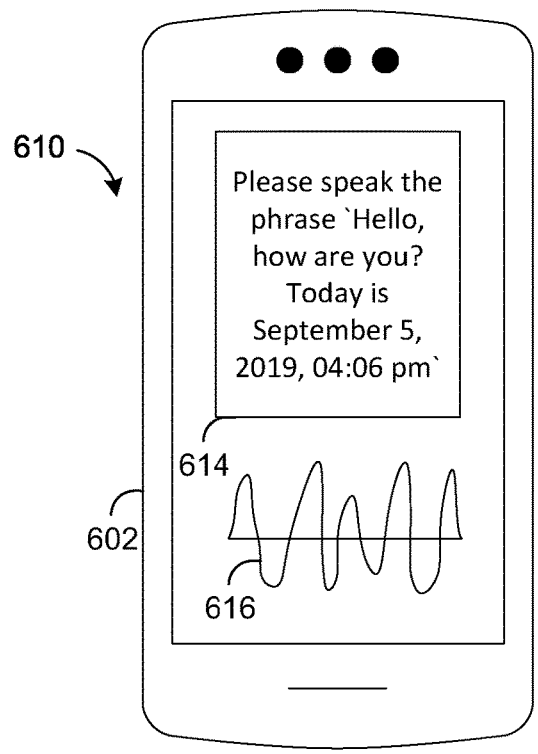
Figure 6C:
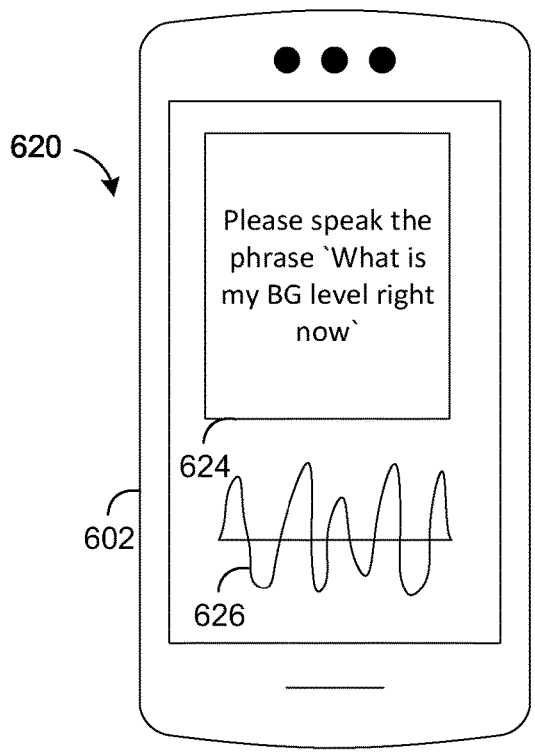
Figure 6D:
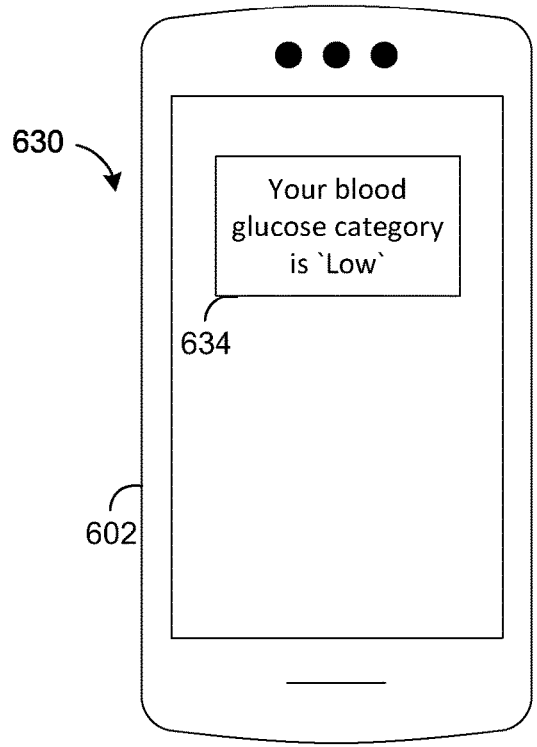
Figure 6E:
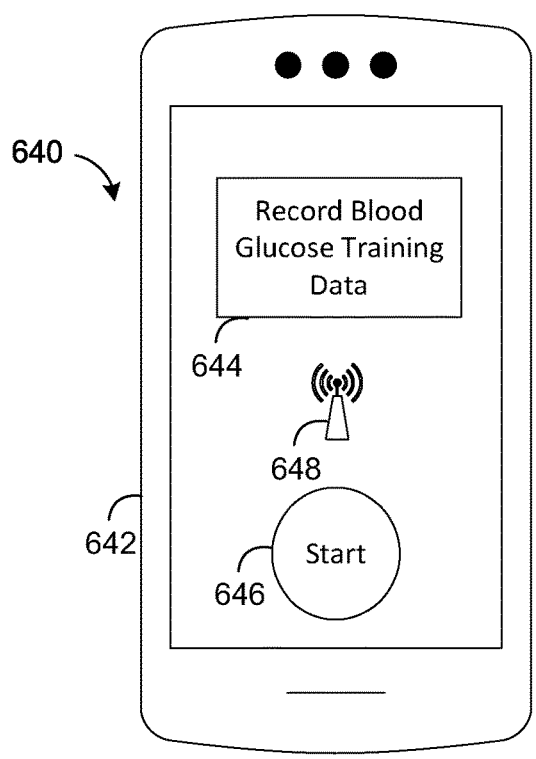
Figure 6F:
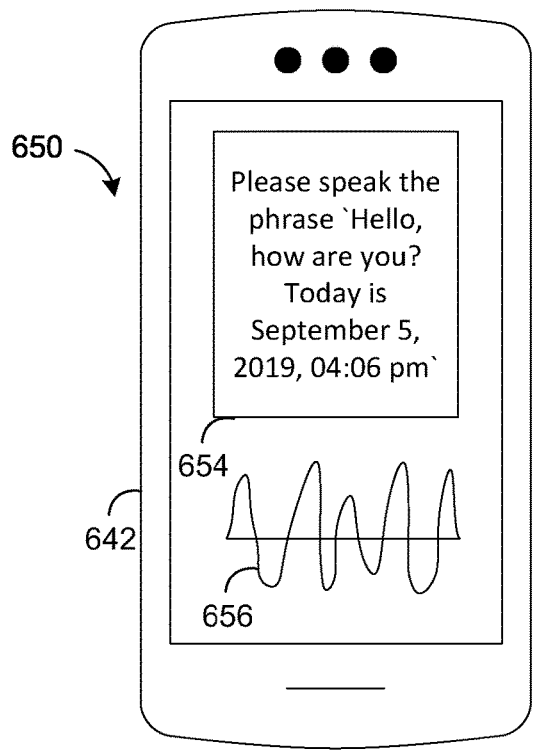
Figure 6G:
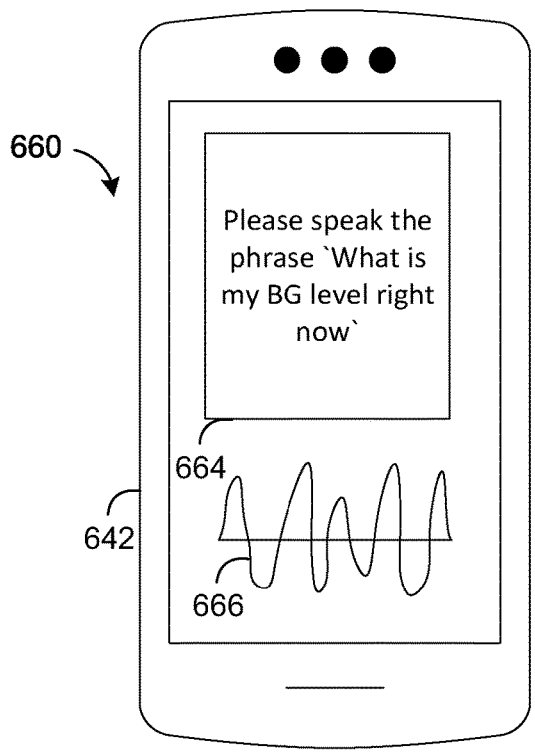
Figure 6H:
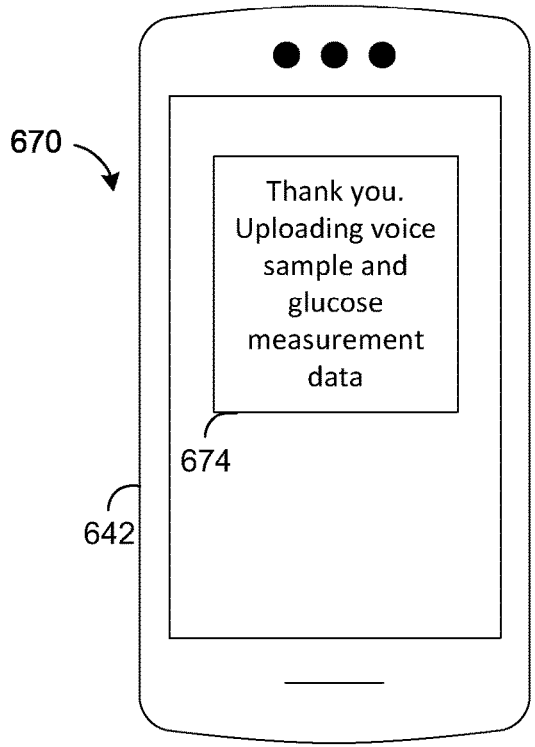
Figure 6I:
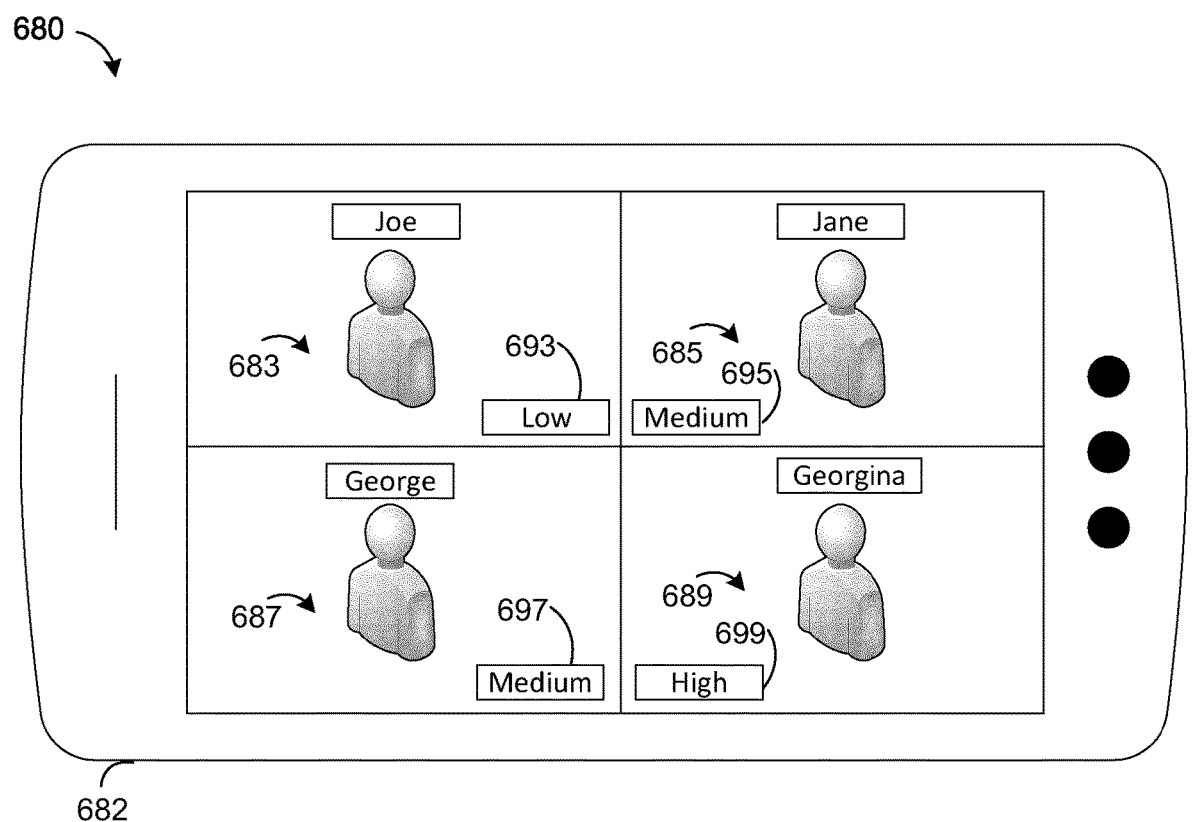

Referring next to FIG. 6I there is shown an example user interface 680 showing a video conferencing application including automatic BG predictions.

The blood glucose prediction software application may be integrated with an existing software application, such as a videoconferencing application or a social network application in order to provide BG prediction data automatically. In one example, the software application may be integrated with a video conferencing application such as Zoom®.

In the video conferencing interface 680, four users are shown on the display of user device 682: Joe 683, Jane 685, George 687 and Georgina 689. Based on each user/subject's voice samples transmitted using the video conferencing application, the methods herein may be used in order to provide a BG category prediction for a user. For example, Joe has a BG category prediction of low' 693, Jane has a BG category prediction of 'Medium' 695, George has a BG category prediction of 'Medium' 697, and Georgina has a BG category prediction of 'High' 699. As described herein, the BG prediction of low' 693, 'Medium' 695, 'Medium' 697, and 'High' 699 may instead be represented by another plurality of categorical predictions, optionally a plurality of numerical categorical predictions that may appear continuous.

Figure 7A:
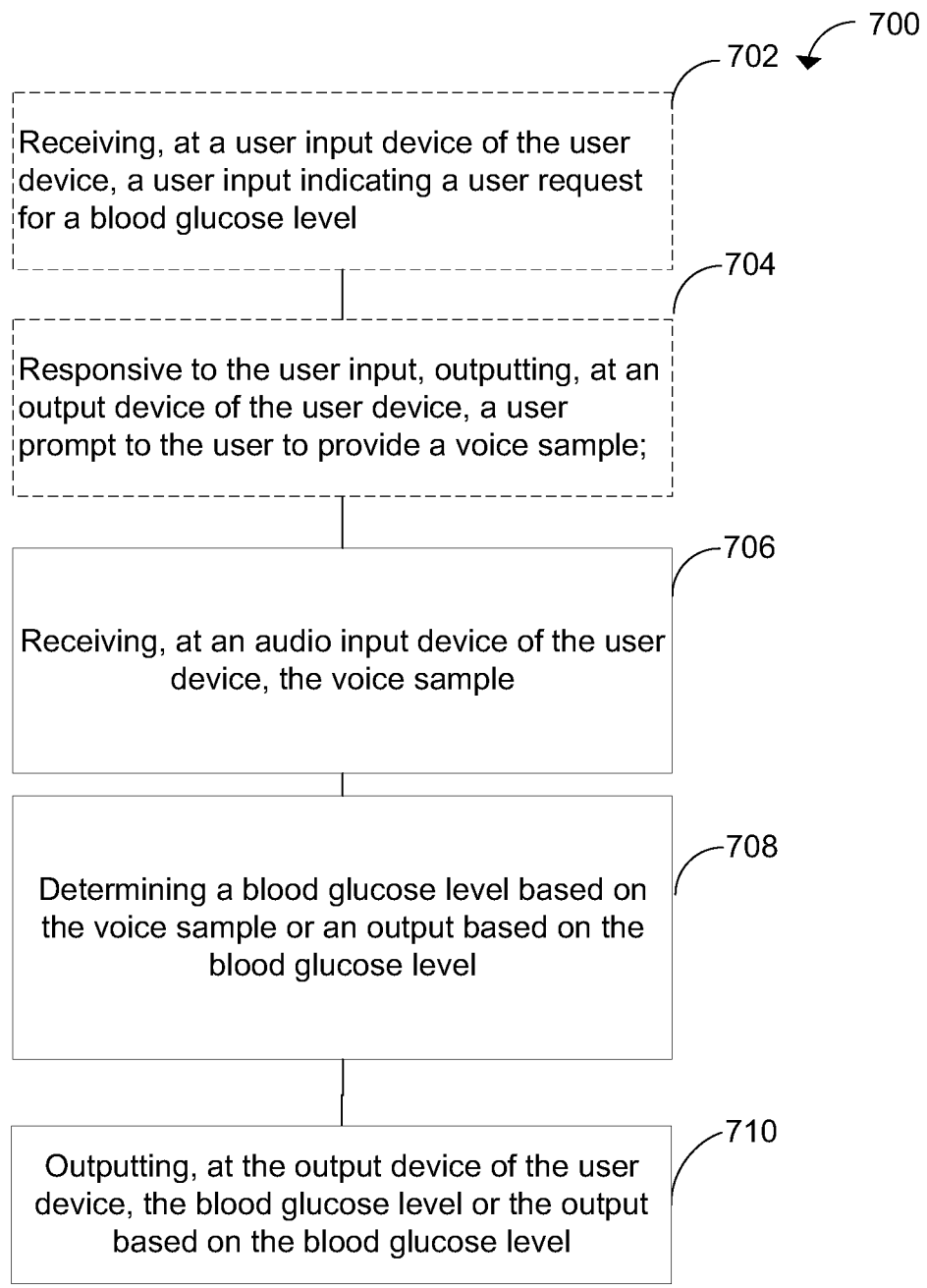
FIG. 7A shows a computer-implemented method diagram for checking a BG prediction in accordance with one or more embodiments.

Referring next to FIG. 7A, there is shown a computer-implemented method diagram 700 for checking a BG level.

The BG level may be represented as a category, a numerical value, a text description, or another type of representation describing the subject's BG level.

At 702, optionally receiving, at a user input device of the user device, a user input indicating a user request for a blood glucose level. The user input may be the user pushing a button, giving a voice command, clicking using a mouse, tapping on a touch sensitive device, or another type of user input as known.

At 704, optionally responsive to the user input, outputting, at an output device of the user device, a user prompt to the user to provide a voice sample. The user prompt may include a sentence for the subject to vocalize. The sentence may be predetermined, randomized, or partially predetermined and partially randomized.

At 706, receiving, at an audio input device of the user device, the voice sample. The voice sample may be of different lengths, but in a preferred embodiment may be a single sentence. The voice sample that is recorded may be a voice command issued to a user device, such as one given to Apple® Sid®, Ok Google®, or Amazon® Alexa®.

At 708, determining a blood glucose level based on the voice sample. Determining the blood glucose level may be performed using a model, and may follow the method provided in FIG. 8. Determining the BG level may be performed by transmitting the voice sample, or data derived from the voice sample including metadata to a server. Alternatively, the device that receives the voice sample may perform the determining independent of a server.

At 710, outputting, at the output device of the user device, the blood glucose level or an output based on the blood glucose level. The outputting may be in a variety of formats, including on a display device or using a text to speech system. The output based on the blood glucose level may include recommendations to the subject, such as a recommendation based on the location, or other subject metadata.

Optionally, the determining the blood glucose level may be determined based on the method of FIG. 8.

Optionally, the determining the blood glucose level may comprise: transmitting, from a network device of the user device to a server in network communication with the user device, a blood glucose prediction request comprising the voice sample; receiving, at the network device from the server in response to the blood glucose prediction request, a blood glucose prediction response, the blood glucose prediction response comprising a blood glucose level; and wherein the server determines the blood glucose level based on the method of FIG. 8.

Optionally, the user device may be a smart speaker; the user input may be a voice query for the blood glucose level; the user prompt may be a voice prompt output; and the output device may be a speaker device. For example, a user may ask an Alexa device "Alexa, what is my blood glucose level", the Alexa device may verbally prompt the user to repeat a phrase.

Optionally, the user device may be a smart watch; the user input may be a voice query for the blood glucose level; the user prompt may be a voice prompt output; and the output device may be a speaker device or a display device. For example, a user may ask an Apple® iWatch® "Sid, what is my blood glucose level", and the iWatch® device may verbally or visually prompt the user to repeat a phrase.

Optionally, the blood glucose prediction request may further comprise a nutritional recommendation request; the blood glucose prediction response may further comprise a nutritional recommendation, the nutritional recommendation may comprise a recommended food for the user; and the outputting, at the output device of the user device, may further comprise outputting the nutritional recommendation. This may involve using a coarse blood glucose level, or diabetes status scoring, to recommend nutrients or to allow the user to evaluate the impact of eating certain foods.

Optionally, the blood glucose prediction request may further comprise a food check request, the food check request may comprise a food identifier; the blood glucose prediction response may further comprise a food check response, the food check response indicating whether the user is permitted to eat the food type; and the outputting, at the output device of the user device, may further comprise outputting the food check response. For example, a user may proactively identify on their user device the food they would like to eat, and then provide a voice sample, in order to see if they are permitted to eat the food. For example, a user with a high blood glucose level would not be permitted to eat an ice cream cone.

Optionally, if the food check response permits the user to eat the food type, transmitting, from a wireless device of the user device to a storage container, an unlock command. For example, a junk food container may be unlocked based on certain BG levels.

Figure 7B:
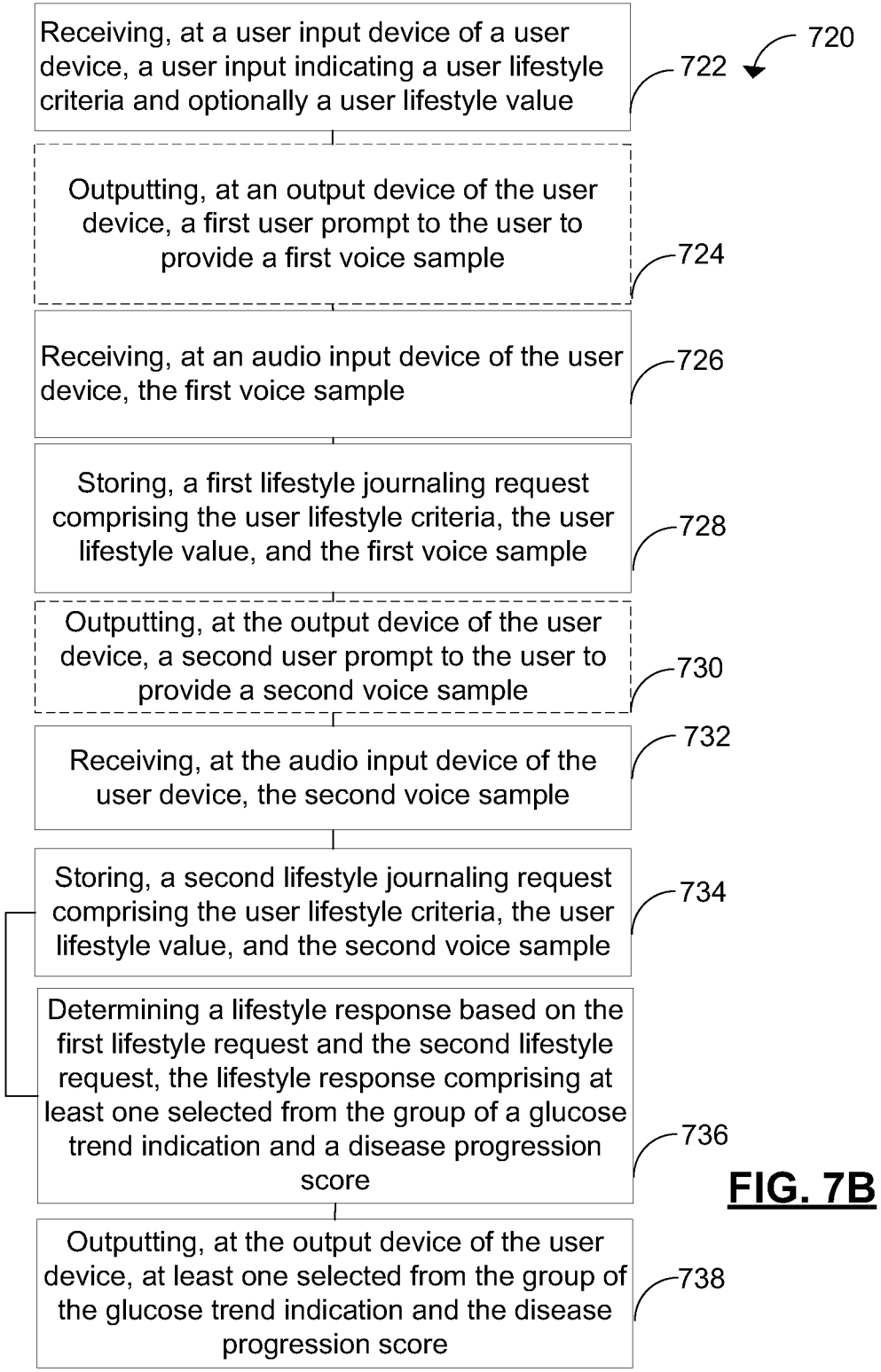
FIG. 7B shows a computer implemented method diagram for receiving a lifestyle change notification in accordance with one or more embodiments.

Referring next to FIG. 7B, there is shown a computer implemented method diagram 720 for receiving a lifestyle change notification.

At 722, receiving, at a user input device of a user device, a user input indicating a user lifestyle criteria and optionally a user lifestyle value.

At 724, optionally outputting, at an output device of the user device, a first user prompt to the user to provide a first voice sample.

At 726, receiving, at an audio input device of the user device, the first voice sample.

At 728, storing, a first lifestyle journaling request comprising the user lifestyle criteria, the user lifestyle value, and the first voice sample.

At 730, optionally outputting, at the output device of the user device, a second user prompt to the user to provide a second voice sample.

At 732, receiving, at the audio input device of the user device, the second voice sample.

At 734, storing, a second lifestyle journaling request comprising the user lifestyle criteria, the user lifestyle value, and the second voice sample.

At 736, determining a lifestyle response based on the first lifestyle request and the second lifestyle request, the lifestyle response comprising at least one selected from the group of a glucose trend indication and a disease progression score.

At 738, outputting, at the output device of the user device, at least one selected from the group of the glucose trend indication and the disease progression score.

The glucose trend indication may indicate a rising or falling BG level. The trend in blood glucose levels may indicate a trend of the user towards type-II diabetes, or another disease. For example, in one embodiment a blood glucose level from 140 to 199 mg/dL (7.8 to 11.0 mmol/L) in the subject is indicative of prediabetes. In another embodiment, a blood sugar level of 200 mg/dL (11.1 mmol/L) or higher in the subject is indicative of type 2 diabetes.

The lifestyle journaling requests may provide a user functionality to document changes in lifestyle, including changes in their diet, changes in their smoking or alcohol consumption, exercise regimen, medication regimen, etc. This may include identifying baseline values for lifestyle decisions at the beginning of a diet and/or exercise regimen. The journaling request may further include subsequently recorded journals from a user documenting their voice sample along with a status updates of their diet and/or exercise changes.

Optionally, the determining the lifestyle response may be based on a blood glucose level determined using the method of FIG. 8. The lifestyle response may include a metric identifying the relative success or trend based on the data associated with at least two lifestyle journaling requests. The metric may identify a percentage towards a goal, a letter grading the subject's performance, a gamified output, or another similar response value to quantify the success of the subject based on the determine BG levels, the relative change in BG levels, and a voice profile determined from one or more voice samples collected from the subject.

Optionally, the storing the first lifestyle journaling request may comprise transmitting, from a network device of the user device to a server in network communication with the user device, the first lifestyle journaling request; the storing the second lifestyle journaling request may comprise transmitting, from the network device of the user device to the server in network communication with the user device; the determining the lifestyle response may comprise receiving, at the network device from the server in response to the second lifestyle journaling request, the lifestyle response, the lifestyle response comprising at least one selected from the group of a glucose trend indication and a disease progression score; and the server determining the lifestyle response based on the method of FIG. 8.

Optionally, the outputting at the display device may comprise outputting a notification. The notification may be an email, SMS, application notification within a mobile operating system, a voice notification for a smart speaker or other intelligent home device, etc.

Optionally, the notification may be a change medication notification. For example, the change medication notification may prompt the user to visit their medical professional and/or to review their current medication regimen.

Figure 7C:
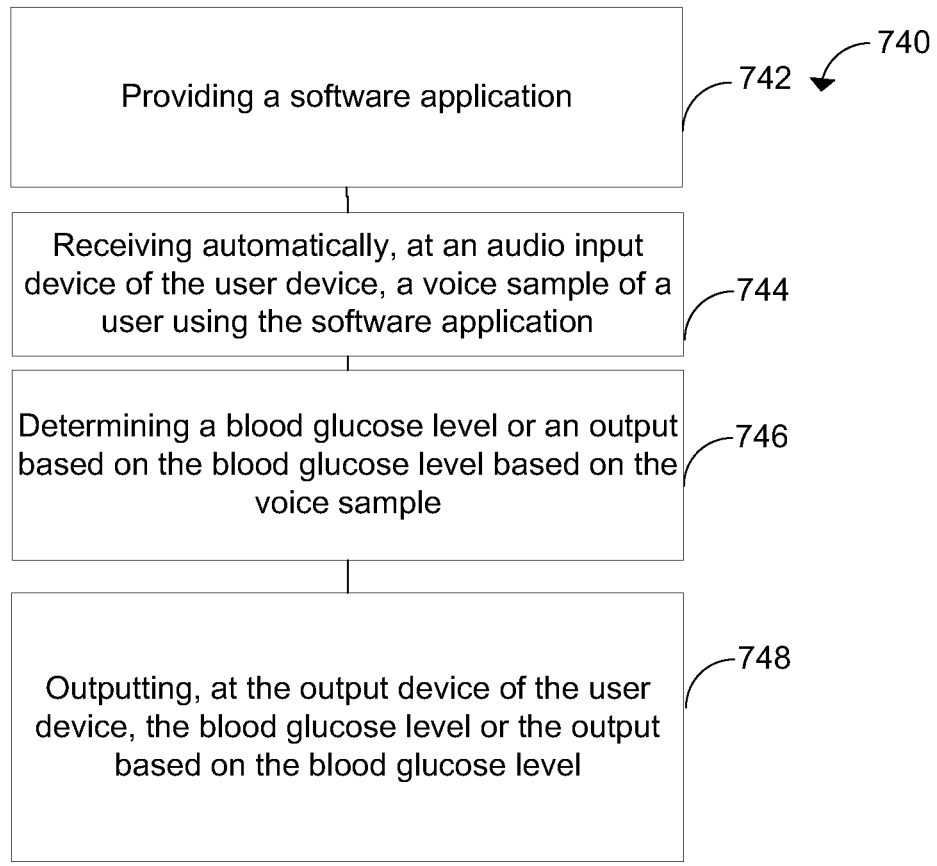
FIG. 7C shows a computer implemented method diagram for automated screening in accordance with one or more embodiments.

Referring next to FIG. 7C, there is shown a computer implemented method diagram 740 for automated screening. Voice samples may be provided during the normal operation of other software applications, including applications that record video and audio, such as videoconferencing software. The glucose prediction method described herein may be integrated with an existing software application in order to automatically determine BG levels of a subject or user of the application.

In this case, the method of FIG. 7C may be provided as a Software Development Kit (SDK) or a library that may be integrated with an existing software application in order to determine BG levels based on voice samples recorded using the application.

At 742, providing a software application. For example, a program 422 such as described in FIG. 4.

At 744, receiving automatically, at an audio input device of the user device, a voice sample of a user using the software application.

At 746, determining a blood glucose level or an output based on the blood glucose level based on the voice sample.

At 748, outputting, at the output device of the user device, the blood glucose level or the output based on the blood glucose level.

Optionally, the determining the blood glucose level may be determined using the method of FIG. 8.

Optionally, the determining the blood glucose level may further comprise: transmitting, from a network device of the user device to a server in network communication with the user device, a blood glucose prediction request comprising the voice sample; receiving, at the network device from the server in response to the blood glucose prediction request, a blood glucose prediction response, the blood glucose prediction response comprising a blood glucose level; and wherein the server may determine the blood glucose level based on the method of FIG. 8.

Optionally, the software application may be a teleconference software application.

Optionally, the teleconference software application may be one selected from the group of Cisco® Webex, Zoom®, Google® Meet, Facebook® Messenger, and Whatsapp®. In this case, the teleconference software application may provide BG level predictions to users who are speaking to one another on a teleconference.

Optionally, the software application may be an automated telephone system. In this case, the telephone system may provide BG level predictions based upon a user's voice samples over the telephone.

Optionally, the automated telephone system may be a PBX system.

Figure 7D:
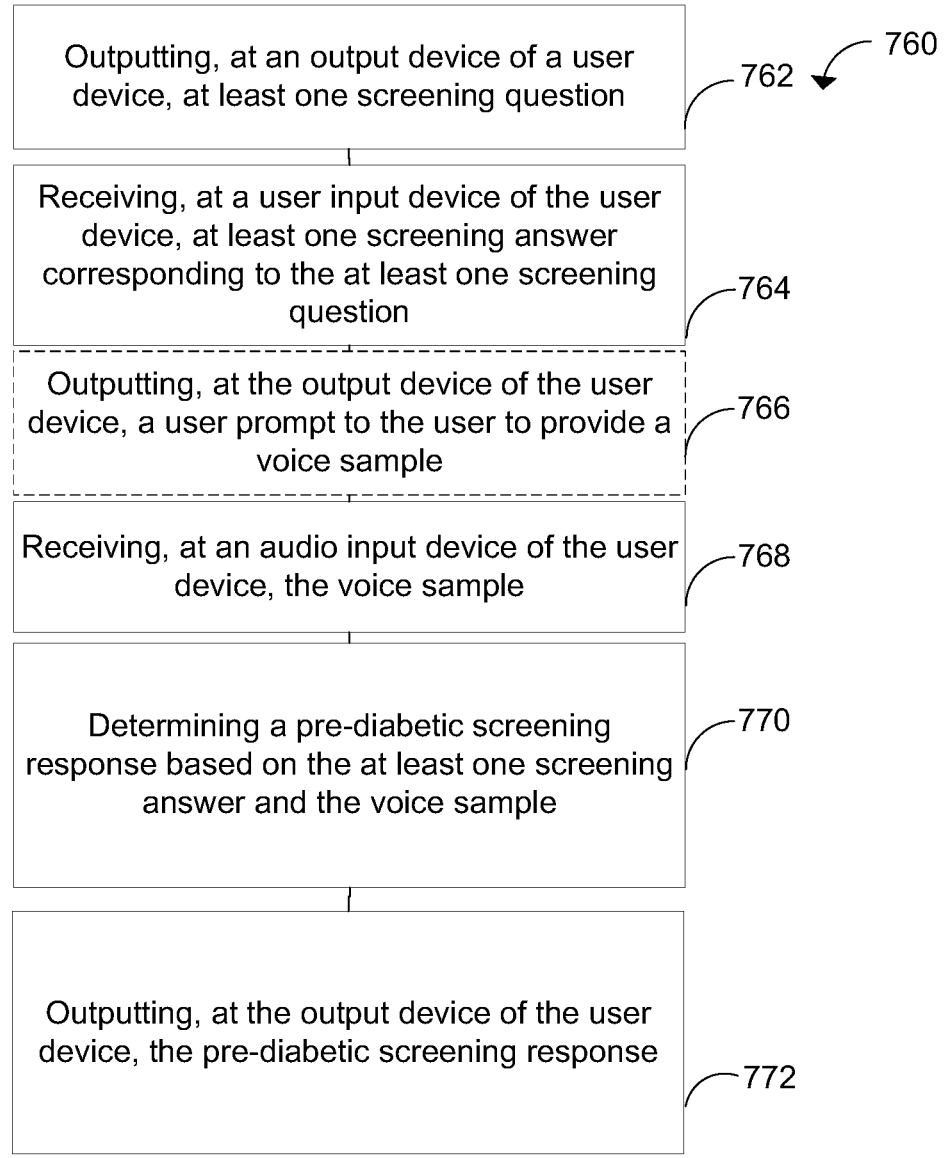
FIG. 7D shows a computer implemented method diagram for pre-diabetic screening in accordance with one or more embodiments.

Referring next to FIG. 7D, there is shown a computer implemented method diagram 760 for pre-diabetic screening.

At 762, outputting, at an output device of the user device, at least one screening question.

At 764, receiving, at a user input device of the user device, at least one screening answer corresponding to the at least one screening question.

At 766, optionally outputting, at the output device of the user device, a user prompt to the user to provide a voice sample.

At 768, receiving, at an audio input device of the user device, the voice sample.

At 770, determining a pre-diabetic screening response based on the at least one or more screening answers and the voice sample.

At 772, outputting, at the output device of the user device, the pre-diabetic risk profile.

Optionally, the pre-diabetic screening response may be based upon one or more blood glucose levels determined based on the method of FIG. 8.

Optionally, the determining the pre-diabetic screening response may further comprise: transmitting, from a network device of the user device to a server in network communication with the user device, a pre-diabetic screening request comprising the at least one screening answer and the voice sample; receiving, at the network device from the server in response to the pre-diabetic screening request, a pre-diabetic screening response; and wherein the server determines the pre-diabetic screening response using the method of FIG. 8.

Optionally, the pre-diabetic screening response may comprise a pre-diabetic risk profile.

Optionally, the method may further comprise outputting, at the output device of the user device, a user prompt to the user to provide the voice sample and responsive to the user prompt, and receiving, at the audio input device of the user device, the voice sample.

Optionally, the at least one screening answers may comprise information on at least one of height, weight, BMI, diabetes status, blood pressure, family history, age, race or ethnicity and physical activity.

Figure 7E:
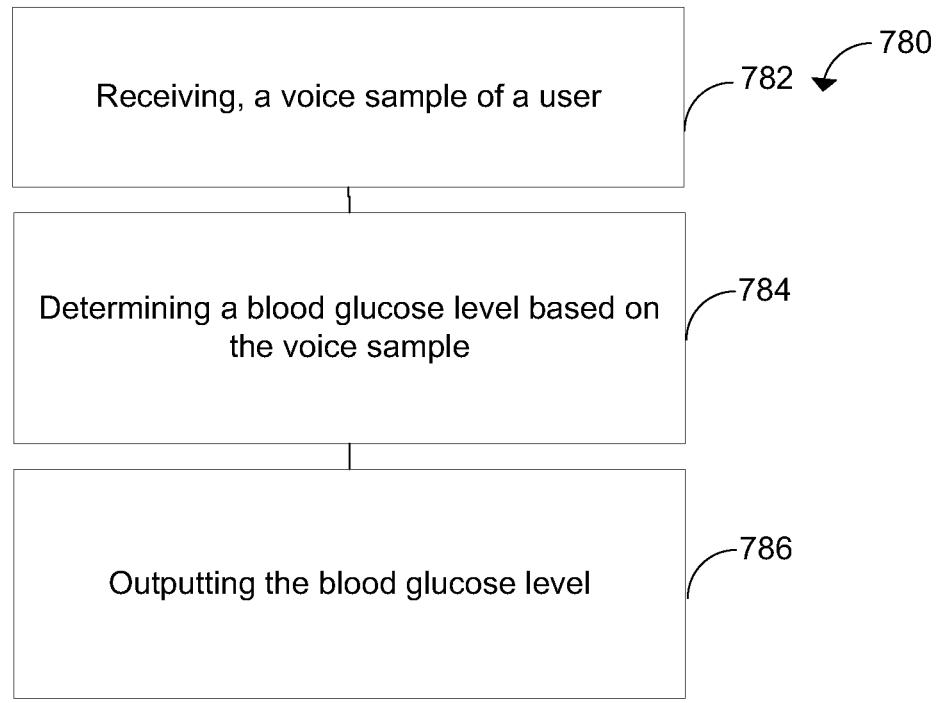
FIG. 7E shows a computer implemented method diagram for passive glucose monitoring in accordance with one or more embodiments.

Referring next to FIG. 7E, there is shown a computer implemented method diagram 780 for passive glucose monitoring.

At 782, receiving, a voice sample of a subject or user.

At 784, determining a blood glucose level or an output based on the blood glucose level based on the voice sample.

At 786, outputting the blood glucose level or an output based on the blood glucose level.

Optionally, the blood glucose level may be determined using the method of 7A, 7C, 7E or FIG. 8.

Optionally, the determining the blood glucose level may further comprise: transmitting from the network device of the user device to a server in network communication with the user device, a blood glucose prediction request comprising the voice sample; receiving at the network device from the server in response to the blood glucose prediction request, a blood glucose prediction response, the blood glucose prediction response comprising a blood glucose level; and wherein the server may determine the blood glucose level based on the method of FIG. 8.

Optionally, the voice sample may be received from one or more sensor devices proximate to the user in network communication with the user device (see e.g. 120 in FIG. 1).

Optionally, the outputting the blood glucose level may comprise outputting a blood glucose level notification based on the blood glucose level at an output device of the user device.

Optionally, the method may further include: receiving, at the network device of the user device from a network device of a companion device, a pairing request comprising a pairing identifier; and responsive to the pairing request, transmitting, from the network device of the user device to the network device of the companion device, a pairing response based on the pairing request; and receiving, at the network device of the companion device, the blood glucose level; and outputting, at an output device of the companion device, a blood glucose level notification based on the blood glucose level.

Optionally, the method may further include: transmitting, from the sensor device in wireless communication with the network device of the user device, a blood glucose level notification based on the blood glucose level; wherein the outputting the blood glucose level comprises outputting a blood glucose level notification at an output device of the sensor device in wireless communication.

Optionally, the blood glucose level notification may further comprise a medication reminder notification.

Optionally, the blood glucose level notification may further comprise a safety alarm.

Figure 7F:
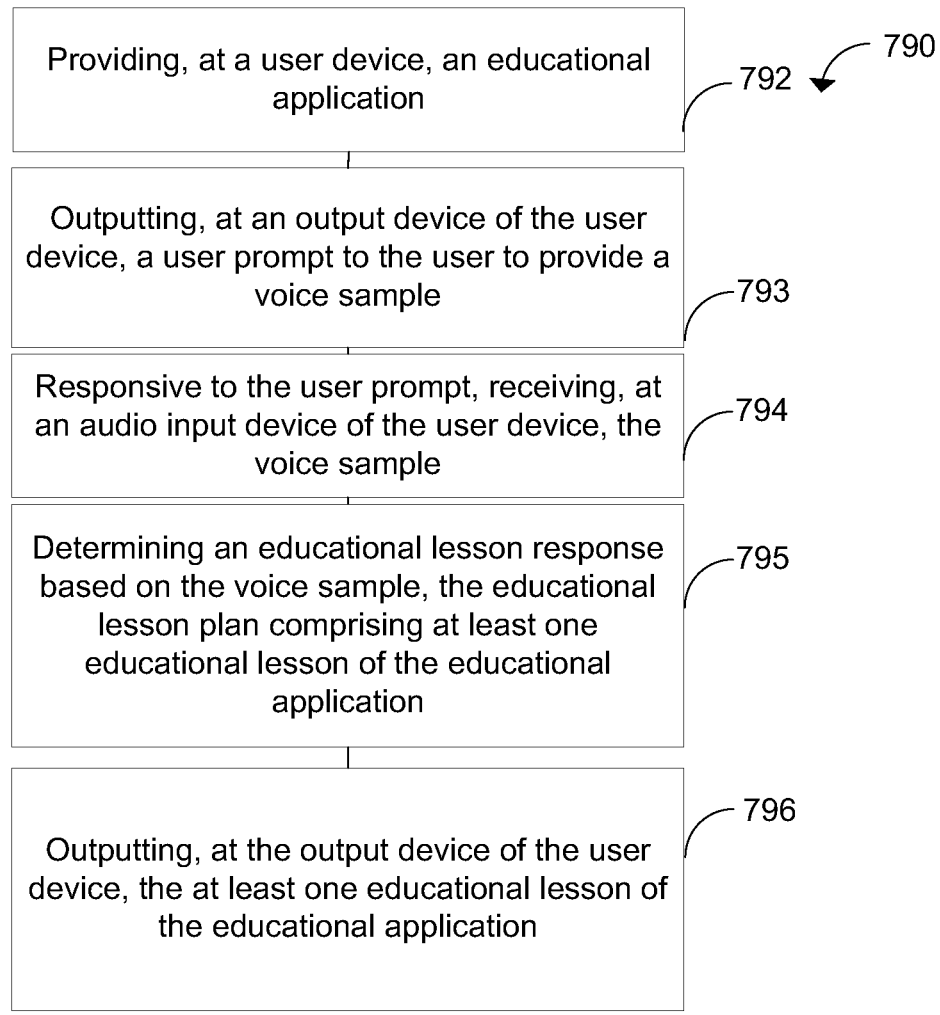
FIG. 7F shows a computer implemented method diagram for a glucose educational application in accordance with one or more embodiments.

Referring next to FIG. 7F, there is shown a computer implemented method diagram 790 for a glucose educational application.

At 792, providing, at a user device, an educational application.

At 793, outputting, at an output device of the user device, a user prompt to the user to provide a voice sample optionally from a subject different from the user.

At 794, responsive to the user prompt, receiving, at an audio input device of the user device, the voice sample.

At 795, determining an educational lesson response based on the voice sample, the educational lesson plan comprising at least one educational lesson of the educational application.

At 796, outputting, at the output device of the user device, the at least one educational lesson of the educational application.

Optionally, the determining the educational lesson response may be based on a blood glucose level determined using the method of FIG. 8.

Optionally, the determining the educational lesson response may further comprise: transmitting, from a network device of the user device to a server in network communication with the user device, a first educational lesson request comprising the voice sample; receiving, at the network device from the server in response to the educational lesson request, the educational lesson response, the educational response comprising at least one educational lesson of the educational application; and wherein the educational response is based on a glucose level determined by the server using the method of FIG. 8.

FIG. 8 shows a computer-implemented method diagram 800 showing a blood glucose level prediction method in accordance with one or more embodiments.

At 802, providing, at a memory, a blood glucose level prediction model. The blood glucose prediction method may be performed by a user device, having received the blood glucose level prediction model from a server, or alternatively at a server.

At 804, receiving, at a processor in communication with the memory, a voice sample from the subject. The voice sample may be received at the user device from an audio input such as a microphone. At the server, the voice sample may be received from the user device as a voice sample file over the network.

At 806, extracting, at the processor, at least one voice biomarker feature value from the voice sample for at least one predetermined voice biomarker feature.

At 808, determining, at the processor, the blood glucose level or an output based on the blood glucose level for the subject based on the at least one voice biomarker feature value and the blood glucose level prediction model.

At 810, outputting, at an output device, the blood glucose level for the subject or the output based on the blood glucose level. The output device may be an audio output device, a display device, etc.

In one or more embodiments, the blood glucose level for the subject may be a quantitative level, optionally a quantitative level expressed as mg/dL or mmol/L.

In one or more embodiments, the blood glucose level for the subject may be a category, optionally hypoglycemic, normal or hyperglycemic.

In one or more embodiments, the predetermined voice biomarker feature is described or listed in Table 3, or Table 4.

In one or more embodiments, the predetermined voice biomarker feature is listed or described in Table 6, Table 7, Table 8, or Table 9, FIG. 32, FIG. 33, FIG. 34, or FIG. 35. In one or more embodiments, the predetermined voice biomarker features comprise or consist of the voice biomarker features described in one of Table 3, Table 4, Table 6, Table 7, Table 8, or Table 9, FIG. 32, FIG. 33, FIG. 34, or FIG. 35. In one embodiment, the predetermined voice biomarker features comprise or consist of the Tier 1, Tier 2 or Tier 3 biomarkers identified herein.

In one or more embodiments, the method may comprise: extracting, at the processor, at least 5, 10, 25, 50, 75 or 100 voice biomarker feature values from the voice sample for at least 5, 10, 25, 50, 75 or 100 predetermined voice biomarker features described or listed in Table 3; and determining, at the processor, the blood glucose level for the subject based on the at least 5, 10, 25, 50, 75 or 100 voice biomarker feature values and the blood glucose level prediction model.

In one or more embodiments, the method may comprise: extracting, at the processor, at least 5, 10, 25, 50, 75 or 100 voice biomarker feature values from the voice sample for at least 5, 10, 25, 50, 75 or 100 predetermined voice biomarker features listed in Table 6, Table 7, Table 8 or Table 9; and determining, at the processor, the blood glucose level for the subject based on the at least 5, 10, 25, 50, 75 or 100 voice biomarker feature values and the blood glucose level prediction model. In one embodiment, the method comprises extracting, at the processor, fewer than 500, 250, 200, 100 or 50 voice biomarker feature values from the voice sample; and determining, at the processor, the blood glucose level for the subject based on the fewer than 500, 250, 200, 100 or 50 voice biomarker feature values and the blood glucose level prediction model.

In one or more embodiments, the model may comprise one or more coefficients (or weights) that may be used to perform a prediction of a BG level for a candidate voice sample. The candidate voice sample may first have voice feature values determined (for a set of features as described herein) and then a corresponding coefficient may be used for a corresponding candidate voice feature value to determine a voice feature output. The set of voice feature outputs may be combined together to determine a BG level prediction. The combination of voice feature outputs may depend on the type of machine learning model used. For example, with a random forest classifier, a majority voting method, or averaging the voice feature outputs.

In one or more embodiments, the method may comprise: extracting, at the processor, voice biomarker feature values from the voice sample for the predetermined voice biomarker features described or listed in Table 4; determining, at the processor, the blood glucose level for the subject based on the voice biomarker feature values and the blood glucose level prediction model.

In one or more embodiments, the method may comprise: extracting, at the processor, voice biomarker feature values from the voice sample for the predetermined voice biomarker features listed in Table 7, Table 8, or Table 9, FIG. 32, FIG. 33, FIG. 34, or FIG. 35; determining, at the processor, the blood glucose level for the subject based on the voice biomarker feature values and the blood glucose level prediction model.

In one or more embodiments, the blood glucose level prediction model may comprise a statistical classifier and/or a statistical regressor.

A statistical regressor may use regression modeling (statistical regression) to generate a function that outputs a continuous output variable (e.g. continuous blood glucose level) from input variables (e.g. continuous feature value). The regressor may be a linear regression model, or another regression model as known.

The statistical regressor may estimate the relationship between input and output variables and determines one or more coefficients that may fit a trend line to data points (output variables). Trend lines may be straight or curved depending on input and output variables.

In one or more embodiments, the statistical classifier may comprise at least one selected from the group of a perceptron, a naive Bayes classifier, a decision tree, logistic regression, K-Nearest Neighbor, an artificial neural network, machine learning, deep learning and support vector machine.

In one or more embodiments, the blood glucose level prediction model may comprise a random forest classifier.

In one or more embodiments, the blood glucose level prediction model may comprise an ensemble model, the ensemble model comprising n random forest classifiers; and wherein the determining, at the processor, the blood glucose level may comprise: determining a prediction from each of the n random forest classifiers in the ensemble model; and determining the blood glucose level based on an election of the predictions from the n random forest classifiers in the ensemble model.

In one or more embodiments, the method may further comprise preprocessing, at the processor, the voice sample by at least one selected from the group of: performing a normalization of the voice sample; performing dynamic compression of the voice sample; and performing voice activity detection (VAD) of the voice sample.

In one or more embodiments, the method may further comprise: transmitting, to a mobile device in network communication with the processor, the blood glucose level for the subject or an output based on the blood glucose level, wherein the outputting of the blood glucose level or output for the subject occurs at the mobile device.

In one or more embodiments, the method may further comprise determining the blood glucose level for the subject based on at least one clinicopathological value for the subject, optionally at least one of height, weight, BMI, disease comorbidity e.g. diabetes status and blood pressure.

In one or more embodiments, the voice sample may comprise a predetermined phrase vocalized by the subject, optionally wherein the predetermined phrase comprises the date or time.

In one or more embodiments, the predetermined phrase may be displayed to the subject on a mobile device.

In one or more embodiments, the voice sample may be obtained from the subject in the afternoon.

In one or more embodiments, the method may be for monitoring blood glucose levels in a healthy subject or a subject with glycemic dysfunction, optionally prediabetes or diabetes.

In one or more embodiments, the subject is a healthy subject who does not have Type I or Type II diabetes or has not have been diagnosed with Type I or Type II diabetes.

Figure 9:
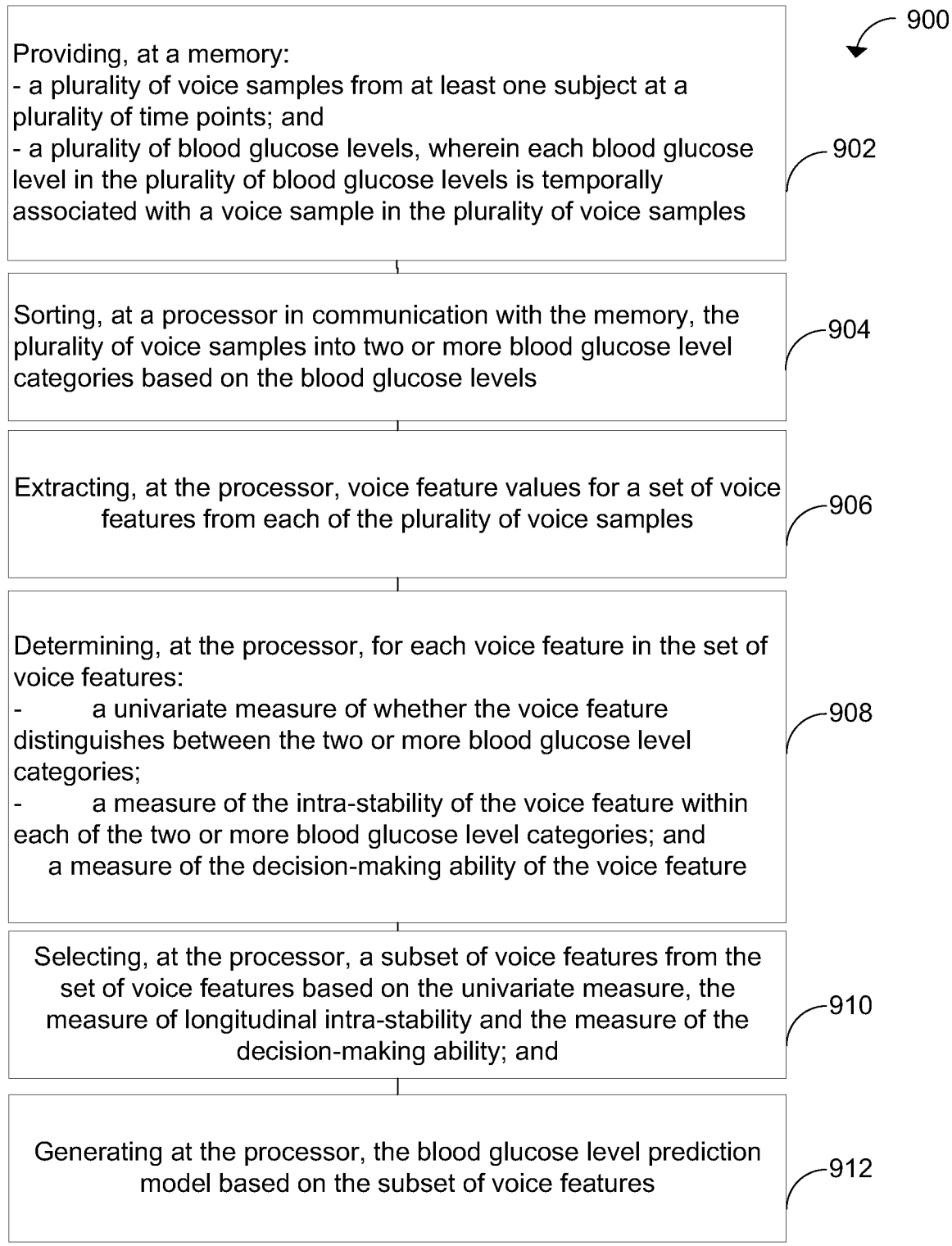
FIG. 9 shows a method diagram in accordance with one or more embodiments.

FIG. 9 shows a model training method diagram 900 in accordance with one or more embodiments.

At 902, providing, at a memory: a plurality of voice samples from at least one subject at a plurality of time points; and a plurality of blood glucose levels, wherein each blood glucose level in the plurality of blood glucose levels is temporally associated with a voice sample in the plurality of voice samples.

At 904, sorting, at a processor in communication with the memory, the plurality of voice samples into two or more blood glucose level categories based on the blood glucose levels.

At 906, extracting, at the processor, voice feature values for a set of voice features from each of the plurality of voice samples. For example, voice feature values may be extracted for a set of voice features using computer software known in the art such as, but not limited to openSmile (Eyben et al., 2015) or another audio analysis library or package. Exemplary voice features useful with the embodiments described herein are described or listed and/or described in Table 3, Table 4, Table 6, Table 7, Table 8, or Table 9, FIG. 32, FIG. 33, FIG. 34, or FIG. 35.

At 908, determining, at the processor, for each voice feature in the set of voice features: a univariate measure of whether the voice feature distinguishes between the two or more blood glucose level categories; a measure of the intra-stability of the voice feature within each of the two or more blood glucose level categories; and a measure of the decision-making ability of the voice feature.

A feature may be distinguished where the univariate measure (FDR) is greater than 0.05. A feature may be distinguished where the measure of intra-stability (ICC) is greater than 0.75. A feature may be distinguished where the measure of decision-making ability ($Gini_c$) is greater than 0.5.

At 910, selecting, at the processor, a subset of voice features from the set of voice features based on the univariate measure, the measure of intra-stability and the measure of the decision-making ability.

At 912, generating at the processor, the blood glucose level prediction model based on the subset of voice features.

Univariate analysis may provide information to estimate the power of voice-features to discriminate abnormal BG groups. From the longitudinal analysis, intra-stabilities may be generalized for voice features and may be used to identify biomarkers that present consistent signals to for BG classification.

The Gini impurity score may measure the probability of each voice feature to decide a correct BG group using a decision tree model, and prioritized features.

These three biomarker selection strategies may be integrated in order to enhance accuracy and reliability of a predictive BG model.

In one or more embodiments, the False Discovery Rate (FDR) may be determined using ANOVA with Benjamini-Hockberg adjusted p-value(s).

In one or more embodiments, the measure of intra-stability may be determined by calculating a coefficient of variation.

In one or more embodiments, the measure of the decision-making ability comprises a calculated mean decrease in accuracy.

The blood glucose prediction model may be generated using methods of data analysis such as statistical regression and/or statistical classification.

In one or more embodiments, the plurality of voice feature values determined for each of the plurality of voice samples may be coefficients determined based upon an audio signal analysis algorithm, optionally for voice features described in Table 3, Table 4, Table 6, Table 7, Table 8, Table 9, FIG. 32, FIG. 33, FIG. 34, or FIG. 35.

In one embodiment, regression analysis may be used based on the plurality of voice samples in order to determine one or more coefficients for a regression model. The regression analysis may be a linear regression analysis. The model may be determined using a least-squares regression.

In one embodiment, the statistical classifier may be determined by training a model. This may include generating the blood glucose level prediction model by determining a weight for each voice feature in the subset of voice features. In one embodiment where the model is a random forest classifier, at least one decision tree may be determined based on the feature values for the plurality of voice samples. Each node in the decision tree may have a question (based on a value of a feature), a Gini impurity of the node, a number of observations in the node, a value representing the number of samples in each class, and a majority classification for points in the node. The model training of the random forest model may proceed as known.

In one or more embodiments, ensembled methods may be used in order to generate a statistical classifier or statistical regressor.

In one or more embodiments, the method may comprise at least one selected from the group of: determining the univariate measure by calculating a False Discovery Rate (FDR); determining the measure of intra-stability by calculating an intraclass correlation coefficient (ICC); and determining the measure of the decision-making ability comprising calculating a Gini impurity score, optionally a Gini impurity score corrected for multiple comparisons ($Gini_c$).

In one or more embodiments, a determined coefficient of variation may be used in order to measure intra-stability.

In one or more embodiments, the method may further comprise: selecting, at the processor, a subset of voice features from the set of voice features based on at least one selected from the group of a FDR with a p-value less than 0.01; an ICC greater than 0.5 or greater than 0.75; and a Ginic greater than 0.5.

In one or more embodiments, the voice features may be selected from the group of a Mel-Frequency Cepstral Coefficient (MFCC) feature, a logarithmic harmonic-to-noise ratio (logHNR) feature, a smoothed fundamental frequency contour (F0Final) feature, an envelope of smoothed F0Final (F0FinalEnv) feature, a difference of period lengths (JitterLocal) feature, a difference of JitterLocal (JitterDDP) feature, a voicing probability of the final fundamental frequency candidate with unclipped voicing threshold (VoicingFinalUnclipped) feature, an amplitude variations (ShimmerLocal) feature, an auditory spectrum coefficient (AudSpec) feature, a relative spectral transform of AudSpec (AudSpecRasta) feature, a logarithmic power of Mel-frequency bands (logMelFreqBand) feature, a line spectral pair frequency (LspFreq) value, and a Pulse-Code Modulation (PCM) feature.

In one or more embodiments, the voice features may comprise at least one selected from the group of a (MFCC) feature, a PCM feature and an AudSpec feature.

In one or more embodiments, the voice features may comprise at least one voice feature described or listed in Table 3, Table 4, Table 6, or Table 7, Table 8, or Table 9, FIG. 32, FIG. 33, FIG. 34, or FIG. 35. In one or more embodiments, the voice features comprise or consist of the voice features identified as Tier 1 biomarkers. In one or more embodiments, the voice features comprise or consist of the voice features identified as Tier 2 biomarkers. In or more embodiments, the voice features comprise or consist of the voice features identified as Tier 3 biomarkers. In one or more embodiments, the voice features comprise or consist of the voice features listed in one of Table 3, Table 4, Table 6, Table 7, Table 8, Table 9, FIG. 32, FIG. 33, FIG. 34, or FIG. 35.

In one or more embodiments, the method may further comprise preprocessing, at the processor, the voice samples by at least one selected from the group of: performing a normalization of the voice samples; performing dynamic compression of the voice samples; and performing voice activity detection (VAD) of the voice samples.

In one or more embodiments, the method may further comprise: generating, at the processor, the blood glucose level prediction model based on the voice feature values for the subset of voice features, wherein each voice feature value is associated with a blood glucose level or category, and optionally at least one clinicopathological value for the at least one subject.

In one embodiment, the categories are representative of a plurality of levels or defined ranges of blood glucose levels, for example a level or range of glucose levels in mg/dL or mmol/L. In one embodiment, methods, systems and devices described herein involve the use of 3, 4, 5, 6, 7, 8, 9, or 10 or more categories.

In one or more embodiments, the voice sample may comprise a predetermined phrase vocalized by the at least one subject, optionally wherein the predetermined phrase comprises the date or time.

In one or more embodiments, the blood glucose level prediction model may be a statistical classifier and/or a statistical regressor.

The present invention has been described here by way of example only. Various modification and variations may be made to these exemplary embodiments without departing from the spirit and scope of the invention, which is limited only by the appended claims.

EXAMPLES

Example 1: Biomarker Potential of Real-World Voice Signals to Predict Abnormal Blood Glucose Levels A study was performed to investigate whether blood glucose levels were manifested in the voice of healthy individuals as well as methods for identifying voice biomarkers and associated models for generating predictive models. Blood glucose levels of individual participants were measured in an uncontrolled setting as they went about their daily lives, and participants recorded their own voices using a typical smartphone at several times throughout the day. Clinicopathological information was collected and the voice samples were analyzed to identify biomarkers and validate a predictive model to classify high, normal, and low blood glucose levels in healthy individuals.

Methods

Study Design and Participants 54 volunteers (aged≥18 years) were recruited from Klick Inc., a technology, media, and research company in the healthcare sector based in Toronto, Canada. They were all employees of Klick Inc. and volunteered via the company's intranet system. The study was performed in accordance with relevant guidelines and regulations, and informed consent was obtained from all participants prior to study entry. The study received full ethics approval from Advarra IRB Services (www.advarra.com/services/irb-services), an independent ethics committee. Participants' blood glucose levels were measured using a FreeStyle® Libre glucose monitoring device (Abbott Diabetes Care), and voice samples of simple spoken sentences (e.g., "Hello, how are you? Today is Sep. 5, 2019, 04:06 pm") were recorded using participants' smartphones. After the 14 days of collection of blood glucose levels and voice samples, data from seven participants were eliminated because of a malfunctioning glucose monitoring device (e.g., erroneous or missing measurements), and from one participant who failed to record a proper voice sample. In total, 44 participants, and their 1,454 voice recordings with matched blood glucose levels were selected and used for further analyses. From each voice recording, 12,072 voice-features were extracted using OpenSmile software (v.2.3.0), an open-source audio feature extractor (Eyben et al., 2015). The profiles of 17,552,688 voice signals (1,454 recording×12,072 voice-features) were finally generated. Profiles were divided into two groups, Group A and Group B. Group A (1,290 voice recordings from 39 participants) was used to extract features, measure intra-stability, identify voice biomarkers, and train a predictive model. Group B (164 voice recordings from 5 participants) was used as an independent test set to evaluate a predictive model.

Study Population

For the study, individuals who were below the age of 18 or those who were pregnant, or breastfeeding were excluded from the initial recruitment process. From the 54 volunteers, two participants were further excluded who were diagnosed with mental or physiological medical conditions and took prescription medication that could interfere with normal blood glucose regulation. The remaining 52 participants completed a self-report demographic survey, and had physiological variables measured, including height, weight, body mass index (BMI), systolic blood pressure, and diastolic blood pressure.

Measuring Blood Glucose Levels

To measure blood glucose levels, the FreeStyle® Libre glucose monitoring device (Abbott Diabetes Care; https://myfreestyle.ca/en/products/libre) was used to measure blood glucose levels (in mmol/L) at 15-minute intervals with a minimally invasive 5 mm flexible filament inserted into the posterior upper arm. The device provided consistent accuracy and reliability throughout the 14 days regardless of age, sex, body weight, BMI, or time of use (day versus night) (Floss et al., 2013; Bailey et al., 2015). Measured blood glucose (BG) levels were divided into three BG groups based on general blood glucose level for non-diabetic individuals (Alvi et al., 2019). High BG indicated elevated BG levels (BG level>7.1 mmol/L), and low BG indicated reduced BG levels (BG level<3.9 mmol/L) compared to the normal range of BG levels (normal BG, 3.9 mmol/L≤BG level≤7.1 mmol/L).

Collecting and Pre-Processing Voice Samples

A custom mobile software application was built by Klick Inc. to record voice samples using participants' smartphones (iOS and Android compatible). The downloaded app required users to input a unique participant identification code provided to them at study initiation, and then allowed them to make voice recordings using their own smartphone. All recordings were timestamped and immediately uploaded to a secure cloud storage system, accessible only to researchers. Throughout the entire study period (14 continuous days), participants were asked to record their voice via their smartphone at least 5 random times (of their choice) throughout the day, with the following phrase: "Hello, how are you? Today is [current day's month, day, year, and time]". During recordings, the mobile app displayed the specific reading instructions for the exact sentence to speak (e.g., Read: "Hello, how are you? Today is Sep. 5, 2019, 04:06 pm"). The app would immediately update the new reading instruction based on the relevant date and time.

Next, to maintain high quality recordings, voices that were recorded with partial sentences, unknown words, excessive background noise, and multiple voices (e.g., others speaking in the background) were excluded (363 recordings). To increase the volume of digital audio and have appropriate sample amplitude range, all voice recordings were normalized. Then, dynamic compression was performed to get audibility for low-level passages without reaching uncomfortable loudness levels for high-level signals (Kirchberger et al., 2016). Voice recordings were re-normalized after dynamic compression. Next, only active human voices were extracted using voice activity detection (VAD) techniques. These audio preprocessing were performed using python package webrtcvad (v.2.0.10) and SoX software (v. 14.4.2). After the pre-processing, 1,454 voice recordings from 44 participants were mapped to corresponding blood glucose levels, which were the nearest measurement from a given voice recording (within ±15 minutes) and used for analyses.

Voice-Feature Extraction and Profiling

To extract and profile voice-features, OpenSmile software was employed (v.2.3.0), an open-source audio feature extractor (Eyben et al., 2015, hereby incorporated by reference in its entirety). It united feature extraction algorithms that represented 13 different aspects (classes) of voice signal and phonatory function: (1) Mel-frequency cepstral coefficient (MFCC), (2) logarithmic harmonic-to-noise ratio (logHNR), (3) smoothed fundamental frequency contour (F0Final), (4) envelope of smoothed F0Final (F0FinalEnv), (5) difference of period lengths (JitterLocal), (6) difference of JitterLocal (JitterDDP), (7) voicing probability of the final fundamental frequency candidate with unclipped voicing threshold (VoicingFianlUnclipped), (8) amplitude variations (ShimmerLocal), (9) sum of the auditory spectrum coefficients (AudSpec), (10) relative spectral transform of AudSpec (AudSpecRasta), (11) logarithmic power of Mel-frequency bands (logMelFreqBand), and (12) line spectral pair frequency (LspFreq), and (13) pulse-code modulation (PCM) that extract spectral features such as spectral energy, roll-off, flux, centroid, entropy, variance, skewness, kurtosis, sharpness, and loudness. Four pre-defined feature sets that OpenSmile provided were used to extract voice-features. They were composed of features that were used for Interspeech 2010 paralinguistic Challenge (IC10), Interspeech 2011 speaker state Challenge (IC11), Interspeech 2012 speaker trait Challenge (IC12), and Interspeech 2013 ComParE Challenge (IC13). In total, 12,072 voice-features were extracted after the removal of identical feature values. All feature values were re-scaled to have values ranging from 0 to 1:

$$\text{Re-scaled feature value} = \frac{(V_{ij} - \text{Min}_i)}{(\text{Max}_i - \text{Min}_i)},$$

where $V_{ij}$ indicated a value of feature i in sample j. $\text{Min}_i$ and $\text{Max}_i$ represented the minimum and maximum value of feature i in all samples, respectively.

Measuring the Association Between Voice Signals and Blood Glucose Groups

To incorporate voice signals from multiple time points in a profile, a dropout score was introduced. Dropout score assigned a value of each voice-feature by calculating the difference between feature value at each BG group and the value at the high BG group.

$$\text{Dropout score} = \frac{1}{2} \times ((N_i - H_i) + (L_i - H_i)),$$

where Hi, Ni and Li are average values of feature i in high, normal and low BG groups, respectively. Positive dropout score indicated feature values were increased as the BG level decreased ($H_i < N_i < L_i$). Negative dropout score indicated feature values were increased as the BG level increased ($H_i > N_i > L_i$).

Biomarker Characterization

The selection of reliable voice biomarkers reduces the dimensionality of the feature space, avoids overfitting, and achieves better generalizability. Voice biomarkers were defined using three criteria. First, voice biomarkers were selected that showed significantly different values between BG groups. One-way analysis of variance (ANOVA) was used to examine statistical differences, and Benjamini-Hochberg-adjusted P-values were used to account for multiple-comparisons testing. Biomarkers showing p-values<0.01 were selected. Second, voice biomarkers showed intra-stability within a BG group and participants within a BG group. Voice-features showing ICC>0.75 were defined as biomarkers. ICC cutoffs 0.5 and 0.75 indicated good and moderate reliability, respectively (Koo and Li, 2016). Lastly, voice biomarkers should have sufficient ability to make distinct predictions in decision trees. To evaluate the decision-ability of voice-features, Gini impurity scores were measured using the RandomForestClassifier function built in the sklearn package (v.0.23.2) in Python. Gini impurity scores were corrected through 1,000 repeated random stratified subsampling to generalize feature relevance. For each iteration, Gini impurity scores were measured from the randomly selected 29 participants in Group A, and scores were normalized to have a same range of values (normalized Gini impurity score, $\text{Gini}_n$):

$$\text{Gini}_{ni} = \frac{\text{Gini impurity}_i}{\sigma}$$

where, Gini impurity$_i$ indicates Gini impurity score of voice-feature i, µ and σ indicate mean and standard deviation of Gini impurity scores. Each voice-feature has 1,000 $\text{Gini}_n$, and finally corrected Gini impurity scores ($\text{Gini}_c$): were measured $$\text{Gini}_c = 1 - \frac{n}{1000}$$

where n indicated the number of $\text{Gini}_n$ whose absolute value≥1.96. Biomarkers are defined when they have $\text{Gini}_c$>0.5. In total, 196 voice-features were defined as voice biomarkers and fed into a predictive model to identify distinct BG groups.

Intra- and Inter Variance Quantification and Generalized Intra-Stability Estimation of Voice-Features The relative effects of intra- and inter-variance derived from participants as well as high, normal, and low blood glucose (BG) groups were assessed via linear mixed-effects modelling using the lme4 package (v1.1-21) in R statistical environment. In the model, BG groups and participants were specified as random factors to control for their associated intra-class correlation, $$Y_{ij} = \alpha_0 + (b_i/c_j) + e_{ij},$$

where $Y_{ij}$ represents values of BG group i in participant j, $\alpha_0$ is a constant, $b_i$ and $c_j$ are the random effects for BG group i and participant j, respectively. Intercept varies among BG groups and participants within a BG group (expressed as $b_i/c_j$). $e_{ij}$ is an unknown vector of random errors. To estimate generalized intra-stability, we calculated the intraclass correlation coefficient (ICC):

$$ICC = \frac{\sigma_R^2}{\sigma_R^2 + \sigma_e^2},$$

Where R represents random effects, b/c. The ICC represented the proportion of inter-b/c variance relative to total intra- and inter-b/c variance explained by a model. A high ICC indicates high generalized intra-stability within a BG group and participants within a BG group. ICCs of voice-features were estimated using Group A participants.

Predictive Model Generation

To generate a predictive model that distinguishes abnormal high and low BG groups from a normal BG group, 196 voice biomarkers were identified, and fed into a multi-class random forest (RF) classifier. The training set (Group A) and the RandomForestClassifier function built in the sklearn package (v.0.23.2) was used to train a model. To find optimal RF parameters (n_estimator, max_depth, max_features, and class_weight), grid search with 5-fold cross-validation was conducted. Five-fold cross-validation set was generated using a stratified group K-fold method so that each fold has the same ratio of high, normal and low BG groups. Optimal parameters were determined based on the rank product of balanced accuracy (BCC), overall accuracy (ACC) and Matthews correlation coefficient (MCC). Prediction performances (BCC, ACC, and MCC) were measured using the pycm package (v.2.8) and sklearn package (v.0.23.2). Final model was trained on an entire training set with optimal parameters. To achieve the generalizability of a predictive model, we repeated this procedure five times. In each repeat, a cross-validation set was composed of different participant samples but kept the same BG group ratio. Finally, the ensemble model was built by combining all the results from five RF classifiers. The ensemble model was applied to an independent test set (Group B). Multi-class ROC was measured using the multiROC library (v.1.1.1) in R.

Interpretation of the Predictive Model

To understand how each voice biomarker contributed to the prediction of a test set, Local Interpretable Model-agnostic Explanations (LIME) analysis was performed (Ribiero et al., 2016). Lime provides three types of weights per voice biomarker. Each weight represented the contribution to predict high, normal and low BG groups in a given sample. To evaluate the importance of voice biomarkers in a high BG group, only high BG weights were compiled from voice samples predicted as a high BG group, and ranked voice biomarkers based on their average weight. Importance for normal and low BG groups also followed the same procedure. LIME package (v.0.1) in Python was used for analyses.

Statistical Analysis

Linear-mixed effect modelling and multi-class AUC estimation were performed using the programming language R (v3.4.0), and any remaining analyses were carried out in the programming language Python (v3.7.6) with the aforementioned packages. To examine the association of clinicopathological variables with blood glucose levels, p-values were measured using the Mann-Whitney U test for binary variables (sex and group), one-way ANOVA for multiple categorical variables (ethnicity), Spearman's rank correlation coefficient for continuous variables (BMI, weight, height, diastolic blood pressure, and systolic blood pressure), and Kendall's tau for ordinal variable (age group). A p-value of less than 0.05 was considered statistically significant. To evaluate the enriched audio-classes of voice-biomarkers, a hypergeometric test was performed. For the visualization of analyses, BPG library (v6.0.1) in R was used (P'ng et al., 2019).

Results

Figure 10:
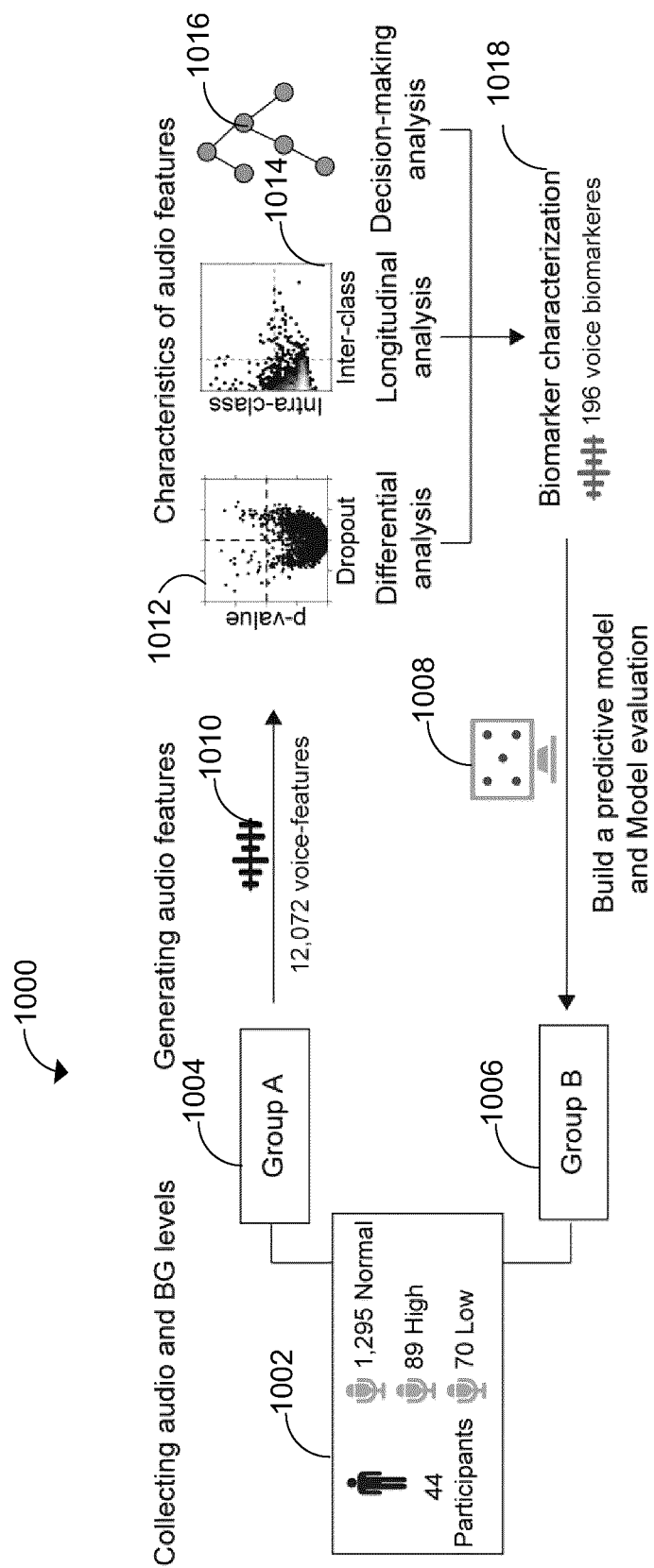
FIG. 10 shows an overview diagram of the analysis of voice signals and blood glucose (BG) levels in healthy individuals in accordance with one or more embodiments.
Figure 11:
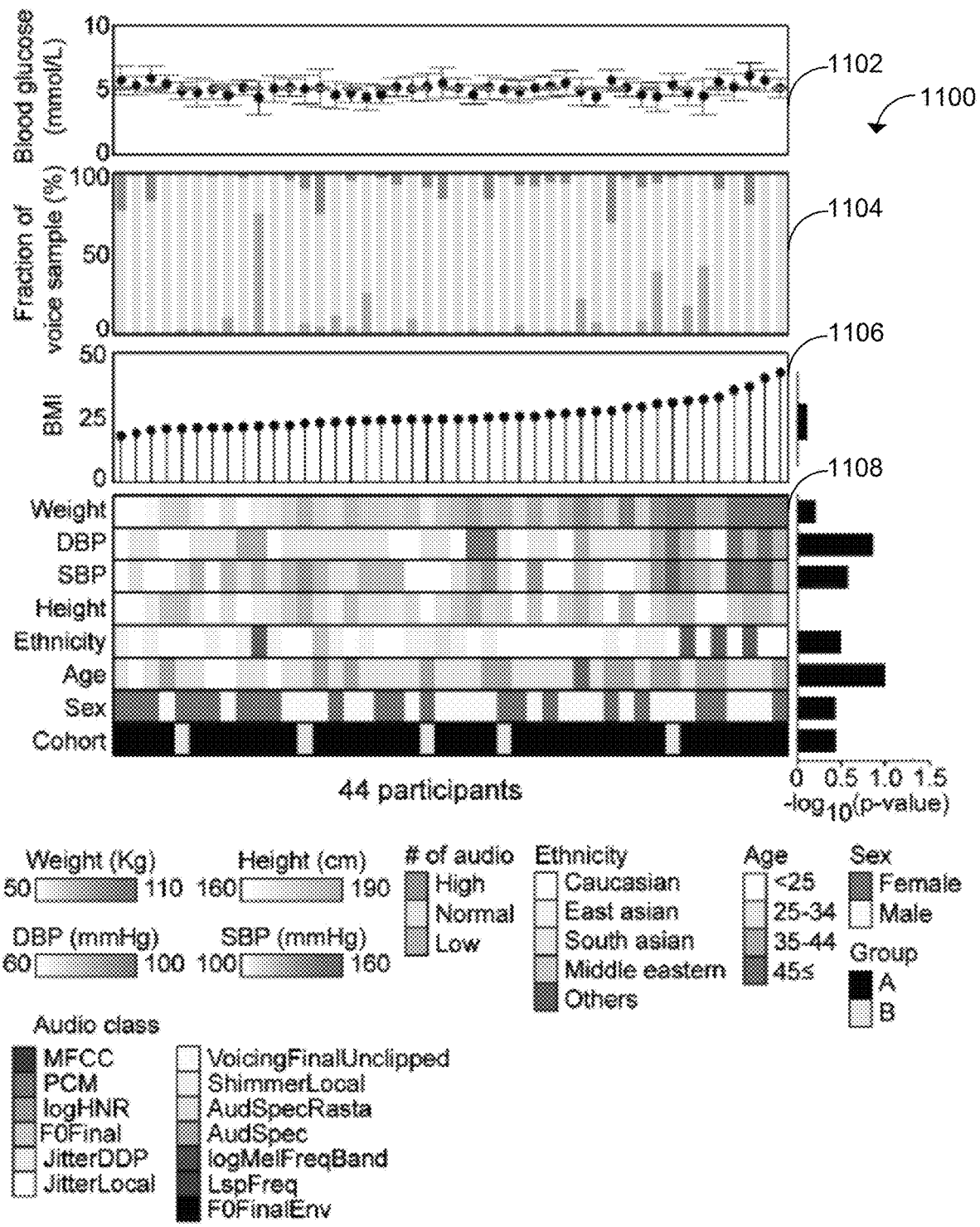
FIG. 11 shows a landscape of BG levels, voice recordings, and clinicopathological information of 44 healthy individuals, including a relationship between individual's average BG levels and clinicopathological parameters shown as p-values in Example 1.

To understand the voice characteristics with respect to blood glucose (BG) levels, we collected 1,454 voice recordings at three different BG groups (70 low, 1,295 normal, and 89 high BG groups) from 44 healthy participants (FIG. 10) after the removal of unqualified voice recordings and participants. Participants were composed of 21 females and 23 males. Study participants had an average age of 32 and included various ethnic backgrounds (East Asian=32%, Caucasian=55%, South Asian=2%, Middle Eastern=2% and Other=9%; Table 1). Clinicopathological variables (e.g., height, weight, blood pressure, and BMI) of participants were within the normal range (Table 1). For 14 days, each participant measured BG levels using a continuous glucose monitoring device (average BG level was 5.27 mmol/L). No statistically significant relationships between average BG levels and clinicopathological variables were observed (p-value>0.1; FIG. 11). On average, each participant provided 33 voice samples which were recorded at low (2 samples, BG level<3.9 mmol/L), normal (29 samples, 3.9 mmol/L BG level 7.1 mmol/L), and high (2 samples, BG level>7.1 mmol/L) BG levels across all time points (FIG. 5). Next, the dataset was divided into two groups. Group A (90% of the dataset) was used to characterize voice-features, evaluate their longitudinal stabilities, and build a predictive model to discriminate abnormal (high or low) BG levels from normal BG level. Group B (10% of the dataset) was used as an independent test set to evaluate the performance of the predictive model (FIG. 10).

TABLE 1

Demographic and clinicopathological characteristics of study participants.

|  |  | Total (n = 44) | Group A (n = 39) | Group B (n = 5) |
| --- | --- | --- | --- | --- |
| Ethnicity | East Asian | 14 | 13 | 1 |
|  | South Asian | 1 | 1 | 0 |
|  | Caucasian | 24 | 20 | 4 |
|  | Middle Eastern | 1 | 1 | 0 |
|  | Others | 4 | 4 | 0 |
| Sex | Female | 21 | 18 | 3 |
|  | Male | 23 | 21 | 2 |
| Age, years |  | 32.32 ± 6.04 | 31.92 ± 6.06 | 35.40 ± 5.41 |
| BMI |  | 25.95 ± 5.44 | 26.11 ± 5.64 | 24.78 ± 3.72 |
| Height (cm) |  | 173.32 ± 9.66 | 172.64 ± 9.28 | 178.60 ± 12.07 |
| Weight (kg) |  | 78.55 ± 20.36 | 78.44 ± 20.98 | 79.40 ± 16.53 |
| Systolic Blood Pressure (mmHg) |  | 120.84 ± 14.89 | 120.49 ± 14.30 | 123.60 ± 20.77 |
| Diastolic Blood Pressure (mmHg) |  | 75.07 ± 9.39 | 75.26 ± 9.41 | 73.60 ± 10.19 |
| Total number of voice recordings |  | 1,454 | 1,290 | 164 |
|  | high BG | 89 | 71 | 18 |
|  | normal BG | 1,295 | 1,155 | 140 |
|  | low BG | 70 | 64 | 6 |
| Number of recordings per participants |  | 33 ± 21 | 33 ± 21 | 33 ± 19 |
|  | high BG | 2 ± 3 | 2 ± 2 | 4 ± 4 |
|  | normal BG | 29 ± 19 | 30 ± 19 | 28 ± 18 |
|  | low BG | 2 ± 3 | 2 ± 3 | 1 ± 1 |

Figure 12:
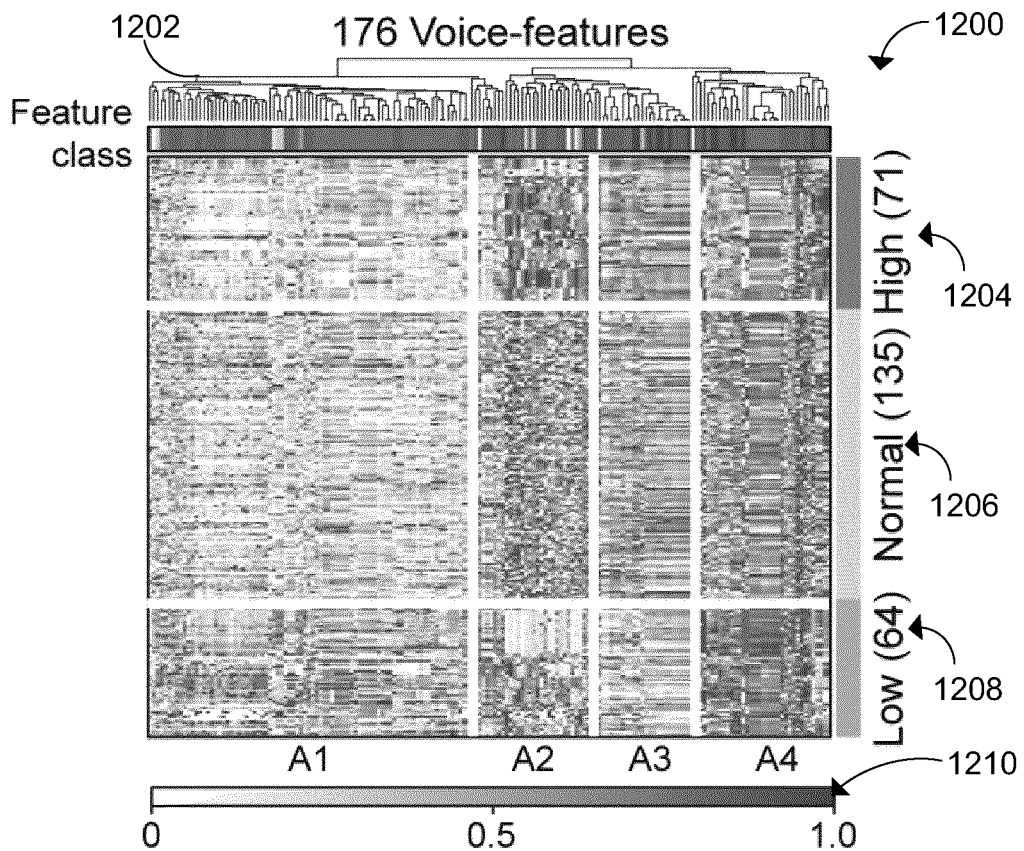
FIG. 12 shows a profile diagram of voice features.
Figure 13:
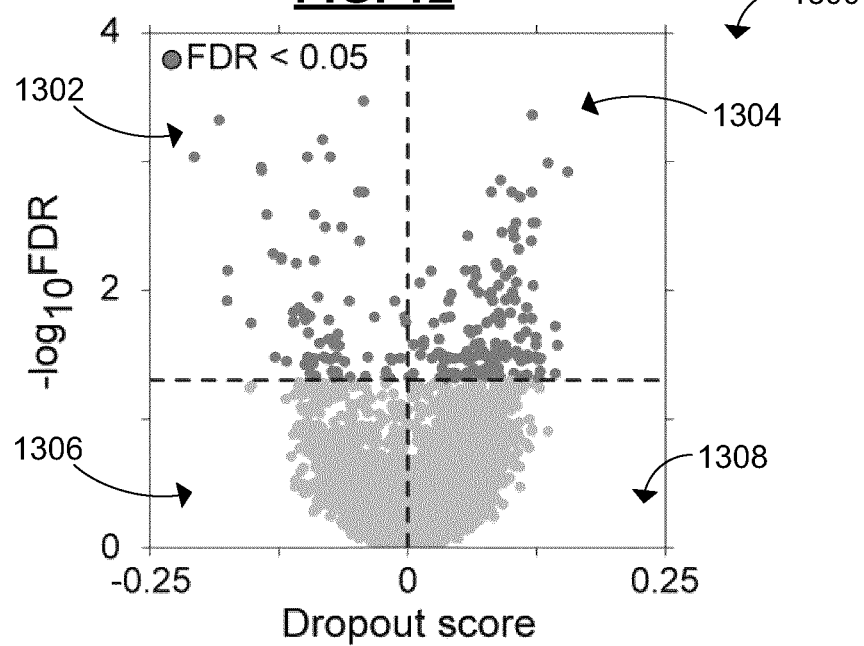
FIG. 13 shows a volcano plot diagram between dropout scores and FDRs of voice-features. Voice-features with FDR<0.05 are shown in dark grey in Example 1.

Voice-features at different BG groups were extracted and profiled from Group A participants. In total, 12,072 voice-features were identified using OpenSmile (Eyben et al., 2015). These features represented 13 audio-classes representing different extractable signal components from a recorded voice. From the profile, we identified four clusters of voice-features (A1, A2, A3, and A4; FIG. 12). A2 and A3 showed the strongest signals in high BG level, and signals were reduced as BG levels decreased. They were mainly composed of Pulse-Code Modulation (PCM) and Mel-frequency cepstral coefficient (MFCC)-based features. Meanwhile, A1 and A4 showed reverse correlations between voice signals and BG levels and were mainly composed of the sum of the auditory spectrum coefficients (AudSpec)-based features. Next, we investigated differences of feature signals among three BG groups (FIG. 13). To examine the directionality of signal changes, a dropout score was measured as described herein. Negative dropout scores indicated the signal was increased as the BG level increased, whereas positive dropout scores indicated a signal that increased as the BG level decreased. The signals of 73 voice-features were significantly increased as the BG level increased (dropout score<0 and false discovery rate (FDR)<0.05; FIG. 13). Of them, 42.47% were PCM-based features. Meanwhile, 153 features showed increased signals as BG levels were decreased (dropout score>0 and FDR<0.05). Half of features (50.33%) were from AudSpec class.

Figure 14:
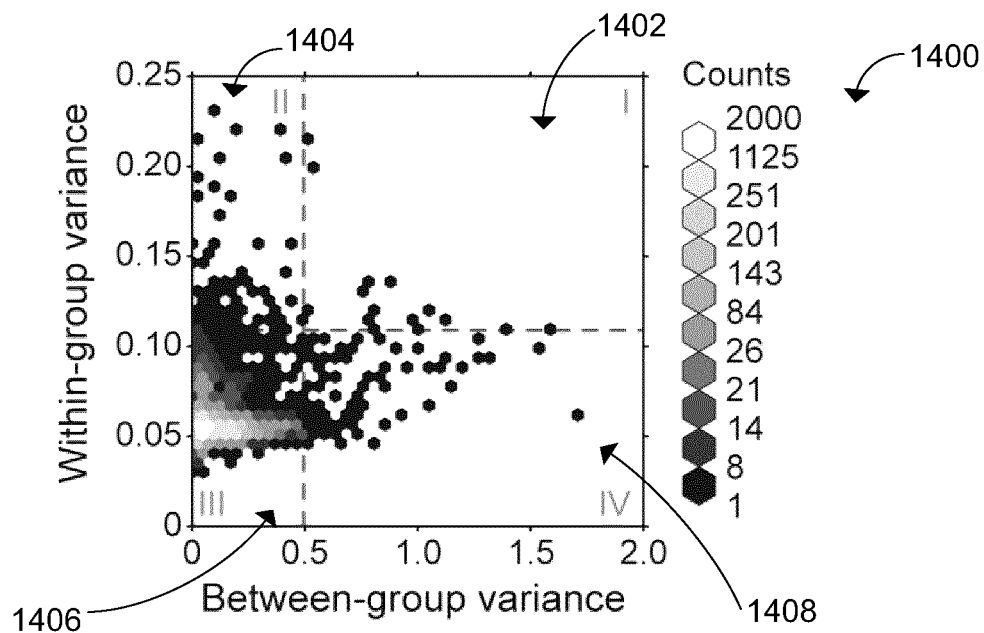
FIG. 14 shows the intra-stability of voice-features, including within- and between-BG group variance in Example 1. Dashed lines indicated top 1% of between-group variance (horizontal) and within-group variance (vertical).

To generate robust voice biomarkers, it is critical that voice signals remain stable over time within the same BG group and are distinctive between BG groups. To understand which voice-features were most and least stable within a BG group, we measured the between- and within-group variance of individual features and divided them into four quadrants (FIG. 14). We found that 106 voice-features were stable within a BG group (quadrant IV) showing high between-group variance (>top 1% of between-group variance) and low within-group variance (<bottom 99% of within-group variance). Meanwhile, another 106 voice-features were unstable within a BG group (quadrant II). Their within-group variances were more than 4 times as high as between-group variances. Over 98% (11,845) of voice-features showed nonsignificant between- and within-group variance (quadrant III), and 15 voice-features showed relatively high between- and within-group variances (quadrant I) implying that there could be additional factors that contribute to the stabilities of voice-features.

Figure 15:
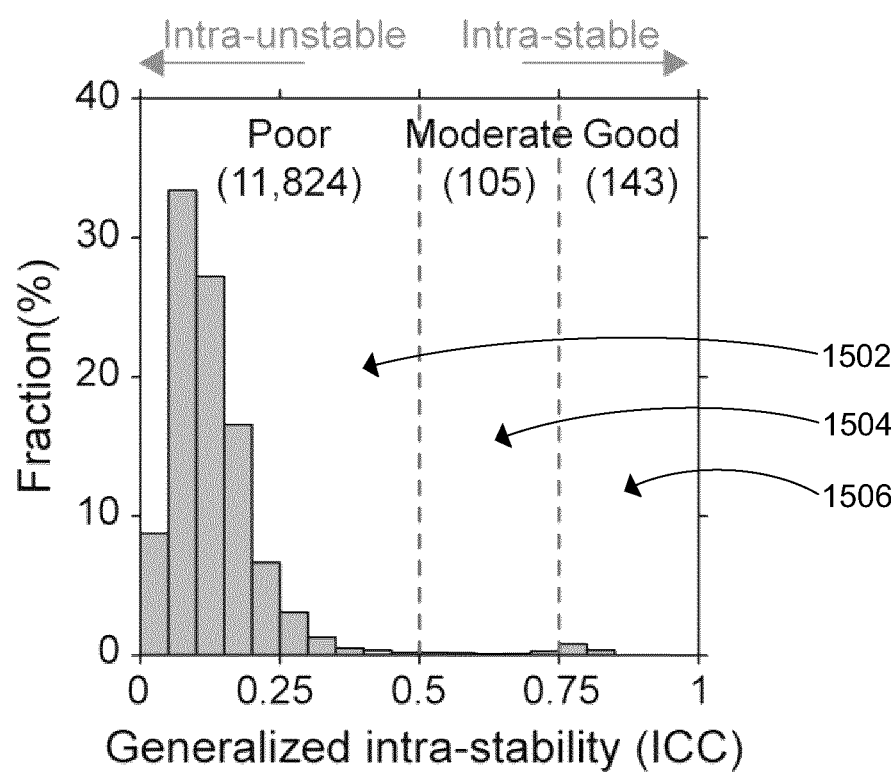
FIG. 15 shows the intra-stability of voice features, including the distribution of generalized intra-stability of 12,027 voice-features in Example 1. Generalized intra-stability is estimated using intraclass correlation coefficient (ICC).
Figure 16:
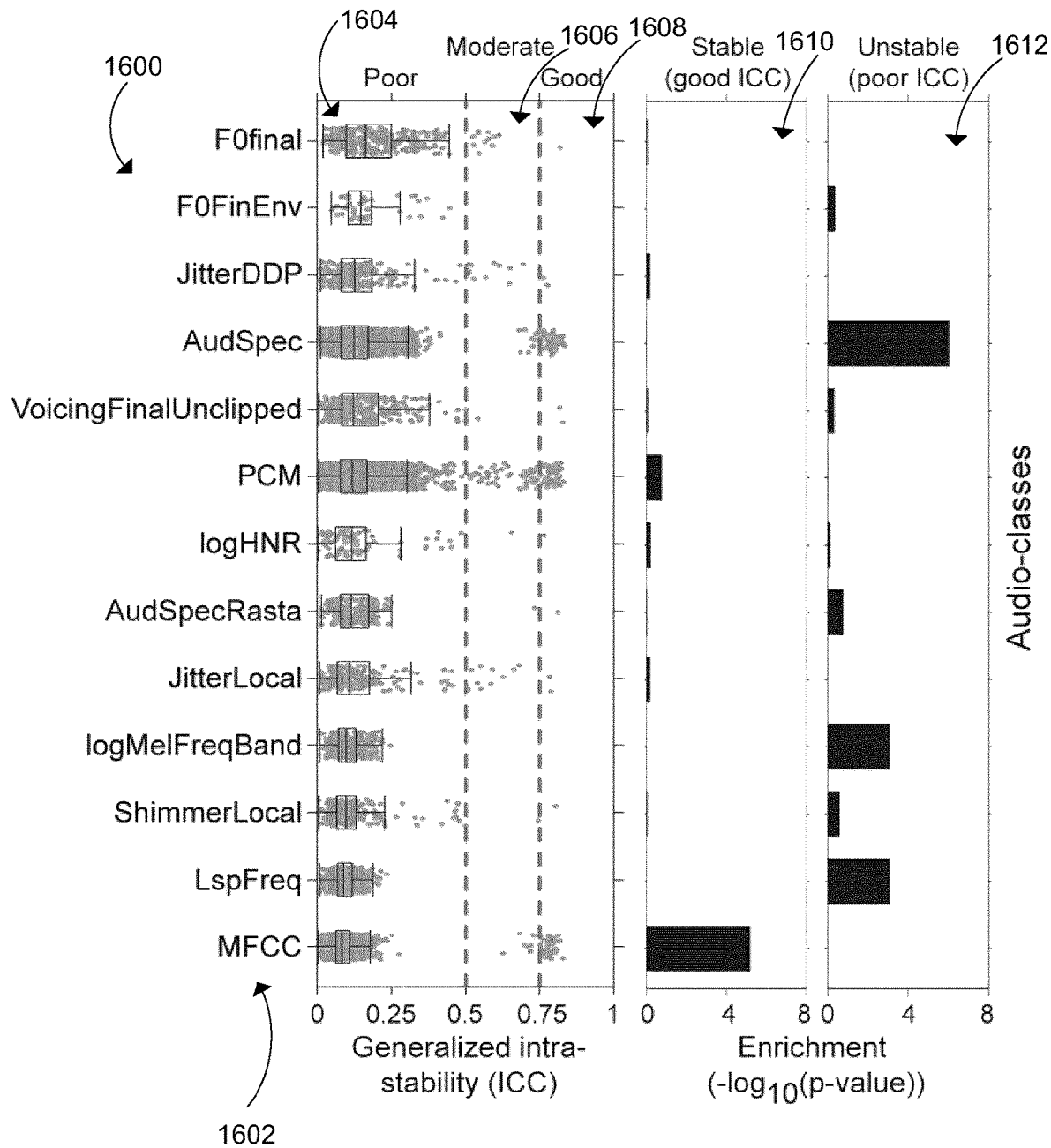
FIG. 16 shows the distribution of ICCs depending on audio-classes in Example 1. Enrichment of audio-classes in stable voice-features and unstable voice-features are also shown.

Because of the potential to generate variations of voice signals within a participant resulting in increased variances within the same BG group, we decided to decode the variabilities derived from BG groups and participants, and estimated the generalized intra-stability of each voice-feature. To do this, linear-mixed-effect modeling was performed, and measured intra-class correlation-coefficient (ICC) as a metric for generalized intra-stability (FIGS. 15 and 16). The higher a voice-feature's ICC, the more it is stable within a BG group across individuals. A majority of voice-features (11,824) showed a lack of stability within a BG group and participants within a BG group (unstable voice-features, poor ICC 0.5; FIG. 15), and 105 features showed a moderate level of stability (0.5<moderate ICC 0.75). Only 143 (1.18%) voice-features were stable within a BG group across individuals (stable voice-features, good ICC>0.75). Interestingly, stable and unstable voice-features were enriched in different audio-classes (FIG. 16). Stable voice-features were significantly enriched in MFCC class (hypergeometric p-value=$7.03\times10^{-6}$, FIG. 16). Meanwhile, unstable voice-features were enriched in AudSpec (p-value=$9.27\times10^{-7}$), logarithmic power of Mel-frequency bands (logMelFreqBand, p-value=$8.47\times10^{-4}$) and line spectral pair frequency (LspFreq, p-value=$8.47\times10^{-4}$) classes.

Figure 18:
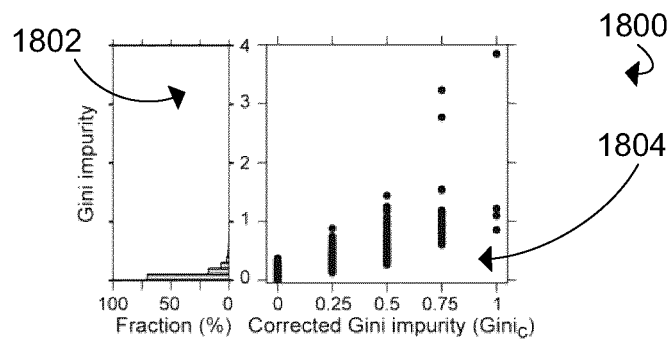
FIG. 18 shows the identification of voice biomarkers, and specifically the relevance of voice-features in Example 1. Gini impurity scores were measured to evaluate the ability of each voice-feature to make a distinct choice in decision trees (left), and were corrected from multiple comparisons ($Gini_c$, right).

An optimal set of voice-features was generated that could serve as biomarkers to discriminate between the three BG groups. Three criteria were considered to select reliable biomarkers (FIG. 17). Features should show statistically significant differences between BG groups (e.g., small FDR), have high stability within the same BG group across participants (e.g., high ICC), and be relevant by having a sufficient ability to make a distinct choice in decision trees. To evaluate the decision ability of each voice-feature, Gini impurity scores were measured and corrected ($Gini_c$) from multiple comparisons (FIG. 18). Gini impurity and $Gini_c$ were positively related. Each voice-feature had 0.04±0.1 of $Gini_c$ (0.08±0.13 of Gini impurity). 3,062 (25.36%) features were irrelevant ($Gini_c$=0), and 4 features had significant abilities to make decisions on BG groups ($Gini_c$=1). 34 top ranked voice-features were selected ($Gini_c$>0.5), which were mainly composed of PCM (12), AudSpec (8), and MFCC (6) classes (FIG. 26).

Figure 19:
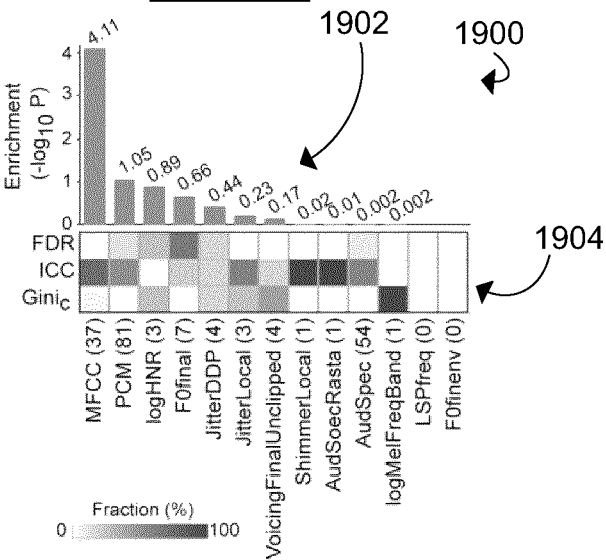
FIG. 19 shows the identification of voice biomarkers, and specifically the enriched audio-classes of voice biomarkers in Example 1. Hypergeometric p-values were shown on the top of bars.

In total, 196 voice-features were identified as a set of biomarkers (Table 3 and FIG. 17). They were composed of 33 FDR-specific (<0.01), 120 ICC-specific (>0.75), 13 Gini-specific (>0.5) features, and 30 biomarkers selected by at least two criteria. Biomarkers were involved in 11 out of 13 audio-classes (FIG. 19). The majority of biomarkers were involved in MFCC (37), PMC (81) and AudSpec (54) classes. The MFCC class was significantly enriched in the biomarkers set (p-value=$7.76\times10^{-5}$). Furthermore, biomarkers selected by different criteria were found to be enriched in different audio-classes. For example, smoothed fundamental frequency contour (F0Fianl)-based biomarkers tended to be selected by FDR by having strong discriminatory power. MFCC-based biomarkers were likely to be selected by ICC indicating they were stable within a BG group and participants within a BG group. Voicing probability of the final fundamental frequency candidate with unclipped voicing threshold (VoicingFianlUclipped) and logMelFreqBand-based biomarkers were likely to be selected by $Gini_c$ suggesting they had important roles to choose BG groups in decision trees. Taken together, selected biomarkers could capture various profiles of the voice signals and avail information for the BG group classification.

Optimized voice biomarkers were integrated into a unified predictor that accurately discriminated between distinct BG groups (FIG. 20). The previously characterized 196 biomarkers listed in Table 3 were fed into a multi-class random forest (RF) classifier with hyperparameter optimization in the training set (Group A). Five-fold cross-validation was performed to find an optimal set of parameters for a RF classifier and trained a predictive model as described herein. To ensure generality of the prediction, the procedure was repeated five times by alternating voice samples in each fold and five different predictive models were generated. Finally, the ensemble model was built by combining all the results from five models and applied to the independent test set (Group B). The ensemble model correctly predicted the BG groups in the test set (overall accuracy=78.66%, balanced accuracy=75.05%; Table 2). Over 80% of normal (recall=80.71%) and low (recall=83.33%) BG groups, and 61.11% of the high BG group were correctly predicted. The model had an overall Area Under the Curve (AUC) of 0.83 (micro AUC, 95% confidence interval (CI)=0.80 to 0.85) and a corrected AUC of 0.71 (macro AUC, 95% CI=0.64–0.77; FIG. 21). The predictive model outperformed any models generated by biomarkers which were selected by only FDR, only ICC and only $Gini_c$. The predictive model showed the highest AUC (FIG. 22), and correctly predicted BG groups 1.07~2.53 times more than individual biomarkers selected by single or two criteria. Other performance measurements, Matthews Correlation Coefficient (MCC=0.41) and corrected F1 score (macro F1=0.64), were 2.42±0.74 and 1.76±0.33 fold higher in the predictive model than single/double criteria-based biomarkers, respectively (Table 2). Additionally, to evaluate the null distribution of voice biomarkers, 1,000 random sets of 196 voice-features were generated and a model was built from each. Indeed, the biomarker model outperformed the majority of random models across all performance evaluation metrics (FIG. 23).

TABLE 2

Performance of the predictive models for blood glucose

| Features | BCC (%) | ACC (%) | MCC | Macro F1 | Macro AUC (95% CI) |
|---|---|---|---|---|---|
| FDR | 69.97 | 39.63 | 0.21 | 0.35 | 0.69 (0.64-0.72) |
| LMM | 52.17 | 39.02 | 0.13 | 0.33 | 0.59 (0.45-0.71) |
| Gini.c | 52.30 | 31.10 | 0.12 | 0.29 | 0.69 (0.64-0.73) |
| FDR + LMM | 59.18 | 65.24 | 0.22 | 0.48 | 0.69 (0.64-0.76) |
| FDR + Gini.c | 65.85 | 42.68 | 0.20 | 0.36 | 0.69 (0.64-0.74) |

TABLE 2-continued

Performance of the predictive models for blood glucose

| Features | BCC (%) | ACC (%) | MCC | Macro F1 | Macro AUC (95% CI) |
|---|---|---|---|---|---|
| LMM + Gini.c | 61.53 | 49.39 | 0.20 | 0.45 | 0.68 (0.59-0.77) |
| FDR + LMM + Gini.c | 75.05 | 78.66 | 0.41 | 0.64 | 0.71 (0.64-0.77) |
| Random* | 37.83 ± 6.28 | 58.74 ± 30.77 | 0.02 ± 0.05 | 0.27 ± 0.14 | 0.60 ± 0.03 |

Voice-biomarkers were selected from a training set using three criteria. To examine how much individual biomarkers contributed to the prediction of a test set, Local Interpretable Model-agnostic Explanations analysis, was performed which is a technique to add interpretability and explainability to black box models (Ribeiro et al., 2016) and 196 biomarkers were ranked based on their importance. It was observed that biomarkers which were relevant in a training set also played important roles in predicting BG groups in the test set. Of 30 biomarkers selected by at least two criteria (FIG. 17), 20 (66.67%) were ranked within the top 50, and 28 (93.33%) were ranked within the top 100 relevant biomarkers to predict BG groups in a test set. Notably, 4 out of 5 (80%) biomarkers selected by all three criteria were ranked within the top 25 relevant biomarkers (FIG. 24). Next, the top-10 positively and top-negatively associated biomarkers were selected for BG group prediction to understand how biomarkers were combined and each BG group was decided (FIG. 25). For the prediction of high BG level, PCM-based biomarkers were likely to be associated positively (i.e., high values affected correct prediction). Meanwhile, MFCC- and AudSpec-based biomarkers tended to be associated negatively with the prediction (i.e., low values affected correct prediction). For predicting low BG levels, AudSpec-based biomarkers were positively associated, showing their ability to track with both elevated and decreased BG level groups. In normal BG levels, jitter- and harmonic-to-noise ratio (HNR)-based biomarkers showed positive associations, which were opposite of their association for high BG prediction. AudSpec- and PCM-based biomarkers showed both positive and negative associations.

Discussion

Generally, one-third of type 2 diabetes patients do not present symptoms until complications appear and undiagnosed diabetes is associated with higher risk of mortality compared to normoglycemic individuals (Wild et al., 2005). Such diagnostic limitations suggested the need for effective screening techniques to differentiate an individual at high-risk from one at low-risk of having the disease in the future. Earlier identification of potential prediabetic-individuals, and their monitoring and treatment can reduce the economic and social burden of diabetes and its complications. In this study, for the first time, the association between voice signals and blood glucose levels in healthy individuals was demonstrated. Specifically, 196 voice biomarkers were identified to identify abnormally high and low BG levels. These voice biomarkers may serve as a non-invasive and conventional surrogate of blood glucose monitoring in daily life as well as a preliminary screening tool to identify individuals with potential prediabetes or those at risk of developing diabetes in the future.

This study provides a new strategy to identify robust non-invasive voice biomarkers through parallel evaluation of feature importance. Repetitive voice recordings allowed quantification of signal variances of voices within and between BG groups across all participants. From this longitudinal analysis, intra-stabilities of voice-features were generalized and relevant biomarkers were identified that present consistent signals to classify BG groups, regardless of time and individual to record voices. Traditional univariate analysis provided information to estimate the power of voice-features to discriminate abnormal BG groups. Lastly, Gini impurity score measured the probability of each voice-feature to decide a correct BG group in decision trees, and prioritized features. By integrating three biomarker selection strategies, we penetrated various different profiles of the voice-features and enhanced both accuracy and reliability of our predictive model.

The biomarker discovery strategy successfully identified voice biomarkers that were physiologically associated with blood glucose levels and perhaps diabetes development. MFCC features have been studied to classify voices at risk for pathological conditions (Eskidere et al., 2015) and to build a regression model to estimate blood glucose levels (Francisco-Garcia et al., 2019). The other biomarkers, representing the changes of jitter, shimmer, loudness, and harmonic-to-noise ratio (HNR), captured the instability of oscillating patterns and closure of vocal folds. It has been shown that abnormal blood glucose levels caused the loss of fine motor muscle control (Hsu et al., 2015) and laryngeal sensory neuropathy (Hamdan et al., 2014). Also, patients with Type 1 and 2 diabetes commonly showed dry mouth and decreased salivary flow rates (Hoseini et al., 2017), which caused difficulty in phonation due to decreased lubrication mechanism of larynx (Sivasankar and Leydon, 2010). Such physiological changes would affect vocal frequency and amplitude alternating phonation function.

In general, the normal hormonal changes in the morning increase blood glucose level regardless of health conditions to help individuals to have enough energy to get up and start the day (Holl et al., 1992). Interestingly, voice sounds in the morning are relatively deeper compared to the sound during the day since vocal cords are relaxed (unused through night), swollen and thickened by the concentration of fluids in the upper body during sleeping. These unique physiological changes would affect the prediction of blood glucose levels from voices in the morning. Indeed, from the independent test set, the lowest accuracy of BG level prediction was observed in the morning between 6 am to 12 pm (25% of accuracy; FIG. 27). There were four voice samples that were recorded at high BG levels in the morning. Of them, three failed to predict BG levels correctly. Use of additional participants and their voice recordings may refine the assessment of longitudinal stability of voice features and improve biomarker discovery and time-dependent BG level prediction.

Overweight, high BMI, and high blood pressure are well known risk factors for both prediabetes and diabetes (Zhang et al., 2019). Integration of clinicopathological variables could improve the prediction accuracy of individuals, especially those at high-risk of disease in the future. Indeed, we observed that one individual in our test set (Group B) who had a relatively high BMI and blood pressure yielded low accuracy (42.85%) to predict BG groups. Meanwhile, four other healthy individuals, who showed a normal range of BMI and blood pressure, yielded 79.69% of accuracy to predicted BG groups (FIG. 29). We expect that integration of clinicopathological information into the predictive models may aid better prediction.

Human voice signals can be a rich source of clinically relevant information while being non-invasive to measure, cost-effective, scalable, and accessible 24 hours a day in remote locations around the world. This work reinforces the idea that combining voice signals and machine learning techniques makes it possible to create a reliable and efficient system to identify abnormal blood glucose levels in otherwise healthy individuals. Glucose levels are traditionally measured with invasive continuous glucose monitoring (CGM) devices or finger prick tests. However, the novel methods and systems described herein for analyzing voice biomarkers have the potential of being implemented in either healthy, prediabetic, or undiagnosed diabetic individuals during regular physician checkups. The fact that voice samples were also recorded on personal smartphones without any specific audio filters gives extra support for its potential use in everyday situations for patients of all demographics. The long-term implications include reducing specialized healthcare equipment costs and resources associated with diabetes-related treatment, as well as enhancing overall health and quality of life.

Example 2: Analysis of a Second Cohort of Real-World Voice Signals to Predict Blood Glucose Levels A further study was performed on a separate cohort that included healthy individuals as well as prediabetics and type-II diabetics. The study design and methods were similar to those described in Example 1, except as noted below. Clinicopathological information, continuous blood glucose monitoring and voice samples were collected and analyzed to identify biomarkers and validate a predictive model to classify subject blood glucose levels using voice.

Study Design and Participants

As shown in FIG. 30, 200 participants (aged 18 years) were recruited into the study and data for 154 subjects was eventually selected for analysis.

Blood glucose levels were measured using a FreeStyle® Libre glucose monitoring device (Abbott Diabetes Care), and voice samples of simple spoken sentences (e.g., "Hello, how are you? What is my glucose level right now?") were recorded using the participants' smartphones as set out in Example 1. After the 14 days of collection, blood glucose levels and voice samples were all collected. In total, 8,566 voice recordings from 154 participants were collected and used for our study.

From each voice recording, 12,072 voice-features were extracted using OpenSmile software (v. 3.0), an open-source audio feature extractor. The profiles of 103,408,752 voice signals (8,566 recordings×12,072 voice features) were finally generated.

Study Population

The participants completed a self-report demographic survey, and had physiological variables measured, including height, weight, body mass index (BMI), systolic blood pressure, and diastolic blood pressure. Of the 154 subjects selected for analysis, 31 participants had prior diagnoses of type-II diabetes, 24 had prior diagnoses of pre-diabetes, 87 were normal healthy individuals, and 12 were of unknown diabetic status. 53 of the subjects were female, 99 male and 2 were of unknown sex. The average age was 37 (Female: 36 yr old & Male: 37.5 yr old).

Measuring Blood Glucose (BG) Levels

Subject BG levels were measured using the FreeStyle® Libre glucose monitoring device as set out in Example 1.

The range of measured BG levels was greater than what was observed in Example 1, reflecting the participation of diabetics and prediabetics in the study. Accordingly, measured blood glucose (BG) levels were divided into one of three BG groups: a high BG level (BG>200 mg/dL), a low BG levels (BG level<70 mg/dL) or a normal BG level (70 mg/dL≤BG level≤200 mg/dL).

Collecting and Pre-Processing Voice Samples

Voice samples were collected and pre-processed as set out in Example 1. After the pre-processing, 8,566 voice recordings from 154 participants were mapped to corresponding blood glucose levels, which were the nearest measurement from a given voice recording (within ±15 minutes) and used for analyses.

Voice-Feature Extraction and Profiling

OpenSmile software (v.3.0) was employed to extract and profile voice-features representing the 13 different aspects (classes of voice signal and phonatory function from each voice recording as set out in Example 1). In total, 12,072 voice-features were extracted after the removal of identical feature values. Feature values were re-scaled to have values ranging from 0 to 1 as set out in Example 1.

Biomarker characterization: FDR, ICC and $Gini_c$

FDR, ICC and $Gini_c$ values were calculated for each voice feature as set out in Example 1. As shown in FIG. 31, of the 12,072 voice features, 7896 were identified as voice biomarkers based on at least one of the FDR, ICC or $Gini_c$ criteria.

Three sets of biomarkers were then identified as set out in Table 6: Tier 1 comprising 32 voice features that were identified as biomarkers both in Example 1 and using the second cohort; Tier 2 comprising 242 voice features identified as biomarkers in the second cohort using at least two criteria; and Tier 3 comprising 274 total voice features found identified as Tier 1 or Tier 2 biomarkers. Tier 4 comprised all 7,066 identified biomarkers in Example 2.

Predictive Model Generation

Predictive models were generated for each of the Tier 1, Tier 2, Tier 3, and Tier 4 biomarker sets. The predictive models were generated as set out in Example 1 (i.e. Tier 1, Tier 2, Tier 3, or Tier 4).

8,566 voice recordings were divided into two groups. One set was a training set, which is composed of 80% of voice recordings (6,852 recordings). The training set was used to find an optimal parameter combination for the Random forest algorithm and train a predictive model. The other 20% was used as a test set, which is composed of 20% of voice recordings (1,714 recordings). This set was used to evaluate a predictive model.

The training set and RandomForestClassifier (RF) function built in the sklearn package (v.0.24.2) was used to train a model. To find optimal RF parameters (n_estimator, max_depth, max_features and class_wegiht), grid search with 3-fold cross-validation was conducted. Optimal parameters were determined based on the balanced accuracy (BCC). Next, the model was trained on an entire training set with optimal parameters. To achieve the generalizability of a predictive model, this procedure was repeated three times. Finally, three RF predictive models were generated and an ensemble model was built by combining all the results from three RF predictive models.

Performance Evaluation

The generated ensemble RF model was evaluated using the test set.

A statistical analysis of each model was performed by determining (1) accuracy (2) balanced accuracy, and MCC (rank product) using the test set. Performance data for each of the three models is summarized in Table 5.

High Information-Value Voice Biomarkers

The selected biomarkers were ranked (i.e. ranking 32 biomarkers in Tier 1) based on their Gini impurity score (gini score). Gini impurity score represents how significant a role a given biomarker plays to predict high, low and normal blood glucose levels when a given predictive model is tested. This score is relative. Therefore, each model has a different range of gini scores and the relative ranking of biomarkers is more significant than the absolute score itself. During the training process, gini impurity score is measured and stored. After 3 times of 3-fold cross validation, nine gini scores are generated for each voice biomarker. An average gini score was assigned to each voice biomarker and ranked to find the most important or preferred biomarkers.

Corrected Gini score ($Gini_c$)

$Gini_c$ is used to define biomarkers, including as one of the three biomarker identification methods described in Example 1. This score is derived from gini impurity score but it represents a more general ability to classify high, low and normal blood glucose levels. Please note that gini impurity score represents the prediction ability of a biomarker in a given predictive model only.

Results

The Tier 1 biomarkers generated a predictive model with an overall accuracy of 69.9%, balanced accuracy of 54.1%, and an MCC of 0.3 to discriminate three different blood glucose levels in an independent test set. Gini scores for each of the Tier 1 biomarkers are ranked and identified in FIG. 32.

The Tier 2 biomarkers generated a predictive model with an overall accuracy of 71.4%, balanced accuracy of 63.6%, and an MCC of 0.4 to discriminate three different blood glucose levels in an independent test set. Gini scores for each of the top 50 Tier 2 biomarkers are ranked and identified in FIG. 33.

The Tier 3 biomarkers generated a predictive model with an overall accuracy of 71.8%, balanced accuracy of 63.3%, and an MCC of 0.40 to discriminate three different blood glucose levels in an independent test set. Gini scores for each of the Top 50 Tier 3 biomarkers are ranked and identified in FIG. 34.

The Tier 4 biomarkers generated a predictive model with an overall accuracy of 72.1%, balanced accuracy of 60% and an MCC of 0.38. Gini scores for each of the top 50 Tier 3 biomarkers are ranked and identified in FIG. 35.

TABLE 5

Performance metrics for predictive models generated using Tier 1, Tier 2, Tier 3, or Tier 4 voice biomarker feature sets.

| Biomarkers | Model | # of biomarkers | Accuracy | Balanced accuracy | MCC |
|---|---|---|---|---|---|
| Tier 1 | Ensemble (RF) | 32 | 69.9 | 54.1 | 0.30 |
| Tier 2 | Ensemble (RF) | 242 | 71.4 | 63.6 | 0.40 |
| Tier 3 | Ensemble (RF) | 274 | 71.8 | 63.3 | 0.40 |
| Tier 4 | Ensemble (RF) | 7,066 | 72.1 | 60.0 | 0.38 |

Model Training Time

The models for Tier 1, Tier 2, Tier 3 and Tier 4 biomarkers were generated using an AMD Ryzen Threadripper 3960X 24-Core Processor), and the model generation times were as follows:

TABLE 10

Model generation times for Tier 1, Tier 2, Tier 3, and Tier 4 models.

| Biomarker type | # of biomarkers | Time duration (minutes) |
|---|---|---|
| Tier1 | 32 | 45 minutes |
| Tier2 | 242 | 60 minutes |
| Tier3 | 274 | 75 minutes |
| Tier4 | 7,066 | 240 minutes |

All publications, patents and patent applications are herein incorporated by reference in their entirety to the same extent as if each individual publication, patent or patent application was specifically and individually indicated to be incorporated by reference in its entirety.

TABLE 3

Identification of 196 voice features useful for determining blood glucose levels.

| OpenSmile Voice-feature name | Audio-class | FDR | DropOut Score | ICC | Gini_c |
|---|---|---|---|---|---|
| pcm_loudness_sma_quartile3_numeric_IC10 | pcm | 0.26 | −0.07 | 0.17 | 0.75 |
| mfcc_sma_9___upleveltime75_numeric_IC10 | mfcc | 0.18 | −0.09 | 0.06 | 0.75 |
| mfcc_sma_de_7___quartile1_numeric_IC10 | mfcc | 0.01 | 0.10 | 0.18 | 0.75 |
| mfcc_sma_de_13___amean_numeric_IC10 | mfcc | 0.42 | −0.07 | 0.16 | 0.75 |
| logMelFreqBand_sma_de_4___skewness_numeric_IC10 | logMelFreqBand | 0.01 | 0.12 | 0.22 | 0.75 |
| F0final_sma_de_linregc1_numeric_IC10 | F0final | 0.00 | −0.08 | 0.61 | 0 |
| audspec_lengthL1norm_sma_de_centroid_numeric_IC11 | audspec | 0.12 | 0.12 | 0.78 | 0.5 |
| pcm_RMSenergy_sma_de_linregc1_numeric_IC11 | pcm | 0.00 | 0.11 | 0.31 | 0.25 |
| pcm_RMSenergy_sma_de_centroid_numeric_IC11 | pcm | 0.91 | 0.03 | 0.77 | 0 |
| pcm_zcr_sma_de_centroid_numeric_IC11 | pcm | 0.01 | −0.11 | 0.79 | 0.5 |
| audSpec_Rfilt_sma_19___minSegLen_numeric_IC11 | audSpec | 0.00 | 0.12 | 0.27 | 0 |
| pcm_fftMag_mfcc_sma_1___meanPeakDist_numeric_IC11 | pcm | 0.00 | 0.10 | 0.19 | 0 |
| pcm_fftMag_mfcc_sma_4___centroid_numeric_IC11 | pcm | 0.16 | 0.12 | 0.75 | 0.25 |
| pcm_fftMag_mfcc_sma_5___centroid_numeric_IC11 | pcm | 0.94 | 0.00 | 0.77 | 0 |
| pcm_fftMag_mfcc_sma_6___centroid_numeric_IC11 | pcm | 0.05 | 0.13 | 0.81 | 0.25 |
| pcm_fftMag_mfcc_sma_7___centroid_numeric_IC11 | pcm | 0.48 | 0.08 | 0.76 | 0.25 |
| pcm_fftMag_mfcc_sma_8___centroid_numeric_IC11 | pcm | 0.00 | −0.10 | 0.73 | 0.75 |
| pcm_fftMag_mfcc_sma_9___centroid_numeric_IC11 | pcm | 0.71 | 0.04 | 0.77 | 0 |
| pcm_fftMag_mfcc_sma_10___centroid_numeric_IC11 | pcm | 0.24 | −0.10 | 0.82 | 0.5 |
| pcm_fftMag_mfcc_sma_12___centroid_numeric_IC11 | pcm | 0.71 | −0.04 | 0.77 | 0 |
| audSpec_Rfilt_sma_de_0___centroid_numeric_IC11 | audSpec | 0.00 | −0.09 | 0.78 | 0.25 |

TABLE 3-continued

Identification of 196 voice features useful for determining blood glucose levels.

| OpenSmile Voice-feature name | Audio-class | FDR | DropOut Score | ICC | Gini_c |
|---|---|---|---|---|---|
| audSpec_Rfilt_sma_de_1__minSegLen_numeric_IC11 | audSpec | 0.00 | 0.12 | 0.27 | 0.75 |
| audSpec_Rfilt_sma_de_1__centroid_numeric_IC11 | audSpec | 0.00 | −0.18 | 0.76 | 0.75 |
| audSpec_Rfilt_sma_de_2__centroid_numeric_IC11 | audSpec | 0.15 | 0.06 | 0.80 | 0.5 |
| audSpec_Rfilt_sma_de_3__centroid_numeric_IC11 | audSpec | 0.15 | 0.02 | 0.80 | 0.25 |
| audSpec_Rfilt_sma_de_4__centroid_numeric_IC11 | audSpec | 0.15 | 0.10 | 0.83 | 0 |
| audSpec_Rfilt_sma_de_5__centroid_numeric_IC11 | audSpec | 0.62 | 0.07 | 0.83 | 0 |
| audSpec_Rfilt_sma_de_6__peakDistStddev_numeric_IC11 | audSpec | 0.01 | 0.09 | 0.22 | 0.25 |
| audSpec_Rfilt_sma_de_6__centroid_numeric_IC11 | audSpec | 0.21 | −0.05 | 0.78 | 0.5 |
| audSpec_Rfilt_sma_de_7__maxSegLen_numeric_IC11 | audSpec | 0.01 | 0.07 | 0.16 | 0.25 |
| audSpec_Rfilt_sma_de_8__centroid_numeric_IC11 | audSpec | 0.11 | −0.04 | 0.82 | 0 |
| audSpec_Rfilt_sma_de_9__centroid_numeric_IC11 | audSpec | 0.70 | 0.06 | 0.79 | 0 |
| audSpec_Rfilt_sma_de_10__centroid_numeric_IC11 | audSpec | 0.63 | 0.01 | 0.75 | 0.25 |
| audSpec_Rfilt_sma_de_12__centroid_numeric_IC11 | audSpec | 0.53 | 0.08 | 0.78 | 0 |
| audSpec_Rfilt_sma_de_13__centroid_numeric_IC11 | audSpec | 0.47 | 0.04 | 0.79 | 0 |
| audSpec_Rfilt_sma_de_14__meanPeakDist_numeric_IC11 | audSpec | 0.01 | 0.09 | 0.20 | 0.25 |
| audSpec_Rfilt_sma_de_15__amean_numeric_IC11 | audSpec | 0.01 | 0.09 | 0.32 | 0.25 |
| audSpec_Rfilt_sma_de_15__centroid_numeric_IC11 | audSpec | 0.99 | 0.01 | 0.79 | 0.25 |
| audSpec_Rfilt_sma_de_17__centroid_numeric_IC11 | audSpec | 0.85 | 0.00 | 0.80 | 0.25 |
| audSpec_Rfilt_sma_de_18__centroid_numeric_IC11 | audSpec | 0.32 | 0.00 | 0.78 | 0.25 |
| audSpec_Rfilt_sma_de_19__centroid_numeric_IC11 | audSpec | 0.48 | −0.07 | 0.83 | 0 |
| audSpec_Rfilt_sma_de_20__centroid_numeric_IC11 | audSpec | 0.25 | −0.02 | 0.80 | 0.25 |
| audSpec_Rfilt_sma_de_21__centroid_numeric_IC11 | audSpec | 0.17 | 0.06 | 0.76 | 0.5 |
| audSpec_Rfilt_sma_de_22__centroid_numeric_IC11 | audSpec | 0.07 | 0.07 | 0.83 | 0.25 |
| audSpec_Rfilt_sma_de_23__centroid_numeric_IC11 | audSpec | 0.33 | 0.06 | 0.79 | 0.25 |
| audSpec_Rfilt_sma_de_25__centroid_numeric_IC11 | audSpec | 0.42 | 0.00 | 0.79 | 0.25 |
| pcm_fftMag_fband25_650_sma_de_minSegLen_numeric_IC11 | pcm | 0.00 | 0.12 | 0.32 | 0.5 |
| pcm_fftMag_fband25_650_sma_de_linregc1_numeric_IC11 | pcm | 0.01 | 0.11 | 0.43 | 0.25 |
| pcm_fftMag_fband25_650_sma_de_centroid_numeric_IC11 | pcm | 0.01 | −0.09 | 0.81 | 1 |
| pcm_fftMag_fband1000_4000_sma_de_centroid_numeric_IC11 | pcm | 0.72 | 0.00 | 0.76 | 0.5 |
| pcm_fftMag_spectralRollOff25.0_sma_de_falltime_numeric_IC11 | pcm | 0.03 | 0.12 | 0.18 | 0.75 |
| pcm_fftMag_spectralRollOff90.0_sma_de_centroid_numeric_IC11 | pcm | 0.00 | 0.14 | 0.80 | 0.5 |
| pcm_fftMag_spectralFlux_sma_de_centroid_numeric_IC11 | pcm | 0.04 | −0.09 | 0.79 | 0.5 |
| pcm_fftMag_spectralEntropy_sma_de_centroid_numeric_IC11 | pcm | 0.06 | −0.05 | 0.80 | 0.25 |
| pcm_fftMag_spectralVariance_sma_de_centroid_numeric_IC11 | pcm | 0.86 | 0.03 | 0.83 | 0 |
| pcm_fftMag_spectralSkewness_sma_de_centroid_numeric_IC11 | pcm | 0.66 | 0.03 | 0.80 | 0.75 |
| pcm_fftMag_spectralKurtosis_sma_de_centroid_numeric_IC11 | pcm | 0.12 | 0.12 | 0.80 | 0.75 |
| pcm_fftMag_spectralSlope_sma_de_minSegLen_numeric_IC11 | pcm | 0.00 | 0.10 | 0.41 | 0.5 |
| pcm_fftMag_spectralSlope_sma_de_linregc1_numeric_IC11 | pcm | 0.01 | −0.11 | 0.39 | 0.25 |
| pcm_fftMag_spectralSlope_sma_de_centroid_numeric_IC11 | pcm | 0.11 | 0.09 | 0.80 | 0.25 |
| pcm_fftMag_mfcc_sma_de_2__centroid_numeric_IC11 | pcm | 0.01 | −0.11 | 0.78 | 0.75 |
| pcm_fftMag_mfcc_sma_de_3__peakDistStddev_numeric_IC11 | pcm | 0.01 | 0.12 | 0.25 | 0.25 |
| pcm_fftMag_mfcc_sma_de_3__centroid_numeric_IC11 | pcm | 0.83 | 0.00 | 0.80 | 0.25 |
| pcm_fftMag_mfcc_sma_de_6__kurtosis_numeric_IC11 | pcm | 0.01 | 0.10 | 0.21 | 0.75 |
| pcm_fftMag_mfcc_sma_de_6__centroid_numeric_IC11 | pcm | 0.26 | 0.02 | 0.81 | 0.25 |
| pcm_fftMag_mfcc_sma_de_7__quartile1_numeric_IC11 | pcm | 0.00 | 0.11 | 0.20 | 0.5 |
| pcm_fftMag_mfcc_sma_de_7__percentile99.0_numeric_IC11 | pcm | 0.01 | −0.09 | 0.16 | 0.25 |
| pcm_fftMag_mfcc_sma_de_7__centroid_numeric_IC11 | pcm | 0.79 | −0.03 | 0.80 | 0.5 |
| pcm_fftMag_mfcc_sma_de_9__centroid_numeric_IC11 | pcm | 0.46 | 0.00 | 0.79 | 0 |
| pcm_fftMag_mfcc_sma_de_10__centroid_numeric_IC11 | pcm | 0.70 | 0.04 | 0.81 | 0 |
| pcm_fftMag_mfcc_sma_de_11__centroid_numeric_IC11 | pcm | 0.84 | 0.01 | 0.81 | 0.25 |
| pcm_fftMag_mfcc_sma_de_12__centroid_numeric_IC11 | pcm | 0.09 | −0.01 | 0.79 | 0.25 |
| F0final_sma_lpc0_numeric_IC11 | F0final | 0.00 | −0.04 | 0.22 | 0.5 |
| jitterLocal_sma_quartile2_numeric_IC11 | jitterLocal | 0.15 | 0.07 | 0.27 | 0.75 |
| jitterDDP_sma_qregc1_numeric_IC11 | jitterDDP | 0.00 | −0.08 | 0.65 | 0.25 |
| F0final_sma_de_centroid_numeric_IC11 | F0final | 0.25 | −0.01 | 0.82 | 0 |
| voicingFinalUnclipped_sma_de_skewness_numeric_IC11 | voicingFinalUnclipped | 0.37 | 0.01 | 0.38 | 1 |
| voicingFinalUnclipped_sma_de_centroid_numeric_IC11 | voicingFinalUnclipped | 0.00 | 0.11 | 0.83 | 0.25 |
| jitterLocal_sma_de_centroid_numeric_IC11 | jitterLocal | 0.41 | 0.07 | 0.79 | 0 |
| jitterDDP_sma_de_centroid_numeric_IC11 | jitterDDP | 0.19 | 0.04 | 0.78 | 0 |
| shimmerLocal_sma_de_centroid_numeric_IC11 | shimmerLocal | 0.66 | 0.00 | 0.80 | 0 |
| pcm_fftMag_mfcc_sma_14__kurtosis_numeric_IC12 | pcm | 0.08 | 0.09 | 0.16 | 0.75 |
| pcm_fftMag_fband250_650_sma_de_minSegLen_numeric_IC12 | pcm | 0.00 | 0.12 | 0.31 | 0.75 |
| pcm_fftMag_spectralHarmonicity_sma_de_minSegLen_numeric_IC12 | pcm | 0.00 | 0.08 | 0.29 | 0.25 |
| F0final_sma_ff0_meanSegLen_numeric_IC12 | F0final | 0.01 | 0.01 | 0.32 | 0.25 |
| audSpec_Rfilt_sma_4__meanPeakDist_numeric_IC12 | audSpec | 0.00 | 0.12 | 0.41 | 0.25 |
| audSpec_Rfilt_sma_4__peakDistStddev_numeric_IC12 | audSpec | 0.00 | 0.10 | 0.38 | 0.25 |
| pcm_fftMag_spectralRollOff50.0_sma_peakDistStddev_numeric_IC12 | pcm | 0.01 | 0.06 | 0.25 | 0.5 |
| pcm_fftMag_mfcc_sma_2__peakMeanRel_numeric_IC12 | pcm | 0.01 | 0.04 | 0.77 | 0.25 |
| pcm_fftMag_mfcc_sma_4__peakMeanRel_numeric_IC12 | pcm | 0.91 | 0.01 | 0.76 | 0.25 |
| pcm_fftMag_mfcc_sma_5__peakMeanRel_numeric_IC12 | pcm | 0.63 | 0.03 | 0.79 | 0 |
| pcm_fftMag_mfcc_sma_5__centroid_numeric_IC12 | pcm | 0.91 | −0.01 | 0.80 | 0.25 |
| pcm_fftMag_mfcc_sma_6__peakMeanRel_numeric_IC12 | pcm | 0.89 | 0.01 | 0.79 | 0.5 |
| pcm_fftMag_mfcc_sma_6__centroid_numeric_IC12 | pcm | 0.05 | 0.00 | 0.78 | 0.5 |
| pcm_fftMag_mfcc_sma_7__centroid_numeric_IC12 | pcm | 0.80 | −0.04 | 0.78 | 0 |
| pcm_fftMag_mfcc_sma_8__peakMeanRel_numeric_IC12 | pcm | 0.80 | −0.04 | 0.79 | 0.5 |

TABLE 3-continued

Identification of 196 voice features useful for determining blood glucose levels.

| OpenSmile Voice-feature name | Audio-class | FDR | DropOut Score | ICC | Gini_c |
|---|---|---|---|---|---|
| pcm_fftMag_mfcc_sma_8___centroid_numeric_IC12 | pcm | 0.55 | 0.05 | 0.77 | 0 |
| pcm_fftMag_mfcc_sma_9___peakMeanRel_numeric_IC12 | pcm | 0.01 | −0.17 | 0.78 | 0.75 |
| pcm_fftMag_mfcc_sma_9___centroid_numeric_IC12 | pcm | 1.00 | −0.01 | 0.78 | 0.5 |
| pcm_fftMag_mfcc_sma_10___peakMeanRel_numeric_IC12 | pcm | 0.18 | 0.02 | 0.79 | 0.25 |
| pcm_fftMag_mfcc_sma_10___centroid_numeric_IC12 | pcm | 0.06 | −0.11 | 0.81 | 0 |
| pcm_fftMag_mfcc_sma_11___peakMeanRel_numeric_IC12 | pcm | 0.29 | 0.10 | 0.82 | 0 |
| pcm_fftMag_mfcc_sma_11___centroid_numeric_IC12 | pcm | 0.03 | 0.06 | 0.78 | 0.5 |
| pcm_fftMag_mfcc_sma_12___peakMeanRel_numeric_IC12 | pcm | 0.01 | 0.09 | 0.78 | 0.5 |
| pcm_fftMag_mfcc_sma_12___centroid_numeric_IC12 | pcm | 0.55 | 0.07 | 0.78 | 0 |
| pcm_fftMag_mfcc_sma_13___peakMeanRel_numeric_IC12 | pcm | 0.75 | 0.02 | 0.76 | 0 |
| pcm_fftMag_mfcc_sma_14___peakMeanRel_numeric_IC12 | pcm | 0.18 | −0.06 | 0.81 | 0.5 |
| pcm_fftMag_mfcc_sma_14___centroid_numeric_IC12 | pcm | 0.16 | 0.08 | 0.80 | 0.25 |
| pcm_RMSenergy_sma_de_posamean_numeric_IC12 | pcm | 0.01 | −0.12 | 0.20 | 0.25 |
| pcm_fftMag_mfcc_sma_de_7___posamean_numeric_IC12 | pcm | 0.00 | −0.14 | 0.21 | 0.25 |
| logHNR_sma_iqr2_3_numeric_IC13 | logHNR | 0.00 | 0.06 | 0.37 | 0.25 |
| F0final_sma_de_centroid_numeric_IC13 | F0final | 0.10 | 0.12 | 0.75 | 0.25 |
| F0final_sma_de_quartile3_numeric_IC13 | F0final | 0.00 | 0.09 | 0.19 | 0.25 |
| F0final_sma_de_iqr2_3_numeric_IC13 | F0final | 0.00 | 0.09 | 0.18 | 0.5 |
| voicingFinalUnclipped_sma_de_amean_numeric_IC13 | voicingFinalUnclipped | 0.72 | 0.01 | 0.47 | 0.75 |
| voicingFinalUnclipped_sma_de_centroid_numeric_IC13 | voicingFinalUnclipped | 0.61 | 0.01 | 0.82 | 0 |
| jitterLocal_sma_de_centroid_numeric_IC13 | jitterLocal | 0.98 | −0.01 | 0.78 | 0 |
| jitterDDP_sma_de_centroid_numeric_IC13 | jitterDDP | 0.01 | −0.01 | 0.76 | 0.75 |
| jitterDDP_sma_de_upleveltime90_numeric_IC13 | jitterDDP | 0.76 | 0.01 | 0.09 | 0.75 |
| logHNR_sma_de_flatness_numeric_IC13 | logHNR | 0.38 | −0.04 | 0.04 | 0.75 |
| logHNR_sma_de_centroid_numeric_IC13 | logHNR | 0.00 | −0.06 | 0.77 | 1 |
| audSpec_Rfilt_sma_4___meanPeakDist_numeric_IC13 | audSpec | 0.00 | 0.12 | 0.41 | 0.75 |
| audSpec_Rfilt_sma_4___peakDistStddev_numeric_IC13 | audSpec | 0.00 | 0.10 | 0.38 | 0 |
| pcm_fftMag_spectralRollOff50.0_sma_peakDistStddev_numeric_IC13 | pcm | 0.01 | 0.07 | 0.26 | 0.25 |
| pcm_fftMag_spectralFlux_sma_rqmean_numeric_IC13 | pcm | 0.13 | −0.03 | 0.20 | 0.75 |
| mfcc_sma_2___peakMeanRel_numeric_IC13 | mfcc | 0.02 | 0.03 | 0.76 | 0 |
| mfcc_sma_3___peakMeanRel_numeric_IC13 | mfcc | 0.48 | −0.07 | 0.75 | 0 |
| mfcc_sma_4___peakMeanRel_numeric_IC13 | mfcc | 0.65 | 0.06 | 0.78 | 0 |
| mfcc_sma_4___centroid_numeric_IC13 | mfcc | 0.49 | 0.06 | 0.75 | 0 |
| mfcc_sma_5___peakMeanRel_numeric_IC13 | mfcc | 0.52 | −0.06 | 0.77 | 0.5 |
| mfcc_sma_5___centroid_numeric_IC13 | mfcc | 0.89 | 0.02 | 0.78 | 0 |
| mfcc_sma_6___peakMeanRel_numeric_IC13 | mfcc | 0.02 | −0.11 | 0.80 | 0.5 |
| mfcc_sma_6___centroid_numeric_IC13 | mfcc | 0.03 | 0.15 | 0.81 | 0.25 |
| mfcc_sma_7___centroid_numeric_IC13 | mfcc | 0.72 | −0.06 | 0.76 | 0 |
| mfcc_sma_8___peakMeanRel_numeric_IC13 | mfcc | 0.14 | 0.04 | 0.82 | 0.5 |
| mfcc_sma_8___meanFallingSlope_numeric_IC13 | mfcc | 0.00 | −0.05 | 0.13 | 0 |
| mfcc_sma_8___centroid_numeric_IC13 | mfcc | 0.00 | −0.05 | 0.78 | 0.75 |
| mfcc_sma_9___peakMeanRel_numeric_IC13 | mfcc | 0.01 | −0.18 | 0.78 | 0.75 |
| mfcc_sma_9___centroid_numeric_IC13 | mfcc | 0.87 | 0.01 | 0.78 | 0 |
| mfcc_sma_10___peakMeanRel_numeric_IC13 | mfcc | 0.28 | 0.09 | 0.79 | 0 |
| mfcc_sma_10___centroid_numeric_IC13 | mfcc | 0.09 | −0.05 | 0.80 | 0.25 |
| mfcc_sma_11___peakMeanRel_numeric_IC13 | mfcc | 0.59 | 0.02 | 0.81 | 0.25 |
| mfcc_sma_11___centroid_numeric_IC13 | mfcc | 0.17 | 0.12 | 0.77 | 0.25 |
| mfcc_sma_12___peakMeanRel_numeric_IC13 | mfcc | 0.63 | −0.01 | 0.77 | 0 |
| mfcc_sma_12___centroid_numeric_IC13 | mfcc | 0.80 | −0.01 | 0.78 | 0.25 |
| mfcc_sma_13___peakMeanRel_numeric_IC13 | mfcc | 0.74 | 0.02 | 0.77 | 0.25 |
| mfcc_sma_14___peakMeanRel_numeric_IC13 | mfcc | 0.19 | −0.08 | 0.80 | 0.5 |
| mfcc_sma_14___centroid_numeric_IC13 | mfcc | 0.31 | 0.08 | 0.76 | 0 |
| audspec_lengthL1norm_sma_de_peakMeanRel_numeric_IC13 | audspec | 0.00 | −0.21 | 0.80 | 1 |
| audspecRasta_lengthL1norm_sma_de_peakMeanRel_numeric_IC13 | audspecRasta | 0.24 | −0.02 | 0.81 | 0.25 |
| pcm_RMSenergy_sma_de_posamean_numeric_IC13 | pcm | 0.01 | −0.12 | 0.20 | 0 |
| pcm_RMSenergy_sma_de_peakMeanRel_numeric_IC13 | pcm | 0.22 | 0.08 | 0.75 | 0 |
| audSpec_Rfilt_sma_de_0___peakMeanRel_numeric_IC13 | audSpec | 0.06 | 0.13 | 0.76 | 0.75 |
| audSpec_Rfilt_sma_de_1___peakMeanRel_numeric_IC13 | audSpec | 0.00 | −0.10 | 0.74 | 0.75 |
| audSpec_Rfilt_sma_de_2___peakMeanRel_numeric_IC13 | audSpec | 0.06 | 0.08 | 0.77 | 0.25 |
| audSpec_Rfilt_sma_de_3___peakMeanRel_numeric_IC13 | audSpec | 0.12 | 0.14 | 0.81 | 0 |
| audSpec_Rfilt_sma_de_4___peakMeanRel_numeric_IC13 | audSpec | 0.06 | −0.01 | 0.76 | 0.25 |
| audSpec_Rfilt_sma_de_7___peakMeanRel_numeric_IC13 | audSpec | 0.00 | −0.08 | 0.69 | 0.75 |
| audSpec_Rfilt_sma_de_9___peakMeanRel_numeric_IC13 | audSpec | 0.02 | −0.09 | 0.77 | 0.75 |
| audSpec_Rfilt_sma_de_11___peakMeanRel_numeric_IC13 | audSpec | 0.24 | 0.11 | 0.78 | 0.5 |
| audSpec_Rfilt_sma_de_12___peakMeanRel_numeric_IC13 | audSpec | 0.85 | −0.03 | 0.76 | 0 |
| audSpec_Rfilt_sma_de_13___peakMeanRel_numeric_IC13 | audSpec | 0.00 | −0.14 | 0.81 | 0 |
| audSpec_Rfilt_sma_de_14___peakMeanRel_numeric_IC13 | audSpec | 0.72 | −0.01 | 0.76 | 0.25 |
| audSpec_Rfilt_sma_de_15___peakMeanRel_numeric_IC13 | audSpec | 0.07 | −0.12 | 0.75 | 0.25 |
| audSpec_Rfilt_sma_de_16___peakMeanRel_numeric_IC13 | audSpec | 0.05 | −0.15 | 0.82 | 0.5 |
| audSpec_Rfilt_sma_de_17___peakMeanRel_numeric_IC13 | audSpec | 0.05 | −0.10 | 0.79 | 0 |
| audSpec_Rfilt_sma_de_19___peakMeanRel_numeric_IC13 | audSpec | 0.06 | 0.03 | 0.79 | 0.25 |
| audSpec_Rfilt_sma_de_20___peakMeanRel_numeric_IC13 | audSpec | 0.00 | −0.04 | 0.81 | 0 |
| audSpec_Rfilt_sma_de_21___peakMeanRel_numeric_IC13 | audSpec | 0.10 | 0.09 | 0.80 | 0.25 |
| audSpec_Rfilt_sma_de_22___peakMeanRel_numeric_IC13 | audSpec | 0.33 | 0.06 | 0.80 | 0.25 |
| audSpec_Rfilt_sma_de_23___peakMeanRel_numeric_IC13 | audSpec | 0.59 | −0.03 | 0.76 | 0.25 |

TABLE 3-continued

Identification of 196 voice features useful for determining blood glucose levels.

| OpenSmile Voice-feature name | Audio-class | FDR | DropOut Score | ICC | Gini_c |
|---|---|---|---|---|---|
| audSpec_Rfilt_sma_de_24___peakMeanRel_numeric_IC13 | audSpec | 0.16 | −0.07 | 0.80 | 0 |
| audSpec_Rfilt_sma_de_25___peakMeanRel_numeric_IC13 | audSpec | 0.77 | −0.04 | 0.80 | 0.25 |
| pcm_fftMag_fband250_650_sma_de_peakMeanRel_numeric_IC13 | pcm | 0.63 | 0.00 | 0.82 | 0.25 |
| pcm_fftMag_fband1000_4000_sma_de_peakMeanRel_numeric_IC13 | pcm | 0.56 | 0.08 | 0.79 | 0.25 |
| pcm_fftMag_spectralRollOff50.0_sma_de_peakMeanRel_numeric_IC13 | pcm | 0.01 | 0.06 | 0.63 | 0.25 |
| pcm_fftMag_spectralRollOff90.0_sma_de_peakMeanRel_numeric_IC13 | pcm | 0.03 | −0.09 | 0.81 | 0.5 |
| pcm_fftMag_spectralFlux_sma_de_peakMeanRel_numeric_IC13 | pcm | 0.57 | −0.04 | 0.80 | 0 |
| pcm_fftMag_spectralCentroid_sma_de_peakMeanRel_numeric_IC13 | pcm | 0.00 | 0.16 | 0.79 | 0.25 |
| pcm_fftMag_spectralEntropy_sma_de_peakMeanRel_numeric_IC13 | pcm | 0.88 | 0.04 | 0.82 | 0 |
| pcm_fftMag_spectralVariance_sma_de_peakMeanRel_numeric_IC13 | pcm | 0.01 | −0.13 | 0.77 | 0.25 |
| pcm_fftMag_spectralSkewness_sma_de_peakMeanRel_numeric_IC13 | pcm | 0.01 | 0.02 | 0.77 | 0.25 |
| pcm_fftMag_spectralKurtosis_sma_de_peakMeanRel_numeric_IC13 | pcm | 0.04 | 0.03 | 0.76 | 0.25 |
| pcm_fftMag_spectralSlope_sma_de_peakMeanRel_numeric_IC13 | pcm | 0.77 | 0.02 | 0.81 | 0 |
| pcm_fftMag_spectralHarmonicity_sma_de_peakMeanRel_numeric_IC13 | pcm | 0.25 | −0.03 | 0.81 | 0 |
| mfcc_sma_de_1___peakMeanRel_numeric_IC13 | mfcc | 0.88 | −0.02 | 0.78 | 0 |
| mfcc_sma_de_3___peakMeanRel_numeric_IC13 | mfcc | 0.84 | −0.03 | 0.78 | 0 |
| mfcc_sma_de_5___peakMeanRel_numeric_IC13 | mfcc | 0.51 | −0.07 | 0.79 | 0 |
| mfcc_sma_de_7___posamean_numeric_IC13 | mfcc | 0.00 | −0.14 | 0.20 | 0 |
| mfcc_sma_de_7___peakMeanRel_numeric_IC13 | mfcc | 0.41 | 0.08 | 0.81 | 0.25 |
| mfcc_sma_de_8___peakMeanRel_numeric_IC13 | mfcc | 0.19 | 0.05 | 0.77 | 0 |
| mfcc_sma_de_9___peakMeanRel_numeric_IC13 | mfcc | 0.55 | −0.01 | 0.77 | 0.5 |
| mfcc_sma_de_10___peakMeanRel_numeric_IC13 | mfcc | 0.74 | −0.03 | 0.79 | 0 |
| mfcc_sma_de_11___peakMeanRel_numeric_IC13 | mfcc | 0.85 | −0.03 | 0.79 | 0.25 |
| mfcc_sma_de_12___peakMeanRel_numeric_IC13 | mfcc | 0.04 | 0.14 | 0.78 | 0.75 |
| mfcc_sma_de_14___peakMeanRel_numeric_IC13 | mfcc | 0.35 | 0.00 | 0.83 | 0 |

TABLE 4

Preferred subset of voice biomarkers from Table 3

| Voice-feature (description) | Voice-feature (openSmile name) | Audio-class | FDR | ICC | Gini_c |
|---|---|---|---|---|---|
| Relative mean of peak difference of auditory spectrum | audspec_lengthL1norm_sma_de_peakMeanRel_numeric_IC13 | audspec | 0.001 | 0.803 | 1.000 |
| Mean of peak distance of 4th auditory spectrum (RASTA-style filt) | audSpec_Rfilt_sma_4___meanPeakDist_numeric_IC13 | audSpec | 0.000 | 0.413 | 0.750 |
| Centroid difference of auditory spectrum 0 (RASTA-style filt) | audSpec_Rfilt_sma_de_0___centroid_numeric_IC11 | audSpec | 0.003 | 0.784 | 0.250 |
| Relative mean of peak difference of auditory spectrum 0 (RASTA-style filt) | audSpec_Rfilt_sma_de_0___peakMeanRel_numeric_IC13 | audSpec | 0.058 | 0.757 | 0.750 |
| Centroid difference of auditory spectrum 1 (RASTA-style filt) | audSpec_Rfilt_sma_de_1___centroid_numeric_IC11 | audSpec | 0.000 | 0.764 | 0.750 |
| Minimum segment length difference of auditory spectrum 1 (RASTA-style filt) | audSpec_Rfilt_sma_de_1___minSegLen_numeric_IC11 | audSpec | 0.003 | 0.271 | 0.750 |
| Relative mean of peak difference of auditory spectrum 1 (RASTA-style filt) | audSpec_Rfilt_sma_de_1___peakMeanRel_numeric_IC13 | audSpec | 0.001 | 0.735 | 0.750 |
| Relative mean of peak difference of auditory spectrum 13 (RASTA-style filt) | audSpec_Rfilt_sma_de_13___peakMeanRel_numeric_IC13 | audSpec | 0.003 | 0.814 | 0.000 |
| Relative mean of peak difference of auditory spectrum 20 (RASTA-style filt) | audSpec_Rfilt_sma_de_20___peakMeanRel_numeric_IC13 | audSpec | 0.002 | 0.806 | 0.000 |
| Relative mean of peak difference of auditory spectrum 7 (RASTA-style filt) | audSpec_Rfilt_sma_de_7___peakMeanRel_numeric_IC13 | audSpec | 0.001 | 0.686 | 0.750 |

TABLE 4-continued

Preferred subset of voice biomarkers from Table 3

| Voice-feature (description) | Voice-feature (openSmile name) | Audio-class | FDR | ICC | Gini_c |
|---|---|---|---|---|---|
| Relative mean of peak difference of auditory spectrum 9 (RASTA-style filt) | audSpec_Rfilt_sma_de_9___peakMeanRel_numeric_IC13 | audSpec | 0.016 | 0.771 | 0.750 |
| Centroid difference of jitter of the jitter | jitterDDP_sma_de_centroid_numeric_IC13 | jitterDDP | 0.012 | 0.764 | 0.750 |
| Centroid difference of log scaled harmonics to noise ratio | logHNR_sma_de_centroid_numeric_IC13 | logHNR | 0.003 | 0.765 | 1.000 |
| Centroid of 8th mel-frequency ceptstral coefficient | mfcc_sma_8___centroid_numeric_IC13 | mfcc | 0.002 | 0.783 | 0.750 |
| Relative mean of peak of 9th mel-frequency cepstral coefficient | mfcc_sma_9___peakMeanRel_numeric_IC13 | mfcc | 0.012 | 0.781 | 0.750 |
| Relative mean of peak of 12th mel-frequency cepstral coefficient | mfcc_sma_de_12___peakMeanRel_numeric_IC13 | mfcc | 0.044 | 0.781 | 0.750 |
| Centroid difference of FFT magnitude of fband 25-650 Hz | pcm_fftMag_fband25_650_sma_de_centroid_numeric_IC11 | pcm | 0.011 | 0.812 | 1.000 |
| Minimum segment length difference of FFT magnitude of fband 250-650 Hz | pcm_fftMag_fband250_650_sma_de_minSegLen_numeric_IC12 | pcm | 0.003 | 0.308 | 0.750 |
| Relative mean of peak difference of FFt magnitude of 12th mel-frequency cepstral coefficient | pcm_fftMag_mfcc_sma_12___peakMeanRel_numeric_IC12 | pcm | 0.008 | 0.780 | 0.500 |
| Centroid difference of FFT magnitude of 8th mel-frequency cepstral coefficient | pcm_fftMag_mfcc_sma_8___centroid_numeric_IC11 | pcm | 0.000 | 0.731 | 0.750 |
| Relative mean of peak difference of FFT magnitude of 9th mel-frequency cepstral coefficient | pcm_fftMag_mfcc_sma_9___peakMeanRel_numeric_IC12 | pcm | 0.007 | 0.775 | 0.750 |
| Centroid difference of FFT magnitude of 2nd mel-frequency cepstral coefficient | pcm_fftMag_mfcc_sma_de_2___centroid_numeric_IC11 | pcm | 0.014 | 0.780 | 0.750 |
| Kurtosis difference of FFT magnitude of 6th mel-frequency cepstral coefficient | pcm_fftMag_mfcc_sma_de_6___kurtosis_numeric_IC11 | pcm | 0.007 | 0.206 | 0.750 |
| Relative mean of peak difference of FFT magnitude of spectral centroid | pcm_fftMag_spectralCentroid_sma_de_peakMeanRel_numeric_IC13 | pcm | 0.001 | 0.789 | 0.250 |
| Centroid difference of FFT magnitude of spectral kurtosis | pcm_fftMag_spectralKurtosis_sma_de_centroid_numeric_IC11 | pcm | 0.120 | 0.804 | 0.750 |
| Centroid difference of FFT magnitude of spectral roll-off points 90% | pcm_fftMag_spectralRollOff90.0_sma_de_centroid_numeric_IC11 | pcm | 0.001 | 0.801 | 0.500 |
| Centroid difference of FFT magnitude of spectral skewness | pcm_fftMag_spectralSkewness_sma_de_centroid_numeric_IC11 | pcm | 0.655 | 0.803 | 0.750 |
| Relative mean of peak difference of FFT magnitude of spectral skewness | pcm_fftMag_spectralSkewness_sma_de_peakMeanRel_numeric_IC13 | pcm | 0.007 | 0.768 | 0.250 |
| Relative mean of peak difference of FFT magnitude of spectral variance | pcm_fftMag_spectralVariance_sma_de_peakMeanRel_numeric_IC13 | pcm | 0.005 | 0.774 | 0.250 |

TABLE 4-continued

Preferred subset of voice biomarkers from Table 3

| Voice-feature (description) | Voice-feature (openSmile name) | Audio-class | FDR | ICC | Gini_c |
|---|---|---|---|---|---|
| Centroid difference of voice probability of the final fundamental frequency candidate | voicingFinalUnclipped_sma_de_centroid_numeric_IC11 | voicingFinalUnclipped | 0.002 | 0.828 | 0.250 |

TABLE 6

Identification of Tier 1, Tier 2 and Tier 3 voice features useful for determining blood glucose levels based on the cohort of 154 subjects in Example 2.

| OpenSmile Voice-feature name | Audio-class | FDR | DropOut Score | ICC | Gini_c | Tier |
|---|---|---|---|---|---|---|
| pcm_loudness_sma_quartile3_IC10 | pcm | 0 | 0.04 | 0.63 | 0.97 | 1, 3 |
| mfcc_sma[0]_percentile1.0_IC10 | mfcc | 0 | 0.08 | 0.85 | 1 | 2, 3 |
| mfcc_sma[0]_pctlrange0-1_IC10 | mfcc | 0 | −0.06 | 0.85 | 1 | 2, 3 |
| mfcc_sma[8]_quartile3_IC10 | mfcc | 0 | 0.02 | 0.54 | 0.46 | 2, 3 |
| mfcc_sma[9]_upleveltime75_IC10 | mfcc | 0 | 0.01 | 0.23 | 0.97 | 1, 3 |
| mfcc_sma[10]_amean_IC10 | mfcc | 0 | 0.01 | 0.43 | 0.38 | 2, 3 |
| mfcc_sma[10]_linregc2_IC10 | mfcc | 0 | 0.02 | 0.36 | 0.42 | 2, 3 |
| mfcc_sma[10]_quartile1_IC10 | mfcc | 0 | 0.01 | 0.42 | 0.4 | 2, 3 |
| mfcc_sma[10]_quartile2_IC10 | mfcc | 0 | 0.01 | 0.41 | 0.32 | 2, 3 |
| mfcc_sma[10]_quartile3_IC10 | mfcc | 0 | 0.01 | 0.41 | 0.46 | 2, 3 |
| logMelFreqBand_sma[0]_percentile1.0_IC10 | logMelFreqBand | 0 | 0.09 | 0.88 | 0.99 | 2, 3 |
| logMelFreqBand_sma[0]_pctlrange0-1_IC10 | logMelFreqBand | 0 | −0.07 | 0.88 | 0.95 | 2, 3 |
| logMelFreqBand_sma[1]_linregc2_IC10 | logMelFreqBand | 0 | 0.05 | 0.58 | 0.18 | 2, 3 |
| logMelFreqBand_sma[1]_quartile2_IC10 | logMelFreqBand | 0 | 0.04 | 0.47 | 0.45 | 2, 3 |
| logMelFreqBand_sma[1]_percentile1.0_IC10 | logMelFreqBand | 0 | 0.08 | 0.87 | 0.99 | 2, 3 |
| logMelFreqBand_sma[1]_pctlrange0-1_IC10 | logMelFreqBand | 0 | −0.06 | 0.87 | 0.96 | 2, 3 |
| logMelFreqBand_sma[2]_percentile1.0_IC10 | logMelFreqBand | 0 | 0.08 | 0.87 | 0.99 | 2, 3 |
| logMelFreqBand_sma[2]_pctlrange0-1_IC10 | logMelFreqBand | 0 | −0.05 | 0.87 | 0.99 | 2, 3 |
| logMelFreqBand_sma[3]_linregc2_IC10 | logMelFreqBand | 0 | 0.05 | 0.61 | 0.23 | 2, 3 |
| logMelFreqBand_sma[3]_percentile1.0_IC10 | logMelFreqBand | 0 | 0.07 | 0.87 | 0.98 | 2, 3 |
| logMelFreqBand_sma[3]_pctlrange0-1_IC10 | logMelFreqBand | 0 | −0.05 | 0.86 | 1 | 2, 3 |
| logMelFreqBand_sma[3]_upleveltime75_IC10 | logMelFreqBand | 0 | −0.05 | 0.75 | 0.99 | 2, 3 |
| logMelFreqBand_sma[4]_percentile1.0_IC10 | logMelFreqBand | 0 | 0.06 | 0.86 | 0.99 | 2, 3 |
| logMelFreqBand_sma[4]_pctlrange0-1_IC10 | logMelFreqBand | 0 | −0.05 | 0.86 | 1 | 2, 3 |
| logMelFreqBand_sma[5]_percentile1.0_IC10 | logMelFreqBand | 0 | 0.05 | 0.86 | 0.99 | 2, 3 |
| logMelFreqBand_sma[5]_pctlrange0-1_IC10 | logMelFreqBand | 0.01 | −0.04 | 0.85 | 1 | 2, 3 |
| logMelFreqBand_sma[6]_percentile1.0_IC10 | logMelFreqBand | 0 | 0.04 | 0.86 | 0.99 | 2, 3 |
| logMelFreqBand_sma[7]_linregc1_IC10 | logMelFreqBand | 0 | −0.02 | 0.65 | 0.5 | 2, 3 |
| logMelFreqBand_sma_de[4]_skewness_IC10 | logMelFreqBand | 0 | −0.04 | 0.75 | 0.88 | 1, 3 |
| logMelFreqBand_sma_de[5]_skewness_IC10 | logMelFreqBand | 0 | −0.03 | 0.75 | 0.91 | 2, 3 |
| logMelFreqBand_sma_de[7]_skewness_IC10 | logMelFreqBand | 0 | −0.05 | 0.75 | 0.65 | 2, 3 |
| logMelFreqBand_sma_de[7]_upleveltime75_IC10 | logMelFreqBand | 0 | 0.03 | 0.42 | 0.43 | 2, 3 |
| logMelFreqBand_sma_de[7]_upleveltime90_IC10 | logMelFreqBand | 0 | 0.03 | 0.3 | 0.05 | 2, 3 |
| lspFreq_sma_de[5]_linregc2_IC10 | lspFreq | 0 | 0.03 | 0.75 | 0.51 | 2, 3 |
| F0final_sma_quartile2_IC10 | F0final | 0 | 0.05 | 0.79 | 0.54 | 2, 3 |
| F0final_sma_de_linregc1_IC10 | F0final | 0 | −0.01 | 0.06 | 1 | 1, 3 |
| audspecRasta_lengthL1norm_sma_lpc1_IC11 | audspecRasta | 0 | −0.03 | 0.75 | 1 | 2, 3 |
| pcm_RMSenergy_sma_quartile2_IC11 | pcm | 0 | 0.03 | 0.55 | 0.47 | 2, 3 |
| pcm_RMSenergy_sma_meanPeakDist_IC11 | pcm | 0 | −0.01 | 0.16 | 0.36 | 2, 3 |
| pcm_zcr_sma_iqr1-3_IC11 | pcm | 0 | −0.02 | 0.21 | 0.47 | 2, 3 |
| pcm_zcr_sma_percentile99.0_IC11 | pcm | 0 | −0.09 | 0.84 | 0.99 | 2, 3 |
| pcm_zcr_sma_pctlrange0-1_IC11 | pcm | 0 | −0.09 | 0.85 | 0.98 | 2, 3 |
| pcm_zcr_sma_amean_IC11 | pcm | 0 | −0.02 | 0.33 | 0 | 2, 3 |
| pcm_zcr_sma_stddev_IC11 | pcm | 0 | −0.05 | 0.76 | 0.95 | 2, 3 |
| pcm_zcr_sma_lpgain_IC11 | pcm | 0 | −0.01 | 0.79 | 0.99 | 2, 3 |
| pcm_RMSenergy_sma_de_linregc1_IC11 | pcm | 0 | −0.04 | 0.47 | 0.88 | 1, 3 |
| pcm_zcr_sma_de_amean_IC11 | pcm | 0.01 | −0.01 | 0.79 | 0.74 | 2, 3 |
| pcm_zcr_sma_de_stddev_IC11 | pcm | 0.01 | 0 | 0.79 | 0.99 | 2, 3 |
| pcm_zcr_sma_de_skewness_IC11 | pcm | 0 | −0.02 | 0.8 | 0.98 | 2, 3 |
| pcm_zcr_sma_de_lpc0_IC11 | pcm | 0 | 0.05 | 0.77 | 0.97 | 2, 3 |
| audSpec_Rfilt_sma[0]_segLenStddev_IC11 | audSpec | 0 | −0.01 | 0.29 | 0.26 | 2, 3 |
| audSpec_Rfilt_sma[3]_segLenStddev_IC11 | audSpec | 0 | −0.01 | 0.32 | 0.48 | 2, 3 |
| audSpec_Rfilt_sma[4]_segLenStddev_IC11 | audSpec | 0 | −0.01 | 0.27 | 0.45 | 2, 3 |
| audSpec_Rfilt_sma[8]_segLenStddev_IC11 | audSpec | 0 | −0.01 | 0.11 | 0.33 | 2, 3 |
| audSpec_Rfilt_sma[9]_segLenStddev_IC11 | audSpec | 0 | 0 | 0.13 | 0.4 | 2, 3 |
| audSpec_Rfilt_sma[10]_segLenStddev_IC11 | audSpec | 0 | 0 | 0.12 | 0.24 | 2, 3 |
| audSpec_Rfilt_sma[11]_segLenStddev_IC11 | audSpec | 0 | 0 | 0.14 | 0.17 | 2, 3 |
| audSpec_Rfilt_sma[12]_segLenStddev_IC11 | audSpec | 0 | 0 | 0.13 | 0.24 | 2, 3 |

TABLE 6-continued

Identification of Tier 1, Tier 2 and Tier 3 voice features useful for determining
blood glucose levels based on the cohort of 154 subjects in Example 2.

| OpenSmile Voice-feature name | Audio-class | FDR | DropOut Score | ICC | Gini_c | Tier |
|---|---|---|---|---|---|---|
| audSpec_Rfilt_sma[14]_segLenStddev_IC11 | audSpec | 0 | 0 | 0.13 | 0.25 | 2, 3 |
| pcm_fftMag_fband25-650_sma_iqr1-2_IC11 | pcm | 0 | 0.02 | 0.47 | 0.42 | 2, 3 |
| pcm_fftMag_spectralRollOff25.0_sma_centroid_IC11 | pcm | 0 | 0.08 | 0.63 | 0.05 | 2, 3 |
| pcm_fftMag_spectralRollOff50.0_sma_stddev_IC11 | pcm | 0 | −0.06 | 0.65 | 0.3 | 2, 3 |
| pcm_fftMag_spectralRollOff50.0_sma_centroid_IC11 | pcm | 0 | 0.08 | 0.6 | 0.26 | 2, 3 |
| pcm_fftMag_spectralRollOff75.0_sma_centroid_IC11 | pcm | 0 | 0.07 | 0.55 | 0.14 | 2, 3 |
| pcm_fftMag_spectralRollOff90.0_sma_qregerrQ_IC11 | pcm | 0 | −0.06 | 0.52 | 0.12 | 2, 3 |
| pcm_fftMag_spectralEntropy_sma_percentile99.0_IC11 | pcm | 0 | −0.01 | 0.77 | 0.84 | 2, 3 |
| pcm_fftMag_spectralEntropy_sma_pctlrange0-1_IC11 | pcm | 0 | −0.01 | 0.77 | 0.98 | 2, 3 |
| pcm_fftMag_spectralVariance_sma_quartile2_IC11 | pcm | 0 | −0.02 | 0.48 | 0.32 | 2, 3 |
| pcm_fftMag_spectralVariance_sma_quartile3_IC11 | pcm | 0 | −0.04 | 0.45 | 0.26 | 2, 3 |
| pcm_fftMag_spectralVariance_sma_iqr1-2_IC11 | pcm | 0 | −0.03 | 0.63 | 0.4 | 2, 3 |
| pcm_fftMag_spectralVariance_sma_amean_IC11 | pcm | 0 | −0.03 | 0.51 | 0 | 2, 3 |
| pcm_fftMag_spectralSkewness_sma_lpc0_IC11 | pcm | 0 | −0.01 | 0.42 | 0.41 | 2, 3 |
| pcm_fftMag_spectralSkewness_sma_lpc3_IC11 | pcm | 0 | −0.02 | 0.25 | 0.31 | 2, 3 |
| pcm_fftMag_spectralKurtosis_sma_kurtosis_IC11 | pcm | 0 | −0.01 | 0.22 | 0.46 | 2, 3 |
| pcm_fftMag_spectralKurtosis_sma_lpc0_IC11 | pcm | 0 | −0.02 | 0.35 | 0.33 | 2, 3 |
| pcm_fftMag_mfcc_sma[1]_meanPeakDist_IC11 | pcm | 0 | −0.01 | 0.27 | 0.99 | 1, 3 |
| pcm_fftMag_mfcc_sma[10]_quartile1_IC11 | pcm | 0 | 0.01 | 0.44 | 0.34 | 2, 3 |
| pcm_fftMag_mfcc_sma[10]_quartile2_IC11 | pcm | 0 | 0.01 | 0.41 | 0.42 | 2, 3 |
| audSpec_Rfilt_sma_de[6]_peakDistStddev_IC11 | audSpec | 0 | −0.01 | 0.18 | 0.99 | 1, 3 |
| audSpec_Rfilt_sma_de[14]_meanPeakDist_IC11 | audSpec | 0 | −0.01 | 0.47 | 1 | 1, 3 |
| audSpec_Rfilt_sma_de[15]_amean_IC11 | audSpec | 0 | −0.01 | 0.06 | 1 | 1, 3 |
| pcm_fftMag_fband25-650_sma_de_linregc1_IC11 | pcm | 0 | −0.01 | 0.41 | 0.87 | 1, 3 |
| pcm_fftMag_spectralVariance_sma_de_iqr1-3_IC11 | pcm | 0 | −0.02 | 0.48 | 0.31 | 2, 3 |
| pcm_fftMag_spectralVariance_sma_de_amean_IC11 | pcm | 0 | −0.02 | 0.32 | 0.41 | 2, 3 |
| pcm_fftMag_spectralVariance_sma_de_qregc2_IC11 | pcm | 0 | 0.03 | 0.28 | 0.38 | 2, 3 |
| pcm_fftMag_spectralSkewness_sma_de_amean_IC11 | pcm | 0 | 0.02 | 0.36 | 0.33 | 2, 3 |
| pcm_fftMag_spectralSkewness_sma_de_skewness_IC11 | pcm | 0 | 0.04 | 0.36 | 0.16 | 2, 3 |
| pcm_fftMag_spectralSkewness_sma_de_qregc2_IC11 | pcm | 0 | −0.02 | 0.4 | 0.44 | 2, 3 |
| pcm_fftMag_spectralKurtosis_sma_de_amean_IC11 | pcm | 0 | 0.02 | 0.28 | 0.21 | 2, 3 |
| pcm_fftMag_spectralKurtosis_sma_de_skewness_IC11 | pcm | 0 | 0.03 | 0.45 | 0.12 | 2, 3 |
| pcm_fftMag_spectralKurtosis_sma_de_qregc2_IC11 | pcm | 0 | −0.02 | 0.33 | 0.37 | 2, 3 |
| pcm_fftMag_spectralSlope_sma_de_linregc1_IC11 | pcm | 0 | 0.01 | 0.4 | 0.97 | 1, 3 |
| pcm_fftMag_mfcc_sma_de[7]_quartile1_IC11 | pcm | 0 | 0 | 0.34 | 1 | 1, 3 |
| pcm_fftMag_mfcc_sma_de[7]_percentile99.0_IC11 | pcm | 0 | 0 | 0.32 | 1 | 1, 3 |
| F0final_sma_quartile2_IC11 | F0final | 0 | 0.05 | 0.8 | 0.43 | 2, 3 |
| F0final_sma_lpc0_IC11 | F0final | 0 | −0.03 | 0.22 | 1 | 1, 3 |
| jitterLocal_sma_quartile2_IC11 | jitterLocal | 0 | −0.01 | 0.32 | 0.93 | 1, 3 |
| voicingFinalUnclipped_sma_de_skewness_IC11 | voicingFinalUnclipped | 0 | −0.02 | 0.38 | 0.87 | 1, 3 |
| voicingFinalUnclipped_sma_de_centroid_IC11 | voicingFinalUnclipped | 0 | 0 | 0.02 | 1 | 1, 3 |
| pcm_zcr_sma_range_IC12 | pcm | 0 | −0.08 | 0.88 | 0.98 | 2, 3 |
| pcm_zcr_sma_de_range_IC12 | pcm | 0 | −0.01 | 0.82 | 0.96 | 2, 3 |
| pcm_fftMag_spectralSkewness_sma_de_upleveltime50_IC12 | pcm | 0 | −0.07 | 0.11 | 0.39 | 2, 3 |
| pcm_fftMag_spectralKurtosis_sma_de_upleveltime50_IC12 | pcm | 0 | −0.07 | 0.06 | 0.42 | 2, 3 |
| pcm_fftMag_spectralKurtosis_sma_de_downleveltime50_IC12 | pcm | 0 | 0.07 | 0.06 | 0.19 | 2, 3 |
| pcm_fftMag_spectralKurtosis_sma_de_upleveltime75_IC12 | pcm | 0 | −0.09 | 0.63 | 0.29 | 2, 3 |
| pcm_fftMag_spectralKurtosis_sma_de_downleveltime75_IC12 | pcm | 0 | 0.09 | 0.63 | 0.41 | 2, 3 |
| pcm_fftMag_psySharpness_sma_de_range_IC12 | pcm | 0 | −0.1 | 0.78 | 0.95 | 2, 3 |
| pcm_fftMag_spectralHarmonicity_sma_de_quartile3_IC12 | pcm | 0 | 0.02 | 0.43 | 0.47 | 2, 3 |
| F0final_sma_quartile1_IC12 | F0final | 0 | 0.04 | 0.71 | 0.29 | 2, 3 |
| F0final_sma_quartile2_IC12 | F0final | 0 | 0.04 | 0.82 | 0.4 | 2, 3 |
| F0final_sma_quartile3_IC12 | F0final | 0 | 0.03 | 0.77 | 0.44 | 2, 3 |
| F0final_sma_ff0_meanSegLen_IC12 | F0final | 0 | 0 | 0.26 | 1 | 1, 3 |
| audspec_lengthL1norm_sma_meanPeakDist_IC12 | audspec | 0 | −0.01 | 0.29 | 0.28 | 2, 3 |
| pcm_RMSenergy_sma_flatness_IC12 | pcm | 0 | 0.01 | 0.38 | 0.42 | 2, 3 |
| pcm_RMSenergy_sma_peakDistStddev_IC12 | pcm | 0 | 0 | 0.05 | 0.21 | 2, 3 |
| pcm_zcr_sma_amean_IC12 | pcm | 0 | −0.02 | 0.33 | 0 | 2, 3 |
| pcm_zcr_sma_peakRangeRel_IC12 | pcm | 0 | 0 | 0.79 | 0.99 | 2, 3 |
| pcm_zcr_sma_qregc3_IC12 | pcm | 0 | −0.06 | 0.78 | 0.77 | 2, 3 |
| audSpec_Rfilt_sma[0]_flatness_IC12 | audSpec | 0 | 0.04 | 0.88 | 1 | 2, 3 |
| audSpec_Rfilt_sma[0]_centroid_IC12 | audSpec | 0.01 | 0.01 | 0.88 | 1 | 2, 3 |
| pcm_fftMag_spectralRollOff25.0_sma_linregc2_IC12 | pcm | 0 | −0.04 | 0.55 | 0.47 | 2, 3 |
| pcm_fftMag_spectralRollOff25.0_sma_centroid_IC12 | pcm | 0 | 0.08 | 0.63 | 0.02 | 2, 3 |
| pcm_fftMag_spectralRollOff50.0_sma_linregc2_IC12 | pcm | 0 | −0.05 | 0.58 | 0.31 | 2, 3 |
| pcm_fftMag_spectralRollOff75.0_sma_amean_IC12 | pcm | 0 | −0.04 | 0.49 | 0.13 | 2, 3 |
| pcm_fftMag_spectralRollOff75.0_sma_rqmean_IC12 | pcm | 0 | −0.07 | 0.61 | 0.07 | 2, 3 |
| pcm_fftMag_spectralRollOff75.0_sma_linregc2_IC12 | pcm | 0 | −0.08 | 0.58 | 0.27 | 2, 3 |
| pcm_fftMag_spectralRollOff75.0_sma_qregc2_IC12 | pcm | 0 | 0.07 | 0.62 | 0.44 | 2, 3 |
| pcm_fftMag_spectralRollOff90.0_sma_amean_IC12 | pcm | 0 | −0.04 | 0.53 | 0.11 | 2, 3 |
| pcm_fftMag_spectralRollOff90.0_sma_flatness_IC12 | pcm | 0 | 0.14 | 0.59 | 0.12 | 2, 3 |
| pcm_fftMag_spectralRollOff90.0_sma_rqmean_IC12 | pcm | 0 | −0.07 | 0.6 | 0 | 2, 3 |
| pcm_fftMag_spectralRollOff90.0_sma_linregc2_IC12 | pcm | 0 | −0.07 | 0.54 | 0.01 | 2, 3 |
| pcm_fftMag_spectralRollOff90.0_sma_linregerrQ_IC12 | pcm | 0 | −0.07 | 0.52 | 0.12 | 2, 3 |

TABLE 6-continued

Identification of Tier 1, Tier 2 and Tier 3 voice features useful for determining
blood glucose levels based on the cohort of 154 subjects in Example 2.

| OpenSmile Voice-feature name | Audio-class | FDR | DropOut Score | ICC | Gini_c | Tier |
|---|---|---|---|---|---|---|
| pcm_fftMag_spectralRollOff90.0_sma_qregc3_IC12 | pcm | 0 | −0.11 | 0.61 | 0 | 2, 3 |
| pcm_fftMag_spectralRollOff90.0_sma_qregerrQ_IC12 | pcm | 0 | −0.06 | 0.52 | 0.15 | 2, 3 |
| pcm_fftMag_spectralEntropy_sma_peakMeanAbs_IC12 | pcm | 0 | 0 | 0.77 | 0.77 | 2, 3 |
| pcm_fftMag_spectralEntropy_sma_peakMeanMeanDist_IC12 | pcm | 0 | 0 | 0.77 | 0.94 | 2, 3 |
| pcm_fftMag_spectralEntropy_sma_peakMeanRel_IC12 | pcm | 0 | 0 | 0.77 | 0.97 | 2, 3 |
| pcm_fftMag_spectralEntropy_sma_meanRisingSlope_IC12 | pcm | 0 | −0.01 | 0.76 | 0.95 | 2, 3 |
| pcm_fftMag_spectralEntropy_sma_stddevRisingSlope_IC12 | pcm | 0 | −0.01 | 0.77 | 0.93 | 2, 3 |
| pcm_fftMag_spectralVariance_sma_amean_IC12 | pcm | 0 | −0.03 | 0.52 | 0.01 | 2, 3 |
| pcm_fftMag_spectralVariance_sma_rqmean_IC12 | pcm | 0 | −0.05 | 0.56 | 0.37 | 2, 3 |
| pcm_fftMag_spectralVariance_sma_peakRangeAbs_IC12 | pcm | 0 | −0.11 | 0.54 | 0.2 | 2, 3 |
| pcm_fftMag_spectralVariance_sma_linregerrQ_IC12 | pcm | 0 | −0.04 | 0.39 | 0.32 | 2, 3 |
| pcm_fftMag_spectralVariance_sma_qregc3_IC12 | pcm | 0 | −0.07 | 0.58 | 0.14 | 2, 3 |
| pcm_fftMag_spectralVariance_sma_qregerrQ_IC12 | pcm | 0 | −0.03 | 0.4 | 0.18 | 2, 3 |
| pcm_fftMag_spectralSkewness_sma_peakRangeRel_IC12 | pcm | 0 | 0.06 | 0.29 | 0.49 | 2, 3 |
| pcm_fftMag_psySharpness_sma_amean_IC12 | pcm | 0 | −0.05 | 0.52 | 0.09 | 2, 3 |
| pcm_fftMag_psySharpness_sma_flatness_IC12 | pcm | 0 | 0.01 | 0.32 | 0.46 | 2, 3 |
| pcm_fftMag_psySharpness_sma_rqmean_IC12 | pcm | 0 | −0.08 | 0.62 | 0.04 | 2, 3 |
| pcm_fftMag_mfcc_sma[1]_qregc3_IC12 | pcm | 0 | 0.1 | 0.48 | 0.01 | 2, 3 |
| pcm_fftMag_mfcc_sma[6]_qregc1_IC12 | pcm | 0 | 0.03 | 0.4 | 0.4 | 2, 3 |
| pcm_fftMag_mfcc_sma[8]_qregc3_IC12 | pcm | 0 | 0.04 | 0.42 | 0.34 | 2, 3 |
| pcm_fftMag_mfcc_sma[10]_qregc3_IC12 | pcm | 0 | 0.02 | 0.28 | 0.44 | 2, 3 |
| pcm_fftMag_mfcc_sma[10]_centroid_IC12 | pcm | 0.06 | 0 | 0.86 | 1 | 1, 3 |
| audspecRasta_lengthL1norm_sma_de_flatness_IC12 | audspecRasta | 0 | 0.04 | 0.83 | 1 | 2, 3 |
| pcm_RMSenergy_sma_de_posamean_IC12 | pcm | 0 | 0.07 | 0.59 | 0.98 | 1, 3 |
| pcm_zcr_sma_de_rqmean_IC12 | pcm | 0.01 | 0 | 0.79 | 0.99 | 2, 3 |
| audSpec_Rfilt_sma_de[0]_flatness_IC12 | audSpec | 0 | 0.04 | 0.85 | 0.99 | 2, 3 |
| audSpec_Rfilt_sma_de[1]_flatness_IC12 | audSpec | 0 | 0.03 | 0.85 | 1 | 2, 3 |
| audSpec_Rfilt_sma_de[2]_flatness_IC12 | audSpec | 0 | 0.05 | 0.85 | 1 | 2, 3 |
| audSpec_Rfilt_sma_de[3]_flatness_IC12 | audSpec | 0 | 0.05 | 0.85 | 0.99 | 2, 3 |
| audSpec_Rfilt_sma_de[4]_flatness_IC12 | audSpec | 0 | 0.05 | 0.84 | 0.99 | 2, 3 |
| audSpec_Rfilt_sma_de[5]_flatness_IC12 | audSpec | 0 | 0.06 | 0.82 | 0.98 | 2, 3 |
| audSpec_Rfilt_sma_de[6]_flatness_IC12 | audSpec | 0 | 0.03 | 0.82 | 1 | 2, 3 |
| audSpec_Rfilt_sma_de[7]_flatness_IC12 | audSpec | 0 | 0.03 | 0.83 | 1 | 2, 3 |
| audSpec_Rfilt_sma_de[8]_flatness_IC12 | audSpec | 0 | 0.05 | 0.83 | 0.98 | 2, 3 |
| audSpec_Rfilt_sma_de[9]_flatness_IC12 | audSpec | 0 | 0.05 | 0.83 | 0.95 | 2, 3 |
| audSpec_Rfilt_sma_de[10]_flatness_IC12 | audSpec | 0 | 0.05 | 0.82 | 0.89 | 2, 3 |
| audSpec_Rfilt_sma_de[11]_flatness_IC12 | audSpec | 0 | 0.04 | 0.81 | 0.98 | 2, 3 |
| audSpec_Rfilt_sma_de[12]_flatness_IC12 | audSpec | 0 | 0.03 | 0.81 | 1 | 2, 3 |
| audSpec_Rfilt_sma_de[22]_flatness_IC12 | audSpec | 0.01 | −0.02 | 0.78 | 1 | 2, 3 |
| audSpec_Rfilt_sma_de[23]_flatness_IC12 | audSpec | 0 | −0.02 | 0.77 | 0.99 | 2, 3 |
| audSpec_Rfilt_sma_de[24]_flatness_IC12 | audSpec | 0 | −0.02 | 0.77 | 0.98 | 2, 3 |
| audSpec_Rfilt_sma_de[25]_flatness_IC12 | audSpec | 0.01 | −0.01 | 0.78 | 0.96 | 2, 3 |
| pcm_fftMag_spectralSlope_sma_de_flatness_IC12 | pcm | 0 | 0.02 | 0.4 | 0.18 | 2, 3 |
| pcm_fftMag_mfcc_sma_de[7]_posamean_IC12 | pcm | 0 | 0 | 0.41 | 1 | 1, 3 |
| audspecRasta_lengthL1norm_sma_segLenStddev_IC13 | audspecRasta | 0 | 0 | 0.12 | 0.4 | 2, 3 |
| pcm_RMSenergy_sma_meanSegLen_IC13 | pcm | 0 | −0.01 | 0.08 | 0.48 | 2, 3 |
| pcm_zcr_sma_range_IC13 | pcm | 0 | −0.09 | 0.88 | 0.96 | 2, 3 |
| pcm_zcr_sma_percentile99.0_IC13 | pcm | 0 | −0.1 | 0.86 | 0.98 | 2, 3 |
| pcm_zcr_sma_pctlrange0-1_IC13 | pcm | 0 | −0.1 | 0.86 | 0.98 | 2, 3 |
| pcm_zcr_sma_stddev_IC13 | pcm | 0 | −0.06 | 0.75 | 0.92 | 2, 3 |
| pcm_zcr_sma_lpgain_IC13 | pcm | 0 | −0.02 | 0.83 | 0.99 | 2, 3 |
| pcm_zcr_sma_de_range_IC13 | pcm | 0 | −0.01 | 0.78 | 0.98 | 2, 3 |
| pcm_zcr_sma_de_stddev_IC13 | pcm | 0 | −0.01 | 0.76 | 0.99 | 2, 3 |
| pcm_zcr_sma_de_skewness_IC13 | pcm | 0 | −0.02 | 0.78 | 0.99 | 2, 3 |
| pcm_zcr_sma_de_lpgain_IC13 | pcm | 0.01 | 0.02 | 0.77 | 0.97 | 2, 3 |
| pcm_zcr_sma_de_lpc0_IC13 | pcm | 0 | 0.03 | 0.8 | 0.96 | 2, 3 |
| pcm_fftMag_spectralCentroid_sma_stddev_IC13 | pcm | 0 | −0.12 | 0.69 | 0.32 | 2, 3 |
| pcm_fftMag_spectralCentroid_sma_de_range_IC13 | pcm | 0 | −0.09 | 0.78 | 0.96 | 2, 3 |
| F0final_sma_quartile2_IC13 | F0final | 0 | 0.05 | 0.75 | 0.45 | 2, 3 |
| logHNR_sma_iqr2-3_IC13 | logHNR | 0 | −0.08 | 0.26 | 0.99 | 1, 3 |
| F0final_sma_quartile3_IC13 | F0final | 0 | 0.04 | 0.45 | 0.86 | 1, 3 |
| F0final_sma_de_iqr2-3_IC13 | F0final | 0 | 0.04 | 0.49 | 0.85 | 1, 3 |
| voicingFinalUnclipped_sma_de_amean_IC13 | voicingFinalUnclipped | 0.01 | 0 | 0.11 | 1 | 1, 3 |
| jitterDDP_sma_de_centroid_IC13 | jitterDDP | 0 | 0 | 0.03 | 1 | 1, 3 |
| logHNR_sma_de_flatness_IC13 | logHNR | 0 | −0.04 | 0.2 | 0.99 | 1, 3 |
| audspec_lengthL1norm_sma_meanPeakDist_IC13 | audspec | 0 | −0.01 | 0.29 | 0.19 | 2, 3 |
| audspec_lengthL1norm_sma_peakDistStddev_IC13 | audspec | 0 | 0 | 0.05 | 0.19 | 2, 3 |
| pcm_RMSenergy_sma_meanPeakDist_IC13 | pcm | 0 | −0.02 | 0.26 | 0.27 | 2, 3 |
| pcm_zcr_sma_amean_IC13 | pcm | 0 | −0.02 | 0.32 | 0.24 | 2, 3 |
| pcm_zcr_sma_peakRangeRel_IC13 | pcm | 0 | 0 | 0.77 | 1 | 2, 3 |
| pcm_zcr_sma_linregc2_IC13 | pcm | 0 | −0.03 | 0.65 | 0.02 | 2, 3 |
| pcm_zcr_sma_qregc3_IC13 | pcm | 0 | −0.07 | 0.77 | 0.22 | 2, 3 |
| audSpec_Rfilt_sma[0]_flatness_IC13 | audSpec | 0 | 0.04 | 0.88 | 0.99 | 2, 3 |
| pcm_fftMag_fband250-650_sma_meanPeakDist_IC13 | pcm | 0 | −0.01 | 0.24 | 0.22 | 2, 3 |

TABLE 6-continued

Identification of Tier 1, Tier 2 and Tier 3 voice features useful for determining
blood glucose levels based on the cohort of 154 subjects in Example 2.

| OpenSmile Voice-feature name | Audio-class | FDR | DropOut Score | ICC | Gini_c | Tier |
|---|---|---|---|---|---|---|
| pcm_fftMag_spectralRollOff25.0_sma_linregc2_IC13 | pcm | 0 | −0.04 | 0.55 | 0.34 | 2, 3 |
| pcm_fftMag_spectralRollOff25.0_sma_qregc3_IC13 | pcm | 0 | −0.07 | 0.62 | 0.45 | 2, 3 |
| pcm_fftMag_spectralRollOff50.0_sma_centroid_IC13 | pcm | 0 | 0.08 | 0.6 | 0.4 | 2, 3 |
| pcm_fftMag_spectralRollOff75.0_sma_amean_IC13 | pcm | 0 | −0.04 | 0.49 | 0.14 | 2, 3 |
| pcm_fftMag_spectralRollOff75.0_sma_linregc2_IC13 | pcm | 0 | −0.08 | 0.58 | 0.23 | 2, 3 |
| pcm_fftMag_spectralRollOff75.0_sma_centroid_IC13 | pcm | 0 | 0.08 | 0.55 | 0.23 | 2, 3 |
| pcm_fftMag_spectralRollOff90.0_sma_flatness_IC13 | pcm | 0 | 0.14 | 0.59 | 0.41 | 2, 3 |
| pcm_fftMag_spectralRollOff90.0_sma_rqmean_IC13 | pcm | 0 | −0.07 | 0.6 | 0.09 | 2, 3 |
| pcm_fftMag_spectralRollOff90.0_sma_linregc2_IC13 | pcm | 0 | −0.07 | 0.55 | 0.03 | 2, 3 |
| pcm_fftMag_spectralRollOff90.0_sma_qregerrQ_IC13 | pcm | 0 | −0.06 | 0.52 | 0.18 | 2, 3 |
| pcm_fftMag_spectralRollOff90.0_sma_centroid_IC13 | pcm | 0 | 0.06 | 0.48 | 0.35 | 2, 3 |
| pcm_fftMag_spectralFlux_sma_rqmean_IC13 | pcm | 0 | 0.05 | 0.56 | 0.9 | 1, 3 |
| pcm_fftMag_spectralCentroid_sma_rqmean_IC13 | pcm | 0 | −0.07 | 0.63 | 0.02 | 2, 3 |
| pcm_fftMag_spectralCentroid_sma_linregc2_IC13 | pcm | 0 | −0.09 | 0.6 | 0.04 | 2, 3 |
| pcm_fftMag_spectralCentroid_sma_linregerrQ_IC13 | pcm | 0 | −0.06 | 0.57 | 0.48 | 2, 3 |
| pcm_fftMag_spectralEntropy_sma_peakMeanAbs_IC13 | pcm | 0 | 0 | 0.77 | 0.83 | 2, 3 |
| pcm_fftMag_spectralEntropy_sma_peakMeanMeanDist_IC13 | pcm | 0 | 0 | 0.77 | 0.94 | 2, 3 |
| pcm_fftMag_spectralEntropy_sma_peakMeanRel_IC13 | pcm | 0 | 0 | 0.77 | 0.96 | 2, 3 |
| pcm_fftMag_spectralEntropy_sma_meanRisingSlope_IC13 | pcm | 0 | −0.01 | 0.76 | 0.93 | 2, 3 |
| pcm_fftMag_spectralEntropy_sma_stddevRisingSlope_IC13 | pcm | 0 | −0.01 | 0.77 | 0.94 | 2, 3 |
| pcm_fftMag_spectralVariance_sma_amean_IC13 | pcm | 0 | −0.03 | 0.51 | 0 | 2, 3 |
| pcm_fftMag_spectralVariance_sma_rqmean_IC13 | pcm | 0 | −0.05 | 0.56 | 0.06 | 2, 3 |
| pcm_fftMag_spectralVariance_sma_qregerrQ_IC13 | pcm | 0 | −0.03 | 0.4 | 0.01 | 2, 3 |
| pcm_fftMag_psySharpness_sma_rqmean_IC13 | pcm | 0 | −0.08 | 0.62 | 0.08 | 2, 3 |
| pcm_fftMag_psySharpness_sma_linregc2_IC13 | pcm | 0 | −0.08 | 0.59 | 0.36 | 2, 3 |
| pcm_fftMag_psySharpness_sma_linregerrQ_IC13 | pcm | 0 | −0.07 | 0.57 | 0.13 | 2, 3 |
| pcm_fftMag_psySharpness_sma_centroid_IC13 | pcm | 0 | 0.06 | 0.58 | 0.28 | 2, 3 |
| pcm_fftMag_spectralHarmonicity_sma_meanPeakDist_IC13 | pcm | 0 | −0.01 | 0.24 | 0.33 | 2, 3 |
| mfcc_sma[6]_qregc1_IC13 | mfcc | 0 | 0.03 | 0.4 | 0.47 | 2, 3 |
| mfcc_sma[6]_qregc2_IC13 | mfcc | 0 | −0.04 | 0.39 | 0.46 | 2, 3 |
| mfcc_sma[8]_meanFallingSlope_IC13 | mfcc | 0 | 0 | 0.25 | 1 | 1, 3 |
| mfcc_sma[8]_qregc3_IC13 | mfcc | 0 | 0.04 | 0.42 | 0.32 | 2, 3 |
| audspecRasta_lengthL1norm_sma_de_flatness_IC13 | audspecRasta | 0 | 0.04 | 0.83 | 0.99 | 2, 3 |
| pcm_RMSenergy_sma_de_posamean_IC13 | pcm | 0 | 0.07 | 0.59 | 0.74 | 1, 3 |
| pcm_zcr_sma_de_rqmean_IC13 | pcm | 0 | −0.01 | 0.77 | 0.98 | 2, 3 |
| audSpec_Rfilt_sma_de[0]_flatness_IC13 | audSpec | 0 | 0.04 | 0.85 | 0.99 | 2, 3 |
| audSpec_Rfilt_sma_de[1]_flatness_IC13 | audSpec | 0 | 0.03 | 0.85 | 1 | 2, 3 |
| audSpec_Rfilt_sma_de[2]_flatness_IC13 | audSpec | 0 | 0.05 | 0.85 | 1 | 2, 3 |
| audSpec_Rfilt_sma_de[3]_flatness_IC13 | audSpec | 0 | 0.05 | 0.85 | 0.99 | 2, 3 |
| audSpec_Rfilt_sma_de[4]_flatness_IC13 | audSpec | 0 | 0.05 | 0.84 | 0.99 | 2, 3 |
| audSpec_Rfilt_sma_de[5]_flatness_IC13 | audSpec | 0 | 0.06 | 0.82 | 0.97 | 2, 3 |
| audSpec_Rfilt_sma_de[6]_flatness_IC13 | audSpec | 0 | 0.03 | 0.82 | 1 | 2, 3 |
| audSpec_Rfilt_sma_de[7]_flatness_IC13 | audSpec | 0 | 0.03 | 0.83 | 1 | 2, 3 |
| audSpec_Rfilt_sma_de[8]_flatness_IC13 | audSpec | 0 | 0.05 | 0.83 | 0.98 | 2, 3 |
| audSpec_Rfilt_sma_de[9]_flatness_IC13 | audSpec | 0 | 0.05 | 0.83 | 0.95 | 2, 3 |
| audSpec_Rfilt_sma_de[10]_flatness_IC13 | audSpec | 0 | 0.05 | 0.82 | 0.96 | 2, 3 |
| audSpec_Rfilt_sma_de[11]_flatness_IC13 | audSpec | 0 | 0.04 | 0.81 | 0.98 | 2, 3 |
| audSpec_Rfilt_sma_de[12]_flatness_IC13 | audSpec | 0 | 0.03 | 0.81 | 1 | 2, 3 |
| audSpec_Rfilt_sma_de[16]_peakMeanRel_IC13 | audSpec | 0.82 | 0 | 0.94 | 1 | 1, 3 |
| audSpec_Rfilt_sma_de[22]_flatness_IC13 | audSpec | 0.01 | −0.02 | 0.78 | 1 | 2, 3 |
| audSpec_Rfilt_sma_de[23]_flatness_IC13 | audSpec | 0 | −0.02 | 0.77 | 0.99 | 2, 3 |
| audSpec_Rfilt_sma_de[24]_flatness_IC13 | audSpec | 0 | −0.02 | 0.77 | 0.98 | 2, 3 |
| audSpec_Rfilt_sma_de[25]_flatness_IC13 | audSpec | 0.01 | −0.01 | 0.78 | 0.97 | 2, 3 |
| pcm_fftMag_fband250-650_sma_de_flatness_IC13 | pcm | 0 | 0.03 | 0.43 | 0.24 | 2, 3 |
| pcm_fftMag_spectralCentroid_sma_de_peakMeanAbs_IC13 | pcm | 0 | −0.07 | 0.76 | 0.99 | 2, 3 |
| pcm_fftMag_spectralCentroid_sma_de_peakMeanMeanDist_IC13 | pcm | 0 | −0.07 | 0.76 | 0.99 | 2, 3 |
| pcm_fftMag_spectralEntropy_sma_de_peakRangeAbs_IC13 | pcm | 0 | −0.01 | 0.82 | 0.92 | 2, 3 |
| pcm_fftMag_spectralEntropy_sma_de_peakMeanAbs_IC13 | pcm | 0 | 0 | 0.78 | 0.96 | 2, 3 |
| pcm_fftMag_spectralEntropy_sma_de_peakMeanMeanDist_IC13 | pcm | 0 | 0 | 0.78 | 0.95 | 2, 3 |
| pcm_fftMag_spectralEntropy_sma_de_meanRisingSlope_IC13 | pcm | 0 | −0.01 | 0.76 | 0.95 | 2, 3 |
| pcm_fftMag_spectralEntropy_sma_de_stddevRisingSlope_IC13 | pcm | 0 | −0.01 | 0.77 | 0.98 | 2, 3 |
| pcm_fftMag_spectralEntropy_sma_de_stddevFallingSlope_IC13 | pcm | 0 | 0 | 0.77 | 0.98 | 2, 3 |
| pcm_fftMag_spectralSkewness_sma_de_peakRangeRel_IC13 | pcm | 0 | 0.03 | 0.15 | 0.37 | 2, 3 |
| pcm_fftMag_spectralKurtosis_sma_de_flatness_IC13 | pcm | 0 | 0.03 | 0.35 | 0.36 | 2, 3 |
| pcm_fftMag_spectralSlope_sma_de_flatness_IC13 | pcm | 0 | 0.02 | 0.4 | 0.22 | 2, 3 |
| pcm_fftMag_psySharpness_sma_de_peakMeanAbs_IC13 | pcm | 0 | −0.07 | 0.76 | 0.99 | 2, 3 |
| pcm_fftMag_psySharpness_sma_de_peakMeanMeanDist_IC13 | pcm | 0 | −0.07 | 0.76 | 1 | 2, 3 |
| mfcc_sma_de[7]_posamean_IC13 | mfcc | 0 | 0 | 0.41 | 1 | 1, 3 |

TABLE 7

Preferred subset of voice biomarkers from Table 6 in Tier 1

| Voice biomarkers | Importance score |
|---|---|
| F0final_sma_de_iqr2-3_IC13 | 0.047 |
| F0final_sma_de_quartile3_IC13 | 0.046 |
| jitterLocal_sma_quartile2_IC11 | 0.043 |
| logMelFreqBand_sma_de[4]_skewness_IC10 | 0.043 |
| logHNR_sma_de_flatness_IC13 | 0.04 |
| logHNR_sma_iqr2-3_IC13 | 0.039 |
| pcm_fftMag_mfcc_sma[1]_meanPeakDist_IC11 | 0.038 |
| audSpec_Rfilt_sma_de[14]_meanPeakDist_IC11 | 0.037 |
| pcm_RMSenergy_sma_de_posamean_IC13 | 0.036 |
| pcm_fftMag_spectralFlux_sma_rqmean_IC13 | 0.036 |
| audSpec_Rfilt_sma_de[6]_peakDistStddev_IC11 | 0.033 |
| pcm_RMSenergy_sma_de_posamean_IC12 | 0.032 |
| voicingFinalUnclipped_sma_de_skewness_IC11 | 0.032 |
| voicingFinalUnclipped_sma_de_amean_IC13 | 0.032 |
| pcm_RMSenergy_sma_de_linregc1_IC11 | 0.031 |
| pcm_loudness_sma_quartile3_IC10 | 0.031 |
| mfcc_sma[9]_upleveltime75_IC10 | 0.028 |

TABLE 7-continued

Preferred subset of voice biomarkers from Table 6 in Tier 1

| Voice biomarkers | Importance score |
|---|---|
| F0final_sma_ff0_meanSegLen_IC12 | 0.028 |
| pcm_fftMag_fband25-650_sma_de_linregc1_IC11 | 0.028 |
| audSpec_Rfilt_sma_de[16]_peakMeanRel_IC13 | 0.027 |
| pcm_fftMag_mfcc_sma_de[7]_quartile1_IC11 | 0.027 |
| pcm_fftMag_mfcc_sma[10]_centroid_IC12 | 0.027 |
| mfcc_sma_de[7]_posamean_IC13 | 0.027 |
| mfcc_sma[8]_meanFallingSlope_IC13 | 0.027 |
| pcm_fftMag_mfcc_sma_de[7]_percentile99.0_IC11 | 0.026 |
| pcm_fftMag_mfcc_sma_de[7]_posamean_IC12 | 0.026 |
| F0final_sma_de_linregc1_IC10 | 0.026 |
| jitterDDP_sma_de_centroid_IC13 | 0.026 |
| F0final_sma_lpc0_IC11 | 0.026 |
| audSpec_Rfilt_sma_de[15]_amean_IC11 | 0.025 |
| pcm_fftMag_spectralSlope_sma_de_linregc1_IC11 | 0.024 |
| voicingFinalUnclipped_sma_de_centroid_IC11 | 0.007 |

TABLE 8

Preferred subset of voice biomarkers from Table 6 in Tier 2

| Voice biomarkers | Importance score |
|---|---|
| pcm_zcr_sma_amean_IC13 | 0.007 |
| logMelFreqBand_sma[1]_linregc2_IC10 | 0.007 |
| pcm_zcr_sma_amean_IC11 | 0.006 |
| audSpec_Rfilt_sma[9]_segLenStddev_IC11 | 0.006 |
| audSpec_Rfilt_sma[12]_segLenStddev_IC11 | 0.006 |
| audspec_lengthL1norm_sma_meanPeakDist_IC13 | 0.006 |
| logMelFreqBand_sma[3]_linregc2_IC10 | 0.006 |
| pcm_fftMag_spectralVariance_sma_amean_IC11 | 0.006 |
| audSpec_Rfilt_sma[3]_segLenStddev_IC11 | 0.006 |
| lspFreq_sma_de[5]_linregc2_IC10 | 0.006 |
| pcm_fftMag_spectralVariance_sma_amean_IC12 | 0.006 |
| audspec_lengthL1norm_sma_meanPeakDist_IC12 | 0.006 |
| pcm_zcr_sma_amean_IC12 | 0.006 |
| pcm_fftMag_spectralVariance_sma_amean_IC13 | 0.006 |
| audSpec_Rfilt_sma[10]_segLenStddev_IC11 | 0.006 |
| audspecRasta_lengthL1norm_sma_segLenStddev_IC13 | 0.006 |
| logMelFreqBand_sma_de[7]_upleveltime90_IC10 | 0.006 |
| audSpec_Rfilt_sma[11]_segLenStddev_IC11 | 0.006 |
| audSpec_Rfilt_sma[8]_segLenStddev_IC11 | 0.006 |
| logMelFreqBand_sma_de[7]_upleveltime75_IC10 | 0.006 |
| pcm_RMSenergy_sma_meanPeakDist_IC13 | 0.006 |
| pcm_fftMag_spectralRollOff25.0_sma_centroid_IC11 | 0.005 |
| F0final_sma_quartile1_IC12 | 0.005 |
| F0final_sma_quartile2_IC12 | 0.005 |
| pcm_fftMag_mfcc_sma[8]_qregc3_IC12 | 0.005 |
| mfcc_sma[8]_quartile3_IC10 | 0.005 |
| pcm_fftMag_spectralRollOff90.0_sma_rqmean_IC12 | 0.005 |
| audSpec_Rfilt_sma[14]_segLenStddev_IC11 | 0.005 |
| mfcc_sma[10]_quartile2_IC10 | 0.005 |
| pcm_fftMag_spectralRollOff90.0_sma_amean_IC12 | 0.005 |
| pcm_RMSenergy_sma_meanPeakDist_IC11 | 0.005 |
| mfcc_sma[8]_qregc3_IC13 | 0.005 |
| F0final_sma_quartile3_IC12 | 0.005 |
| pcm_fftMag_mfcc_sma[6]_qregc1_IC12 | 0.005 |
| pcm_fftMag_mfcc_sma[10]_qregc3_IC12 | 0.005 |
| pcm_RMSenergy_sma_quartile2_IC11 | 0.005 |
| F0final_sma_quartile2_IC11 | 0.005 |
| mfcc_sma[6]_qregc1_IC13 | 0.005 |
| pcm_fftMag_psySharpness_sma_amean_IC12 | 0.005 |
| audSpec_Rfilt_sma[4]_segLenStddev_IC11 | 0.005 |
| logMelFreqBand_sma[1]_quartile2_IC10 | 0.005 |
| mfcc_sma[10]_quartile1_IC10 | 0.005 |
| F0final_sma_quartile2_IC13 | 0.005 |
| pcm_fftMag_spectralHarmonicity_sma_meanPeakDist_IC13 | 0.005 |
| pcm_fftMag_spectralRollOff90.0_sma_rqmean_IC13 | 0.005 |
| mfcc_sma[10]_amean_IC10 | 0.005 |
| F0final_sma_quartile2_IC10 | 0.005 |
| audSpec_Rfilt_sma[0]_segLenStddev_IC11 | 0.005 |

TABLE 8-continued

Preferred subset of voice biomarkers from Table 6 in Tier 2

| Voice biomarkers | Importance score |
|---|---|
| mfcc_sma[10]_quartile3_IC10 | 0.005 |
| pcm_RMSenergy_sma_peakDistStddev_IC12 | 0.005 |
| audspec_lengthL1norm_sma_peakDistStddev_IC13 | 0.005 |
| logMelFreqBand_sma_de[7]_skewness_IC10 | 0.005 |
| mfcc_sma[10]_linregc2_IC10 | 0.005 |
| pcm_fftMag_fband25-650_sma_iqr1-2_IC11 | 0.005 |
| pcm_fftMag_spectralRollOff25.0_sma_centroid_IC12 | 0.005 |
| pcm_fftMag_spectralKurtosis_sma_de_skewness_IC11 | 0.005 |
| pcm_fftMag_mfcc_sma[10]_quartile2_IC11 | 0.005 |
| mfcc_sma[6]_qregc2_IC13 | 0.005 |
| pcm_fftMag_spectralRollOff90.0_sma_qregc3_IC12 | 0.005 |
| pcm_fftMag_fband250-650_sma_de_flatness_IC13 | 0.005 |
| pcm_fftMag_spectralVariance_sma_de_amean_IC11 | 0.005 |
| pcm_fftMag_fband250-650_sma_meanPeakDist_IC13 | 0.005 |
| pcm_fftMag_spectralRollOff90.0_sma_linregc2_IC13 | 0.005 |
| logMelFreqBand_sma[7]_linregc1_IC10 | 0.005 |
| pcm_fftMag_spectralVariance_sma_iqr1-2_IC11 | 0.005 |
| pcm_fftMag_spectralKurtosis_sma_de_downleveltime50_IC12 | 0.005 |
| pcm_fftMag_spectralKurtosis_sma_de_qregc2_IC11 | 0.005 |
| pcm_fftMag_spectralVariance_sma_rqmean_IC12 | 0.005 |
| pcm_fftMag_mfcc_sma[1]_qregc3_IC12 | 0.005 |
| pcm_fftMag_spectralKurtosis_sma_de_amean_IC11 | 0.005 |
| pcm_fftMag_spectralHarmonicity_sma_de_quartile3_IC12 | 0.005 |
| pcm_fftMag_spectralVariance_sma_de_qregc2_IC11 | 0.004 |
| pcm_fftMag_spectralKurtosis_sma_lpc0_IC11 | 0.004 |
| pcm_fftMag_spectralSlope_sma_de_flatness_IC13 | 0.004 |
| pcm_fftMag_spectralKurtosis_sma_de_upleveltime50_IC12 | 0.004 |
| pcm_fftMag_spectralSkewness_sma_de_amean_IC11 | 0.004 |
| pcm_fftMag_spectralRollOff90.0_sma_linregc2_IC12 | 0.004 |
| pcm_fftMag_spectralVariance_sma_quartile3_IC11 | 0.004 |
| pcm_fftMag_psySharpness_sma_linregc2_IC13 | 0.004 |
| pcm_fftMag_spectralVariance_sma_quartile2_IC11 | 0.004 |
| pcm_fftMag_mfcc_sma[10]_quartile1_IC11 | 0.004 |
| pcm_fftMag_spectralKurtosis_sma_de_upleveltime75_IC12 | 0.004 |
| pcm_fftMag_spectralCentroid_sma_rqmean_IC13 | 0.004 |
| pcm_zcr_sma_linregc2_IC13 | 0.004 |
| pcm_fftMag_spectralRollOff75.0_sma_amean_IC13 | 0.004 |
| pcm_RMSenergy_sma_meanSegLen_IC13 | 0.004 |
| pcm_fftMag_spectralKurtosis_sma_de_downleveltime75_IC12 | 0.004 |
| pcm_fftMag_spectralSlope_sma_de_flatness_IC12 | 0.004 |
| pcm_fftMag_spectralSkewness_sma_de_skewness_IC11 | 0.004 |
| pcm_fftMag_spectralVariance_sma_de_iqr1-3_IC11 | 0.004 |
| pcm_fftMag_spectralRollOff75.0_sma_amean_IC12 | 0.004 |
| pcm_fftMag_spectralVariance_sma_rqmean_IC13 | 0.004 |
| pcm_fftMag_psySharpness_sma_rqmean_IC12 | 0.004 |
| pcm_fftMag_psySharpness_sma_rqmean_IC13 | 0.004 |
| pcm_zcr_sma_de_amean_IC11 | 0.004 |
| pcm_fftMag_psySharpness_sma_flatness_IC12 | 0.004 |
| pcm_fftMag_spectralSkewness_sma_de_upleveltime50_IC12 | 0.004 |
| pcm_fftMag_spectralRollOff50.0_sma_centroid_IC11 | 0.004 |
| pcm_fftMag_spectralSkewness_sma_de_qregc2_IC11 | 0.004 |
| pcm_fftMag_spectralRollOff75.0_sma_centroid_IC13 | 0.004 |
| pcm_fftMag_spectralRollOff50.0_sma_stddev_IC11 | 0.004 |
| pcm_RMSenergy_sma_flatness_IC12 | 0.004 |
| pcm_fftMag_psySharpness_sma_centroid_IC13 | 0.004 |
| pcm_fftMag_spectralRollOff75.0_sma_linregc2_IC12 | 0.004 |
| pcm_fftMag_spectralRollOff90.0_sma_flatness_IC13 | 0.004 |
| pcm_zcr_sma_de_range_IC12 | 0.004 |
| pcm_fftMag_spectralSkewness_sma_lpc0_IC11 | 0.004 |
| pcm_fftMag_spectralKurtosis_sma_de_flatness_IC13 | 0.004 |
| pcm_zcr_sma_range_IC13 | 0.004 |
| pcm_fftMag_spectralRollOff90.0_sma_linregerrQ_IC12 | 0.004 |
| pcm_fftMag_spectralEntropy_sma_stddevRisingSlope_IC13 | 0.004 |
| pcm_fftMag_spectralSkewness_sma_de_peakRangeRel_IC13 | 0.004 |
| pcm_fftMag_spectralVariance_sma_linregerrQ_IC12 | 0.004 |
| logMelFreqBand_sma_de[5]_skewness_IC10 | 0.004 |
| pcm_fftMag_spectralEntropy_sma_peakMeanAbs_IC13 | 0.004 |
| pcm_fftMag_spectralRollOff25.0_sma_qregc3_IC13 | 0.004 |
| pcm_zcr_sma_qregc3_IC12 | 0.004 |
| pcm_fftMag_spectralRollOff25.0_sma_linregc2_IC13 | 0.004 |
| pcm_fftMag_spectralEntropy_sma_peakMeanAbs_IC12 | 0.004 |
| pcm_fftMag_spectralCentroid_sma_linregc2_IC13 | 0.004 |
| pcm_fftMag_spectralSkewness_sma_lpc3_IC11 | 0.004 |
| pcm_fftMag_spectralRollOff50.0_sma_centroid_IC13 | 0.004 |
| pcm_fftMag_spectralRollOff90.0_sma_centroid_IC13 | 0.004 |

TABLE 8-continued

Preferred subset of voice biomarkers from Table 6 in Tier 2

| Voice biomarkers | Importance score |
|---|---|
| pcm_fftMag_spectralVariance_sma_qregc3_IC12 | 0.004 |
| pcm_zcr_sma_iqr1-3_IC11 | 0.004 |
| pcm_zcr_sma_qregc3_IC13 | 0.004 |
| pcm_fftMag_spectralRollOff90.0_sma_qregerrQ_IC13 | 0.004 |
| pcm_fftMag_spectralEntropy_sma_de_peakMeanAbs_IC13 | 0.004 |
| pcm_fftMag_spectralKurtosis_sma_kurtosis_IC11 | 0.004 |
| pcm_fftMag_spectralEntropy_sma_de_meanRisingSlope_IC13 | 0.004 |
| pcm_fftMag_spectralRollOff90.0_sma_flatness_IC12 | 0.004 |
| pcm_fftMag_spectralRollOff90.0_sma_qregerrQ_IC11 | 0.004 |
| pcm_zcr_sma_de_range_IC13 | 0.004 |
| pcm_fftMag_spectralSkewness_sma_peakRangeRel_IC12 | 0.004 |
| pcm_fftMag_spectralEntropy_sma_meanRisingSlope_IC12 | 0.004 |
| pcm_fftMag_psySharpness_sma_de_range_IC12 | 0.004 |
| pcm_fftMag_spectralRollOff75.0_sma_linregc2_IC13 | 0.004 |
| pcm_fftMag_spectralVariance_sma_peakRangeAbs_IC12 | 0.004 |
| pcm_fftMag_spectralRollOff90.0_sma_qregerrQ_IC12 | 0.004 |
| pcm_fftMag_spectralEntropy_sma_stddevRisingSlope_IC12 | 0.004 |
| pcm_fftMag_spectralEntropy_sma_de_peakRangeAbs_IC13 | 0.004 |
| pcm_zcr_sma_stddev_IC13 | 0.004 |
| pcm_zcr_sma_de_lpgain_IC13 | 0.004 |
| pcm_fftMag_spectralEntropy_sma_meanRisingSlope_IC13 | 0.004 |
| pcm_fftMag_spectralEntropy_sma_peakMeanMeanDist_IC13 | 0.004 |
| pcm_zcr_sma_de_lpc0_IC13 | 0.004 |
| pcm_fftMag_spectralVariance_sma_qregerrQ_IC12 | 0.004 |
| pcm_fftMag_spectralRollOff75.0_sma_qregc2_IC12 | 0.004 |
| pcm_fftMag_spectralEntropy_sma_de_peakMeanMeanDist_IC13 | 0.004 |
| pcm_zcr_sma_de_skewness_IC11 | 0.004 |
| logMelFreqBand_sma[0]_pctlrange0-1_IC10 | 0.004 |
| pcm_zcr_sma_de_rqmean_IC13 | 0.004 |
| pcm_zcr_sma_lpgain_IC11 | 0.004 |
| pcm_zcr_sma_de_lpc0_IC11 | 0.004 |
| logMelFreqBand_sma[1]_pctlrange0-1_IC10 | 0.004 |
| logMelFreqBand_sma[2]_pctlrange0-1_IC10 | 0.004 |
| pcm_fftMag_spectralRollOff75.0_sma_centroid_IC11 | 0.004 |
| pcm_zcr_sma_stddev_IC11 | 0.004 |
| pcm_zcr_sma_lpgain_IC13 | 0.004 |
| pcm_zcr_sma_de_stddev_IC13 | 0.004 |
| pcm_fftMag_spectralRollOff75.0_sma_rqmean_IC12 | 0.004 |
| audSpec_Rfilt_sma_de[10]_flatness_IC13 | 0.004 |
| pcm_fftMag_spectralEntropy_sma_de_stddevRisingSlope_IC13 | 0.004 |
| pcm_fftMag_spectralVariance_sma_qregerrQ_IC13 | 0.004 |
| pcm_fftMag_spectralEntropy_sma_peakMeanMeanDist_IC12 | 0.004 |
| pcm_fftMag_spectralRollOff25.0_sma_linregc2_IC12 | 0.004 |
| pcm_zcr_sma_pctlrange0-1_IC13 | 0.004 |
| audSpec_Rfilt_sma_de[24]_flatness_IC12 | 0.004 |
| pcm_fftMag_spectralCentroid_sma_de_peakMeanMeanDist_IC13 | 0.004 |
| pcm_fftMag_spectralCentroid_sma_stddev_IC13 | 0.004 |
| pcm_fftMag_spectralCentroid_sma_de_range_IC13 | 0.004 |
| pcm_zcr_sma_de_rqmean_IC12 | 0.004 |
| audSpec_Rfilt_sma_de[10]_flatness_IC12 | 0.004 |
| audSpec_Rfilt_sma_de[9]_flatness_IC12 | 0.004 |
| audSpec_Rfilt_sma_de[23]_flatness_IC12 | 0.004 |
| logMelFreqBand_sma[3]_upleveltime75_IC10 | 0.004 |
| pcm_zcr_sma_de_skewness_IC13 | 0.004 |
| pcm_zcr_sma_range_IC12 | 0.003 |
| audSpec_Rfilt_sma_de[24]_flatness_IC13 | 0.003 |
| audSpec_Rfilt_sma_de[23]_flatness_IC13 | 0.003 |
| audSpec_Rfilt_sma_de[9]_flatness_IC13 | 0.003 |
| audSpec_Rfilt_sma_de[25]_flatness_IC12 | 0.003 |
| audSpec_Rfilt_sma_de[8]_flatness_IC13 | 0.003 |
| audSpec_Rfilt_sma_de[25]_flatness_IC13 | 0.003 |
| pcm_fftMag_spectralEntropy_sma_peakMeanRel_IC12 | 0.003 |
| pcm_fftMag_psySharpness_sma_linregerrQ_IC13 | 0.003 |
| pcm_fftMag_spectralCentroid_sma_linregerrQ_IC13 | 0.003 |
| pcm_fftMag_spectralEntropy_sma_de_stddevFallingSlope_IC13 | 0.003 |
| pcm_fftMag_spectralEntropy_sma_pctlrange0-1_IC11 | 0.003 |
| audSpec_Rfilt_sma_de[5]_flatness_IC12 | 0.003 |
| audspecRasta_lengthL1norm_sma_lpc1_IC11 | 0.003 |
| audSpec_Rfilt_sma_de[0]_flatness_IC12 | 0.003 |
| pcm_fftMag_spectralEntropy_sma_percentile99.0_IC11 | 0.003 |
| audSpec_Rfilt_sma_de[4]_flatness_IC13 | 0.003 |
| pcm_fftMag_psySharpness_sma_de_peakMeanAbs_IC13 | 0.003 |
| pcm_fftMag_spectralCentroid_sma_de_peakMeanAbs_IC13 | 0.003 |
| audSpec_Rfilt_sma_de[22]_flatness_IC12 | 0.003 |
| audSpec_Rfilt_sma[0]_flatness_IC13 | 0.003 |

TABLE 8-continued

Preferred subset of voice biomarkers from Table 6 in Tier 2

| Voice biomarkers | Importance score |
| --- | --- |
| pcm_fftMag_spectralRollOff50.0_sma_linregc2_IC12 | 0.003 |
| audSpec_Rfilt_sma_de[2]_flatness_IC13 | 0.003 |
| audSpec_Rfilt_sma_de[3]_flatness_IC13 | 0.003 |
| audSpec_Rfilt_sma_de[5]_flatness_IC13 | 0.003 |
| pcm_zcr_sma_de_stddev_IC11 | 0.003 |
| audSpec_Rfilt_sma_de[4]_flatness_IC12 | 0.003 |
| audSpec_Rfilt_sma_de[8]_flatness_IC12 | 0.003 |
| audSpec_Rfilt_sma[0]_centroid_IC12 | 0.003 |
| logMelFreqBand_sma[3]_pctlrange0-1_IC10 | 0.003 |
| audSpec_Rfilt_sma_de[11]_flatness_IC12 | 0.003 |
| audSpec_Rfilt_sma_de[0]_flatness_IC13 | 0.003 |
| logMelFreqBand_sma[4]_pctlrange0-1_IC10 | 0.003 |
| audSpec_Rfilt_sma_de[3]_flatness_IC12 | 0.003 |
| audSpec_Rfilt_sma_de[11]_flatness_IC13 | 0.003 |
| audSpec_Rfilt_sma_de[2]_flatness_IC12 | 0.003 |
| mfcc_sma[0]_pctlrange0-1_IC10 | 0.003 |
| pcm_fftMag_psySharpness_sma_de_peakMeanMeanDist_IC13 | 0.003 |
| audSpec_Rfilt_sma[0]_flatness_IC12 | 0.003 |
| pcm_fftMag_spectralEntropy_sma_peakMeanRel_IC13 | 0.003 |
| audSpec_Rfilt_sma_de[22]_flatness_IC13 | 0.003 |
| logMelFreqBand_sma[3]_percentile1.0_IC10 | 0.003 |
| audspecRasta_lengthL1norm_sma_de_flatness_IC12 | 0.003 |
| logMelFreqBand_sma[0]_percentile1.0_IC10 | 0.003 |
| pcm_zcr_sma_pctlrange0-1_IC11 | 0.003 |
| audSpec_Rfilt_sma_de[6]_flatness_IC13 | 0.003 |
| audspecRasta_lengthL1norm_sma_de_flatness_IC13 | 0.003 |
| logMelFreqBand_sma[5]_pctlrange0-1_IC10 | 0.003 |
| logMelFreqBand_sma[2]_percentile1.0_IC10 | 0.003 |
| pcm_zcr_sma_percentile99.0_IC13 | 0.003 |
| audSpec_Rfilt_sma_de[12]_flatness_IC13 | 0.003 |
| audSpec_Rfilt_sma_de[12]_flatness_IC12 | 0.003 |
| audSpec_Rfilt_sma_de[7]_flatness_IC12 | 0.003 |
| logMelFreqBand_sma[1]_percentile1.0_IC10 | 0.003 |
| logMelFreqBand_sma[6]_percentile1.0_IC10 | 0.003 |
| audSpec_Rfilt_sma_de[1]_flatness_IC12 | 0.003 |
| pcm_zcr_sma_percentile99.0_IC11 | 0.003 |
| audSpec_Rfilt_sma_de[6]_flatness_IC12 | 0.003 |
| audSpec_Rfilt_sma_de[1]_flatness_IC13 | 0.003 |
| audSpec_Rfilt_sma_de[7]_flatness_IC13 | 0.003 |
| mfcc_sma[0]_percentile1.0_IC10 | 0.003 |
| logMelFreqBand_sma[4]_percentile1.0_IC10 | 0.003 |
| logMelFreqBand_sma[5]_percentile1.0_IC10 | 0.003 |
| pcm_zcr_sma_peakRangeRel_IC13 | 0.003 |
| pcm_zcr_sma_peakRangeRel_IC12 | 0.003 |

TABLE 9

Preferred subset of voice biomarkers from Table 6 in Tier 3

| Voice biomarkers | Importance score |
| --- | --- |
| audspec_lengthL1norm_sma_meanPeakDist_IC12 | 0.01 |
| pcm_fftMag_spectralRollOff90.0_sma_rqmean_IC12 | 0.008 |
| pcm_fftMag_spectralVariance_sma_amean_IC13 | 0.008 |
| pcm_zcr_sma_amean_IC11 | 0.007 |
| audSpec_Rfilt_sma[8]_segLenStddev_IC11 | 0.006 |
| F0final_sma_quartile2_IC12 | 0.006 |
| logMelFreqBand_sma[1]_linregc2_IC10 | 0.006 |
| audSpec_Rfilt_sma[11]_segLenStddev_IC11 | 0.006 |
| mfcc_sma[8]_qregc3_IC13 | 0.006 |
| logMelFreqBand_sma_de[7]_upleveltime90_IC10 | 0.006 |
| audSpec_Rfilt_sma[10]_segLenStddev_IC11 | 0.006 |
| pcm_fftMag_mfcc_sma[8]_qregc3_IC12 | 0.006 |
| logMelFreqBand_sma_de[7]_upleveltime75_IC10 | 0.006 |
| IspFreq_sma_de[5]_linregc2_IC10 | 0.006 |
| audspec_lengthL1norm_sma_meanPeakDist_IC13 | 0.006 |
| pcm_zcr_sma_amean_IC13 | 0.006 |
| pcm_fftMag_spectralCentroid_sma_linregc2_IC13 | 0.006 |
| pcm_zcr_sma_amean_IC12 | 0.006 |
| F0final_sma_de_iqr2-3_IC13 | 0.006 |
| audSpec_Rfilt_sma[12]_segLenStddev_IC11 | 0.006 |

TABLE 9-continued

Preferred subset of voice biomarkers from Table 6 in Tier 3

| Voice biomarkers | Importance score |
|---|---|
| pcm_fftMag_spectralVariance_sma_quartile3_IC11 | 0.006 |
| audspecRasta_lengthL1norm_sma_segLenStddev_IC13 | 0.006 |
| pcm_RMSenergy_sma_meanPeakDist_IC11 | 0.006 |
| mfcc_sma[10]_quartile1_IC10 | 0.006 |
| pcm_fftMag_mfcc_sma[10]_qregc3_IC12 | 0.006 |
| mfcc_sma[10]_quartile3_IC10 | 0.006 |
| pcm_fftMag_spectralRollOff90.0_sma_linregc2_IC12 | 0.006 |
| logMelFreqBand_sma[3]_linregc2_IC10 | 0.005 |
| F0final_sma_quartile2_IC13 | 0.005 |
| pcm_fftMag_spectralRollOff90.0_sma_amean_IC12 | 0.005 |
| audSpec_Rfilt_sma[3]_segLenStddev_IC11 | 0.005 |
| mfcc_sma[10]_linregc2_IC10 | 0.005 |
| F0final_sma_quartile1_IC12 | 0.005 |
| audSpec_Rfilt_sma[9]_segLenStddev_IC11 | 0.005 |
| pcm_RMSenergy_sma_peakDistStddev_IC12 | 0.005 |
| pcm_fftMag_spectralRollOff50.0_sma_centroid_IC13 | 0.005 |
| audSpec_Rfilt_sma[14]_segLenStddev_IC11 | 0.005 |
| audSpec_Rfilt_sma[0]_segLenStddev_IC11 | 0.005 |
| pcm_fftMag_spectralKurtosis_sma_de_downleveltime75_IC12 | 0.005 |
| mfcc_sma[6]_qregc2_IC13 | 0.005 |
| mfcc_sma[10]_amean_IC10 | 0.005 |
| pcm_fftMag_spectralRollOff25.0_sma_centroid_IC11 | 0.005 |
| audspec_lengthL1norm_sma_peakDistStddev_IC13 | 0.005 |
| pcm_fftMag_spectralHarmonicity_sma_meanPeakDist_IC13 | 0.005 |
| mfcc_sma[10]_quartile2_IC10 | 0.005 |
| pcm_fftMag_spectralCentroid_sma_rqmean_IC13 | 0.005 |
| pcm_fftMag_spectralVariance_sma_qregc3_IC12 | 0.005 |
| audSpec_Rfilt_sma[4]_segLenStddev_IC11 | 0.005 |
| pcm_fftMag_mfcc_sma[1]_qregc3_IC12 | 0.005 |
| F0final_sma_quartile2_IC10 | 0.005 |
| pcm_fftMag_mfcc_sma[10]_quartile2_IC11 | 0.005 |
| pcm_fftMag_spectralVariance_sma_amean_IC12 | 0.005 |
| F0final_sma_quartile2_IC11 | 0.005 |
| mfcc_sma[8]_quartile3_IC10 | 0.005 |
| pcm_RMSenergy_sma_de_linregc1_IC11 | 0.005 |
| pcm_RMSenergy_sma_quartile2_IC11 | 0.005 |
| pcm_fftMag_psySharpness_sma_linregc2_IC13 | 0.005 |
| F0final_sma_quartile3_IC12 | 0.005 |
| pcm_fftMag_spectralVariance_sma_quartile2_IC11 | 0.005 |
| pcm_fftMag_spectralKurtosis_sma_lpc0_IC11 | 0.005 |
| logMelFreqBand_sma[7]_linregc1_IC10 | 0.005 |
| pcm_fftMag_spectralSkewness_sma_de_amean_IC11 | 0.005 |
| pcm_fftMag_mfcc_sma[6]_qregc1_IC12 | 0.005 |
| pcm_fftMag_spectralKurtosis_sma_de_upleveltime50_IC12 | 0.005 |
| pcm_fftMag_psySharpness_sma_rqmean_IC12 | 0.005 |
| pcm_fftMag_fband25-650_sma_de_linregc1_IC11 | 0.005 |
| mfcc_sma[6]_qregc1_IC13 | 0.004 |
| pcm_fftMag_psySharpness_sma_flatness_IC12 | 0.004 |
| pcm_fftMag_spectralVariance_sma_de_amean_IC11 | 0.004 |
| pcm_fftMag_spectralSlope_sma_de_flatness_IC12 | 0.004 |
| pcm_fftMag_spectralVariance_sma_iqr1-2_IC11 | 0.004 |
| pcm_fftMag_psySharpness_sma_amean_IC12 | 0.004 |
| pcm_fftMag_spectralKurtosis_sma_de_amean_IC11 | 0.004 |
| pcm_zcr_sma_qregc3_IC13 | 0.004 |
| pcm_fftMag_mfcc_sma[10]_quartile1_IC11 | 0.004 |
| pcm_fftMag_spectralSkewness_sma_de_skewness_IC11 | 0.004 |
| F0final_sma_de_quartile3_IC13 | 0.004 |
| jitterLocal_sma_quartile2_IC11 | 0.004 |
| pcm_RMSenergy_sma_meanPeakDist_IC13 | 0.004 |
| pcm_fftMag_spectralVariance_sma_amean_IC11 | 0.004 |
| pcm_fftMag_spectralRollOff90.0_sma_qregerrQ_IC12 | 0.004 |
| pcm_fftMag_spectralRollOff25.0_sma_centroid_IC12 | 0.004 |
| pcm_fftMag_spectralKurtosis_sma_de_qregc2_IC11 | 0.004 |
| logMelFreqBand_sma_de[7]_skewness_IC10 | 0.004 |
| pcm_fftMag_spectralVariance_sma_de_iqr1-3_IC11 | 0.004 |
| pcm_fftMag_fband250-650_sma_meanPeakDist_IC13 | 0.004 |
| pcm_fftMag_spectralKurtosis_sma_de_skewness_IC11 | 0.004 |
| pcm_fftMag_spectralRollOff75.0_sma_centroid_IC13 | 0.004 |
| pcm_fftMag_spectralSkewness_sma_de_upleveltime50_IC12 | 0.004 |
| pcm_fftMag_spectralEntropy_sma_peakMeanAbs_IC12 | 0.004 |
| voicingFinalUnclipped_sma_de_skewness_IC11 | 0.004 |
| pcm_fftMag_spectralRollOff75.0_sma_centroid_IC11 | 0.004 |
| pcm_fftMag_spectralVariance_sma_de_qregc2_IC11 | 0.004 |
| logMelFreqBand_sma[1]_pctlrange0-1_IC10 | 0.004 |
| pcm_fftMag_spectralKurtosis_sma_de_upleveltime75_IC12 | 0.004 |

TABLE 9-continued

Preferred subset of voice biomarkers from Table 6 in Tier 3

| Voice biomarkers | Importance score |
|---|---|
| pcm_zcr_sma_range_IC13 | 0.004 |
| pcm_fftMag_spectralVariance_sma_qregerrQ_IC12 | 0.004 |
| pcm_RMSenergy_sma_flatness_IC12 | 0.004 |
| pcm_fftMag_fband25-650_sma_iqr1-2_IC11 | 0.004 |
| pcm_fftMag_spectralKurtosis_sma_de_downleveltime50_IC12 | 0.004 |
| logMelFreqBand_sma[1]_quartile2_IC10 | 0.004 |
| pcm_fftMag_spectralEntropy_sma_peakMeanAbs_IC13 | 0.004 |
| pcm_fftMag_spectralFlux_sma_rqmean_IC13 | 0.004 |
| pcm_fftMag_psySharpness_sma_rqmean_IC13 | 0.004 |
| pcm_fftMag_spectralSkewness_sma_de_peakRangeRel_IC13 | 0.004 |
| logMelFreqBand_sma_de[5]_skewness_IC10 | 0.004 |
| pcm_zcr_sma_de_skewness_IC11 | 0.004 |
| pcm_fftMag_spectralSlope_sma_de_flatness_IC13 | 0.004 |
| pcm_fftMag_spectralRollOff90.0_sma_qregc3_IC12 | 0.004 |
| pcm_fftMag_spectralSlope_sma_de_linregc1_IC11 | 0.004 |
| pcm_fftMag_spectralHarmonicity_sma_de_quartile3_IC12 | 0.004 |
| pcm_RMSenergy_sma_de_posamean_IC12 | 0.004 |
| pcm_fftMag_spectralRollOff90.0_sma_centroid_IC13 | 0.004 |
| pcm_RMSenergy_sma_de_posamean_IC13 | 0.004 |
| pcm_fftMag_spectralSkewness_sma_de_qregc2_IC11 | 0.004 |
| pcm_loudness_sma_quartile3_IC10 | 0.004 |
| pcm_RMSenergy_sma_meanSegLen_IC13 | 0.004 |
| pcm_fftMag_fband250-650_sma_de_flatness_IC13 | 0.004 |
| audSpec_Rfilt_sma_de[10]_flatness_IC12 | 0.003 |
| pcm_fftMag_spectralEntropy_sma_stddevRisingSlope_IC13 | 0.003 |
| pcm_fftMag_spectralEntropy_sma_peakMeanMeanDist_IC13 | 0.003 |
| pcm_fftMag_spectralSkewness_sma_lpc3_IC11 | 0.003 |
| pcm_zcr_sma_de_range_IC12 | 0.003 |
| pcm_fftMag_spectralSkewness_sma_lpc0_IC11 | 0.003 |
| pcm_fftMag_spectralRollOff90.0_sma_flatness_IC12 | 0.003 |
| audSpec_Rfilt_sma_de[24]_flatness_IC13 | 0.003 |
| logMelFreqBand_sma_de[4]_skewness_IC10 | 0.003 |
| pcm_fftMag_spectralRollOff90.0_sma_linregc2_IC13 | 0.003 |
| logMelFreqBand_sma[3]_upleveltime75_IC10 | 0.003 |
| pcm_fftMag_spectralRollOff90.0_sma_qregerrQ_IC13 | 0.003 |
| pcm_fftMag_spectralEntropy_sma_stddevRisingSlope_IC12 | 0.003 |
| pcm_zcr_sma_lpgain_IC11 | 0.003 |
| pcm_fftMag_spectralEntropy_sma_de_meanRisingSlope_IC13 | 0.003 |
| mfcc_sma_de[7]_posamean_IC13 | 0.003 |
| pcm_zcr_sma_qregc3_IC12 | 0.003 |
| pcm_zcr_sma_de_range_IC13 | 0.003 |
| pcm_zcr_sma_de_lpc0_IC13 | 0.003 |
| pcm_fftMag_spectralRollOff25.0_sma_qregc3_IC13 | 0.003 |
| pcm_fftMag_spectralRollOff90.0_sma_qregerrQ_IC11 | 0.003 |
| pcm_fftMag_spectralEntropy_sma_de_peakRangeAbs_IC13 | 0.003 |
| audSpec_Rfilt_sma_de[22]_flatness_IC13 | 0.003 |
| logMelFreqBand_sma[0]_pctlrange0-1_IC10 | 0.003 |
| pcm_fftMag_spectralSkewness_sma_peakRangeRel_IC12 | 0.003 |
| pcm_fftMag_spectralEntropy_sma_de_peakMeanAbs_IC13 | 0.003 |
| pcm_fftMag_spectralRollOff75.0_sma_linregc2_IC13 | 0.003 |
| pcm_fftMag_spectralVariance_sma_rqmean_IC13 | 0.003 |
| audSpec_Rfilt_sma_de[8]_flatness_IC12 | 0.003 |
| pcm_fftMag_spectralRollOff75.0_sma_amean_IC12 | 0.003 |
| pcm_zcr_sma_de_amean_IC11 | 0.003 |
| pcm_zcr_sma_stddev_IC13 | 0.003 |
| pcm_fftMag_psySharpness_sma_de_peakMeanMeanDist_IC13 | 0.003 |
| pcm_fftMag_spectralEntropy_sma_peakMeanMeanDist_IC12 | 0.003 |
| pcm_zcr_sma_iqr1-3_IC11 | 0.003 |
| pcm_fftMag_spectralRollOff50.0_sma_stddev_IC11 | 0.003 |
| pcm_zcr_sma_de_lpc0_IC11 | 0.003 |
| audSpec_Rfilt_sma_de[9]_flatness_IC13 | 0.003 |
| audSpec_Rfilt_sma_de[25]_flatness_IC12 | 0.003 |
| audSpec_Rfilt_sma_de[9]_flatness_IC12 | 0.003 |
| audspecRasta_lengthL1norm_sma_lpc1_IC11 | 0.003 |
| pcm_zcr_sma_linregc2_IC13 | 0.003 |
| audSpec_Rfilt_sma[0]_centroid_IC12 | 0.003 |
| pcm_fftMag_spectralKurtosis_sma_de_flatness_IC13 | 0.003 |
| pcm_fftMag_spectralRollOff90.0_sma_flatness_IC13 | 0.003 |
| audSpec_Rfilt_sma_de[23]_flatness_IC13 | 0.003 |
| pcm_fftMag_spectralEntropy_sma_de_peakMeanMeanDist_IC13 | 0.003 |
| pcm_fftMag_psySharpness_sma_centroid_IC13 | 0.003 |
| pcm_fftMag_psySharpness_sma_de_range_IC12 | 0.003 |
| pcm_fftMag_spectralRollOff25.0_sma_linregc2_IC13 | 0.003 |
| pcm_zcr_sma_de_skewness_IC13 | 0.003 |
| audSpec_Rfilt_sma_de[11]_flatness_IC13 | 0.003 |

TABLE 9-continued

Preferred subset of voice biomarkers from Table 6 in Tier 3

| Voice biomarkers | Importance score |
| --- | --- |
| pcm_fftMag_mfcc_sma_de[7]_percentile99.0_IC11 | 0.003 |
| pcm_fftMag_spectralRollOff75.0_sma_linregc2_IC12 | 0.003 |
| audSpec_Rfilt_sma_de[23]_flatness_IC12 | 0.003 |
| pcm_zcr_sma_de_lpgain_IC13 | 0.003 |
| pcm_zcr_sma_range_IC12 | 0.003 |
| pcm_fftMag_spectralEntropy_sma_peakMeanRel_IC13 | 0.003 |
| audSpec_Rfilt_sma_de[10]_flatness_IC13 | 0.003 |
| pcm_fftMag_spectralEntropy_sma_peakMeanRel_IC12 | 0.003 |
| pcm_fftMag_spectralRollOff50.0_sma_centroid_IC11 | 0.003 |
| logMelFreqBand_sma[2]_pctlrange0-1_IC10 | 0.003 |
| pcm_fftMag_spectralRollOff25.0_sma_linregc2_IC12 | 0.003 |
| pcm_zcr_sma_de_stddev_IC13 | 0.003 |
| pcm_fftMag_spectralEntropy_sma_meanRisingSlope_IC13 | 0.003 |
| audSpec_Rfilt_sma_de[22]_flatness_IC12 | 0.003 |
| pcm_fftMag_mfcc_sma_de[7]_posamean_IC12 | 0.003 |
| pcm_fftMag_spectralRollOff75.0_sma_amean_IC13 | 0.003 |
| mfcc_sma[0]_pctlrange0-1_IC10 | 0.003 |
| logHNR_sma_de_flatness_IC13 | 0.003 |
| pcm_fftMag_mfcc_sma[1]_meanPeakDist_IC11 | 0.003 |
| logMelFreqBand_sma[1]_percentile1.0_IC10 | 0.003 |
| pcm_fftMag_spectralVariance_sma_peakRangeAbs_IC12 | 0.003 |
| pcm_fftMag_spectralEntropy_sma_de_stddevFallingSlope_IC13 | 0.003 |
| audSpec_Rfilt_sma_de[5]_flatness_IC12 | 0.003 |
| logMelFreqBand_sma[4]_pctlrange0-1_IC10 | 0.003 |
| audSpec_Rfilt_sma_de[8]_flatness_IC13 | 0.003 |
| pcm_fftMag_mfcc_sma[10]_centroid_IC12 | 0.003 |
| pcm_fftMag_spectralEntropy_sma_meanRisingSlope_IC12 | 0.003 |
| pcm_fftMag_spectralCentroid_sma_de_peakMeanMeanDist_IC13 | 0.003 |
| pcm_fftMag_psySharpness_sma_de_peakMeanAbs_IC13 | 0.003 |
| mfcc_sma[9]_upleveltime75_IC10 | 0.003 |
| audSpec_Rfilt_sma_de[2]_flatness_IC13 | 0.003 |
| pcm_zcr_sma_stddev_IC11 | 0.003 |
| F0final_sma_lpc0_IC11 | 0.003 |
| pcm_fftMag_spectralCentroid_sma_de_range_IC13 | 0.003 |
| audSpec_Rfilt_sma_de[25]_flatness_IC13 | 0.003 |
| audSpec_Rfilt_sma[0]_flatness_IC12 | 0.003 |
| pcm_zcr_sma_lpgain_IC13 | 0.003 |
| pcm_fftMag_spectralRollOff90.0_sma_linregerrQ_IC12 | 0.003 |
| audSpec_Rfilt_sma_de[24]_flatness_IC12 | 0.003 |
| pcm_fftMag_spectralKurtosis_sma_kurtosis_IC11 | 0.003 |
| pcm_zcr_sma_peakRangeRel_IC13 | 0.003 |
| pcm_fftMag_spectralEntropy_sma_de_stddevRisingSlope_IC13 | 0.003 |
| audSpec_Rfilt_sma_de[0]_flatness_IC13 | 0.003 |
| audSpec_Rfilt_sma_de[4]_flatness_IC13 | 0.003 |
| pcm_zcr_sma_pctlrange0-1_IC13 | 0.003 |
| audSpec_Rfilt_sma_de[11]_flatness_IC12 | 0.003 |
| pcm_zcr_sma_de_rqmean_IC12 | 0.003 |
| logMelFreqBand_sma[3]_pctlrange0-1_IC10 | 0.003 |
| logMelFreqBand_sma[5]_pctlrange0-1_IC10 | 0.003 |
| audSpec_Rfilt_sma_de[3]_flatness_IC13 | 0.003 |
| pcm_zcr_sma_de_stddev_IC11 | 0.003 |
| audSpec_Rfilt_sma_de[0]_flatness_IC12 | 0.003 |
| pcm_fftMag_spectralVariance_sma_qregerrQ_IC13 | 0.003 |
| audSpec_Rfilt_sma_de[14]_meanPeakDist_IC11 | 0.003 |
| audSpec_Rfilt_sma[0]_flatness_IC13 | 0.003 |
| pcm_fftMag_psySharpness_sma_linregerrQ_IC13 | 0.003 |
| pcm_fftMag_spectralRollOff75.0_sma_qregc2_IC12 | 0.003 |
| pcm_zcr_sma_pctlrange0-1_IC11 | 0.003 |
| audSpec_Rfilt_sma_de[6]_flatness_IC12 | 0.003 |
| pcm_fftMag_mfcc_sma_de[7]_quartile1_IC11 | 0.003 |
| mfcc_sma[8]_meanFallingSlope_IC13 | 0.003 |
| F0final_sma_ff0_meanSegLen_IC12 | 0.003 |
| audSpec_Rfilt_sma_de[3]_flatness_IC12 | 0.003 |
| pcm_fftMag_spectralRollOff50.0_sma_linregc2_IC12 | 0.003 |
| audSpec_Rfilt_sma_de[1]_flatness_IC12 | 0.003 |
| pcm_zcr_sma_de_rqmean_IC13 | 0.003 |
| logMelFreqBand_sma[4]_percentile1.0_IC10 | 0.003 |
| audSpec_Rfilt_sma_de[6]_peakDistStddev_IC11 | 0.003 |
| logMelFreqBand_sma[3]_percentile1.0_IC10 | 0.003 |
| audSpec_Rfilt_sma_de[15]_amean_IC11 | 0.003 |
| audSpec_Rfilt_sma_de[12]_flatness_IC12 | 0.003 |
| pcm_fftMag_spectralRollOff90.0_sma_rqmean_IC13 | 0.003 |
| audSpec_Rfilt_sma_de[5]_flatness_IC13 | 0.003 |
| pcm_fftMag_spectralEntropy_sma_percentile99.0_IC11 | 0.003 |
| audspecRasta_lengthL1norm_sma_de_flatness_IC13 | 0.002 |

TABLE 9-continued

Preferred subset of voice biomarkers from Table 6 in Tier 3

| Voice biomarkers | Importance score |
| --- | --- |
| audSpec_Rfilt_sma_de[6]_flatness_IC13 | 0.002 |
| pcm_fftMag_spectralCentroid_sma_de_peakMeanAbs_IC13 | 0.002 |
| F0final_sma_de_linregc1_IC10 | 0.002 |
| pcm_fftMag_spectralCentroid_sma_linregerrQ_IC13 | 0.002 |
| audSpec_Rfilt_sma_de[4]_flatness_IC12 | 0.002 |
| pcm_fftMag_spectralVariance_sma_linregerrQ_IC12 | 0.002 |
| mfcc_sma[0]_percentile1.0_IC10 | 0.002 |
| audSpec_Rfilt_sma_de[7]_flatness_IC13 | 0.002 |
| audSpec_Rfilt_sma_de[2]_flatness_IC12 | 0.002 |
| logMelFreqBand_sma[2]_percentile1.0_IC10 | 0.002 |
| audSpec_Rfilt_sma_de[12]_flatness_IC13 | 0.002 |
| pcm_fftMag_spectralCentroid_sma_stddev_IC13 | 0.002 |
| pcm_fftMag_spectralRollOff75.0_sma_rqmean_IC12 | 0.002 |
| logMelFreqBand_sma[0]_percentile1.0_IC10 | 0.002 |
| pcm_fftMag_spectralVariance_sma_rqmean_IC12 | 0.002 |
| pcm_zcr_sma_peakRangeRel_IC12 | 0.002 |
| pcm_fftMag_spectralEntropy_sma_pctlrange0-1_IC11 | 0.002 |
| logHNR_sma_iqr2-3_IC13 | 0.002 |
| logMelFreqBand_sma[6]_percentile1.0_IC10 | 0.002 |
| audSpec_Rfilt_sma_de[1]_flatness_IC13 | 0.002 |
| audspecRasta_lengthL1norm_sma_de_flatness_IC12 | 0.002 |
| logMelFreqBand_sma[5]_percentile1.0_IC10 | 0.002 |
| jitterDDP_sma_de_centroid_IC13 | 0.002 |
| pcm_zcr_sma_percentile99.0_IC13 | 0.002 |
| voicingFinalUnclipped_sma_de_amean_IC13 | 0.002 |
| audSpec_Rfilt_sma_de[16]_peakMeanRel_IC13 | 0.002 |
| audSpec_Rfilt_sma_de[7]_flatness_IC12 | 0.002 |
| pcm_zcr_sma_percentile99.0_IC11 | 0.002 |
| voicingFinalUnclipped_sma_de_centroid_IC11 | 0.001 |

REFERENCES

Alvi G B, Qadir M I, Ali B. Assessment of Inter-Connection between Suriphobia and Individual's Blood Glucose Level: A Questionnaire Centred Project. *J Clin Exp Immunol* 2019; 4.

Bailey T, Bode B W, Christiansen M P, Klaff L J, Alva S. The Performance and Usability of a Factory-Calibrated Flash Glucose Monitoring System. *Diabetes Technol Ther* 2015. D01:10.1089/dia.2014.0378.

Beagley J, Guariguata L, Weil C, Motala A A. Global estimates of undiagnosed diabetes in adults. Diabetes Res Clin Pract 2014. DOI:10.1016/j.diabres.2013.11.001.

Bonneh Y S, Levanon Y, Dean-Pardo O, Lossos L, Adini Y. Abnormal speech spectrum and increased pitch variability in young autistic children. Front Hum Neurosci 2011. D01:10.3389/fnhum.2010.00237.

Colton R H, Casper J K, Leonard R. Understanding voice problem: A physiological perspective for diagnosis and treatment: Fourth edition. 2011.

Czupryniak L, Sielska-Badurek E, Agnieszka N, et al. 378-P: Human Voice Is Modulated by Hypoglycemia and Hyperglycemia in Type 1 Diabetes. Am Diabetes Assoc San Fr Calif (poster Present 2019.

Daniel P M, Love E R, Pratt O E. Insulin-stimulated entry of glucose into muscle in vivo as a major factor in the regulation of blood glucose. J Physiol 1975. DOI: 10.1113/jphysiol.1975.sp010931

Eskidere Ö, Gürhanli A. Voice Disorder Classification Based on Multitaper Mel Frequency Cepstral Coefficients Features. Comput Math Methods Med 2015. DOI:10.1155/2015/956249.

Eyben F, Wöllmer M, Schuller B B, Weninger F, Wollmer M, Schuller B B. OPENSMILE: open-Source Media Interpretation by Large feature-space Extraction. *MM'10—Proc ACM Multimed 2010 Int Conf* 2015. DOI:10.1145/1873951.1874246.

Francisco-Garcia V, Guzman-Guzman I P, Salgado-Rivera R, Alonso-Silverio G A, Alarcón-Paredes A. Non-invasive Glucose Level Estimation: A Comparison of Regression Models Using the MFCC as Feature Extractor. In: Lecture Notes in Computer Science (including subseries Lecture Notes in Artificial Intelligence and Lecture Notes in Bioinformatics). 2019. DOI:10.1007/978-3-030-21077-9_19.

Fraser K C, Meltzer J A, Rudzicz F. Linguistic features identify Alzheimer's disease in narrative speech. J Alzheimer's Dis 2015. DOI:10.3233/JAD-150520.

Hamdan A L, Jabbour J, Nassar J, Dahouk I, Azar S T. Vocal characteristics in patients with type 2 diabetes mellitus. Eur Arch Oto-Rhino-Laryngology 2012. DOI:10.1007/s00405-012-1933-7.

Hamdan A L, Dowli A, Barazi R, Jabbour J, Azar S. Laryngeal sensory neuropathy in patients with diabetes mellitus. J Laryngol Otol 2014. DOI:10.1017/S002221511400139X.

Hari Kumar K V S, Garg A, Ajai Chandra N S, Singh S P, Datta R. Voice and endocrinology. Indian J. Endocrinol. Metab. 2016. DOI:10.4103/2230-8210.190523.

Holl R W, Heinze E. Dawn or Somogyi phenomenon? High morning fasting blood sugar levels in juvenile type 1 diabetics. Dtsch Medizinische Wochenschrift 1992. DOI: 10.1055/s-2008-1062470.

Hoseini A, Mirzapour A, Bijani A, Shirzad A. Salivary flow rate and xerostomia in patients with type I and II diabetes mellitus. Electron Physician 2017. DOI:10.19082/5244.

Hoss U, Budiman E S, Liu H, Christiansen M P. Continuous glucose monitoring in the subcutaneous tissue over a 14-day sensor wear period. *J Diabetes Sci Technol* 2013. DOI:10.1177/193229681300700511.

Hsu H Y, Chiu H Y, Lin H T, Su F C, Lu C H, Kuo L C. Impacts of elevated glycaemic haemoglobin and disease duration on the sensorimotor control of hands in diabetes patients. Diabetes Metab Res Rev 2015. DOI:10.1002/dmrr.2623.

Jackson R, Brennan S, Fielding P, et al. Distinct and complementary roles for α and β isoenzymes of PKC in mediating vasoconstrictor responses to acutely elevated glucose. Br J Pharmacol 2016. DOI:10.1111/bph.13399.

Kirchberger M, Russo F A. Dynamic Range Across Music Genres and the Perception of Dynamic Compression in Hearing-Impaired Listeners. In: Trends in Hearing. 2016. DOI:10.1177/2331216516630549.

Koo T K, Li M Y. A Guideline of Selecting and Reporting Intraclass Correlation Coefficients for Reliability Research. *J Chiropr Med* 2016. DOI:10.1016/j.jcm.2016.02.012.

Malouf R, Brust J C M. Hypoglycemia: Causes, neurological manifestations, and outcome. *Ann. Neurol.* 1985. DOI:10.1002/ana.410170502.

Maor E, Perry D, Mevorach D, et al. Vocal Biomarker Is Associated With Hospitalization and Mortality Among Heart Failure Patients. J Am Heart Assoc 2020. DOI: 10.1161/JAHA.119.013359.

Marmar C R, Brown A D, Qian M, et al. Speech-based markers for posttraumatic stress disorder in U S veterans. *Depress Anxiety* 2019. DOI:10.1002/da.22890.

Noffs G, Perera T, Kolbe S C, et al. What speech can tell us: A systematic review of dysarthria characteristics in Multiple Sclerosis. Autoimmun. Rev. 2018. DOI:10.1016/j.autrev.2018.06.010.

Pinyopodjanard S, Suppakitjanusant P, Lomprew P, Kasemkosin N, Chailurkit L, Ongphiphadhanakul B. Instrumental Acoustic Voice Characteristics in Adults with Type 2 Diabetes. J Voice 2019. DOI:10.1016/j.jvoice.2019.07.003.

P'ng C, Green J, Chong L C, et al. BPG: Seamless, automated and interactive visualization of scientific data. *BMC Bioinformatics* 2019. DOI:10.1186/512859-019-2610-2.

Ribeiro M T, Singh S, Guestrin C. 'Why should i trust you?' Explaining the predictions of any classifier. In: Proceedings of the ACM SIGKDD International Conference on Knowledge Discovery and Data Mining. 2016. DOI: 10.1145/2939672.2939778.

Sivasankar M, Leydon C. The role of hydration in vocal fold physiology. Curr. Opin. Otolaryngol. Head Neck Surg. 2010. DOI:10.1097/MOO.0b013e3283393784.

Standards of medical care for patients with diabetes mellitus. Diabetes Care. 2003. DOI:10.2337/diacare.26.2007.533.

Statistics About Diabetes. https://www.diabetes.org/resources/statistics/statistics-about-diabetes.

Vaiciukynas E, Verikas A, Gelzinis A, Bacauskiene M. Detecting Parkinson's disease from sustained phonation and speech signals. PLoS One 2017. DOI:10.1371/journal.pone.0185613.

Veen L van, Morra J, Palanica A, Fossat Y. Homeostasis as a proportional—integral control system. npj Digit Med 2020. DOI:10.1038/s41746-020-0283-x.

Wild S H, Smith F B, Lee A J, Fowkes F G R. Criteria for previously undiagnosed diabetes and risk of mortality: 15-Year follow-up of the Edinburgh Artery Study cohort. Diabet Med 2005. DOI:10.1111/j.1464-5491.2004.01433.x.

Zhang Y, Santosa A, Wang N, et al. Prevalence and the Association of Body Mass Index and Other Risk Factors with Prediabetes and Type 2 Diabetes Among Adults in China and Sweden: A Cross-Sectional Study. Diabetes Ther 2019. DOI:10.1007/s13300-019-00690-3.

We claim:

1. A computer-implemented method for generating a blood glucose level prediction model, the method comprising:
    providing, at a memory:
        a plurality of voice samples from at least one subject at a plurality of time points; and
        a plurality of blood glucose levels, wherein each blood glucose level in the plurality of blood glucose levels is temporally associated with a voice sample in the plurality of voice samples;
    sorting, at a processor in communication with the memory, the plurality of voice samples into two or more blood glucose level categories based on the blood glucose levels;
    extracting, at the processor, voice feature values for a set of voice features from each of the plurality of voice samples;
    determining, at the processor, for each voice feature in the set of voice features:
        a univariate measure of whether the voice feature distinguishes between the two or more blood glucose level categories;
        a measure of the intra-stability of the voice feature within each of the two or more blood glucose level categories; and
        a measure of the decision-making ability of the voice feature;
    selecting, at the processor, a subset of voice features from the set of voice features based on the univariate measure, the measure of intra-stability and the measure of the decision-making ability; and
    generating at the processor, the blood glucose level prediction model based on the subset of voice features.

2. The method of claim 1, wherein generating the blood glucose level prediction model based on the subset of voice features comprises determining a weight for each voice feature in the subset of voice features.

3. The method of claim 1, wherein the method further comprises at least one selected from the group of:
    determining the univariate measure by calculating a False Discovery Rate (FDR)
    determining the measure of intra-stability by calculating an intraclass correlation coefficient (ICC); and
    determining the measure of the decision-making ability comprises calculating a Gini impurity score, optionally a Gini impurity score corrected for multiple comparisons ($Gini_c$).

4. The method of claim 3, wherein the method further comprises:
    selecting, at the processor, a subset of voice features from the set of voice features based on at least one selected from the group of a FDR with a p-value less than 0.01; an ICC greater than 0.5 or greater than 0.75; and a $Gini_c$ greater than 0.5.

5. The method of claim 3, wherein the voice features are selected from the group of a Mel-Frequency Cepstral Coefficient (MFCC) feature, a logarithmic harmonic-to-noise ratio (logHNR) feature, a smoothed fundamental frequency contour (F0Final) feature, an envelope of smoothed F0Final (F0FinalEnv) feature, a difference of period lengths (JitterLocal) feature, a difference of JitterLocal (JitterDDP) feature, a voicing probability of the final fundamental frequency candidate with unclipped voicing threshold (VoicingFinalUnclipped) feature, an amplitude variations (ShimmerLocal) feature, an auditory spectrum coefficient (AudSpec) feature, a relative spectral transform of AudSpec (AudSpecRasta) feature, a logarithmic power of Mel-frequency bands (logMelFreqBand) feature, a line spectral pair frequency (LspFreq) value, and a Pulse-Code Modulation (PCM) feature.

6. The method of claim 5, wherein the voice features comprise at least one selected from the group of a (MFCC) feature, a PCM feature and an AudSpec feature, optionally wherein one or more of the voice features are selected from the group of:

Relative mean of peak difference of auditory spectrum;
Mean of peak distance of 4th auditory spectrum (RASTA-style filt);
Centroid difference of auditory spectrum 0 (RASTA-style filt);
Relative mean of peak difference of auditory spectrum 0 (RASTA-style filt);
Centroid difference of auditory spectrum 1 (RASTA-style filt);
Minimum segment length difference of auditory spectrum 1 (RASTA-style filt);
Relative mean of peak difference of auditory spectrum 1 (RASTA-style filt);
Relative mean of peak difference of auditory spectrum 13 (RASTA-style filt);
Relative mean of peak difference of auditory spectrum 20 (RASTA-style filt);
Relative mean of peak difference of auditory spectrum 7 (RASTA-style filt);
Relative mean of peak difference of auditory spectrum 9 (RASTA-style filt);
Centroid difference of jitter of the jitter;
Centroid difference of log scaled harmonics to noise ratio;
Centroid of 8th mel-frequency ceptstral coefficient;
Relative mean of peak of 9th mel-frequency cepstral coefficient;
Relative mean of peak of 12th mel-frequency cepstral coefficient;
Centroid difference of FFT magnitude of fband 25-650 Hz;
Minimum segment length difference of FFT magnitude of fband 250-650 Hz;
Relative mean of peak difference of FFt magnitude of 12th mel-frequency cepstral coefficient;
Centroid difference of FFT magnitude of 8th mel-frequency cepstral coefficient;
Relative mean of peak difference of FFT magnitude of 9th mel-frequency cepstral coefficient;
Centroid difference of FFT magnitude of 2nd mel-frequency cepstral coefficient;
Kurtosis difference of FFT magnitude of 6th mel-frequency cepstral coefficient;
Relative mean of peak difference of FFT magnitude of spectral centroid;
Centroid difference of FFT magnitude of spectral kurtosis;
Centroid difference of FFT magnitude of spectral roll-off points 90%;
Centroid difference of FFT magnitude of spectral skewness;
Relative mean of peak difference of FFT magnitude of spectral skewness;
Relative mean of peak difference of FFT magnitude of spectral variance;
Centroid difference of voice probability of the final fundamental frequency candidate;
pcm_loudness_sma_quartile3_IC10;
mfcc_sma[0]_percentile1.0_IC10;
mfcc_sma[0]_pctlrange0-1_IC10;
mfcc_sma[8]_quartile3_IC10;
mfcc_sma[9]_upleveltime75_IC10;
mfcc_sma[10]_amean_IC10;
mfcc_sma[10]_linregc2_IC10;
mfcc_sma[10]_quartile1_IC10;
mfcc_sma[10]_quartile2_IC10;
mfcc_sma[10]_quartile3_IC10;
logMelFreqBand_sma[0]_percentile1.0_IC10;
logMelFreqBand_sma[0]_pctlrange0-1_IC10;
logMelFreqBand_sma[1]_linregc2_IC10;
logMelFreqBand_sma[1]_quartile2_IC10;
logMelFreqBand_sma[1]_percentile1.0_IC10;
logMelFreqBand_sma[1]_pctlrange0-1_IC10;
logMelFreqBand_sma[2]_percentile1.0_IC10;
logMelFreqBand_sma[2]_pctlrange0-1_IC10;
logMelFreqBand_sma[3]_linregc2_IC10;
logMelFreqBand_sma[3]_percentile1.0_IC10;
logMelFreqBand_sma[3]_pctlrange0-1_IC10;
logMelFreqBand_sma[3]_upleveltime75_IC10;
logMelFreqBand_sma[4]_percentile1.0_IC10;
logMelFreqBand_sma[4]_pctlrange0-1_IC10;
logMelFreqBand_sma[5]_percentile1.0_IC10;
logMelFreqBand_sma[5]_pctlrange0-1_IC10;
logMelFreqBand_sma[6]_percentile1.0_IC10;
logMelFreqBand_sma[7]_linregc1_IC10;
logMelFreqBand_sma_de[4]_skewness_IC10;
logMelFreqBand_sma_de[5]_skewness_IC10;
logMelFreqBand_sma_de[7]_skewness_IC10;
logMelFreqBand_sma_de[7]_upleveltime75_IC10;
logMelFreqBand_sma_de[7]_upleveltime90_IC10;
IspFreq_sma_de[5]_linregc2_IC10;
F0final_sma_quartile2_IC10;
F0final_sma_de_linregc1_IC10;
audspecRasta_lengthL1norm_sma_lpc1_IC11;
pcm_RMSenergy_sma_quartile2_IC11;
pcm_RMSenergy_sma_meanPeakDist_IC11;
pcm_zcr_sma_iqr1-3_IC11;
pcm_zcr_sma_percentile99.0_IC11;
pcm_zcr_sma_pctlrange0-1_IC11;
pcm_zcr_sma_amean_IC11;
pcm_zcr_sma_stddev_IC11;
pcm_zcr_sma_lpgain_IC11;
pcm_RMSenergy_sma_de_linregc1_IC11;
pcm_zcr_sma_de_amean_IC11;
pcm_zcr_sma_de_stddev_IC11;
pcm_zcr_sma_de_skewness_IC11;
pcm_zcr_sma_de_lpc0_IC11;
audSpec_Rfilt_sma[0]_segLenStddev_IC11;
audSpec_Rfilt_sma[3]_segLenStddev_IC11;
audSpec_Rfilt_sma[4]_segLenStddev_IC11;
audSpec_Rfilt_sma[8]_segLenStddev_IC11;
audSpec_Rfilt_sma[9]_segLenStddev_IC11;
audSpec_Rfilt_sma[10]_segLenStddev_IC11;
audSpec_Rfilt_sma[11]_segLenStddev_IC11;
audSpec_Rfilt_sma[12]_segLenStddev_IC11;
audSpec_Rfilt_sma[14]_segLenStddev_IC11;
pcm_fftMag_fband25-650_sma_iqr1-2_IC11;
pcm_fftMag_spectralRollOff25.0_sma_centroid_IC11;
pcm_fftMag_spectralRollOff50.0_sma_stddev_IC11;
pcm_fftMag_spectralRollOff50.0_sma_centroid_IC11;

pcm_fftMag_spectralRollOff75.0_sma_centroid_IC11;
pcm_fftMag_spectralRollOff90.0_sma_qregerrQ_IC11;
pcm_fftMag_spectralEntropy_sma_percentile99.0_IC11;
pcm_fftMag_spectralEntropy_sma_pctlrange0-1_IC11;
pcm_fftMag_spectralVariance_sma_quartile2_IC11;
pcm_fftMag_spectralVariance_sma_quartile3_IC11;
pcm_fftMag_spectralVariance_sma_iqr1-2_IC11;
pcm_fftMag_spectralVariance_sma_amean_IC11;
pcm_fftMag_spectralSkewness_sma_lpc0_IC11;
pcm_fftMag_spectralSkewness_sma_lpc3_IC11;
pcm_fftMag_spectralKurtosis_sma_kurtosis_IC11;
pcm_fftMag_spectralKurtosis_sma_lpc0_IC11;
pcm_fftMag_mfcc_sma[1]_meanPeakDist_IC11;
pcm_fftMag_mfcc_sma[10]_quartile1_IC11;
pcm_fftMag_mfcc_sma[10]_quartile2_IC11;
audSpec_Rfilt_sma_de[6]_peakDistStddev_IC11;
audSpec_Rfilt_sma_de[14]_meanPeakDist_IC11;
audSpec_Rfilt_sma_de[15]_amean_IC11;
pcm_fftMag_fband25-650_sma_de_linregc1_IC11;
pcm_fftMag_spectralVariance_sma_de_iqr1-3_IC11;
pcm_fftMag_spectralVariance_sma_de_amean_IC11;
pcm_fftMag_spectralVariance_sma_de_qregc2_IC11;
pcm_fftMag_spectralSkewness_sma_de_amean_IC11;
pcm_fftMag_spectralSkewness_sma_de_skewness_IC11;
pcm_fftMag_spectralSkewness_sma_de_qregc2_IC11;
pcm_fftMag_spectralKurtosis_sma_de_amean_IC11;
pcm_fftMag_spectralKurtosis_sma_de_skewness_IC11;
pcm_fftMag_spectralKurtosis_sma_de_qregc2_IC11;
pcm_ftMag_spectralSlope_sma_de_linregc1_IC11;
pcm_fftMag_mfcc_sma_de[7]_quartile1_IC11;
pcm_fftMag_mfcc_sma_de[7]_percentile99.0_IC11;
F0final_sma_quartile2_IC11;
F0final_sma_lpc0_IC11;
jitterLocal_sma_quartile2_IC11;
voicingFinalUnclipped_sma_de_skewness_IC11;
voicingFinalUnclipped_sma_de_centroid_IC11;
pcm_zcr_sma_range_IC12;
pcm_zcr_sma_de_range_IC12;
pcm_fftMag_spectralSkewness_sma_de_upleveltime50_IC12;
pcm_fftMag_spectralKurtosis_sma_de_upleveltime50_IC12;
pcm_fftMag_spectralKurtosis_sma_de_downleveltime50_IC12;
pcm_fftMag_spectralKurtosis_sma_de_upleveltime75_IC12;
pcm_fftMag_spectralKurtosis_sma_de_downleveltime75_IC12;
pcm_fftMag_psySharpness_sma_de_range_IC12;
pcm_fftMag_spectralHarmonicity_sma_de_quartile3_IC12;
F0final_sma_quartile1_IC12;
F0final_sma_quartile2_IC12;
F0final_sma_quartile3_IC12;
F0final_sma_ff0_meanSegLen_IC12;
audspec_lengthL1norm_sma_meanPeakDist_IC12;
pcm_RMSenergy_sma_flatness_IC12;
pcm_RMSenergy_sma_peakDistStddev_IC12;
pcm_zcr_sma_amean_IC12;
pcm_zcr_sma_peakRangeRel_IC12;
pcm_zcr_sma_qregc3_IC12;
audSpec_Rfilt_sma[0]_flatness_IC12;
audSpec_Rfilt_sma[0]_centroid_IC12;
pcm_fftMag_spectralRollOff25.0_sma_linregc2_IC12;
pcm_fftMag_spectralRollOff25.0_sma_centroid_IC12;
pcm_fftMag_spectralRollOff50.0_sma_linregc2_IC12;
pcm_fftMag_spectralRollOff75.0_sma_amean_IC12;
pcm_fftMag_spectralRollOff75.0_sma_rqmean_IC12;
pcm_fftMag_spectralRollOff75.0_sma_linregc2_IC12;
pcm_fftMag_spectralRollOff75.0_sma_qregc2_IC12;
pcm_fftMag_spectralRollOff90.0_sma_amean_IC12;
pcm_fftMag_spectralRollOff90.0_sma_flatness_IC12;
pcm_fftMag_spectralRollOff90.0_sma_rqmean_IC12;
pcm_fftMag_spectralRollOff90.0_sma_linregc2_IC12;
pcm_fftMag_spectralRollOff90.0_sma_linregerrQ_IC12;
pcm_fftMag_spectralRollOff90.0_sma_qregc3_IC12;
pcm_fftMag_spectralRollOff90.0_sma_qregerrQ_IC12;
pcm_fftMag_spectralEntropy_sma_peakMeanAbs_IC12;
pcm_fftMag_spectralEntropy_sma_peakMeanMeanDist_IC12;
pcm_fftMag_spectralEntropy_sma_peakMeanRel_IC12;
pcm_fftMag_spectralEntropy_sma_meanRisingSlope_IC12;
pcm_fftMag_spectralEntropy_sma_stddevRisingSlope_IC12;
pcm_fftMag_spectralVariance_sma_amean_IC12;
pcm_fftMag_spectralVariance_sma_rqmean_IC12;
pcm_fftMag_spectralVariance_sma_peakRangeAbs_IC12;
pcm_fftMag_spectralVariance_sma_linregerrQ_IC12;
pcm_fftMag_spectralVariance_sma_qregc3_IC12;
pcm_fftMag_spectralVariance_sma_qregerrQ_IC12;
pcm_fftMag_spectralSkewness_sma_peakRangeRel_IC12;
pcm_fftMag_psySharpness_sma_amean_IC12;
pcm_fftMag_psySharpness_sma_flatness_IC12;
pcm_fftMag_psySharpness_sma_rqmean_IC12;
pcm_fftMag_mfcc_sma[1]_qregc3_IC12;
pcm_fftMag_mfcc_sma[6]_qregc1_IC12;
pcm_fftMag_mfcc_sma[8]_qregc3_IC12;
pcm_fftMag_mfcc_sma[10]_qregc3_IC12;
pcm_fftMag_mfcc_sma[10]_centroid_IC12;
audspecRasta_lengthL1norm_sma_de_flatness_IC12;
pcm_RMSenergy_sma_de_posamean_IC12;
pcm_zcr_sma_de_rqmean_IC12;
audSpec_Rfilt_sma_de[0]_flatness_IC12;
audSpec_Rfilt_sma_de[1]_flatness_IC12;
audSpec_Rfilt_sma_de[2]_flatness_IC12;
audSpec_Rfilt_sma_de[3]_flatness_IC12;
audSpec_Rfilt_sma_de[4]_flatness_IC12;
audSpec_Rfilt_sma_de[5]_flatness_IC12;
audSpec_Rfilt_sma_de[6]_flatness_IC12;
audSpec_Rfilt_sma_de[7]_flatness_IC12;
audSpec_Rfilt_sma_de[8]_flatness_IC12;
audSpec_Rfilt_sma_de[9]_flatness_IC12;
audSpec_Rfilt_sma_de[10]_flatness_IC12;
audSpec_Rfilt_sma_de[11]_flatness_IC12;
audSpec_Rfilt_sma_de[12]_flatness_IC12;
audSpec_Rfilt_sma_de[22]_flatness_IC12;
audSpec_Rfilt_sma_de[23]_flatness_IC12;
audSpec_Rfilt_sma_de[24]_flatness_IC12;
audSpec_Rfilt_sma_de[25]_flatness_IC12;
pcm_fftMag_spectralSlope_sma_de_flatness_IC12;
pcm_fftMag_mfcc_sma_de[7]_posamean_IC12;
audspecRasta_lengthL1norm_sma_segLenStddev_IC13;
pcm_RMSenergy_sma_meanSegLen_IC13;
pcm_zcr_sma_range_IC13;
pcm_zcr_sma_percentile99.0_IC13;
pcm_zcr_sma_pctlrange0-1_IC13;
pcm_zcr_sma_stddev_IC13;
pcm_zcr_sma_lpgain_IC13;
pcm_zcr_sma_de_range_IC13;
pcm_zcr_sma_de_stddev_IC13;
pcm_zcr_sma_de_skewness_IC13;
pcm_zcr_sma_de_lpgain_IC13;
pcm_zcr_sma_de_lpc0_IC13;
pcm_fftMag_spectralCentroid_sma_stddev_IC13;
pcm_fftMag_spectralCentroid_sma_de_range_IC13;
F0final_sma_quartile2_IC13;

logHNR_sma_iqr2-3_IC13;
F0final_sma_de_quartile3_IC13;
F0final_sma_de_iqr2-3_IC13;
voicingFinalUnclipped_sma_de_amean_IC13;
jitterDDP_sma_de_centroid_IC13;
logHNR_sma_de_flatness_IC13;
audspec_lengthL1norm_sma_meanPeakDist_IC13;
audspec_lengthL1norm_sma_peakDistStddev_IC13;
pcm_RMSenergy_sma_meanPeakDist_IC13;
pcm_zcr_sma_amean_IC13;
pcm_zcr_sma_peakRangeRel_IC13;
pcm_zcr_sma_linregc2_IC13;
pcm_zcr_sma_qregc3_IC13;
audSpec_Rfilt_sma[0]_flatness_IC13;
pcm_fftMag_fband250-650_sma_meanPeakDist_IC13;
pcm_fftMag_spectralRollOff25.0_sma_linregc2_IC13;
pcm_fftMag_spectralRollOff25.0_sma_qregc3_IC13;
pcm_fftMag_spectralRollOff50.0_sma_centroid_IC13;
pcm_fftMag_spectralRollOff75.0_sma_amean_IC13;
pcm_fftMag_spectralRollOff75.0_sma_linregc2_IC13;
pcm_fftMag_spectralRollOff75.0_sma_centroid_IC13;
pcm_fftMag_spectralRollOff90.0_sma_flatness_IC13;
pcm_fftMag_spectralRollOff90.0_sma_rqmean_IC13;
pcm_fftMag_spectralRollOff90.0_sma_linregc2_IC13;
pcm_fftMag_spectralRollOff90.0_sma_qregerrQ_IC13;
pcm_fftMag_spectralRollOff90.0_sma_centroid_IC13;
pcm_fftMag_spectralFlux_sma_rqmean_IC13;
pcm_fftMag_spectralCentroid_sma_rqmean_IC13;
pcm_fftMag_spectralCentroid_sma_linregc2_IC13;
pcm_fftMag_spectralCentroid_sma_linregerrQ_IC13;
pcm_fftMag_spectralEntropy_sma_peakMeanAbs_IC13;
pcm_fftMag_spectralEntropy_sma_peakMeanMeanDist_IC13;
pcm_fftMag_spectralEntropy_sma_peakMeanRel_IC13;
pcm_fftMag_spectralEntropy_sma_meanRisingSlope_IC13;
pcm_fftMag_spectralEntropy_sma_stddevRisingSlope_IC13;
pcm_fftMag_spectralVariance_sma_amean_IC13;
pcm_fftMag_spectralVariance_sma_rqmean_IC13;
pcm_fftMag_spectralVariance_sma_qregerrQ_IC13;
pcm_fftMag_psySharpness_sma_rqmean_IC13;
pcm_fftMag_psySharpness_sma_linregc2_IC13;
pcm_fftMag_psySharpness_sma_linregerrQ_IC13;
pcm_fftMag_psySharpness_sma_centroid_IC13;
pcm_fftMag_spectralHarmonicity_sma_meanPeakDist_IC13;
mfcc_sma[6]_qregc1_IC13;
mfcc_sma[6]_qregc2_IC13;
mfcc_sma[8]_meanFallingSlope_IC13;
mfcc_sma[8]_qregc3_IC13;
audspecRasta_lengthL1norm_sma_de_flatness_IC13;
pcm_RMSenergy_sma_de_posamean_IC13;
pcm_zcr_sma_de_rqmean_IC13;
audSpec_Rfilt_sma_de[0]_flatness_IC13;
audSpec_Rfilt_sma_de[1]_flatness_IC13;
audSpec_Rfilt_sma_de[2]_flatness_IC13;
audSpec_Rfilt_sma_de[3]_flatness_IC13;
audSpec_Rfilt_sma_de[4]_flatness_IC13;
audSpec_Rfilt_sma_de[5]_flatness_IC13;
audSpec_Rfilt_sma_de[6]_flatness_IC13;
audSpec_Rfilt_sma_de[7]_flatness_IC13;
audSpec_Rfilt_sma_de[8]_flatness_IC13;
audSpec_Rfilt_sma_de[9]_flatness_IC13;
audSpec_Rfilt_sma_de[10]_flatness_IC13;
audSpec_Rfilt_sma_de[11]_flatness_IC13;
audSpec_Rfilt_sma_de[12]_flatness_IC13;
audSpec_Rfilt_sma_de[16]_peakMeanRel_IC13;
audSpec_Rfilt_sma_de[22]_flatness_IC13;
audSpec_Rfilt_sma_de[23]_flatness_IC13;
audSpec_Rfilt_sma_de[24]_flatness_IC13;
audSpec_Rfilt_sma_de[25]_flatness_IC13;
pcm_fftMag_fband250-650_sma_de_flatness_IC13;
pcm_fftMag_spectralCentroid_sma_de_peakMeanAbs_IC13;
pcm_fftMag_spectralCentroid_sma_de_peakMeanMeanDist_IC13;
pcm_fftMag_spectralEntropy_sma_de_peakRangeAbs_IC13;
pcm_fftMag_spectralEntropy_sma_de_peakMeanAbs_IC13;
pcm_fftMag_spectralEntropy_sma_de_peakMeanMeanDist_IC13;
pcm_fftMag_spectralEntropy_sma_de_meanRisingSlope_IC13;
pcm_fftMag_spectralEntropy_sma_de_stddevRisingSlope_IC13;
pcm_fftMag_spectralEntropy_sma_de_stddevFallingSlope_IC13;
pcm_fftMag_spectralSkewness_sma_de_peakRangeRel_IC13;
pcm_fftMag_spectralKurtosis_sma_de_flatness_IC13;
pcm_fftMag_spectralSlope_sma_de_flatness_IC13;
pcm_fftMag_psySharpness_sma_de_peakMeanAbs_IC13;
pcm_fftMag_psySharpness_sma_de_peakMeanMeanDist_IC13;
mfcc_sma_de[7]_posamean_IC13;
F0final_sma_de_iqr2-3_IC13;
F0final_sma_de_quartile3_IC13;
jitterLocal_sma_quartile2_IC11;
logMelFreqBand_sma_de[4]_skewness_IC10;
logHNR_sma_de_flatness_IC13;
logHNR_sma_iqr2-3_IC13;
pcm_fftMag_mfcc_sma[1]_meanPeakDist_IC11;
audSpec_Rfilt_sma_de[14]_meanPeakDist_IC11;
pcm_RMSenergy_sma_de_posamean_IC13;
pcm_fftMag_spectralFlux_sma_rqmean_IC13;
audSpec_Rfilt_sma_de[6]_peakDistStddev_IC11;
pcm_RMSenergy_sma_de_posamean_IC12;
voicingFinalUnclipped_sma_de_skewness_IC11;
voicingFinalUnclipped_sma_de_amean_IC13;
pcm_RMSenergy_sma_de_linregc1_IC11;
pcm_loudness_sma_quartile3_IC10;
mfcc_sma[9]_upleveltime75_IC10;
F0final_sma_ff0_meanSegLen_IC12;
pcm_fftMag_fband25-650_sma_de_linregc1_IC11;
audSpec_Rfilt_sma_de[16]_peakMeanRel_IC13;
pcm_fftMag_mfcc_sma_de[7]_quartile1_IC11;
pcm_fftMag_mfcc_sma[10]_centroid_IC12;
mfcc_sma_de[7]_posamean_IC13;
mfcc_sma[8]_meanFallingSlope_IC13;
pcm_fftMag_mfcc_sma_de[7]_percentile99.0_IC11;
pcm_fftMag_mfcc_sma[7]_posamean_IC12;
F0final_sma_de_linregc1_IC10;
jitterDDP_sma_de_centroid_IC13;
F0final_sma_lpc0_IC11;
audSpec_Rfilt_sma_de[15]_amean_IC11;
pcm_fftMag_spectralSlope_sma_de_linregc1_IC11;
voicingFinalUnclipped_sma_de_centroid_IC11;
pcm_zcr_sma_amean_IC13;
logMelFreqBand_sma[1]_linregc2_IC10;
pcm_zcr_sma_amean_IC11;
audSpec_Rfilt_sma[9]_segLenStddev_IC11;

audSpec_Rfilt_sma[12]_segLenStddev_IC11;
audspec_lengthL1norm_sma_meanPeakDist_IC13;
logMelFreqBand_sma[3]_linregc2_IC10;
pcm_fftMag_spectralVariance_sma_amean_IC11;
audSpec_Rfilt_sma[3]_segLenStddev_IC11;
IspFreq_sma_de[5]_linregc2_IC10;
pcm_fftMag_spectralVariance_sma_amean_IC12;
audspec_lengthL1norm_sma_meanPeakDist_IC12;
pcm_zcr_sma_amean_IC12;
pcm_fftMag_spectralVariance_sma_amean_IC13;
audSpec_Rfilt_sma[10]_segLenStddev_IC11;
audspecRasta_lengthL1norm_sma_segLenStddev_IC13;
logMelFreqBand_sma_de[7]_upleveltime90_IC10;
audSpec_Rfilt_sma[11]_segLenStddev_IC11;
audSpec_Rfilt_sma[8]_segLenStddev_IC11;
logMelFreqBand_sma_de[7]_upleveltime75_IC10;
pcm_RMSenergy_sma_meanPeakDist_IC13;
pcm_fftMag_spectralRollOff25.0_sma_centroid_IC11;
F0final_sma_quartile1_IC12;
F0final_sma_quartile2_IC12;
pcm_fftMag_mfcc_sma[8]_qregc3_IC12;
mfcc_sma[8]_quartile3_IC10;
pcm_fftMag_spectralRollOff90.0_sma_rqmean_IC12;
audSpec_Rfilt_sma[14]_segLenStddev_IC11;
mfcc_sma[10]_quartile2_IC10;
pcm_fftMag_spectralRollOff90.0_sma_amean_IC12;
pcm_RMSenergy_sma_meanPeakDist_IC11;
mfcc_sma[8]_qregc3_IC13;
F0final_sma_quartile3_IC12;
pcm_fftMag_mfcc_sma[6]_qregc1_IC12;
pcm_fftMag_mfcc_sma[10]_qregc3_IC12;
pcm_RMSenergy_sma_quartile2_IC11;
F0final_sma_quartile2_IC11;
mfcc_sma[6]_qregc1_IC13;
pcm_fftMag_psySharpness_sma_amean_IC12;
audSpec_Rfilt_sma[4]_segLenStddev_IC11;
logMelFreqBand_sma[1]_quartile2_IC10;
mfcc_sma[10]_quartile1_IC10;
F0final_sma_quartile2_IC13;
pcm_fftMag_spectralHarmonicity_sma_meanPeakDist_IC13;
pcm_fftMag_spectralRollOff90.0_sma_rqmean_IC13;
mfcc_sma[10]_amean_IC10;
F0final_sma_quartile2_IC10;
audSpec_Rfilt_sma[0]_segLenStddev_IC11;
mfcc_sma[10]_quartile3_IC10;
pcm_RMSenergy_sma_peakDistStddev_IC12;
audspec_lengthL1norm_sma_peakDistStddev_IC13;
logMelFreqBand_sma_de[7]_skewness_IC10;
mfcc_sma[10]_linregc2_IC10;
pcm_fftMag_fband25-650_sma_iqr1-2_IC11;
pcm_fftMag_spectralRollOff25.0_sma_centroid_IC12;
pcm_fftMag_spectralKurtosis_sma_de_skewness_IC11;
pcm_fftMag_mfcc_sma[10]_quartile2_IC11;
mfcc_sma[6]_qregc2_IC13;
pcm_fftMag_spectralRollOff90.0_sma_qregc3_IC12;
pcm_fftMag_fband250-650_sma_de_flatness_IC13;
pcm_fftMag_spectralVariance_sma_de_amean_IC11;
pcm_fftMag_fband250-650_sma_meanPeakDist_IC13;
pcm_fftMag_spectralRollOff90.0_sma_linregc2_IC13;
logMelFreqBand_sma[7]_linregc1_IC10;
pcm_fftMag_spectralVariance_sma_iqr1-2_IC11;
pcm_fftMag_spectralKurtosis_sma_de_downleveltime50_IC12;
pcm_fftMag_spectralKurtosis_sma_de_qregc2_IC11;
pcm_fftMag_spectralVariance_sma_rqmean_IC12;
pcm_fftMag_mfcc_sma[1]_qregc3_IC12;
pcm_fftMag_spectralKurtosis_sma_de_amean_IC11;
pcm_fftMag_spectralHarmonicity_sma_de_quartile3_IC12;
pcm_fftMag_spectralVariance_sma_de_qregc2_IC11;
pcm_fftMag_spectralKurtosis_sma_lpc0_IC11;
pcm_fftMag_spectralSlope_sma_de_flatness_IC13;
pcm_fftMag_spectralKurtosis_sma_de_upleveltime50_IC12;
pcm_fftMag_spectralSkewness_sma_de_amean_IC11;
pcm_fftMag_spectralRollOff90.0_sma_linregc2_IC12;
pcm_fftMag_spectralVariance_sma_quartile3_IC11;
pcm_fftMag_psySharpness_sma_linregc2_IC13;
pcm_fftMag_spectralVariance_sma_quartile2_IC11;
pcm_fftMag_mfcc_sma[10]_quartile1_IC11;
pcm_fftMag_spectralKurtosis_sma_de_upleveltime75_IC12;
pcm_fftMag_spectralCentroid_sma_rqmean_IC13;
pcm_zcr_sma_linregc2_IC13;
pcm_fftMag_spectralRollOff75.0_sma_amean_IC13;
pcm_RMSenergy_sma_meanSegLen_IC13;
pcm_fftMag_spectralKurtosis_sma_de_downleveltime75_IC12;
pcm_fftMag_spectralSlope_sma_de_flatness_IC12;
pcm_fftMag_spectralSkewness_sma_de_skewness_IC11;
pcm_fftMag_spectralVariance_sma_de_iqr1-3_IC11;
pcm_fftMag_spectralRollOff75.0_sma_amean_IC12;
pcm_fftMag_spectralVariance_sma_rqmean_IC13;
pcm_fftMag_psySharpness_sma_rqmean_IC12;
pcm_fftMag_psySharpness_sma_rqmean_IC13;
pcm_zcr_sma_de_amean_IC11;
pcm_fftMag_psySharpness_sma_flatness_IC12;
pcm_fftMag_spectralSkewness_sma_de_upleveltime50_IC12;
pcm_fftMag_spectralRollOff50.0_sma_centroid_IC11;
pcm_fftMag_spectralSkewness_sma_de_qregc2_IC11;
pcm_fftMag_spectralRollOff75.0_sma_centroid_IC13;
pcm_fftMag_spectralRollOff50.0_sma_stddev_IC11;
pcm_RMSenergy_sma_flatness_IC12;
pcm_fftMag_psySharpness_sma_centroid_IC13;
pcm_fftMag_spectralRollOff75.0_sma_linregc2_IC12;
pcm_fftMag_spectralRollOff90.0_sma_flatness_IC13;
pcm_zcr_sma_de_range_IC12;
pcm_fftMag_spectralSkewness_sma_lpc0_IC11;
pcm_fftMag_spectralKurtosis_sma_de_flatness_IC13;
pcm_zcr_sma_range_IC13;
pcm_fftMag_spectralRollOff90.0_sma_linregerrQ_IC12;
pcm_fftMag_spectralEntropy_sma_stddevRisingSlope_IC13;
pcm_fftMag_spectralSkewness_sma_de_peakRangeRel_IC13;
pcm_fftMag_spectralVariance_sma_linregerrQ_IC12;
logMelFreqBand_sma_de[5]_skewness_IC10;
pcm_fftMag_spectralEntropy_sma_peakMeanAbs_IC13;
pcm_fftMag_spectralRollOff25.0_sma_qregc3_IC13;
pcm_zcr_sma_qregc3_IC12;
pcm_fftMag_spectralRollOff25.0_sma_linregc2_IC13;
pcm_fftMag_spectralEntropy_sma_peakMeanAbs_IC12;
pcm_fftMag_spectralCentroid_sma_linregc2_IC13;
pcm_fftMag_spectralSkewness_sma_lpc3_IC11;
pcm_fftMag_spectralRollOff50.0_sma_centroid_IC13;
pcm_fftMag_spectralRollOff90.0_sma_centroid_IC13;
pcm_fftMag_spectralVariance_sma_qregc3_IC12;
pcm_zcr_sma_iqr1-3_IC11;
pcm_zcr_sma_qregc3_IC13;
pcm_fftMag_spectralRollOff90.0_sma_qregerrQ_IC13;

pcm_fftMag_spectralEntropy_sma_de_peakMeanAbs_IC13;
pcm_fftMag_spectralKurtosis_sma_kurtosis_IC11;
pcm_fftMag_spectralEntropy_sma_de_meanRisingSlope_IC13;
pcm_fftMag_spectralRollOff90.0_sma_flatness_IC12;
pcm_fftMag_spectralRollOff90.0_sma_qregerrQ_IC11;
pcm_zcr_sma_de_range_IC13;
pcm_fftMag_spectralSkewness_sma_peakRangeRel_IC12;
pcm_fftMag_spectralEntropy_sma_meanRisingSlope_IC12;
pcm_fftMag_psySharpness_sma_de_range_IC12;
pcm_fftMag_spectralRollOff75.0_sma_linregc2_IC13;
pcm_fftMag_spectralVariance_sma_peakRangeAbs_IC12;
pcm_fftMag_spectralRollOff90.0_sma_qregerrQ_IC12;
pcm_fftMag_spectralEntropy_sma_stddevRisingSlope_IC12;
pcm_fftMag_spectralEntropy_sma_de_peakRangeAbs_IC13;
pcm_zcr_sma_stddev_IC13;
pcm_zcr_sma_de_lpgain_IC13;
pcm_fftMag_spectralEntropy_sma_meanRisingSlope_IC13;
pcm_fftMag_spectralEntropy_sma_peakMeanMeanDist_IC13;
pcm_zcr_sma_de_lpc0_IC13;
pcm_fftMag_spectralVariance_sma_qregerrQ_IC12;
pcm_fftMag_spectralRollOff75.0_sma_qregc2_IC12;
pcm_fftMag_spectralEntropy_sma_de_peakMeanMeanDist_IC13;
pcm_zcr_sma_de_skewness_IC11;
logMelFreqBand_sma[0]_pctlrange0-1_IC10;
pcm_zcr_sma_de_rqmean_IC13;
pcm_zcr_sma_lpgain_IC11;
pcm_zcr_sma_de_lpc0_IC11;
logMelFreqBand_sma[1]_pctlrange0-1_IC10;
logMelFreqBand_sma[2]_pctlrange0-1_IC10;
pcm_fftMag_spectralRollOff75.0_sma_centroid_IC11;
pcm_zcr_sma_stddev_IC11;
pcm_zcr_sma_lpgain_IC13;
pcm_zcr_sma_de_stddev_IC13;
pcm_fftMag_spectralRollOff75.0_sma_rqmean_IC12;
audSpec_Rfilt_sma_de[10]_flatness_IC13;
pcm_fftMag_spectralEntropy_sma_de_stddevRisingSlope_IC13;
pcm_fftMag_spectralVariance_sma_qregerrQ_IC13;
pcm_fftMag_spectralEntropy_sma_peakMeanMeanDist_IC12;
pcm_fftMag_spectralRollOff25.0_sma_linregc2_IC12;
pcm_zcr_sma_pctlrange0-1_IC13;
audSpec_Rfilt_sma_de[24]_flatness_IC12;
pcm_fftMag_spectralCentroid_sma_de_peakMeanMeanDist_IC13;
pcm_fftMag_spectralCentroid_sma_stddev_IC13;
pcm_fftMag_spectralCentroid_sma_range_IC13;
pcm_zcr_sma_de_rqmean_IC12;
audSpec_Rfilt_sma_de[10]_flatness_IC12;
audSpec_Rfilt_sma_de[9]_flatness_IC12;
audSpec_Rfilt_sma_de[23]_flatness_IC12;
logMelFreqBand_sma[3]_upleveltime75_IC10;
pcm_zcr_sma_de_skewness_IC13;
pcm_zcr_sma_range_IC12;
audSpec_Rfilt_sma_de[24]_flatness_IC13;
audSpec_Rfilt_sma_de[23]_flatness_IC13;
audSpec_Rfilt_sma_de[9]_flatness_IC13;
audSpec_Rfilt_sma_de[25]_flatness_IC12;
audSpec_Rfilt_sma_de[8]_flatness_IC13;
audSpec_Rfilt_sma_de[25]_flatness_IC13;
pcm_fftMag_spectralEntropy_sma_peakMeanRel_IC12;
pcm_fftMag_psySharpness_sma_linregerrQ_IC13;
pcm_fftMag_spectralCentroid_sma_linregerrQ_IC13;
pcm_fftMag_spectralEntropy_sma_de_stddevFallingSlope_IC13;
pcm_fftMag_spectralEntropy_sma_pctlrange0-1_IC11;
audSpec_Rfilt_sma_de[5]_flatness_IC12;
audspecRasta_lengthL1norm_sma_lpc1_IC11;
audSpec_Rfilt_sma_de[0]_flatness_IC12;
pcm_fftMag_spectralEntropy_sma_percentile99.0_IC11;
audSpec_Rfilt_sma_de[4]_flatness_IC13;
pcm_fftMag_psySharpness_sma_de_peakMeanAbs_IC13;
pcm_fftMag_spectralCentroid_sma_de_peakMeanAbs_IC13;
audSpec_Rfilt_sma_de[22]_flatness_IC12;
audSpec_Rfilt_sma[0]_flatness_IC13;
pcm_fftMag_spectralRollOff50.0_sma_linregc2_IC12;
audSpec_Rfilt_sma_de[2]_flatness_IC13;
audSpec_Rfilt_sma_de[3]_flatness_IC13;
audSpec_Rfilt_sma_de[5]_flatness_IC13;
pcm_zcr_sma_de_stddev_IC11;
audSpec_Rfilt_sma_de[4]_flatness_IC12;
audSpec_Rfilt_sma_de[8]_flatness_IC12;
audSpec_Rfilt_sma[0]_centroid_IC12;
logMelFreqBand_sma[3]_pctlrange0-1_IC10;
audSpec_Rfilt_sma_de[11]_flatness_IC12;
audSpec_Rfilt_sma_de[0]_flatness_IC13;
logMelFreqBand_sma[4]_pctlrange0-1_IC10;
audSpec_Rfilt_sma_de[3]_flatness_IC12;
audSpec_Rfilt_sma_de[11]_flatness_IC13;
audSpec_Rfilt_sma_de[2]_flatness_IC12;
mfcc_sma[0]_pctlrange0-1_IC10;
pcm_fftMag_psySharpness_sma_de_peakMeanMeanDist_IC13;
audSpec_Rfilt_sma[0]_flatness_IC12;
pcm_fftMag_spectralEntropy_sma_peakMeanRel_IC13;
audSpec_Rfilt_sma_de[22]_flatness_IC13;
logMelFreqBand_sma[3]_percentile1.0_IC10;
audspecRasta_lengthL1norm_sma_de_flatness_IC12;
logMelFreqBand_sma[0]_percentile1.0_IC10;
pcm_zcr_sma_pctlrange0-1_IC11;
audSpec_Rfilt_sma_de[6]_flatness_IC13;
audspecRasta_lengthL1norm_sma_de_flatness_IC13;
logMelFreqBand_sma[5]_pctlrange0-1_IC10;
logMelFreqBand_sma[2]_percentile1.0_IC10;
pcm_zcr_sma_percentile99.0_IC13;
audSpec_Rfilt_sma_de[12]_flatness_IC13;
audSpec_Rfilt_sma_de[12]_flatness_IC12;
audSpec_Rfilt_sma_de[7]_flatness_IC12;
logMelFreqBand_sma[1]_percentile1.0_IC10;
logMelFreqBand_sma[6]_percentile1.0_IC10;
audSpec_Rfilt_sma_de[1]_flatness_IC12;
pcm_zcr_sma_percentile99.0_IC11;
audSpec_Rfilt_sma_de[6]_flatness_IC12;
audSpec_Rfilt_sma_de[1]_flatness_IC13;
audSpec_Rfilt_sma_de[7]_flatness_IC13;
mfcc_sma[0]_percentile1.0_IC10;
logMelFreqBand_sma[4]_percentile1.0_IC10;
logMelFreqBand_sma[5]_percentile1.0_IC10;
pcm_zcr_sma_peakRangeRel_IC13;
pcm_zcr_sma_peakRangeRel_IC12;
audspec_lengthL1norm_sma_meanPeakDist_IC12;
pcm_fftMag_spectralRollOff90.0_sma_rqmean_IC12;

pcm_fftMag_spectralVariance_sma_amean_IC13;
pcm_zcr_sma_amean_IC11;
audSpec_Rfilt_sma[8]_segLenStddev_IC11;
F0final_sma_quartile2_IC12;
logMelFreqBand_sma[1]_linregc2_IC10;
audSpec_Rfilt_sma[11]_segLenStddev_IC11;
mfcc_sma[8]_qregc3_IC13;
logMelFreqBand_sma_de[7]_upleveltime90_IC10;
audSpec_Rfilt_sma[10]_segLenStddev_IC11;
pcm_fftMag_mfcc_sma[8]_qregc3_IC12;
logMelFreqBand_sma_de[7]_upleveltime75_IC10;
IspFreq_sma_de[5]_linregc2_IC10;
audspec_lengthL1norm_sma_meanPeakDist_IC13;
pcm_zcr_sma_amean_IC13;
pcm_fftMag_spectralCentroid_sma_linregc2_IC13;
pcm_zcr_sma_amean_IC12;
F0final_sma_de_iqr2-3_IC13;
audSpec_Rfilt_sma[12]_segLenStddev_IC11;
pcm_fftMag_spectralVariance_sma_quartile3_IC11;
audspecRasta_lengthL1norm_sma_segLenStddev_IC13;
pcm_RMSenergy_sma_meanPeakDist_IC11;
mfcc_sma[10]_quartile1_IC10;
pcm_fftMag_mfcc_sma[10]_qregc3_IC12;
mfcc_sma[10]_quartile3_IC10;
pcm_fftMag_spectralRollOff90.0_sma_linregc2_IC12;
logMelFreqBand_sma[3]_linregc2_IC10;
F0final_sma_quartile2_IC13;
pcm_fftMag_spectralRollOff90.0_sma_amean_IC12;
audSpec_Rfilt_sma[3]_segLenStddev_IC11;
mfcc_sma[10]_linregc2_IC10;
F0final_sma_quartile1_IC12;
audSpec_Rfilt_sma[9]_segLenStddev_IC11;
pcm_RMSenergy_sma_peakDistStddev_IC12;
pcm_fftMag_spectralRollOff50.0_sma_centroid_IC13;
audSpec_Rfilt_sma[14]_segLenStddev_IC11;
audSpec_Rfilt_sma[0]_segLenStddev_IC11;
pcm_fftMag_spectralKurtosis_sma_de_downleveltime75_IC12;
mfcc_sma[6]_qregc2_IC13;
mfcc_sma[10]_amean_IC10;
pcm_fftMag_spectralRollOff25.0_sma_centroid_IC11;
audspec_lengthL1norm_sma_peakDistStddev_IC13;
pcm_fftMag_spectralHarmonicity_sma_meanPeakDist_IC13;
mfcc_sma[10]_quartile2_IC10;
pcm_fftMag_spectralCentroid_sma_rqmean_IC13;
pcm_fftMag_spectralVariance_sma_qregc3_IC12;
audSpec_Rfilt_sma[4]_segLenStddev_IC11;
pcm_fftMag_mfcc_sma[1]_qregc3_IC12;
F0final_sma_quartile2_IC10;
pcm_fftMag_mfcc_sma[10]_quartile2_IC11;
pcm_fftMag_spectralVariance_sma_amean_IC12;
F0final_sma_quartile2_IC11;
mfcc_sma[8]_quartile3_IC10;
pcm_RMSenergy_sma_de_linregc1_IC11;
pcm_RMSenergy_sma_quartile2_IC11;
pcm_fftMag_psySharpness_sma_linregc2_IC13;
F0final_sma_quartile3_IC12;
pcm_fftMag_spectralVariance_sma_quartile2_IC11;
pcm_fftMag_spectralKurtosis_sma_lpc0_IC11;
logMelFreqBand_sma[7]_linregc1_IC10;
pcm_fftMag_spectralSkewness_sma_de_amean_IC11;
pcm_fftMag_mfcc_sma[6]_qregc1_IC12;
pcm_fftMag_spectralKurtosis_sma_de_upleveltime50_IC12;
pcm_fftMag_psySharpness_sma_rqmean_IC12;
pcm_fftMag_fband25-650_sma_de_linregc1_IC11;
mfcc_sma[6]_qregc1_IC13;
pcm_fftMag_psySharpness_sma_flatness_IC12;
pcm_fftMag_spectralVariance_sma_de_amean_IC11;
pcm_fftMag_spectralSlope_sma_de_flatness_IC12;
pcm_fftMag_spectralVariance_sma_iqr1-2_IC11;
pcm_fftMag_psySharpness_sma_amean_IC12;
pcm_fftMag_spectralKurtosis_sma_de_amean_IC11;
pcm_zcr_sma_qregc3_IC13;
pcm_fftMag_mfcc_sma[10]_quartile1_IC11;
pcm_fftMag_spectralSkewness_sma_de_skewness_IC11;
F0final_sma_de_quartile3_IC13;
jitterLocal_sma_quartile2_IC11;
pcm_RMSenergy_sma_meanPeakDist_IC13;
pcm_fftMag_spectralVariance_sma_amean_IC11;
pcm_fftMag_spectralRollOff90.0_sma_qregerrQ_IC12;
pcm_fftMag_spectralRollOff25.0_sma_centroid_IC12;
pcm_fftMag_spectralKurtosis_sma_de_qregc2_IC11;
logMelFreqBand_sma_de[7]_skewness_IC10;
pcm_fftMag_spectralVariance_sma_de_iqr1-3_IC11;
pcm_fftMag_fband250-650_sma_meanPeakDist_IC13;
pcm_fftMag_spectralKurtosis_sma_de_skewness_IC11;
pcm_fftMag_spectralRollOff75.0_sma_centroid_IC13;
pcm_fftMag_spectralSkewness_sma_de_upleveltime50_IC12;
pcm_fftMag_spectralEntropy_sma_peakMeanAbs_IC12;
voicingFinalUnclipped_sma_de_skewness_IC11;
pcm_fftMag_spectralRollOff75.0_sma_centroid_IC11;
pcm_fftMag_spectralVariance_sma_de_qregc2_IC11;
logMelFreqBand_sma[1]_pctlrange0-1_IC10;
pcm_fftMag_spectralKurtosis_sma_de_upleveltime75_IC12;
pcm_zcr_sma_range_IC13;
pcm_fftMag_spectralVariance_sma_qregerrQ_IC12;
pcm_RMSenergy_sma_flatness_IC12;
pcm_fftMag_fband25-650_sma_iqr1-2_IC11;
pcm_fftMag_spectralKurtosis_sma_de_downleveltime50_IC12;
logMelFreqBand_sma[1]_quartile2_IC10;
pcm_fftMag_spectralEntropy_sma_peakMeanAbs_IC13;
pcm_fftMag_spectralFlux_sma_rqmean_IC13;
pcm_fftMag_psySharpness_sma_rqmean_IC13;
pcm_fftMag_spectralSkewness_sma_de_peakRangeRel_IC13;
logMelFreqBand_sma_de[5]_skewness_IC10;
pcm_zcr_sma_de_skewness_IC11;
pcm_fftMag_spectralSlope_sma_de_flatness_IC13;
pcm_fftMag_spectralRollOff90.0_sma_qregc3_IC12;
pcm_fftMag_spectralSlope_sma_de_linregc1_IC11;
pcm_fftMag_spectralHarmonicity_sma_de_quartile3_IC12;
pcm_RMSenergy_sma_de_posamean_IC12;
pcm_fftMag_spectralRollOff90.0_sma_centroid_IC13;
pcm_RMSenergy_sma_de_posamean_IC13;
pcm_fftMag_spectralSkewness_sma_de_qregc2_IC11;
pcm_loudness_sma_quartile3_IC10;
pcm_RMSenergy_sma_meanSegLen_IC13;
pcm_fftMag_fband250-650_sma_de_flatness_IC13;
audSpec_Rfilt_sma_de[10]_flatness_IC12;
pcm_fftMag_spectralEntropy_sma_stddevRisingSlope_IC13;
pcm_fftMag_spectralEntropy_sma_peakMeanMeanDist_IC13;
pcm_fftMag_spectralSkewness_sma_lpc3_IC11;
pcm_zcr_sma_de_range_IC12;
pcm_fftMag_spectralSkewness_sma_lpc0_IC11;
pcm_fftMag_spectralRollOff90.0_sma_flatness_IC12;

audSpec_Rfilt_sma_de[24]_flatness_IC13;
logMelFreqBand_sma_de[4]_skewness_IC10;
pcm_fftMag_spectralRollOff90.0_sma_linregc2_IC13;
logMelFreqBand_sma[3]_upleveltime75_IC10;
pcm_fftMag_spectralRollOff90.0_sma_qregerrQ_IC13;
pcm_fftMag_spectralEntropy_sma_stddevRisingSlope_IC12;
pcm_zcr_sma_lpgain_IC11;
pcm_fftMag_spectralEntropy_sma_de_meanRisingSlope_IC13;
mfcc_sma_de[7]_posamean_IC13;
pcm_zcr_sma_qregc3_IC12;
pcm_zcr_sma_de_range_IC13;
pcm_zcr_sma_de_lpc0_IC13;
pcm_fftMag_spectralRollOff25.0_sma_qregc3_IC13;
pcm_fftMag_spectralRollOff90.0_sma_qregerrQ_IC11;
pcm_fftMag_spectralEntropy_sma_de_peakRangeAbs_IC13;
audSpec_Rfilt_sma_de[22]_flatness_IC13;
logMelFreqBand_sma[0]_pctlrange0-1_IC10;
pcm_fftMag_spectralSkewness_sma_peakRangeRel_IC12;
pcm_fftMag_spectralEntropy_sma_de_peakMeanAbs_IC13;
pcm_fftMag_spectralRollOff75.0_sma_linregc2_IC13;
pcm_fftMag_spectralVariance_sma_rqmean_IC13;
audSpec_Rfilt_sma_de[8]_flatness_IC12;
pcm_fftMag_spectralRollOff75.0_sma_amean_IC12;
pcm_zcr_sma_de_amean_IC11;
pcm_zcr_sma_stddev_IC13;
pcm_fftMag_psySharpness_sma_de_peakMeanMeanDist_IC13;
pcm_fftMag_spectralEntropy_sma_peakMeanMeanDist_IC12;
pcm_zcr_sma_iqr1-3_IC11;
pcm_fftMag_spectralRollOff50.0_sma_stddev_IC11;
pcm_zcr_sma_de_lpc0_IC11;
audSpec_Rfilt_sma_de[9]_flatness_IC13;
audSpec_Rfilt_sma_de[25]_flatness_IC12;
audSpec_Rfilt_sma_de[9]_flatness_IC12;
audspecRasta_lengthL1norm_sma_lpc1_IC11;
pcm_zcr_sma_linregc2_IC13;
audSpec_Rfilt_sma[0]_centroid_IC12;
pcm_fftMag_spectralKurtosis_sma_de_flatness_IC13;
pcm_fftMag_spectralRollOff90.0_sma_flatness_IC13;
audSpec_Rfilt_sma_de[23]_flatness_IC13;
pcm_fftMag_spectralEntropy_sma_de_peakMeanMeanDist_IC13;
pcm_fftMag_psySharpness_sma_centroid_IC13;
pcm_fftMag_psySharpness_sma_de_range_IC12;
pcm_fftMag_spectralRollOff25.0_sma_linregc2_IC13;
pcm_zcr_sma_de_skewness_IC13;
audSpec_Rfilt_sma_de[11]_flatness_IC13;
pcm_fftMag_mfcc_sma_de[7]_percentile99.0_IC11;
pcm_fftMag_spectralRollOff75.0_sma_linregc2_IC12;
audSpec_Rfilt_sma_de[23]_flatness_IC12;
pcm_zcr_sma_de_lpgain_IC13;
pcm_zcr_sma_range_IC12;
pcm_fftMag_spectralEntropy_sma_peakMeanRel_IC13;
audSpec_Rfilt_sma_de[10]_flatness_IC13;
pcm_fftMag_spectralEntropy_sma_peakMeanRel_IC12;
pcm_fftMag_spectralRollOff50.0_sma_centroid_IC11;
logMelFreqBand_sma[2]_pctlrange0-1_IC10;
pcm_fftMag_spectralRollOff25.0_sma_linregc2_IC12;
pcm_zcr_sma_de_stddev_IC13;
pcm_fftMag_spectralEntropy_sma_meanRisingSlope_IC13;
audSpec_Rfilt_sma_de[22]_flatness_IC12;
pcm_fftMag_mfcc_sma_de[7]_posamean_IC12;
pcm_fftMag_spectralRollOff75.0_sma_amean_IC13;
mfcc_sma[0]_pctlrange0-1_IC10;
logHNR_sma_de_flatness_IC13;
pcm_fftMag_mfcc_sma[1]_meanPeakDist_IC11;
logMelFreqBand_sma[1]_percentile1.0_IC10;
pcm_fftMag_spectralVariance_sma_peakRangeAbs_IC12;
pcm_fftMag_spectralEntropy_sma_de_stddevFallingSlope_IC13;
audSpec_Rfilt_sma_de[5]_flatness_IC12;
logMelFreqBand_sma[4]_pctlrange0-1_IC10;
audSpec_Rfilt_sma_de[8]_flatness_IC13;
pcm_fftMag_mfcc_sma[10]_centroid_IC12;
pcm_fftMag_spectralEntropy_sma_meanRisingSlope_IC12;
pcm_fftMag_spectralCentroid_sma_de_peakMeanMeanDist_IC13;
pcm_fftMag_psySharpness_sma_de_peakMeanAbs_IC13;
mfcc_sma[9]_upleveltime75_IC10;
audSpec_Rfilt_sma_de[2]_flatness_IC13;
pcm_zcr_sma_stddev_IC11;
F0final_sma_lpc0_IC11;
pcm_fftMag_spectralCentroid_sma_de_range_IC13;
audSpec_Rfilt_sma_de[25]_flatness_IC13;
audSpec_Rfilt_sma[0]_flatness_IC12;
pcm_zcr_sma_lpgain_IC13;
pcm_fftMag_spectralRollOff90.0_sma_linregerrQ_IC12;
audSpec_Rfilt_sma_de[24]_flatness_IC12;
pcm_fftMag_spectralKurtosis_sma_kurtosis_IC11;
pcm_zcr_sma_peakRangeRel_IC13;
pcm_fftMag_spectralEntropy_sma_de_stddevRisingSlope_IC13;
audSpec_Rfilt_sma_de[0]_flatness_IC13;
audSpec_Rfilt_sma_de[4]_flatness_IC13;
pcm_zcr_sma_pctlrange0-1_IC13;
audSpec_Rfilt_sma_de[11]_flatness_IC12;
pcm_zcr_sma_de_rqmean_IC12;
logMelFreqBand_sma[3]_pctlrange0-1_IC10;
logMelFreqBand_sma[5]_pctlrange0-1_IC10;
audSpec_Rfilt_sma_de[3]_flatness_IC13;
pcm_zcr_sma_de_stddev_IC11;
audSpec_Rfilt_sma_de[0]_flatness_IC12;
pcm_fftMag_spectralVariance_sma_qregerrQ_IC13;
audSpec_Rfilt_sma_de[14]_meanPeakDist_IC11;
audSpec_Rfilt_sma[0]_flatness_IC13;
pcm_fftMag_psySharpness_sma_linregerrQ_IC13;
pcm_fftMag_spectralRollOff75.0_sma_qregc2_IC12;
pcm_zcr_sma_pctlrange0-1_IC11;
audSpec_Rfilt_sma_de[6]_flatness_IC12;
pcm_fftMag_mfcc_sma_de[7]_quartile1_IC11;
mfcc_sma[8]_meanFallingSlope_IC13;
F0final_sma_ff0_meanSegLen_IC12;
audSpec_Rfilt_sma_de[3]_flatness_IC12;
pcm_fftMag_spectralRollOff50.0_sma_linregc2_IC12;
audSpec_Rfilt_sma_de[1]_flatness_IC12;
pcm_zcr_sma_de_rqmean_IC13;
logMelFreqBand_sma[4]_percentile1.0_IC10;
audSpec_Rfilt_sma_de[6]_peakDistStddev_IC11;
logMelFreqBand_sma[3]_percentile1.0_IC10;
audSpec_Rfilt_sma_de[15]_amean_IC11;
audSpec_Rfilt_sma_de[12]_flatness_IC12;
pcm_fftMag_spectralRollOff90.0_sma_rqmean_IC13;
audSpec_Rfilt_sma_de[5]_flatness_IC13;
pcm_fftMag_spectralEntropy_sma_percentile99.0_IC11;

audspecRasta_lengthL1norm_sma_de_flatness_IC13;
audSpec_Rfilt_sma_de[6]_flatness_IC13;
pcm_fftMag_spectralCentroid_sma_de_peakMeanAbs_IC13;
F0final_sma_de_linregc1_IC10;
pcm_fftMag_spectralCentroid_sma_linregerrQ_IC13;
audSpec_Rfilt_sma_de[4]_flatness_IC12;
pcm_fftMag_spectralVariance_sma_linregerrQ_IC12;
mfcc_sma[0]_percentile1.0_IC10;
audSpec_Rfilt_sma_de[7]_flatness_IC13;
audSpec_Rfilt_sma_de[2]_flatness_IC12;
logMelFreqBand_sma[2]_percentile1.0_IC10;
audSpec_Rfilt_sma_de[12]_flatness_IC13;
pcm_fftMag_spectralCentroid_sma_stddev_IC13;
pcm_fftMag_spectralRollOff75.0_sma_rqmean_IC12;
logMelFreqBand_sma[0]_percentile1.0_IC10;
pcm_fftMag_spectralVariance_sma_rqmean_IC12;
pcm_zcr_sma_peakRangeRel_IC12;
pcm_fftMag_spectralEntropy_sma_pctlrange0-1_IC11;
logHNR_sma_iqr2-3_IC13;
logMelFreqBand_sma[6]_percentile1.0_IC10;
audSpec_Rfilt_sma_de[1]_flatness_IC13;
audspecRasta_lengthL1norm_sma_de_flatness_IC12;
logMelFreqBand_sma[5]_percentile1.0_IC10;
jitterDDP_sma_de_centroid_IC13;
pcm_zcr_sma_percentile99.0_IC13;
voicingFinalUnclipped_sma_de_amean_IC13;
audSpec_Rfilt_sma_de[16]_peakMeanRel_IC13;
audSpec_Rfilt_sma_de[7]_flatness_IC12;
pcm_zcr_sma_percentile99.0_IC11; and
voicingFinalUnclipped_sma_de_centroid_IC11.

7. The method of claim 5, wherein the voice features comprise at least one voice feature selected from the group of:
pcm_loudness_sma_quartile3_numeric_IC10;
mfcc_sma_9_upleveltime75_numeric_IC10;
mfcc_sma_de_7_quartile1_numeric_IC10;
mfcc_sma_de_13_amean_numeric_IC10;
logMelFreqBand_sma_de_4_skewness_numeric_IC10;
F0final_sma_de_linregc1_numeric_IC10;
audspec_lengthL1norm_sma_de_centroid_numeric_IC11;
pcm_RMSenergy_sma_de_linregc1_numeric_IC11;
pcm_RMSenergy_sma_de_centroid_numeric_IC11;
pcm_zcr_sma_de_centroid_numeric_IC11;
audSpec_Rfilt_sma_19_minSegLen_numeric_IC11;
pcm_fftMag_mfcc_sma_1_meanPeakDist_numeric_IC11;
pcm_fftMag_mfcc_sma_4_centroid_numeric_IC11;
pcm_fftMag_mfcc_sma_5_centroid_numeric_IC11;
pcm_fftMag_mfcc_sma_6_centroid_numeric_IC11;
pcm_fftMag_mfcc_sma_7_centroid_numeric_IC11;
pcm_fftMag_mfcc_sma_8_centroid_numeric_IC11;
pcm_fftMag_mfcc_sma_9_centroid_numeric_IC11;
pcm_fftMag_mfcc_sma_10_centroid_numeric_IC11;
pcm_fftMag_mfcc_sma_12_centroid_numeric_IC11;
audSpec_Rfilt_sma_de_0_centroid_numeric_IC11;
audSpec_Rfilt_sma_de_1_minSegLen_numeric_IC11;
audSpec_Rfilt_sma_de_1_centroid_numeric_IC11;
audSpec_Rfilt_sma_de_2_centroid_numeric_IC11;
audSpec_Rfilt_sma_de_3_centroid_numeric_IC11;
audSpec_Rfilt_sma_de_4_centroid_numeric_IC11;
audSpec_Rfilt_sma_de_5_centroid_numeric_IC11;
audSpec_Rfilt_sma_de_6_peakDistStddev_numeric_IC11;
audSpec_Rfilt_sma_de_6_centroid_numeric_IC11;
audSpec_Rfilt_sma_de_7_maxSegLen_numeric_IC11;
audSpec_Rfilt_sma_de_8_centroid_numeric_IC11;
audSpec_Rfilt_sma_de_9_centroid_numeric_IC11;
audSpec_Rfilt_sma_de_10_centroid_numeric_IC11;
audSpec_Rfilt_sma_de_12_centroid_numeric_IC11;
audSpec_Rfilt_sma_de_13_centroid_numeric_IC11;
audSpec_Rfilt_sma_de_14_meanPeakDist_numeric_IC11;
audSpec_Rfilt_sma_de_15_amean_numeric_IC11;
audSpec_Rfilt_sma_de_15_centroid_numeric_IC11;
audSpec_Rfilt_sma_de_17_centroid_numeric_IC11;
audSpec_Rfilt_sma_de_18_centroid_numeric_IC11;
audSpec_Rfilt_sma_de_19_centroid_numeric_IC11;
audSpec_Rfilt_sma_de_20_centroid_numeric_IC11;
audSpec_Rfilt_sma_de_21_centroid_numeric_IC11;
audSpec_Rfilt_sma_de_22_centroid_numeric_IC11;
audSpec_Rfilt_sma_de_23_centroid_numeric_IC11;
audSpec_Rfilt_sma_de_25_centroid_numeric_IC11;
pcm_fftMag_fband25_650_sma_de_minSegLen_numeric_IC11;
pcm_fftMag_fband25_650_sma_de_linregc1_numeric_IC11;
pcm_fftMag_fband25_650_sma_de_centroid_numeric_IC11;
pcm_fftMag_fband1000_4000_sma_de_centroid_numeric_IC11;
pcm_fftMag_spectralRollOff25.0_sma_de_falltime_numeric_IC11;
pcm_fftMag_spectralRollOff90.0_sma_de_centroid_numeric_IC11;
pcm_fftMag_spectralFlux_sma_de_centroid_numeric_IC11;
pcm_fftMag_spectralEntropy_sma_de_centroid_numeric_IC11;
pcm_fftMag_spectralVariance_sma_de_centroid_numeric_IC11;
pcm_fftMag_spectralSkewness_sma_de_centroid_numeric_IC11;
pcm_fftMag_spectralKurtosis_sma_de_centroid_numeric_IC11;
pcm_fftMag_spectralSlope_sma_de_minSegLen_numeric_IC11;
pcm_fftMag_spectralSlope_sma_de_linregc1_numeric_IC11;
pcm_fftMag_spectralSlope_sma_de_centroid_numeric_IC11;
pcm_fftMag_mfcc_sma_de_2_centroid_numeric_IC11;
pcm_fftMag_mfcc_sma_de_3_peakDistStddev_numeric_IC11;
pcm_fftMag_mfcc_sma_de_3_centroid_numeric_IC11;
pcm_fftMag_mfcc_sma_de_6_kurtosis_numeric_IC11;
pcm_fftMag_mfcc_sma_de_6_centroid_numeric_IC11;
pcm_fftMag_mfcc_sma_de_7_quartile1_numeric_IC11;
pcm_fftMag_mfcc_sma_de_7_percentile99.0_numeric_IC11;
pcm_fftMag_mfcc_sma_de_7_centroid_numeric_IC11;
pcm_fftMag_mfcc_sma_de_9_centroid_numeric_IC11;
pcm_fftMag_mfcc_sma_de_10_centroid_numeric_IC11;
pcm_fftMag_mfcc_sma_de_11_centroid_numeric_IC11;
pcm_fftMag_mfcc_sma_de_12_centroid_numeric_IC11;
F0final_sma_lpc0_numeric_IC11;
jitterLocal_sma_quartile2_numeric_IC11;
jitterDDP_sma_qregc1_numeric_IC11;
F0final_sma_de_centroid_numeric_IC11;
voicingFinalUnclipped_sma_de_skewness_numeric_IC11;
voicingFinalUnclipped_sma_de_centroid_numeric_IC11;

jitterLocal_sma_de_centroid_numeric_IC11;
jitterDDP_sma_de_centroid_numeric_IC11;
shimmerLocal_sma_de_centroid_numeric_IC11;
pcm_fftMag_mfcc_sma_14_kurtosis_numeric_IC12;
pcm_fftMag_fband250_650_sma_de_minSegLen_numeric_IC12;
pcm_fftMag_spectralHarmonicity_sma_de_minSegLen_numeric_IC12;
F0final_sma_ff0_meanSegLen_numeric_IC12;
audSpec_Rfilt_sma_4_meanPeakDist_numeric_IC12;
audSpec_Rfilt_sma_4_peakDistStddev_numeric_IC12;
pcm_fftMag_spectralRollOff50.0_sma_peakDistStddev_numeric_IC12;
pcm_fftMag_mfcc_sma_2_peakMeanRel_numeric_IC12;
pcm_fftMag_mfcc_sma_4_peakMeanRel_numeric_IC12;
pcm_fftMag_mfcc_sma_5_peakMeanRel_numeric_IC12;
pcm_fftMag_mfcc_sma_5_centroid_numeric_IC12;
pcm_fftMag_mfcc_sma_6_peakMeanRel_numeric_IC12;
pcm_fftMag_mfcc_sma_6_centroid_numeric_IC12;
pcm_fftMag_mfcc_sma_7_centroid_numeric_IC12;
pcm_fftMag_mfcc_sma_8_peakMeanRel_numeric_IC12;
pcm_fftMag_mfcc_sma_8_centroid_numeric_IC12;
pcm_fftMag_mfcc_sma_9_peakMeanRel_numeric_IC12;
pcm_fftMag_mfcc_sma_9_centroid_numeric_IC12;
pcm_fftMag_mfcc_sma_10_peakMeanRel_numeric_IC12;
pcm_fftMag_mfcc_sma_10_centroid_numeric_IC12;
pcm_fftMag_mfcc_sma_11_peakMeanRel_numeric_IC12;
pcm_fftMag_mfcc_sma_11_centroid_numeric_IC12;
pcm_fftMag_mfcc_sma_12_peakMeanRel_numeric_IC12;
pcm_fftMag_mfcc_sma_12_centroid_numeric_IC12;
pcm_fftMag_mfcc_sma_13_peakMeanRel_numeric_IC12;
pcm_fftMag_mfcc_sma_14_peakMeanRel_numeric_IC12;
pcm_fftMag_mfcc_sma_14_centroid_numeric_IC12;
pcm_RMSenergy_sma_de_posamean_numeric_IC12;
pcm_fftMag_mfcc_sma_de_7_posamean_numeric_IC12;
logHNR_sma_iqr2_3_numeric_IC13;
F0final_sma_de_centroid_numeric_IC13;
F0final_sma_de_quartile3_numeric_IC13;
F0final_sma_de_iqr2_3_numeric_IC13;
voicingFinalUnclipped_sma_de_amean_numeric_IC13;
voicingFinalUnclipped_sma_de_centroid_numeric_IC13;
jitterLocal_sma_de_centroid_numeric_IC13;
jitterDDP_sma_de_centroid_numeric_IC13;
jitterDDP_sma_de_upleveltime90_numeric_IC13;
logHNR_sma_de_flatness_numeric_IC13;
logHNR_sma_de_centroid_numeric_IC13;
audSpec_Rfilt_sma_4_meanPeakDist_numeric_IC13;
audSpec_Rfilt_sma_4_peakDistStddev_numeric_IC13;
pcm_fftMag_spectralRollOff50.0_sma_peakDistStddev_numeric_IC13;
pcm_fftMag_spectralFlux_sma_rqmean_numeric_IC13;
mfcc_sma_2_peakMeanRel_numeric_IC13;
mfcc_sma_3_peakMeanRel_numeric_IC13;
mfcc_sma_4_peakMeanRel_numeric_IC13;
mfcc_sma_4_centroid_numeric_IC13;
mfcc_sma_5_peakMeanRel_numeric_IC13;
mfcc_sma_5_centroid_numeric_IC13;
mfcc_sma_6_peakMeanRel_numeric_IC13;
mfcc_sma_6_centroid_numeric_IC13;
mfcc_sma_7_centroid_numeric_IC13;
mfcc_sma_8_peakMeanRel_numeric_IC13;
meanFallingSlope_numeric_IC13;
mfcc_sma_8_centroid_numeric_IC13;
mfcc_sma_9_peakMeanRel_numeric_IC13;
mfcc_sma_9_centroid_numeric_IC13;
mfcc_sma_10_peakMeanRel_numeric_IC13;
mfcc_sma_10_centroid_numeric_IC13;
mfcc_sma_11_peakMeanRel_numeric_IC13;
mfcc_sma_11_centroid_numeric_IC13;
mfcc_sma_12_peakMeanRel_numeric_IC13;
mfcc_sma_12_centroid_numeric_IC13;
mfcc_sma_13_peakMeanRel_numeric_IC13;
mfcc_sma_14_peakMeanRel_numeric_IC13;
mfcc_sma_14_centroid_numeric_IC13;
audspec_lengthL1norm_sma_de_peakMeanRel_numeric_IC13;
audspecRasta_lengthL1norm_sma_de_peakMeanRel_numeric_IC13;
pcm_RMSenergy_sma_de_posamean_numeric_IC13;
pcm_RMSenergy_sma_de_peakMeanRel_numeric_IC13;
audSpec_Rfilt_sma_de_0_peakMeanRel_numeric_IC13;
audSpec_Rfilt_sma_de_1_peakMeanRel_numeric_IC13;
audSpec_Rfilt_sma_de_2_peakMeanRel_numeric_IC13;
audSpec_Rfilt_sma_de_3_peakMeanRel_numeric_IC13;
audSpec_Rfilt_sma_de_4_peakMeanRel_numeric_IC13;
audSpec_Rfilt_sma_de_7_peakMeanRel_numeric_IC13;
audSpec_Rfilt_sma_de_9_peakMeanRel_numeric_IC13;
audSpec_Rfilt_sma_de_11_peakMeanRel_numeric_IC13;
audSpec_Rfilt_sma_de_12_peakMeanRel_numeric_IC13;
audSpec_Rfilt_sma_de_13_peakMeanRel_numeric_IC13;
audSpec_Rfilt_sma_de_14_peakMeanRel_numeric_IC13;
audSpec_Rfilt_sma_de_15_peakMeanRel_numeric_IC13;
audSpec_Rfilt_sma_de_16_peakMeanRel_numeric_IC13;
audSpec_Rfilt_sma_de_17_peakMeanRel_numeric_IC13;
audSpec_Rfilt_sma_de_19_peakMeanRel_numeric_IC13;
audSpec_Rfilt_sma_de_20_peakMeanRel_numeric_IC13;
audSpec_Rfilt_sma_de_21_peakMeanRel_numeric_IC13;
audSpec_Rfilt_sma_de_22_peakMeanRel_numeric_IC13;
audSpec_Rfilt_sma_de_23_peakMeanRel_numeric_IC13;
audSpec_Rfilt_sma_de_24_peakMeanRel_numeric_IC13;
audSpec_Rfilt_sma_de_25_peakMeanRel_numeric_IC13;
pcm_fftMag_fband250_650_sma_de_peakMeanRel_numeric_IC13;
pcm_fftMag_fband1000_4000_sma_de_peakMeanRel_numeric_IC13;
pcm_fftMag_spectralRollOff50.0_sma_de_peakMeanRel_numeric_IC13;
pcm_fftMag_spectralRollOff90.0_sma_de_peakMeanRel_numeric_IC13;
pcm_fftMag_spectralFlux_sma_de_peakMeanRel_numeric_IC13;

pcm_fftMag_spectralCentroid_sma_de_peakMeanRel_numeric_IC13;
pcm_fftMag_spectralEntropy_sma_de_peakMeanRel_numeric_IC13;
pcm_fftMag_spectralVariance_sma_de_peakMeanRel_numeric_IC13;
pcm_fftMag_spectralSkewness_sma_de_peakMeanRel_numeric_IC13;
pcm_fftMag_spectralKurtosis_sma_de_peakMeanRel_numeric_IC13;
pcm_fftMag_spectralSlope_sma_de_peakMeanRel_numeric_IC13;
pcm_fftMag_spectralHarmonicity_sma_de_peakMeanRel_numeric_IC13;
mfcc_sma_de_1_peakMeanRel_numeric_IC13;
mfcc_sma_de_3_peakMeanRel_numeric_IC13;
mfcc_sma_de_5_peakMeanRel_numeric_IC13;
mfcc_sma_de_7_posamean_numeric_IC13;
mfcc_sma_de_7_peakMeanRel_numeric_IC13;
mfcc_sma_de_8_peakMeanRel_numeric_IC13;
mfcc_sma_de_9_peakMeanRel_numeric_IC13;
mfcc_sma_de_10_peakMeanRel_numeric_IC13;
mfcc_sma_de_11_peakMeanRel_numeric_IC13;
mfcc_sma_de_12_peakMeanRel_numeric_IC13;
mfcc_sma_de_14_peakMeanRel_numeric_IC13;
pcm_loudness_sma_quartile3_IC10;
mfcc_sma[0]_percentile1.0_IC10;
mfcc_sma[0]_pctlrange0-1_IC10;
mfcc_sma[8]_quartile3_IC10;
mfcc_sma[9]_upleveltime75_IC10;
mfcc_sma[10]_amean_IC10;
mfcc_sma[10]_linregc2_IC10;
mfcc_sma[10]_quartile1_IC10;
mfcc_sma[10]_quartile2_IC10;
mfcc_sma[10]_quartile3_IC10;
logMelFreqBand_sma[0]_percentile1.0_IC10;
logMelFreqBand_sma[0]_pctlrange0-1_IC10;
logMelFreqBand_sma[1]_linregc2_IC10;
logMelFreqBand_sma[1]_quartile2_IC10;
logMelFreqBand_sma[1]_percentile1.0_IC10;
logMelFreqBand_sma[1]_pctlrange0-1_IC10;
logMelFreqBand_sma[2]_percentile1.0_IC10;
logMelFreqBand_sma[2]_pctlrange0-1_IC10;
logMelFreqBand_sma[3]_linregc2_IC10;
logMelFreqBand_sma[3]_percentile1.0_IC10;
logMelFreqBand_sma[3]_pctlrange0-1_IC10;
logMelFreqBand_sma[3]_upleveltime75_IC10;
logMelFreqBand_sma[4]_percentile1.0_IC10;
logMelFreqBand_sma[4]_pctlrange0-1_IC10;
logMelFreqBand_sma[5]_percentile1.0_IC10;
logMelFreqBand_sma[5]_pctlrange0-1_IC10;
logMelFreqBand_sma[6]_percentile1.0_IC10;
logMelFreqBand_sma[7]_linregc1_IC10;
logMelFreqBand_sma_de[4]_skewness_IC10;
logMelFreqBand_sma_de[5]_skewness_IC10;
logMelFreqBand_sma_de[7]_skewness_IC10;
logMelFreqBand_sma_de[7]_upleveltime75_IC10;
logMelFreqBand_sma_de[7]_upleveltime90_IC10;
IspFreq_sma_de[5]_linregc2_IC10;
F0final_sma_quartile2_IC10;
F0final_sma_de_linregc1_IC10;
audspecRasta_lengthL1norm_sma_lpc1_IC11;
pcm_RMSenergy_sma_quartile2_IC11;
pcm_RMSenergy_sma_meanPeakDist_IC11;
pcm_zcr_sma_iqr1-3_IC11;
pcm_zcr_sma_percentile99.0_IC11;
pcm_zcr_sma_pctlrange0-1_IC11;
pcm_zcr_sma_amean_IC11;
pcm_zcr_sma_stddev_IC11;
pcm_zcr_sma_lpgain_IC11;
pcm_RMSenergy_sma_de_linregc1_IC11;
pcm_zcr_sma_de_amean_IC11;
pcm_zcr_sma_de_stddev_IC11;
pcm_zcr_sma_de_skewness_IC11;
pcm_zcr_sma_de_lpc0_IC11;
audSpec_Rfilt_sma[0]_segLenStddev_IC11;
audSpec_Rfilt_sma[3]_segLenStddev_IC11;
audSpec_Rfilt_sma[4]_segLenStddev_IC11;
audSpec_Rfilt_sma[8]_segLenStddev_IC11;
audSpec_Rfilt_sma[9]_segLenStddev_IC11;
audSpec_Rfilt_sma[10]_segLenStddev_IC11;
audSpec_Rfilt_sma[11]_segLenStddev_IC11;
audSpec_Rfilt_sma[12]_segLenStddev_IC11;
audSpec_Rfilt_sma[14]_segLenStddev_IC11;
pcm_fftMag_fband25-650_sma_iqr1-2_IC11;
pcm_fftMag_spectralRollOff25.0_sma_centroid_IC11;
pcm_fftMag_spectralRollOff50.0_sma_stddev_IC11;
pcm_fftMag_spectralRollOff50.0_sma_centroid_IC11;
pcm_fftMag_spectralRollOff75.0_sma_centroid_IC11;
pcm_fftMag_spectralRollOff90.0_sma_qregerrQ_IC11;
pcm_fftMag_spectralEntropy_sma_percentile99.0_IC11;
pcm_fftMag_spectralEntropy_sma_pctlrange0-1_IC11;
pcm_fftMag_spectralVariance_sma_quartile2_IC11;
pcm_fftMag_spectralVariance_sma_quartile3_IC11;
pcm_fftMag_spectralVariance_sma_iqr1-2_IC11;
pcm_fftMag_spectralVariance_sma_amean_IC11;
pcm_fftMag_spectralSkewness_sma_lpc0_IC11;
pcm_fftMag_spectralSkewness_sma_lpc3_IC11;
pcm_fftMag_spectralKurtosis_sma_kurtosis_IC11;
pcm_fftMag_spectralKurtosis_sma_lpc0_IC11;
pcm_fftMag_mfcc_sma[1]_meanPeakDist_IC11;
pcm_fftMag_mfcc_sma[10]_quartile1_IC11;
pcm_fftMag_mfcc_sma[10]_quartile2_IC11;
audSpec_Rfilt_sma_de[6]_peakDistStddev_IC11;
audSpec_Rfilt_sma_de[14]_meanPeakDist_IC11;
audSpec_Rfilt_sma_de[15]_amean_IC11;
pcm_fftMag_fband25-650_sma_de_linregc1_IC11;
pcm_fftMag_spectralVariance_sma_de_iqr1-3_IC11;
pcm_fftMag_spectralVariance_sma_de_amean_IC11;
pcm_fftMag_spectralVariance_sma_de_qregc2_IC11;
pcm_fftMag_spectralSkewness_sma_de_amean_IC11;
pcm_fftMag_spectralSkewness_sma_de_skewness_IC11;
pcm_fftMag_spectralSkewness_sma_de_qregc2_IC11;
pcm_fftMag_spectralKurtosis_sma_de_amean_IC11;
pcm_fftMag_spectralKurtosis_sma_de_skewness_IC11;
pcm_fftMag_spectralKurtosis_sma_de_qregc2_IC11;
pcm_fftMag_spectralSlope_sma_de_linregc1_IC11;
pcm_fftMag_mfcc_sma_de[7]_quartile1_IC11;
pcm_fftMag_mfcc_sma_de[7]_percentile99.0_IC11;
F0final_sma_quartile2_IC11;
F0final_sma_lpc0_IC11;
jitterLocal_sma_quartile2_IC11;
voicingFinalUnclipped_sma_de_skewness_IC11;
voicingFinalUnclipped_sma_de_centroid_IC11;
pcm_zcr_sma_range_IC12;
pcm_zcr_sma_de_range_IC12;
pcm_fftMag_spectralSkewness_sma_de_upleveltime50_IC12;
pcm_fftMag_spectralKurtosis_sma_de_upleveltime50_IC12;
pcm_fftMag_spectralKurtosis_sma_de_downleveltime50_IC12;

pcm_fftMag_spectralKurtosis_sma_de_upleveltime75_IC12;
pcm_fftMag_spectralKurtosis_sma_de_downleveltime75_IC12;
pcm_fftMag_psySharpness_sma_de_range_IC12;
pcm_fftMag_spectralHarmonicity_sma_de_quartile3_IC12;
F0final_sma_quartile1_IC12;
F0final_sma_quartile2_IC12;
F0final_sma_quartile3_IC12;
F0final_sma_ff0_meanSegLen_IC12;
audspec_lengthL1norm_sma_meanPeakDist_IC12;
pcm_RMSenergy_sma_flatness_IC12;
pcm_RMSenergy_sma_peakDistStddev_IC12;
pcm_zcr_sma_amean_IC12;
pcm_zcr_sma_peakRangeRel_IC12;
pcm_zcr_sma_qregc3_IC12;
audSpec_Rfilt_sma[0]_flatness_IC12;
audSpec_Rfilt_sma[0]_centroid_IC12;
pcm_fftMag_spectralRollOff25.0_sma_linregc2_IC12;
pcm_fftMag_spectralRollOff25.0_sma_centroid_IC12;
pcm_fftMag_spectralRollOff50.0_sma_linregc2_IC12;
pcm_fftMag_spectralRollOff75.0_sma_amean_IC12;
pcm_fftMag_spectralRollOff75.0_sma_rqmean_IC12;
pcm_fftMag_spectralRollOff75.0_sma_linregc2_IC12;
pcm_fftMag_spectralRollOff75.0_sma_qregc2_IC12;
pcm_fftMag_spectralRollOff90.0_sma_amean_IC12;
pcm_fftMag_spectralRollOff90.0_sma_flatness_IC12;
pcm_fftMag_spectralRollOff90.0_sma_rqmean_IC12;
pcm_fftMag_spectralRollOff90.0_sma_linregc2_IC12;
pcm_fftMag_spectralRollOff90.0_sma_linregerrQ_IC12;
pcm_fftMag_spectralRollOff90.0_sma_qregc3_IC12;
pcm_fftMag_spectralRollOff90.0_sma_qregerrQ_IC12;
pcm_fftMag_spectralEntropy_sma_peakMeanAbs_IC12;
pcm_fftMag_spectralEntropy_sma_peakMeanMeanDist_IC12;
pcm_fftMag_spectralEntropy_sma_peakMeanRel_IC12;
pcm_fftMag_spectralEntropy_sma_meanRisingSlope_IC12;
pcm_fftMag_spectralEntropy_sma_stddevRisingSlope_IC12;
pcm_fftMag_spectralVariance_sma_amean_IC12;
pcm_fftMag_spectralVariance_sma_rqmean_IC12;
pcm_fftMag_spectralVariance_sma_peakRangeAbs_IC12;
pcm_fftMag_spectralVariance_sma_linregerrQ_IC12;
pcm_fftMag_spectralVariance_sma_qregc3_IC12;
pcm_fftMag_spectralVariance_sma_qregerrQ_IC12;
pcm_fftMag_spectralSkewness_sma_peakRangeRel_IC12;
pcm_fftMag_psySharpness_sma_amean_IC12;
pcm_fftMag_psySharpness_sma_flatness_IC12;
pcm_fftMag_psySharpness_sma_rqmean_IC12;
pcm_fftMag_mfcc_sma[1]_qregc3_IC12;
pcm_fftMag_mfcc_sma[6]_qregc1_IC12;
pcm_fftMag_mfcc_sma[8]_qregc3_IC12;
pcm_fftMag_mfcc_sma[10]_qregc3_IC12;
pcm_fftMag_mfcc_sma[10]_centroid_IC12;
audspecRasta_lengthL1norm_sma_de_flatness_IC12;
pcm_RMSenergy_sma_de_posamean_IC12;
pcm_zcr_sma_de_rqmean_IC12;
audSpec_Rfilt_sma_de[0]_flatness_IC12;
audSpec_Rfilt_sma_de[1]_flatness_IC12;
audSpec_Rfilt_sma_de[2]_flatness_IC12;
audSpec_Rfilt_sma_de[3]_flatness_IC12;
audSpec_Rfilt_sma_de[4]_flatness_IC12;
audSpec_Rfilt_sma_de[5]_flatness_IC12;
audSpec_Rfilt_sma_de[6]_flatness_IC12;
audSpec_Rfilt_sma_de[7]_flatness_IC12;
audSpec_Rfilt_sma_de[8]_flatness_IC12;
audSpec_Rfilt_sma_de[9]_flatness_IC12;
-audSpec_Rfilt_sma_de[10]_flatness_IC12;
audSpec_Rfilt_sma_de[11]_flatness_IC12;
audSpec_Rfilt_sma_de[12]_flatness_IC12;
audSpec_Rfilt_sma_de[22]_flatness_IC12;
audSpec_Rfilt_sma_de[23]_flatness_IC12;
audSpec_Rfilt_sma_de[24]_flatness_IC12;
audSpec_Rfilt_sma_de[25]_flatness_IC12;
pcm_fftMag_spectralSlope_sma_de_flatness_IC12;
pcm_fftMag_mfcc_sma_de[7]_posamean_IC12;
audspecRasta_lengthL1norm_sma_segLenStddev_IC13;
pcm_RMSenergy_sma_meanSegLen_IC13;
pcm_zcr_sma_range_IC13;
pcm_zcr_sma_percentile99.0_IC13;
pcm_zcr_sma_pctlrange0-1_IC13;
pcm_zcr_sma_stddev_IC13;
pcm_zcr_sma_lpgain_IC13;
pcm_zcr_sma_de_range_IC13;
pcm_zcr_sma_de_stddev_IC13;
pcm_zcr_sma_de_skewness_IC13;
pcm_zcr_sma_de_lpgain_IC13;
pcm_zcr_sma_de_lpc0_IC13;
pcm_fftMag_spectralCentroid_sma_stddev_IC13;
pcm_fftMag_spectralCentroid_sma_de_range_IC13;
F0final_sma_quartile2_IC13;
logHNR_sma_iqr2-3_IC13;
F0final_sma_de_quartile3_IC13;
F0final_sma_de_iqr2-3_IC13;
voicingFinalUnclipped_sma_de_amean_IC13;
jitterDDP_sma_de_centroid_IC13;
logHNR_sma_de_flatness_IC13;
audspec_lengthL1norm_sma_meanPeakDist_IC13;
audspec_lengthL1norm_sma_peakDistStddev_IC13;
pcm_RMSenergy_sma_meanPeakDist_IC13;
pcm_zcr_sma_amean_IC13;
pcm_zcr_sma_peakRangeRel_IC13;
pcm_zcr_sma_linregc2_IC13;
pcm_zcr_sma_qregc3_IC13;
audSpec_Rfilt_sma[0]_flatness_IC13;
pcm_fftMag_fband250-650_sma_meanPeakDist_IC13;
pcm_fftMag_spectralRollOff25.0_sma_linregc2_IC13;
pcm_fftMag_spectralRollOff25.0_sma_qregc3_IC13;
pcm_fftMag_spectralRollOff50.0_sma_centroid_IC13;
pcm_fftMag_spectralRollOff75.0_sma_amean_IC13;
pcm_fftMag_spectralRollOff75.0_sma_linregc2_IC13;
pcm_fftMag_spectralRollOff75.0_sma_centroid_IC13;
pcm_fftMag_spectralRollOff90.0_sma_flatness_IC13;
pcm_fftMag_spectralRollOff90.0_sma_rqmean_IC13;
pcm_fftMag_spectralRollOff90.0_sma_linregc2_IC13;
pcm_fftMag_spectralRollOff90.0_sma_qregerrQ_IC13;
pcm_fftMag_spectralRollOff90.0_sma_centroid_IC13;
pcm_fftMag_spectralFlux_sma_rqmean_IC13;
pcm_fftMag_spectralCentroid_sma_rqmean_IC13;
pcm_fftMag_spectralCentroid_sma_linregc2_IC13;
pcm_fftMag_spectralCentroid_sma_linregerrQ_IC13;
pcm_fftMag_spectralEntropy_sma_peakMeanAbs_IC13;
pcm_fftMag_spectralEntropy_sma_peakMeanMeanDist_IC13;
pcm_fftMag_spectralEntropy_sma_peakMeanRel_IC13;
pcm_fftMag_spectralEntropy_sma_meanRisingSlope_IC13;
pcm_fftMag_spectralEntropy_sma_stddevRisingSlope_IC13;
pcm_fftMag_spectralVariance_sma_amean_IC13;
pcm_fftMag_spectralVariance_sma_rqmean_IC13;
pcm_fftMag_spectralVariance_sma_qregerrQ_IC13;

pcm_fftMag_psySharpness_sma_rqmean_IC13;
pcm_fftMag_psySharpness_sma_linregc2_IC13;
pcm_fftMag_psySharpness_sma_linregerrQ_IC13;
pcm_fftMag_psySharpness_sma_centroid_IC13;
pcm_fftMag_spectralHarmonicity_sma_meanPeakDist_IC13;
mfcc_sma[6]_qregc1_IC13;
mfcc_sma[6]_qregc2_IC13;
mfcc_sma[8]_meanFallingSlope_IC13;
mfcc_sma[8]_qregc3_IC13;
audspecRasta_lengthL1norm_sma_de_flatness_IC13;
pcm_RMSenergy_sma_de_posamean_IC13;
pcm_zcr_sma_de_rqmean_IC13;
audSpec_Rfilt_sma_de[0]_flatness_IC13;
audSpec_Rfilt_sma_de[1]_flatness_IC13;
audSpec_Rfilt_sma_de[2]_flatness_IC13;
audSpec_Rfilt_sma_de[3]_flatness_IC13;
audSpec_Rfilt_sma_de[4]_flatness_IC13;
audSpec_Rfilt_sma_de[5]_flatness_IC13;
audSpec_Rfilt_sma_de[6]_flatness_IC13;
audSpec_Rfilt_sma_de[7]_flatness_IC13;
audSpec_Rfilt_sma_de[8]_flatness_IC13;
audSpec_Rfilt_sma_de[9]_flatness_IC13;
audSpec_Rfilt_sma_de[10]_flatness_IC13;
audSpec_Rfilt_sma_de[11]_flatness_IC13;
audSpec_Rfilt_sma_de[12]_flatness_IC13;
audSpec_Rfilt_sma_de[16]_peakMeanRel_IC13;
audSpec_Rfilt_sma_de[22]_flatness_IC13;
audSpec_Rfilt_sma_de[23]_flatness_IC13;
audSpec_Rfilt_sma_de[24]_flatness_IC13;
audSpec_Rfilt_sma_de[25]_flatness_IC13;
pcm_fftMag_fband250-650_sma_de_flatness_IC13;
pcm_fftMag_spectralCentroid_sma_de_peakMeanAbs_IC13;
pcm_fftMag_spectralCentroid_sma_de_peakMeanMeanDist_IC13;
pcm_fftMag_spectralEntropy_sma_de_peakRangeAbs_IC13;
pcm_fftMag_spectralEntropy_sma_de_peakMeanAbs_IC13;
pcm_fftMag_spectralEntropy_sma_de_peakMeanMeanDist_IC13;
pcm_fftMag_spectralEntropy_sma_de_meanRisingSlope_IC13;
pcm_fftMag_spectralEntropy_sma_de_stddevRisingSlope_IC13;
pcm_fftMag_spectralEntropy_sma_de_stddevFallingSlope_IC13;
pcm_fftMag_spectralSkewness_sma_de_peakRangeRel_IC13;
pcm_fftMag_spectralKurtosis_sma_de_flatness_IC13;
pcm_fftMag_spectralSlope_sma_de_flatness_IC13;
pcm_fftMag_psySharpness_sma_de_peakMeanAbs_IC13;
pcm_fftMag_psySharpness_sma_de_peakMeanMeanDist_IC13; and
mfcc_sma_de[7]_posamean_IC13.

8. The method of claim 1, further comprising preprocessing, at the processor, the voice samples by at least one selected from the group of:
performing a normalization of the voice samples;
performing dynamic compression of the voice samples; and
performing voice activity detection (VAD) of the voice samples.

9. The method of claim 1, further comprising
generating, at the processor, the blood glucose level prediction model based on the voice feature values for the subset of voice features, wherein each voice feature value is associated with a blood glucose level or category, and optionally at least one clinicopathological value for the at least one subject.

10. The method of claim 1, wherein the voice sample comprises a predetermined phrase vocalized by the at least one subject, optionally wherein the predetermined phrase comprises the date or time.

11. The method of claim 1, wherein the blood glucose level prediction model comprises a statistical classifier and/or statistical regressor.

12. A system for generating a blood glucose level prediction model, the system comprising:
a memory, the memory comprising:
a plurality of voice samples from at least one subject at a plurality of time points; and
a plurality of blood glucose levels, wherein each blood glucose level in the plurality of blood glucose levels is temporally associated with a voice sample in the plurality of voice samples;
a processor in communication with the memory, the processor configured to:
sort the plurality of voice samples into two or more blood glucose level categories based on the blood glucose levels;
extract voice feature values for a set of voice features from each of the voice samples;
determine for each voice feature in the set of voice features:
a univariate measure of whether the voice feature distinguishes between the two or more blood glucose level categories;
a measure of the intra-stability of the voice feature within each of the two or more blood glucose level groups;
a measure of the decision-making ability of the voice feature;
select a subset of voice features from the set of voice features based on the univariate measure, the measure of intra-stability and the measure of the decision-making ability; and
generate the blood glucose level prediction model based on the subset of voice features.

13. The system of claim 12, wherein the processor is further configured to generate the blood glucose level prediction model based on the subset of voice features by determining a weight for each voice feature in the subset of voice features.

14. The system of claim 12, wherein the processor is further configured to:
determine the univariate measure by calculating a False Discovery Rate (FDR)
determine the measure of intra-stability by calculating an intraclass correlation coefficient (ICC); and
determine the measure of the decision-making ability by calculating a Gini impurity score, optionally a Gini impurity score corrected for multiple comparisons ($Gini_c$).

15. The system of claim 14, wherein the processor is further configured to select the subset of voice features from the set of voice features based on at least one selected from the group of a FDR with a p-value less than 0.01; an ICC greater than 0.5 or greater than 0.75; and a $Gini_c$ greater than 0.5.

16. The system of claim 14, wherein the voice features are selected from the group of a Mel-Frequency Cepstral Coefficient (MFCC) feature, a logarithmic harmonic-to-noise ratio (logHNR) feature, a smoothed fundamental frequency contour (F0Final) feature, an envelope of smoothed F0Final (F0FinalEnv) feature, a difference of period lengths (JitterLocal) feature, a difference of JitterLocal (JitterDDP) feature, a voicing probability of the final fundamental frequency candidate with unclipped voicing threshold (VoicingFinalUnclipped) feature, an amplitude variations (ShimmerLocal) feature, an auditory spectrum coefficient (AudSpec) feature, a relative spectral transform of AudSpec (AudSpecRasta) feature, a logarithmic power of Mel-frequency bands (logMelFreqBand) feature, a line spectral pair frequency (LspFreq) value, and a Pulse-Code Modulation (PCM) feature.

17. The system of claim 16, wherein the voice features comprise at least one selected from the group of a (MFCC) feature, a PCM feature and an AudSpec feature.

18. The system of claim 17, wherein the voice features comprise at least one voice feature selected from the group of:

pcm_loudness_sma_quartile3_numeric_IC10;
   mfcc_sma_9_upleveltime75_numeric_IC10;
   mfcc_sma_de_7_quartile1_numeric_IC10;
   mfcc_sma_de_13_amean_numeric_IC10;
   logMelFreqBand_sma_de_4_skewness_numeric_IC10;
   F0final_sma_de_linregc1_numeric_IC10;
   audspec_lengthL1norm_sma_de_centroid_numeric_IC11;
   pcm_RMSenergy_sma_de_linregc1_numeric_IC11;
   pcm_RMSenergy_sma_de_centroid_numeric_IC11;
   pcm_zcr_sma_de_centroid_numeric_IC11;
   audSpec_Rfilt_sma_19_minSegLen_numeric_IC11;
   pcm_fftMag_mfcc_sma_1_meanPeakDist_numeric_IC11;
   pcm_fftMag_mfcc_sma_4_centroid_numeric_IC11;
   pcm_fftMag_mfcc_sma_5_centroid_numeric_IC11;
   pcm_fftMag_mfcc_sma_6_centroid_numeric_IC11;
   pcm_fftMag_mfcc_sma_7_centroid_numeric_IC11;
   pcm_fftMag_mfcc_sma_8_centroid_numeric_IC11;
   pcm_fftMag_mfcc_sma_9_centroid_numeric_IC11;
   pcm_fftMag_mfcc_sma_10_centroid_numeric_IC11;
   pcm_fftMag_mfcc_sma_12_centroid_numeric_IC11;
   audSpec_Rfilt_sma_de_0_centroid_numeric_IC11;
   audSpec_Rfilt_sma_de_1_minSegLen_numeric_IC11;
   audSpec_Rfilt_sma_de_1_centroid_numeric_IC11;
   audSpec_Rfilt_sma_de_2_centroid_numeric_IC11;
   audSpec_Rfilt_sma_de_3_centroid_numeric_IC11;
   audSpec_Rfilt_sma_de_4_centroid_numeric_IC11;
   audSpec_Rfilt_sma_de_5_centroid_numeric_IC11;
   audSpec_Rfilt_sma_de_6_peakDistStddev_numeric_IC11;
   audSpec_Rfilt_sma_de_6_centroid_numeric_IC11;
   audSpec_Rfilt_sma_de_7_maxSegLen_numeric_IC11;
   audSpec_Rfilt_sma_de_8_centroid_numeric_IC11;
   audSpec_Rfilt_sma_de_9_centroid_numeric_IC11;
   audSpec_Rfilt_sma_de_10_centroid_numeric_IC11;
   audSpec_Rfilt_sma_de_12_centroid_numeric_IC11;
   audSpec_Rfilt_sma_de_13_centroid_numeric_IC11;
   audSpec_Rfilt_sma_de_14_meanPeakDist_numeric_IC11;
   audSpec_Rfilt_sma_de_15_amean_numeric_IC11;
   audSpec_Rfilt_sma_de_15_centroid_numeric_IC11;
   audSpec_Rfilt_sma_de_17_centroid_numeric_IC11;
   audSpec_Rfilt_sma_de_18_centroid_numeric_IC11;
   audSpec_Rfilt_sma_de_19_centroid_numeric_IC11;
   audSpec_Rfilt_sma_de_20_centroid_numeric_IC11;
   audSpec_Rfilt_sma_de_21_centroid_numeric_IC11;
   audSpec_Rfilt_sma_de_22_centroid_numeric_IC11;
   audSpec_Rfilt_sma_de_23_centroid_numeric_IC11;
   audSpec_Rfilt_sma_de_25_centroid_numeric_IC11;
   pcm_fftMag_fband25_650_sma_de_minSegLen_numeric_IC11;
   pcm_fftMag_fband25_650_sma_de_linregc1_numeric_IC11;
   pcm_fftMag_fband25_650_sma_de_centroid_numeric_IC11;
   pcm_fftMag_fband1000_4000_sma_de_centroid_numeric_IC11;
   pcm_fftMag_spectralRollOff25.0_sma_de_falltime_numeric_IC11;
   pcm_fftMag_spectralRollOff90.0_sma_de_centroid_numeric_IC11;
   pcm_fftMag_spectralFlux_sma_de_centroid_numeric_IC11;
   pcm_fftMag_spectralEntropy_sma_de_centroid_numeric_IC11;
   pcm_fftMag_spectralVariance_sma_de_centroid_numeric_IC11;
   pcm_fftMag_spectralSkewness_sma_de_centroid_numeric_IC11;
   pcm_fftMag_spectralKurtosis_sma_de_centroid_numeric_IC11;
   pcm_fftMag_spectralSlope_sma_de_minSegLen_numeric_IC11;
   pcm_fftMag_spectralSlope_sma_de_linregc1_numeric_IC11;
   pcm_fftMag_spectralSlope_sma_de_centroid_numeric_IC11;
   pcm_fftMag_mfcc_sma_de_2_centroid_numeric_IC11;
   pcm_fftMag_mfcc_sma_de_3_peakDistStddev_numeric_IC11;
   pcm_fftMag_mfcc_sma_de_3_centroid_numeric_IC11;
   pcm_fftMag_mfcc_sma_de_6_kurtosis_numeric_IC11;
   pcm_fftMag_mfcc_sma_de_6_centroid_numeric_IC11;
   pcm_fftMag_mfcc_sma_de_7_quartile1_numeric_IC11;
   pcm_fftMag_mfcc_sma_de_7_percentile99.0_numeric_IC11;
   pcm_fftMag_mfcc_sma_de_7_centroid_numeric_IC11;
   pcm_fftMag_mfcc_sma_de_9_centroid_numeric_IC11;
   pcm_fftMag_mfcc_sma_de_10_centroid_numeric_IC11;
   pcm_fftMag_mfcc_sma_de_11_centroid_numeric_IC11;
   pcm_fftMag_mfcc_sma_de_12_centroid_numeric_IC11;
   F0final_sma_lpc0_numeric_IC11;
   jitterLocal_sma_quartile2_numeric_IC11;
   jitterDDP_sma_qregc1_numeric_IC11;
   F0final_sma_de_centroid_numeric_IC11;
   voicingFinalUnclipped_sma_de_skewness_numeric_IC11;
   voicingFinalUnclipped_sma_de_centroid_numeric_IC11;
   jitterLocal_sma_de_centroid_numeric_IC11;
   jitterDDP_sma_de_centroid_numeric_IC11;
   shimmerLocal_sma_de_centroid_numeric_IC11;
   pcm_fftMag_mfcc_sma_14_kurtosis_numeric_IC12;
   pcm_fftMag_fband250_650_sma_de_minSegLen_numeric_IC12;
   pcm_fftMag_spectralHarmonicity_sma_de_minSegLen_numeric_IC12;
   F0final_sma_ff0_meanSegLen_numeric_IC12;
   audSpec_Rfilt_sma_4_meanPeakDist_numeric_IC12;
   audSpec_Rfilt_sma_4_peakDistStddev_numeric_IC12;

pcm_fftMag_spectralRollOff50.0_sma_peakDistStddev_numeric_IC12;
pcm_fftMag_mfcc_sma_2_peakMeanRel_numeric_IC12;
pcm_fftMag_mfcc_sma_4_peakMeanRel_numeric_IC12;
pcm_fftMag_mfcc_sma_5_peakMeanRel_numeric_IC12;
pcm_fftMag_mfcc_sma_5_centroid_numeric_IC12;
pcm_fftMag_mfcc_sma_6_peakMeanRel_numeric_IC12;
pcm_fftMag_mfcc_sma_6_centroid_numeric_IC12;
pcm_fftMag_mfcc_sma_7_centroid_numeric_IC12;
pcm_fftMag_mfcc_sma_8_peakMeanRel_numeric_IC12;
pcm_fftMag_mfcc_sma_8_centroid_numeric_IC12;
pcm_fftMag_mfcc_sma_9_peakMeanRel_numeric_IC12;
pcm_fftMag_mfcc_sma_9_centroid_numeric_IC12;
pcm_fftMag_mfcc_sma_10_peakMeanRel_numeric_IC12;
pcm_fftMag_mfcc_sma_10_centroid_numeric_IC12;
pcm_fftMag_mfcc_sma_11_peakMeanRel_numeric_IC12;
pcm_fftMag_mfcc_sma_11_centroid_numeric_IC12;
pcm_fftMag_mfcc_sma_12_peakMeanRel_numeric_IC12;
pcm_fftMag_mfcc_sma_12_centroid_numeric_IC12;
pcm_fftMag_mfcc_sma_13_peakMeanRel_numeric_IC12;
pcm_fftMag_mfcc_sma_14_peakMeanRel_numeric_IC12;
pcm_fftMag_mfcc_sma_14__centroid_numeric_IC12;
pcm_RMSenergy_sma_de_posamean_numeric_IC12;
pcm_fftMag_mfcc_sma_de_7_posamean_numeric_IC12;
logHNR_sma_iqr2_3_numeric_IC13;
F0final_sma_de_centroid_numeric_IC13;
F0final_sma_de_quartile3_numeric_IC13;
F0final_sma_de_iqr2_3_numeric_IC13;
voicingFinalUnclipped_sma_de_amean_numeric_IC13;
voicingFinalUnclipped_sma_de_centroid_numeric_IC13;
jitterLocal_sma_de_centroid_numeric_IC13;
jitterDDP_sma_de_centroid_numeric_IC13;
jitterDDP_sma_de_upleveltime90_numeric_IC13;
logHNR_sma_de_flatness_numeric_IC13;
logHNR_sma_de_centroid_numeric_IC13;
audSpec_Rfilt_sma_4_meanPeakDist_numeric_IC13;
audSpec_Rfilt_sma_4_peakDistStddev_numeric_IC13;
pcm_fftMag_spectralRollOff50.0_sma_peakDistStddev_numeric_IC13;
pcm_fftMag_spectralFlux_sma_rqmean_numeric_IC13;
mfcc_sma_2_peakMeanRel_numeric_IC13;
mfcc_sma_3_peakMeanRel_numeric_IC13;
mfcc_sma_4_peakMeanRel_numeric_IC13;
mfcc_sma_4_centroid_numeric_IC13;
mfcc_sma_5_peakMeanRel_numeric_IC13;
mfcc_sma_5_centroid_numeric_IC13;
mfcc_sma_6_peakMeanRel_numeric_IC13;
mfcc_sma_6_centroid_numeric_IC13;
mfcc_sma_7_centroid_numeric_IC13;
mfcc_sma_8_peakMeanRel_numeric_IC13;
mfcc_sma_8_meanFallingSlope_numeric_IC13;
mfcc_sma_8_centroid_numeric_IC13;
mfcc_sma_9_peakMeanRel_numeric_IC13;
mfcc_sma_9_centroid_numeric_IC13;
mfcc_sma_10_peakMeanRel_numeric_IC13;
mfcc_sma_10_centroid_numeric_IC13;
mfcc_sma_11_peakMeanRel_numeric_IC13;
mfcc_sma_11_centroid_numeric_IC13;
mfcc_sma_12_peakMeanRel_numeric_IC13;
mfcc_sma_12_centroid_numeric_IC13;
mfcc_sma_13_peakMeanRel_numeric_IC13;
mfcc_sma_14_peakMeanRel_numeric_IC13;
mfcc_sma_14_centroid_numeric_IC13;
audspec_lengthL1norm_sma_de_peakMeanRel_numeric_IC13;
audspecRasta_lengthL1norm_sma_de_peakMeanRel_numeric_IC13;
pcm_RMSenergy_sma_de_posamean_numeric_IC13;
pcm_RMSenergy_sma_de_peakMeanRel_numeric_IC13;
audSpec_Rfilt_sma_de_0_peakMeanRel_numeric_IC13;
audSpec_Rfilt_sma_de_1_peakMeanRel_numeric_IC13;
audSpec_Rfilt_sma_de_2_peakMeanRel_numeric_IC13;
audSpec_Rfilt_sma_de_3_peakMeanRel_numeric_IC13;
audSpec_Rfilt_sma_de_4_peakMeanRel_numeric_IC13;
audSpec_Rfilt_sma_de_7_peakMeanRel_numeric_IC13;
audSpec_Rfilt_sma_de_9_peakMeanRel_numeric_IC13;
audSpec_Rfilt_sma_de_11_peakMeanRel_numeric_IC13;
audSpec_Rfilt_sma_de_12_peakMeanRel_numeric_IC13;
audSpec_Rfilt_sma_de_13_peakMeanRel_numeric_IC13;
audSpec_Rfilt_sma_de_14_peakMeanRel_numeric_IC13;
audSpec_Rfilt_sma_de_15_peakMeanRel_numeric_IC13;
audSpec_Rfilt_sma_de_16_peakMeanRel_numeric_IC13;
audSpec_Rfilt_sma_de_17_peakMeanRel_numeric_IC13;
audSpec_Rfilt_sma_de_19_peakMeanRel_numeric_IC13;
audSpec_Rfilt_sma_de_20_peakMeanRel_numeric_IC13;
audSpec_Rfilt_sma_de_21_peakMeanRel_numeric_IC13;
audSpec_Rfilt_sma_de_22_peakMeanRel_numeric_IC13;
audSpec_Rfilt_sma_de_23_peakMeanRel_numeric_IC13;
audSpec_Rfilt_sma_de_24_peakMeanRel_numeric_IC13;
audSpec_Rfilt_sma_de_25_peakMeanRel_numeric_IC13;
pcm_fftMag_fband250_650_sma_de_peakMeanRel_numeric_IC13;
pcm_fftMag_fband1000_4000_sma_de_peakMeanRel_numeric_IC13;
pcm_fftMag_spectralRollOff50.0_sma_de_peakMeanRel_numeric_IC13;
pcm_fftMag_spectralRollOff90.0_sma_de_peakMeanRel_numeric_IC13;
pcm_fftMag_spectralFlux_sma_de_peakMeanRel_numeric_IC13;
pcm_fftMag_spectralCentroid_sma_de_peakMeanRel_numeric_IC13;
pcm_fftMag_spectralEntropy_sma_de_peakMeanRel_numeric_IC13;
pcm_fftMag_spectralVariance_sma_de_peakMeanRel_numeric_IC13;
pcm_fftMag_spectralSkewness_sma_de_peakMeanRel_numeric_IC13;
pcm_fftMag_spectralKurtosis_sma_de_peakMeanRel_numeric_IC13;
pcm_fftMag_spectralSlope_sma_de_peakMeanRel_numeric_IC13;

pcm_fftMag_spectralHarmonicity_sma_de_peakMean-Rel_numeric_IC13;
mfcc_sma_de_1_peakMeanRel_numeric_IC13;
mfcc_sma_de_3_peakMeanRel_numeric_IC13;
mfcc_sma_de_5_peakMeanRel_numeric_IC13;
mfcc_sma_de_7_posamean_numeric_IC13;
mfcc_sma_de_7_peakMeanRel_numeric_IC13;
mfcc_sma_de_8_peakMeanRel_numeric_IC13;
mfcc_sma_de_9_peakMeanRel_numeric_IC13;
mfcc_sma_de_10_peakMeanRel_numeric_IC13;
mfcc_sma_de_11_peakMeanRel_numeric_IC13;
mfcc_sma_de_12_peakMeanRel_numeric_IC13;
mfcc_sma_de_14_peakMeanRel_numeric_IC13;
pcm_loudness_sma_quartile3_IC10;
mfcc_sma[0]_percentile1.0_IC10;
mfcc_sma[0]_pctlrange0-1_IC10;
mfcc_sma[8]_quartile3_IC10;
mfcc_sma[9]_upleveltime75_IC10;
mfcc_sma[10]_amean_IC10;
mfcc_sma[10]_linregc2_IC10;
mfcc_sma[10]_quartile1_IC10;
mfcc_sma[10]_quartile2_IC10;
mfcc_sma[10]_quartile3_IC10;
logMelFreqBand_sma[0]_percentile1.0_IC10;
logMelFreqBand_sma[0]_pctlrange0-1_IC10;
logMelFreqBand_sma[1]_linregc2_IC10;
logMelFreqBand_sma[1]_quartile2_IC10;
logMelFreqBand_sma[1]_percentile1.0_IC10;
logMelFreqBand_sma[1]_pctlrange0-1_IC10;
logMelFreqBand_sma[2]_percentile1.0_IC10;
logMelFreqBand_sma[2]_pctlrange0-1_IC10;
logMelFreqBand_sma[3]_linregc2_IC10;
logMelFreqBand_sma[3]_percentile1.0_IC10;
logMelFreqBand_sma[3]_pctlrange0-1_IC10;
logMelFreqBand_sma[3]_upleveltime75_IC10;
logMelFreqBand_sma[4]_percentile1.0_IC10;
logMelFreqBand_sma[4]_pctlrange0-1_IC10;
logMelFreqBand_sma[5]_percentile1.0_IC10;
logMelFreqBand_sma[5]_pctlrange0-1_IC10;
logMelFreqBand_sma[6]_percentile1.0_IC10;
logMelFreqBand_sma[7]_linregc1_IC10;
logMelFreqBand_sma_de[4]_skewness_IC10;
logMelFreqBand_sma_de[5]_skewness_IC10;
logMelFreqBand_sma_de[7]_skewness_IC10;
logMelFreqBand_sma_de[7]_upleveltime75_IC10;
logMelFreqBand_sma_de[7]_upleveltime90_IC10;
IspFreq_sma_de[5]_linregc2_IC10;
F0final_sma_quartile2_IC10;
F0final_sma_de_linregc1_IC10;
audspecRasta_lengthL1norm_sma_lpc1_IC11;
pcm_RMSenergy_sma_quartile2_IC11;
pcm_RMSenergy_sma_meanPeakDist_IC11;
pcm_zcr_sma_iqr1-3_IC11;
pcm_zcr_sma_percentile99.0_IC11;
pcm_zcr_sma_pctlrange0-1_IC11;
pcm_zcr_sma_amean_IC11;
pcm_zcr_sma_stddev_IC11;
pcm_zcr_sma_lpgain_IC11;
pcm_RMSenergy_sma_de_linregc1_IC11;
pcm_zcr_sma_de_amean_IC11;
pcm_zcr_sma_de_stddev_IC11;
pcm_zcr_sma_de_skewness_IC11;
pcm_zcr_sma_de_lpc0_IC11;
audSpec_Rfilt_sma[0]_segLenStddev_IC11;
audSpec_Rfilt_sma[3]_segLenStddev_IC11;
audSpec_Rfilt_sma[4]_segLenStddev_IC11;
audSpec_Rfilt_sma[8]_segLenStddev_IC11;
audSpec_Rfilt_sma[9]_segLenStddev_IC11;
audSpec_Rfilt_sma[10]_segLenStddev_IC11;
audSpec_Rfilt_sma[11]_segLenStddev_IC11;
audSpec_Rfilt_sma[12]_segLenStddev_IC11;
audSpec_Rfilt_sma[14]_segLenStddev_IC11;
pcm_fftMag_fband25-650_sma_iqr1-2_IC11;
pcm_fftMag_spectralRollOff25.0_sma_centroid_IC11;
pcm_fftMag_spectralRollOff50.0_sma_stddev_IC11;
pcm_fftMag_spectralRollOff50.0_sma_centroid_IC11;
pcm_fftMag_spectralRollOff75.0_sma_centroid_IC11;
pcm_fftMag_spectralRollOff90.0_sma_qregerrQ_IC11;
pcm_fftMag_spectralEntropy_sma_percentile99.0_IC11;
pcm_fftMag_spectralEntropy_sma_pctlrange0-1_IC11;
pcm_fftMag_spectralVariance_sma_quartile2_IC11;
pcm_fftMag_spectralVariance_sma_quartile3_IC11;
pcm_fftMag_spectralVariance_sma_iqr1-2_IC11;
pcm_fftMag_spectralVariance_sma_amean_IC11;
pcm_fftMag_spectralSkewness_sma_lpc0_IC11;
pcm_fftMag_spectralSkewness_sma_lpc3_IC11;
pcm_fftMag_spectralKurtosis_sma_kurtosis_IC11;
pcm_fftMag_spectralKurtosis_sma_lpc0_IC11;
pcm_fftMag_mfcc_sma[1]_meanPeakDist_IC11;
pcm_fftMag_mfcc_sma[10]_quartile1_IC11;
pcm_fftMag_mfcc_sma[10]_quartile2_IC11;
audSpec_Rfilt_sma_de[6]_peakDistStddev_IC11;
audSpec_Rfilt_sma_de[14]_meanPeakDist_IC11;
audSpec_Rfilt_sma_de[15]_amean_IC11;
pcm_fftMag_fband25-650_sma_de_linregc1_IC11;
pcm_fftMag_spectralVariance_sma_de_iqr1-3_IC11;
pcm_fftMag_spectralVariance_sma_de_amean_IC11;
pcm_fftMag_spectralVariance_sma_de_qregc2_IC11;
pcm_fftMag_spectralSkewness_sma_de_amean_IC11;
pcm_fftMag_spectralSkewness_sma_de_skewness_IC11;
pcm_fftMag_spectralSkewness_sma_de_qregc2_IC11;
pcm_fftMag_spectralKurtosis_sma_de_amean_IC11;
pcm_fftMag_spectralKurtosis_sma_de_skewness_IC11;
pcm_fftMag_spectralKurtosis_sma_de_qregc2_IC11;
pcm_fftMag_spectralSlope_sma_de_linregc1_IC11;
pcm_fftMag_mfcc_sma_de[7]_quartile1_IC11;
pcm_fftMag_mfcc_sma_de[7]_percentile99.0_IC11;
F0final_sma_quartile2_IC11;
F0final_sma_lpc0_IC11;
jitterLocal_sma_quartile2_IC11;
voicingFinalUnclipped_sma_de_skewness_IC11;
voicingFinalUnclipped_sma_de_centroid_IC11;
pcm_zcr_sma_range_IC12;
pcm_zcr_sma_de_range_IC12;
pcm_fftMag_spectralSkewness_sma_de_upleveltime50_IC12;
pcm_fftMag_spectralKurtosis_sma_de_upleveltime50_IC12;
pcm_fftMag_spectralKurtosis_sma_de_downleveltime50_IC12;
pcm_fftMag_spectralKurtosis_sma_de_upleveltime75_IC12;
pcm_fftMag_spectralKurtosis_sma_de_downleveltime75_IC12;
pcm_fftMag_psySharpness_sma_de_range_IC12;
pcm_fftMag_spectralHarmonicity_sma_de_quartile3_IC12;
F0final_sma_quartile1_IC12;
F0final_sma_quartile2_IC12;
F0final_sma_quartile3_IC12;
F0final_sma_ff0_meanSegLen_IC12;
audspec_lengthL1norm_sma_meanPeakDist_IC12;
pcm_RMSenergy_sma_flatness_IC12;

pcm_RMSenergy_sma_peakDistStddev_IC12;
pcm_zcr_sma_amean_IC12;
pcm_zcr_sma_peakRangeRel_IC12;
pcm_zcr_sma_qregc3_IC12;
audSpec_Rfilt_sma[0]_flatness_IC12;
audSpec_Rfilt_sma[0]_centroid_IC12;
pcm_fftMag_spectralRollOff25.0_sma_linregc2_IC12;
pcm_fftMag_spectralRollOff25.0_sma_centroid_IC12;
pcm_fftMag_spectralRollOff50.0_sma_linregc2_IC12;
pcm_fftMag_spectralRollOff75.0_sma_amean_IC12;
pcm_fftMag_spectralRollOff75.0_sma_rqmean_IC12;
pcm_fftMag_spectralRollOff75.0_sma_linregc2_IC12;
pcm_fftMag_spectralRollOff75.0_sma_qregc2_IC12;
pcm_fftMag_spectralRollOff90.0_sma_amean_IC12;
pcm_fftMag_spectralRollOff90.0_sma_flatness_IC12;
pcm_fftMag_spectralRollOff90.0_sma_rqmean_IC12;
pcm_fftMag_spectralRollOff90.0_sma_linregc2_IC12;
pcm_fftMag_spectralRollOff90.0_sma_linregerrQ_IC12;
pcm_fftMag_spectralRollOff90.0_sma_qregc3_IC12;
pcm_fftMag_spectralRollOff90.0_sma_qregerrQ_IC12;
pcm_fftMag_spectralEntropy_sma_peakMeanAbs_IC12;
pcm_fftMag_spectralEntropy_sma_peakMeanMeanDist_IC12;
pcm_fftMag_spectralEntropy_sma_peakMeanRel_IC12;
pcm_fftMag_spectralEntropy_sma_meanRisingSlope_IC12;
pcm_fftMag_spectralEntropy_sma_stddevRisingSlope_IC12;
pcm_fftMag_spectralVariance_sma_amean_IC12;
pcm_fftMag_spectralVariance_sma_rqmean_IC12;
pcm_fftMag_spectralVariance_sma_peakRangeAbs_IC12;
pcm_fftMag_spectralVariance_sma_linregerrQ_IC12;
pcm_fftMag_spectralVariance_sma_qregc3_IC12;
pcm_fftMag_spectralVariance_sma_qregerrQ_IC12;
pcm_fftMag_spectralSkewness_sma_peakRangeRel_IC12;
pcm_fftMag_psySharpness_sma_amean_IC12;
pcm_fftMag_psySharpness_sma_flatness_IC12;
pcm_fftMag_psySharpness_sma_rqmean_IC12;
pcm_fftMag_mfcc_sma[1]_qregc3_IC12;
pcm_fftMag_mfcc_sma[6]_qregc1_IC12;
pcm_fftMag_mfcc_sma[8]_qregc3_IC12;
pcm_fftMag_mfcc_sma[10]_qregc3_IC12;
pcm_fftMag_mfcc_sma[10]_centroid_IC12;
audspecRasta_lengthL1norm_sma_de_flatness_IC12;
pcm_RMSenergy_sma_de_posamean_IC12;
pcm_zcr_sma_de_rqmean_IC12;
audSpec_Rfilt_sma_de[0]_flatness_IC12;
audSpec_Rfilt_sma_de[1]_flatness_IC12;
audSpec_Rfilt_sma_de[2]_flatness_IC12;
audSpec_Rfilt_sma_de[3]_flatness_IC12;
audSpec_Rfilt_sma_de[4]_flatness_IC12;
audSpec_Rfilt_sma_de[5]_flatness_IC12;
audSpec_Rfilt_sma_de[6]_flatness_IC12;
audSpec_Rfilt_sma_de[7]_flatness_IC12;
audSpec_Rfilt_sma_de[8]_flatness_IC12;
audSpec_Rfilt_sma_de[9]_flatness_IC12;
audSpec_Rfilt_sma_de[10]_flatness_IC12;
audSpec_Rfilt_sma_de[11]_flatness_IC12;
audSpec_Rfilt_sma_de[12]_flatness_IC12;
audSpec_Rfilt_sma_de[22]_flatness_IC12;
audSpec_Rfilt_sma_de[23]_flatness_IC12;
audSpec_Rfilt_sma_de[24]_flatness_IC12;
audSpec_Rfilt_sma_de[25]_flatness_IC12;
pcm_fftMag_spectralSlope_sma_de_flatness_IC12;
pcm_fftMag_mfcc_sma_de[7]_posamean_IC12;
audspecRasta_lengthL1norm_sma_segLenStddev_IC13;
pcm_RMSenergy_sma_meanSegLen_IC13;
pcm_zcr_sma_range_IC13;
pcm_zcr_sma_percentile99.0_IC13;
pcm_zcr_sma_pctlrange0-1_IC13;
pcm_zcr_sma_stddev_IC13;
pcm_zcr_sma_lpgain_IC13;
pcm_zcr_sma_de_range_IC13;
pcm_zcr_sma_de_stddev_IC13;
pcm_zcr_sma_de_skewness_IC13;
pcm_zcr_sma_de_lpgain_IC13;
pcm_zcr_sma_de_lpc0_IC13;
pcm_fftMag_spectralCentroid_sma_stddev_IC13;
pcm_fftMag_spectralCentroid_sma_de_range_IC13;
F0final_sma_quartile2_IC13;
logHNR_sma_iqr2-3_IC13;
F0final_sma_de_quartile3_IC13;
F0final_sma_de_iqr2-3_IC13;
voicingFinalUnclipped_sma_de_amean_IC13;
jitterDDP_sma_de_centroid_IC13;
logHNR_sma_de_flatness_IC13;
audspec_lengthL1norm_sma_meanPeakDist_IC13;
audspec_lengthL1norm_sma_peakDistStddev_IC13;
pcm_RMSenergy_sma_meanPeakDist_IC13;
pcm_zcr_sma_amean_IC13;
pcm_zcr_sma_peakRangeRel_IC13;
pcm_zcr_sma_linregc2_IC13;
pcm_zcr_sma_qregc3_IC13;
audSpec_Rfilt_sma[0]_flatness_IC13;
pcm_fftMag_fband250-650_sma_meanPeakDist_IC13;
pcm_fftMag_spectralRollOff25.0_sma_linregc2_IC13;
pcm_fftMag_spectralRollOff25.0_sma_qregc3_IC13;
pcm_fftMag_spectralRollOff50.0_sma_centroid_IC13;
pcm_fftMag_spectralRollOff75.0_sma_amean_IC13;
pcm_fftMag_spectralRollOff75.0_sma_linregc2_IC13;
pcm_fftMag_spectralRollOff75.0_sma_centroid_IC13;
pcm_fftMag_spectralRollOff90.0_sma_flatness_IC13;
pcm_fftMag_spectralRollOff90.0_sma_rqmean_IC13;
pcm_fftMag_spectralRollOff90.0_sma_linregc2_IC13;
pcm_fftMag_spectralRollOff90.0_sma_qregerrQ_IC13;
pcm_fftMag_spectralRollOff90.0_sma_centroid_IC13;
pcm_fftMag_spectralFlux_sma_rqmean_IC13;
pcm_fftMag_spectralCentroid_sma_rqmean_IC13;
pcm_fftMag_spectralCentroid_sma_linregc2_IC13;
pcm_fftMag_spectralCentroid_sma_linregerrQ_IC13;
pcm_fftMag_spectralEntropy_sma_peakMeanAbs_IC13;
pcm_fftMag_spectralEntropy_sma_peakMeanMeanDist_IC13;
pcm_fftMag_spectralEntropy_sma_peakMeanRel_IC13;
pcm_fftMag_spectralEntropy_sma_meanRisingSlope_IC13;
pcm_fftMag_spectralEntropy_sma_stddevRisingSlope_IC13;
pcm_fftMag_spectralVariance_sma_amean_IC13;
pcm_fftMag_spectralVariance_sma_rqmean_IC13;
pcm_fftMag_spectralVariance_sma_qregerrQ_IC13;
pcm_fftMag_psySharpness_sma_rqmean_IC13;
pcm_fftMag_psySharpness_sma_linregc2_IC13;
pcm_fftMag_psySharpness_sma_linregerrQ_IC13;
pcm_fftMag_psySharpness_sma_centroid_IC13;
pcm_fftMag_spectralHarmonicity_sma_meanPeakDist_IC13;
mfcc_sma[6]_qregc1_IC13;
mfcc_sma[6]_qregc2_IC13;
mfcc_sma[8]_meanFallingSlope_IC13;
mfcc_sma[8]_qregc3_IC13;
audspecRasta_lengthL1norm_sma_de_flatness_IC13;

pcm_RMSenergy_sma_de_posamean_IC13;
pcm_zcr_sma_de_rqmean_IC13;
audSpec_Rfilt_sma_de[0]_flatness_IC13;
audSpec_Rfilt_sma_de[1]_flatness_IC13;
audSpec_Rfilt_sma_de[2]_flatness_IC13;
audSpec_Rfilt_sma_de[3]_flatness_IC13;
audSpec_Rfilt_sma_de[4]_flatness_IC13;
audSpec_Rfilt_sma_de[5]_flatness_IC13;
audSpec_Rfilt_sma_de[6]_flatness_IC13;
audSpec_Rfilt_sma_de[7]_flatness_IC13;
audSpec_Rfilt_sma_de[8]_flatness_IC13;
audSpec_Rfilt_sma_de[9]_flatness_IC13;
audSpec_Rfilt_sma_de[10]_flatness_IC13;
audSpec_Rfilt_sma_de[11]_flatness_IC13;
audSpec_Rfilt_sma_de[12]_flatness_IC13;
audSpec_Rfilt_sma_de[16]_peakMeanRel_IC13;
audSpec_Rfilt_sma_de[22]_flatness_IC13;
audSpec_Rfilt_sma_de[23]_flatness_IC13;
audSpec_Rfilt_sma_de[24]_flatness_IC13;
audSpec_Rfilt_sma_de[25]_flatness_IC13;
pcm_fftMag_fband250-650_sma_de_flatness_IC13;
pcm_fftMag_spectralCentroid_sma_de_peakMeanAbs_IC13;
pcm_fftMag_spectralCentroid_sma_de_peakMeanMeanDist_IC13;
pcm_fftMag_spectralEntropy_sma_de_peakRangeAbs_IC13;
pcm_fftMag_spectralEntropy_sma_de_peakMeanAbs_IC13;
pcm_fftMag_spectralEntropy_sma_de_peakMeanMeanDist_IC13;
pcm_fftMag_spectralEntropy_sma_de_meanRisingSlope_IC13;
pcm_fftMag_spectralEntropy_sma_de_stddevRisingSlope_IC13;
pcm_fftMag_spectralEntropy_sma_de_stddevFallingSlope_IC13;
pcm_fftMag_spectralSkewness_sma_de_peakRangeRel_IC13;
pcm_fftMag_spectralKurtosis_sma_de_flatness_IC13;
pcm_fftMag_spectralSlope_sma_de_flatness_IC13;
pcm_fftMag_psySharpness_sma_de_peakMeanAbs_IC13;
pcm_fftMag_psySharpness_sma_de_peakMeanMeanDist_IC13; and
mfcc_sma_de[7]_posamean_IC13.

19. The system of claim 12, wherein the processor is further configured to preprocess the voice samples by performing at least one selected from the group of:
performing a normalization of the voice samples;
performing dynamic compression of the voice samples; and
performing voice activity detection (VAD) of the voice samples.

20. The system of claim 12, wherein the processor is further configured to:
generate the blood glucose level prediction model based on the voice feature values for the subset of voice features, wherein each voice feature value is associated with a blood glucose level or category, and optionally at least one clinicopathological value for the at least one subject.

21. The system of claim 12, wherein the voice sample comprises a predetermined phrase vocalized by the subjects, optionally wherein the predetermined phrase comprises the date or time.

22. The system of claim 12, wherein the blood glucose level prediction model comprises a statistical classifier and/or a statistical regressor.

* * * * *